US012018662B2

(12) United States Patent
Keith et al.

(10) Patent No.: US 12,018,662 B2
(45) Date of Patent: Jun. 25, 2024

(54) HIGH PRESSURE PUMP

(71) Applicant: Kerr Machine Co., Sulphur, OK (US)

(72) Inventors: John Keith, Ardmore, OK (US); Micheal Cole Thomas, Ardmore, OK (US); Christopher Todd Barnett, Stratford, OK (US); Kelcy Jake Foster, Ardmore, OK (US); Nicholas Son, Davis, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 17/952,729

(22) Filed: Sep. 26, 2022

(65) Prior Publication Data

US 2023/0012666 A1    Jan. 19, 2023

Related U.S. Application Data

(63) Continuation of application No. 17/884,691, filed on Aug. 10, 2022, which is a continuation-in-part of (Continued)

(51) Int. Cl.
*F04B 15/02* (2006.01)
*F04B 1/0452* (2020.01)
(Continued)

(52) U.S. Cl.
CPC ............ *F04B 15/02* (2013.01); *F04B 1/0452* (2013.01); *F04B 1/0538* (2013.01);
(Continued)

(58) Field of Classification Search
CPC ...... F04B 15/02; F04B 1/0452; F04B 1/0538; F04B 7/0003; F04B 7/0088; F04B 53/007;
(Continued)

(56) References Cited

U.S. PATENT DOCUMENTS 677,137 A    6/1901  Leavitt
1,316,539 A  9/1919  Ford
(Continued)

FOREIGN PATENT DOCUMENTS

CN    207974953 U    10/2018
EP    2494140 B1      5/2017
(Continued)

OTHER PUBLICATIONS

Bolt Science, The Use of Two Nuts to Prevent Self Loosening, Jan. 9, 2015, https://www.boltscience.com/pages/twonuts.htm (Year: 2015).
(Continued)

*Primary Examiner* — Connor J Tremarche
(74) *Attorney, Agent, or Firm* — Tomlinson McKinstry, P.C.

(57) ABSTRACT

A high pressure pump. The pump comprises a fluid end assembly supported on a power end assembly. The power end assembly is modular and held together by a first set of stay rods. The fluid end assembly comprises a plurality of fluid end sections positioned in a side-by-side relationship. Each fluid end section comprises a housing made of multiple-piece construction. One or more pieces of the housing are configured to having a second set of stay rods attached thereto. The second set of stay rods interconnect the fluid end assembly and a power end assembly and a vertically offset from the first set of stay rods.

33 Claims, 90 Drawing Sheets

Related U.S. Application Data application No. 17/825,173, filed on May 26, 2022, now Pat. No. 11,846,282, which is a continuation of application No. 16/951,895, filed on Nov. 18, 2020, now Pat. No. 11,346,339, said application No. 17/884,691 is a continuation-in-part of application No. 17/550,453, filed on Dec. 14, 2021, now Pat. No. 11,635,068, which is a continuation-in-part of application No. 16/951,844, filed on Nov. 18, 2020, now Pat. No. 11,208,996.

(60) Provisional application No. 63/343,180, filed on May 18, 2022, provisional application No. 63/334,355, filed on Apr. 25, 2022, provisional application No. 63/312,541, filed on Feb. 22, 2022, provisional application No. 63/310,269, filed on Feb. 15, 2022, provisional application No. 63/309,168, filed on Feb. 11, 2022, provisional application No. 63/304,070, filed on Jan. 28, 2022, provisional application No. 63/301,524, filed on Jan. 21, 2022, provisional application No. 63/246,099, filed on Sep. 20, 2021, provisional application No. 63/240,889, filed on Sep. 4, 2021, provisional application No. 63/235,251, filed on Aug. 20, 2021, provisional application No. 63/233,241, filed on Aug. 14, 2021, provisional application No. 63/217,566, filed on Jul. 1, 2021, provisional application No. 63/191,619, filed on May 21, 2021, provisional application No. 63/175,692, filed on Apr. 16, 2021, provisional application No. 63/172,398, filed on Apr. 8, 2021, provisional application No. 63/171,866, filed on Apr. 7, 2021, provisional application No. 63/124,945, filed on Dec. 14, 2020, provisional application No. 63/089,882, filed on Oct. 9, 2020, provisional application No. 63/076,587, filed on Sep. 10, 2020, provisional application No. 63/053,797, filed on Jul. 20, 2020, provisional application No. 63/046,826, filed on Jul. 1, 2020, provisional application No. 63/040,086, filed on Jun. 17, 2020, provisional application No. 63/033,244, filed on Jun. 2, 2020, provisional application No. 63/027,584, filed on May 20, 2020, provisional application No. 63/019,789, filed on May 4, 2020, provisional application No. 63/018,021, filed on Apr. 30, 2020, provisional application No. 63/008,036, filed on Apr. 10, 2020, provisional application No. 62/990,817, filed on Mar. 17, 2020, provisional application No. 62/968,634, filed on Jan. 31, 2020, provisional application No. 62/960,366, filed on Jan. 13, 2020, provisional application No. 62/960,194, filed on Jan. 13, 2020, provisional application No. 62/959,570, filed on Jan. 10, 2020, provisional application No. 62/957,489, filed on Jan. 6, 2020, provisional application No. 62/953,763, filed on Dec. 26, 2019.

(51) Int. Cl.

| | | |
|---|---|---|
| *F04B 1/0538* | (2020.01) | |
| *F04B 7/00* | (2006.01) | |
| *F04B 7/02* | (2006.01) | |
| *F04B 53/00* | (2006.01) | |
| *F04B 53/10* | (2006.01) | |
| *F04B 53/14* | (2006.01) | |
| *F04B 53/16* | (2006.01) | |
| *F04B 53/22* | (2006.01) | |
| *F16K 1/42* | (2006.01) | |
| *F16K 11/10* | (2006.01) | |
| *F16K 15/06* | (2006.01) | |
| *F16L 55/11* | (2006.01) | |
| *E21B 43/26* | (2006.01) | |
| *F04B 17/00* | (2006.01) | |
| *F04B 19/04* | (2006.01) | |
| *F04B 19/22* | (2006.01) | |
| *F04B 53/18* | (2006.01) | |

(52) U.S. Cl.
CPC .......... *F04B 7/0003* (2013.01); *F04B 7/0088* (2013.01); *F04B 7/0208* (2013.01); *F04B 53/007* (2013.01); *F04B 53/1022* (2013.01); *F04B 53/1032* (2013.01); *F04B 53/14* (2013.01); *F04B 53/162* (2013.01); *F04B 53/164* (2013.01); *F04B 53/22* (2013.01); *F16K 1/42* (2013.01); *F16K 11/105* (2013.01); *F16K 15/063* (2013.01); *F16L 55/11* (2013.01); *E21B 43/2607* (2020.05); *F04B 7/0084* (2013.01); *F04B 7/0266* (2013.01); *F04B 17/00* (2013.01); *F04B 19/04* (2013.01); *F04B 19/22* (2013.01); *F04B 53/006* (2013.01); *F04B 53/18* (2013.01); *F16K 15/066* (2013.01)

(58) Field of Classification Search
CPC .. F04B 53/1022; F04B 53/1032; F04B 53/14; F04B 53/162; F04B 53/164; F04B 53/22; F04B 7/0084; F04B 7/0266; F04B 17/00; F04B 19/04; F04B 19/22; F04B 53/006; F04B 53/18; F16K 15/066; F16K 1/42; F16K 11/105; F16K 15/063; F16L 55/11; E21B 43/2607
See application file for complete search history.

(56) References Cited

U.S. PATENT DOCUMENTS

| | | | |
|---|---|---|---|
| 1,317,294 A | 9/1919 | Hildebrand | |
| 1,662,725 A | 3/1928 | Toney, Jr. | |
| 1,822,682 A | 9/1931 | Weiger | |
| 1,836,498 A * | 12/1931 | Pielstick | F02F 1/102 |
| | | | 92/147 |
| 2,495,880 A | 1/1950 | Volpin | |
| 2,545,506 A | 3/1951 | Walsh | |
| 2,713,522 A | 7/1955 | Petch | |
| 2,756,960 A | 7/1956 | Church | |
| 2,771,846 A | 11/1956 | Horton et al. | |
| 2,783,810 A | 3/1957 | Wrigley | |
| 2,828,696 A | 4/1958 | Wright | |
| 2,856,857 A | 10/1958 | Saalfrank | |
| 2,957,422 A | 10/1960 | Loeber | |
| 3,005,412 A | 10/1961 | Camp | |
| 3,053,500 A | 9/1962 | Atkinson | |
| 3,146,724 A | 9/1964 | Cornelsen | |
| 3,152,787 A | 10/1964 | Timmons | |
| 3,173,648 A | 3/1965 | McGuire et al. | |
| 3,179,121 A | 4/1965 | Bredtschneider et al. | |
| 3,244,424 A | 4/1966 | Cope | |
| 3,257,952 A | 6/1966 | McCormick | |
| 3,301,197 A | 1/1967 | Dodson | |
| 3,309,013 A | 3/1967 | Bauer | |
| 3,373,695 A | 3/1968 | Yohpe | |
| 3,427,988 A | 2/1969 | Redman et al. | |
| 3,463,527 A | 8/1969 | Baker | |
| 3,474,808 A | 10/1969 | Elliott | |
| 3,508,849 A | 4/1970 | Weber | |
| 3,589,387 A | 6/1971 | Raymond | |
| 3,679,332 A | 7/1972 | Yohpe | |
| 3,702,624 A | 11/1972 | Fries | |
| 3,746,483 A | 7/1973 | Hindel et al. | |
| 3,756,229 A | 9/1973 | Ollivier | |
| 3,776,558 A | 12/1973 | Maurer et al. | |

(56) References Cited

U.S. PATENT DOCUMENTS

| | | |
|---|---|---|
| 3,887,305 A | 6/1975 | Ito |
| 4,047,850 A | 9/1977 | Berthelot |
| 4,170,214 A | 10/1979 | Gill et al. |
| 4,174,194 A | 11/1979 | Hammelmann |
| 4,277,229 A | 7/1981 | Pacht |
| 4,289,317 A * | 9/1981 | Kuc .................. F04D 29/106 251/340 |
| 4,363,463 A | 12/1982 | Moon, Jr. |
| 4,388,050 A | 6/1983 | Schuller |
| 4,467,703 A | 8/1984 | Redwine et al. |
| 4,470,771 A | 9/1984 | Hall et al. |
| 4,494,415 A * | 1/1985 | Elliston .................. F04B 9/045 92/255 |
| 4,518,329 A | 5/1985 | Weaver |
| 4,520,837 A | 6/1985 | Cole et al. |
| 4,616,983 A | 10/1986 | Hanafi |
| 4,768,933 A | 9/1988 | Stachowiak |
| 4,771,801 A | 9/1988 | Crump et al. |
| 4,773,833 A | 9/1988 | Wilkinson et al. |
| 4,778,347 A | 10/1988 | Mize |
| 4,861,241 A | 8/1989 | Gamboa et al. |
| 4,878,815 A | 11/1989 | Stachowiak |
| 4,891,241 A | 1/1990 | Hashimoto et al. |
| 4,948,349 A | 8/1990 | Koiwa |
| 4,984,970 A | 1/1991 | Eickmann |
| 5,059,101 A | 10/1991 | Valavaara |
| 5,061,159 A | 10/1991 | Pryor |
| 5,073,096 A | 12/1991 | King et al. |
| 5,088,521 A | 2/1992 | Johnson |
| 5,127,807 A | 7/1992 | Eslinger |
| 5,145,340 A | 9/1992 | Allard |
| 5,207,242 A | 5/1993 | Daghe et al. |
| 5,226,445 A | 7/1993 | Surjaatmadja |
| 5,230,363 A | 7/1993 | Winn, Jr. et al. |
| 5,253,987 A | 10/1993 | Harrison |
| 5,299,921 A | 4/1994 | Ritcher |
| 5,302,087 A * | 4/1994 | Pacht .................. F04B 53/007 417/571 |
| 5,362,215 A | 11/1994 | King |
| 5,370,148 A | 12/1994 | Shafer |
| 5,382,057 A * | 1/1995 | Richter .................. F04B 53/1022 411/405 |
| 5,507,219 A | 4/1996 | Stogner |
| 5,524,902 A | 6/1996 | Cornette |
| 5,605,449 A | 2/1997 | Reed |
| 5,636,975 A | 6/1997 | Tiffany et al. |
| D383,053 S | 9/1997 | Schrader et al. |
| 5,848,880 A | 12/1998 | Helmig |
| 5,924,853 A * | 7/1999 | Pacht .................. F04B 53/147 417/567 |
| 6,000,469 A * | 12/1999 | Bassinger .................. E21B 33/08 166/241.1 |
| 6,164,318 A | 12/2000 | Dixon |
| 6,167,959 B1 | 1/2001 | Bassinger et al. |
| 6,231,323 B1 | 5/2001 | Jezek |
| 6,257,626 B1 | 7/2001 | Campau |
| 6,382,940 B1 | 5/2002 | Blume |
| 6,419,459 B1 | 7/2002 | Sibbing |
| 6,544,012 B1 | 4/2003 | Blume |
| 6,641,112 B2 | 11/2003 | Antoff et al. |
| 6,910,871 B1 | 6/2005 | Blume |
| 7,140,211 B2 | 11/2006 | Tremblay |
| 7,168,440 B1 | 1/2007 | Blume |
| 7,186,097 B1 | 3/2007 | Blume |
| 7,290,560 B2 | 11/2007 | Orr et al. |
| 7,296,591 B2 | 11/2007 | Moe et al. |
| 7,335,002 B2 | 2/2008 | Vicars |
| 7,506,574 B2 * | 3/2009 | Jensen .................. F04B 53/007 417/454 |
| 7,513,483 B1 | 4/2009 | Blume |
| 7,513,759 B1 | 4/2009 | Blume |
| 7,591,450 B1 | 9/2009 | Blume |
| D616,966 S | 6/2010 | Angell |
| 7,789,133 B2 | 9/2010 | McGuire |
| 7,828,053 B2 | 11/2010 | McGuire et al. |
| 7,845,413 B2 | 12/2010 | Shampine et al. |
| D631,142 S | 1/2011 | Angell |
| 7,866,346 B1 | 1/2011 | Walters |
| 7,963,502 B2 | 6/2011 | Lovell et al. |
| 8,083,504 B2 | 12/2011 | Williams et al. |
| 8,100,407 B2 | 1/2012 | Stanton et al. |
| 8,141,849 B1 | 3/2012 | Blume |
| 8,240,634 B2 | 8/2012 | Jarchau et al. |
| 8,317,498 B2 | 11/2012 | Gambier et al. |
| 8,360,094 B2 | 1/2013 | Steinbock et al. |
| 8,365,754 B2 | 2/2013 | Riley et al. |
| 8,528,462 B2 | 9/2013 | Pacht |
| 8,701,546 B2 | 4/2014 | Pacht |
| 9,010,412 B2 | 4/2015 | McGuire |
| D731,035 S | 6/2015 | Lo Cicero |
| D737,497 S | 8/2015 | Burgess et al. |
| 9,188,121 B1 | 11/2015 | Dille |
| D748,228 S | 1/2016 | Bayyouk et al. |
| 9,260,933 B2 | 2/2016 | Artherholt et al. |
| 9,291,274 B1 | 3/2016 | Blume |
| 9,328,745 B2 | 5/2016 | Bartlok et al. |
| 9,371,919 B2 | 6/2016 | Forrest et al. |
| 9,416,887 B2 | 8/2016 | Blume |
| 9,435,454 B2 | 9/2016 | Blume |
| 9,470,226 B2 | 10/2016 | Johnson et al. |
| 9,534,473 B2 | 1/2017 | Morris et al. |
| 9,631,739 B2 | 4/2017 | Belshan et al. |
| D787,029 S | 5/2017 | Bayyouk et al. |
| 9,670,922 B2 | 6/2017 | Pacht |
| 9,732,746 B2 | 8/2017 | Chandrasekaran et al. |
| 9,791,082 B2 | 10/2017 | Baxter et al. |
| 9,822,894 B2 | 11/2017 | Bayyouk et al. |
| D806,241 S | 12/2017 | Swinney et al. |
| 10,184,470 B2 | 1/2019 | Barnett, Jr. |
| 10,221,847 B2 | 3/2019 | Dyer |
| 10,240,597 B2 | 3/2019 | Bayyouk et al. |
| 10,352,321 B2 | 7/2019 | Byrne et al. |
| 10,393,113 B2 | 8/2019 | Wagner |
| 10,677,380 B1 | 6/2020 | Surjaatmadja et al. |
| 10,711,778 B2 | 7/2020 | Buckley |
| 10,760,567 B2 | 9/2020 | Salih et al. |
| 10,767,773 B2 | 9/2020 | Lee |
| 10,871,227 B1 | 12/2020 | Belshan et al. |
| 11,162,479 B2 | 11/2021 | Thomas |
| 11,261,863 B2 | 3/2022 | Beisel et al. |
| 2002/0166588 A1 | 11/2002 | Dean |
| 2004/0170507 A1 | 9/2004 | Vicars |
| 2004/0234404 A1 | 11/2004 | Vicars |
| 2006/0002806 A1 | 1/2006 | Baxter et al. |
| 2006/0027779 A1 | 2/2006 | McGuire et al. |
| 2008/0006089 A1 | 1/2008 | Adnan et al. |
| 2008/0008605 A1 | 1/2008 | Bauer et al. |
| 2008/0093361 A1 | 4/2008 | Kennedy et al. |
| 2008/0181798 A1 | 7/2008 | Folk |
| 2008/0279705 A1 | 11/2008 | Wago et al. |
| 2008/0279706 A1 | 11/2008 | Gambier et al. |
| 2009/0194717 A1 | 8/2009 | Jarchau et al. |
| 2010/0129249 A1* | 5/2010 | Bianchi .................. F04B 39/14 417/521 |
| 2010/0243255 A1 | 9/2010 | Luharuka et al. |
| 2011/0079302 A1 | 4/2011 | Hawes |
| 2011/0173814 A1 | 7/2011 | Patel |
| 2011/0189040 A1 | 8/2011 | Vicars |
| 2011/0206546 A1 | 8/2011 | Vicars |
| 2011/0206547 A1 | 8/2011 | Kim et al. |
| 2011/0236238 A1 | 9/2011 | Cordes et al. |
| 2012/0063936 A1 | 3/2012 | Baxter et al. |
| 2012/0141308 A1 | 6/2012 | Saini et al. |
| 2012/0187321 A1 | 7/2012 | Small |
| 2012/0272764 A1 | 11/2012 | Pendleton |
| 2013/0020521 A1 | 1/2013 | Byrne |
| 2013/0045123 A1 | 2/2013 | Roman et al. |
| 2013/0105175 A1 | 5/2013 | Mailand et al. |
| 2013/0112074 A1 | 5/2013 | Small |
| 2013/0202458 A1 | 8/2013 | Byrne et al. |
| 2013/0263932 A1 | 10/2013 | Baxter et al. |
| 2013/0319220 A1 | 12/2013 | Luharuka et al. |
| 2014/0127062 A1 | 5/2014 | Buckley et al. |

(56) References Cited

U.S. PATENT DOCUMENTS

| | | |
|---|---|---|
| 2014/0196570 A1 | 7/2014 | Small et al. |
| 2014/0196883 A1 | 7/2014 | Artherholt et al. |
| 2014/0348677 A1 | 11/2014 | Moeller et al. |
| 2015/0071803 A1 | 3/2015 | Huang |
| 2015/0084335 A1 | 3/2015 | Farrell et al. |
| 2015/0101694 A1* | 4/2015 | Forrest ............ F04B 53/164 137/861 |
| 2015/0132152 A1 | 5/2015 | Lazzara |
| 2015/0132157 A1 | 5/2015 | Whaley et al. |
| 2015/0144826 A1 | 5/2015 | Bayyouk et al. |
| 2015/0147194 A1 | 5/2015 | Foote |
| 2015/0159647 A1* | 6/2015 | Dille ............ F04B 53/144 92/169.1 |
| 2015/0211641 A1 | 7/2015 | Pacht |
| 2015/0219096 A1 | 8/2015 | Jain et al. |
| 2015/0300332 A1 | 10/2015 | Kotapish et al. |
| 2016/0025082 A1 | 1/2016 | Bryne et al. |
| 2016/0123313 A1 | 5/2016 | Simmons |
| 2016/0160848 A1 | 6/2016 | Toppings et al. |
| 2016/0281699 A1 | 9/2016 | Gnessin et al. |
| 2016/0369792 A1* | 12/2016 | Wagner ............ F04B 53/22 |
| 2017/0002947 A1 | 1/2017 | Bayyouk et al. |
| 2017/0089473 A1 | 3/2017 | Nowell et al. |
| 2017/0204852 A1 | 7/2017 | Barnett, Jr. |
| 2017/0211565 A1 | 7/2017 | Morreale |
| 2017/0218951 A1 | 8/2017 | Graham et al. |
| 2018/0017173 A1 | 1/2018 | Nowell et al. |
| 2018/0045187 A1 | 2/2018 | Nagel et al. |
| 2018/0058447 A1 | 3/2018 | Foster |
| 2018/0313456 A1 | 11/2018 | Bayyouk et al. |
| 2018/0363642 A1* | 12/2018 | Salih ............ F04B 53/1027 |
| 2019/0011051 A1 | 1/2019 | Yeung |
| 2019/0017503 A1 | 1/2019 | Foster et al. |
| 2019/0032685 A1 | 1/2019 | Foster et al. |
| 2019/0049052 A1 | 2/2019 | Shuck |
| 2019/0063427 A1 | 2/2019 | Nowell et al. |
| 2019/0120389 A1 | 4/2019 | Foster et al. |
| 2019/0128104 A1 | 5/2019 | Graham et al. |
| 2019/0136842 A1 | 5/2019 | Nowell et al. |
| 2019/0145391 A1 | 5/2019 | Davids |
| 2019/0277279 A1 | 9/2019 | Byrne et al. |
| 2019/0277341 A1 | 9/2019 | Byrne et al. |
| 2019/0368619 A1 | 12/2019 | Barnett et al. |
| 2020/0182240 A1 | 6/2020 | Nowell et al. |
| 2020/0191146 A1 | 6/2020 | Rinaldi et al. |
| 2020/0232455 A1 | 7/2020 | Blume |
| 2020/0362678 A1 | 11/2020 | Lesko |

FOREIGN PATENT DOCUMENTS

| | | |
|---|---|---|
| WO | 2014144113 A2 | 9/2014 |
| WO | 2017096488 A1 | 6/2017 |
| WO | 2017139348 A1 | 8/2017 |
| WO | 2018197458 A1 | 11/2018 |

OTHER PUBLICATIONS

U.S. Patent and Trademark Office, "Office Action Summary", dated Apr. 9, 2021, 38 pages, Alexandria, VA.

U.S. Patent and Trademark Office, "Office Action Summary", dated Aug. 10, 2021, 10 pages, Alexandria, VA.

Patent Cooperation Treaty, "PCT Written Opinion of the International Searching Authority", dated Mar. 2, 2021, 9 pages, Korean Intellectual Property Office, Korea.

Patent Cooperation Treaty, "PCT Written Opinion of the International Searching Authority", dated Mar. 8, 2021, 8 pages, Korean Intellectual Property Office, Korea.

U.S. Patent and Trademark Office, "Office Action Summary", dated Jun. 10, 2021, 42 pages, Alexandria, VA.

U.S. Patent and Trademark Office, "Office Action Summary", dated Oct. 15, 2021, 16 pages, Alexandria, VA.

U.S. Patent and Trademark Office, "Office Action Summary", dated Mar. 15, 2022, 32 pages, Alexandria, VA.

U.S. Patent and Trademark Office, "Office Action Summary", dated Mar. 30, 2022, 41 pages, Alexandria, VA.

* cited by examiner

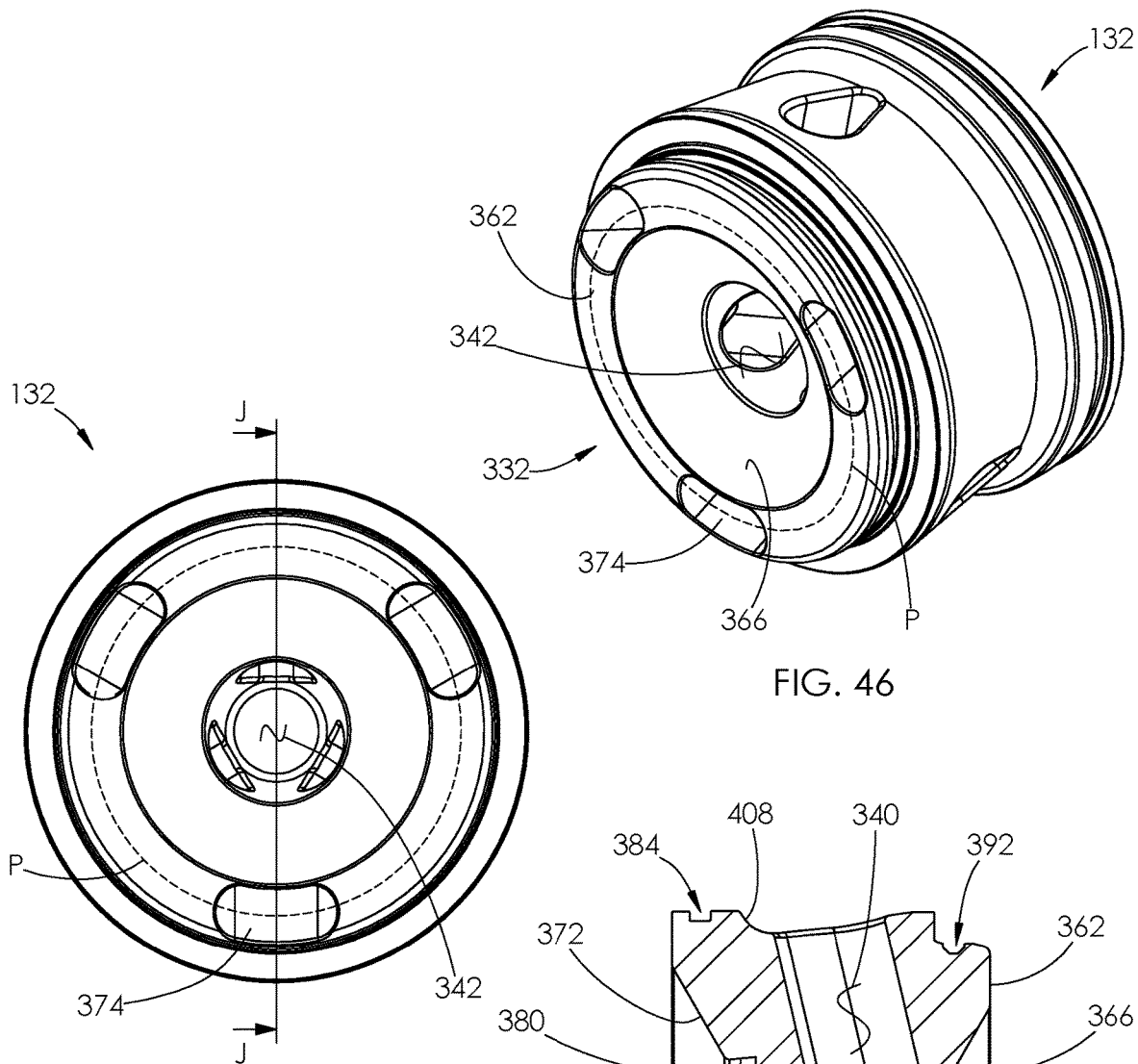
FIG. 46
FIG. 47
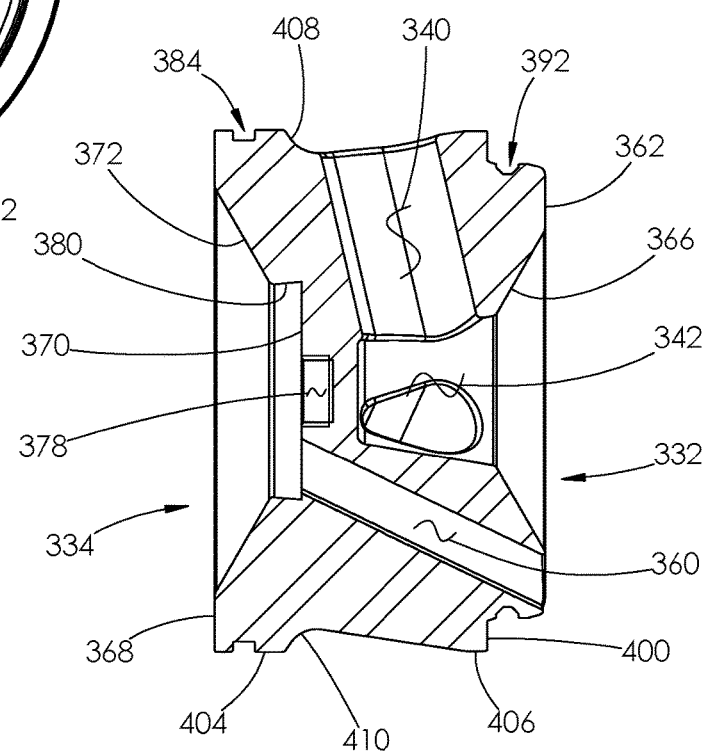
FIG. 48

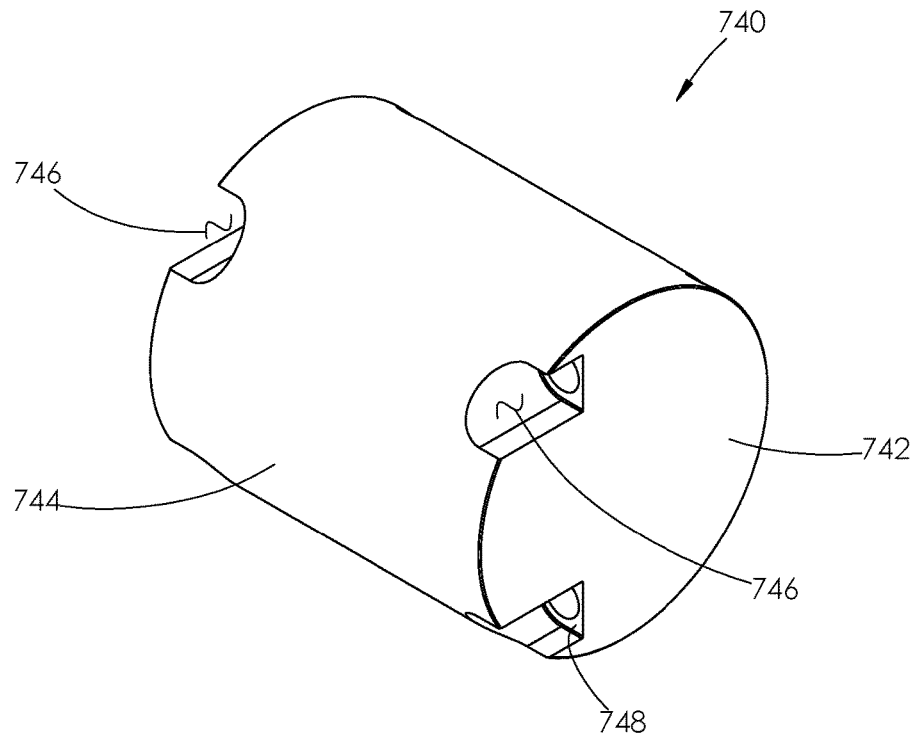
FIG. 118
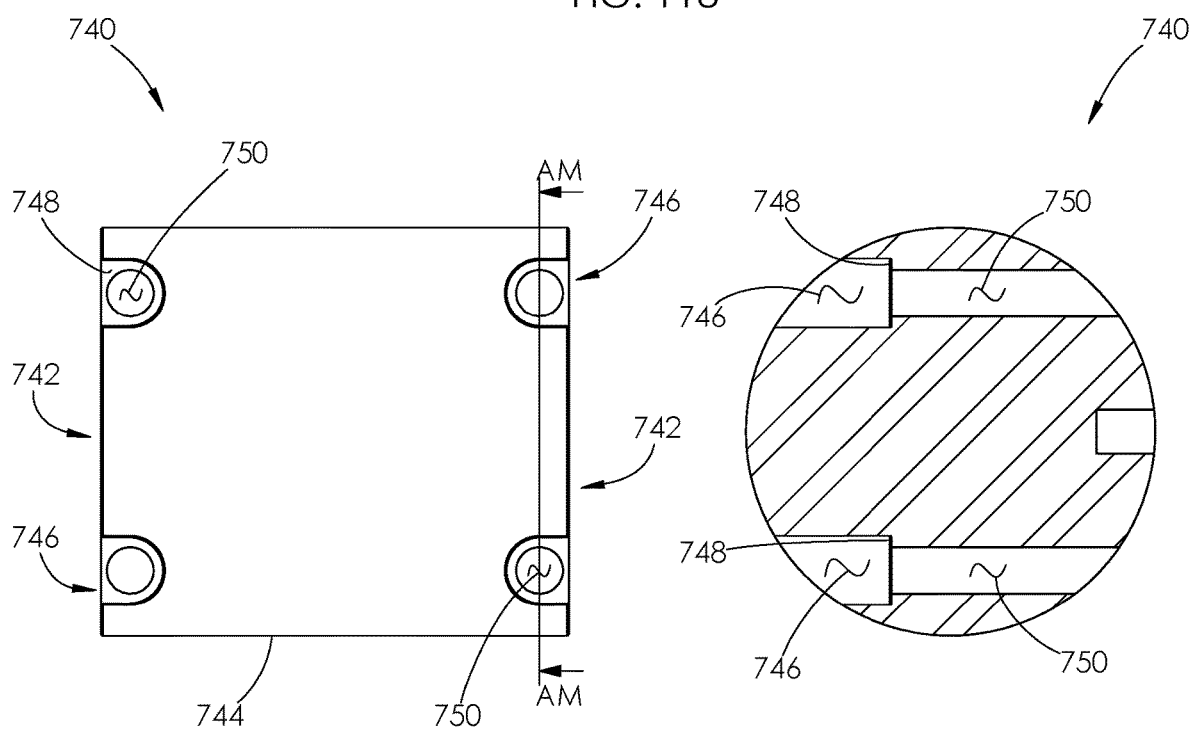
FIG. 119
FIG. 120

HIGH PRESSURE PUMP

RELATED APPLICATIONS

This application is a Continuation-in-Part of U.S. patent application Ser. No. 17/550,453, authored by Foster et al., and filed on Dec. 14, 2021, the entire contents of which are incorporated herein by reference. This application is a Continuation-in-Part of U.S. patent application Ser. No. 17/825,173, authored by Nowell et al., and filed on May 26, 2022, the entire contents of which are incorporated herein by reference. This application also claims the benefit of the following U.S. provisional patent applications: Ser. No. 63/233,241, authored by Foster et al, and filed on Aug. 14, 2021; Ser. No. 63/235,251, authored by Foster et al., and filed on Aug. 20, 2021; Ser. No. 63/240,889, authored by Foster et al., and filed on Sep. 4, 2021; Ser. No. 63/246,099, authored by Foster et al., and filed on Sep. 20, 2021; Ser. No. 63/301,524, authored by Foster et al., and filed on Jan. 21, 2022; Ser. No. 63/304,070, authored by Foster et al., and filed on Jan. 28, 2022; Ser. No. 63/310,269, authored by Foster et al., and filed on Feb. 15, 2022; and Ser. No. 63/312,541, authored by Foster et al., and filed on Feb. 22, 2022. The entire contents of all of the above listed provisional patent applications are incorporated herein by reference.

BACKGROUND

Various industrial applications may require the delivery of high volumes of highly pressurized fluids. For example, hydraulic fracturing (commonly referred to as "fracking") is a well stimulation technique used in oil and gas production, in which highly pressurized fluid is injected into a cased wellbore. As shown for example in FIG. 1, the pressured fluid flows through perforations 10 in a casing 12 and creates fractures 14 in deep rock formations 16. Pressurized fluid is delivered to the casing 12 through a wellhead 18 supported on the ground surface 20. Sand or other small particles (commonly referred to as "proppants") are normally delivered with the fluid into the rock formations 16. The proppants help hold the fractures 14 open after the fluid is withdrawn. The resulting fractures 14 facilitate the extraction of oil, gas, brine, or other fluid trapped within the rock formations 16.

Fluid ends are devices used in conjunction with a power source to pressurize the fluid used during hydraulic fracturing operations. A single fracking operation may require the use of two or more fluid ends at one time. For example, six fluid ends 22 are shown operating at a wellsite 24 in FIG. 2. Each of the fluid ends 22 is attached to a power end 26 in a one-to-one relationship. The power end 26 serves as an engine or motor for the fluid end 22. Together, the fluid end 22 and power end 26 function as a high pressure pump.

Continuing with FIG. 2, a single fluid end 22 and its corresponding power end 26 are typically positioned on a truck bed 28 at the wellsite 24 so that they may be easily moved, as needed. The fluid and proppant mixture to be pressurized is normally held in large tanks 30 at the wellsite 24. An intake piping system 32 delivers the fluid and proppant mixture from the tanks 30 to each fluid end 22. A discharge piping system 33 transfers the pressurized fluid from each fluid end 22 to the wellhead 18, where it is delivered into the casing 12 shown in FIG. 1.

Fluid ends operate under notoriously extreme conditions, enduring the same pressures, vibrations, and abrasives that are needed to fracture the deep rock formations 16, shown in FIG. 1. Fluid ends may operate at pressures of 5,000-15,000 pounds per square inch (psi) or greater. Fluid used in hydraulic fracturing operations is typically pumped through the fluid end at a pressure of at least 8,000 psi, and more typically between 10,000 and 15,000 psi. However, the pressure may reach up to 22,500 psi.

The power end used with the fluid end typically has a power output of at least 2,250 horsepower during hydraulic fracturing operations. A single fluid end typically produces a fluid volume of about 400 gallons, or 10 barrels, per minute during a fracking operation. A single fluid end may operate in flow ranges from 170 to 630 gallons per minute, or approximately 4 to 15 barrels per minute. When a plurality of fluid ends are used together, the fluid ends collectively may deliver as much as 4,200 gallons per minute or 100 barrels per minute to the wellbore.

High operational pressures may cause a fluid end to expand or crack. Such a structural failure may lead to fluid leakage, which leaves the fluid end unable to produce and maintain adequate fluid pressures. Moreover, if proppants are included in the pressurized fluid, those proppants may cause erosion at weak points within the fluid end, resulting in additional failures. Likewise, high operational pressures may cause damage to the power end over time.

It is not uncommon for conventional fluid ends to experience failure after only several hundred operating hours. Yet, a single fracking operation may require as many as fifty (50) hours of fluid end operation. Thus, a traditional fluid end may require replacement after use on as few as two fracking jobs. There is a need in the industry for a high pressure pump configured to avoid or significantly delay the structures or conditions that cause wear or failures during operation.

BRIEF DESCRIPTION OF THE DRAWINGS

Fluid End Assembly

FIG. 46 is a rear perspective view of the fluid routing plug shown in FIG. 43.

FIG. 47 is a rear elevational view of the fluid routing plug shown in FIG. 43.

FIG. 48 is a cross-sectional view of the fluid routing plug shown in FIG. 47, taken along line J-J.

Power End Assembly

Figure 3:
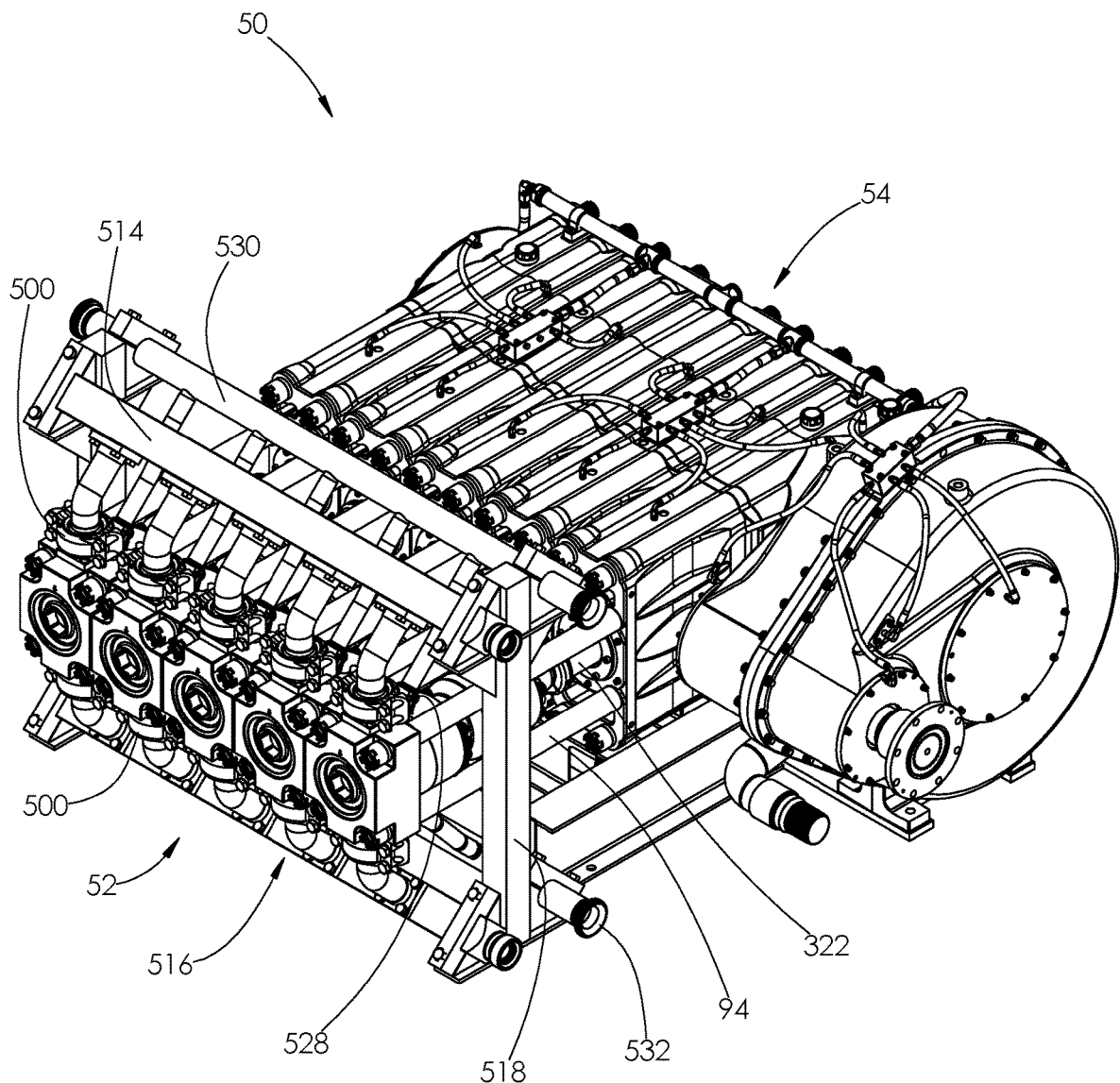
FIG. 3 is a font perspective view of one embodiment of a high pressure pump disclosed herein.
Figure 81:
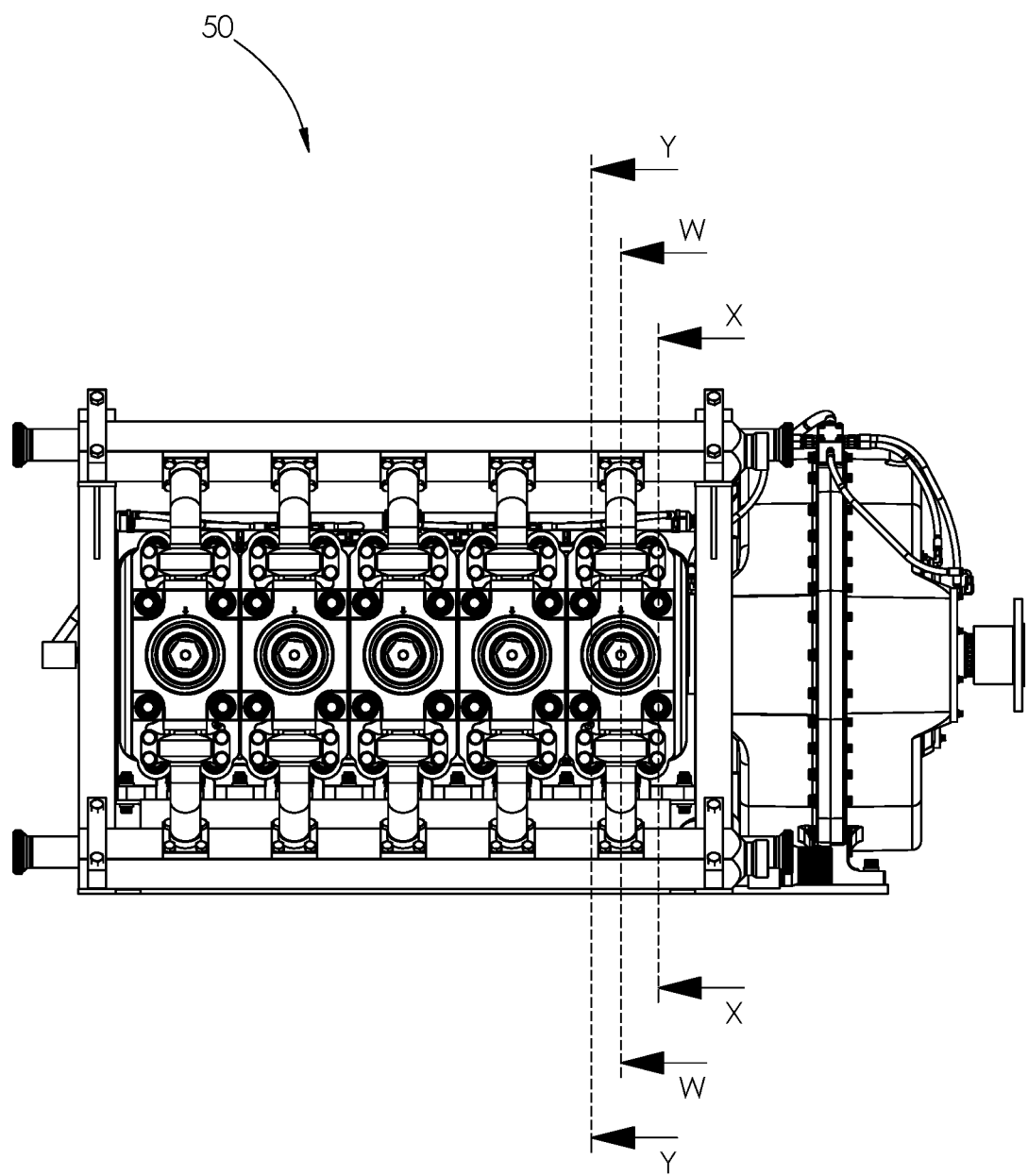

FIG. 81 is a front elevational view of the high pressure pump shown in FIG. 3.

Figure 82:
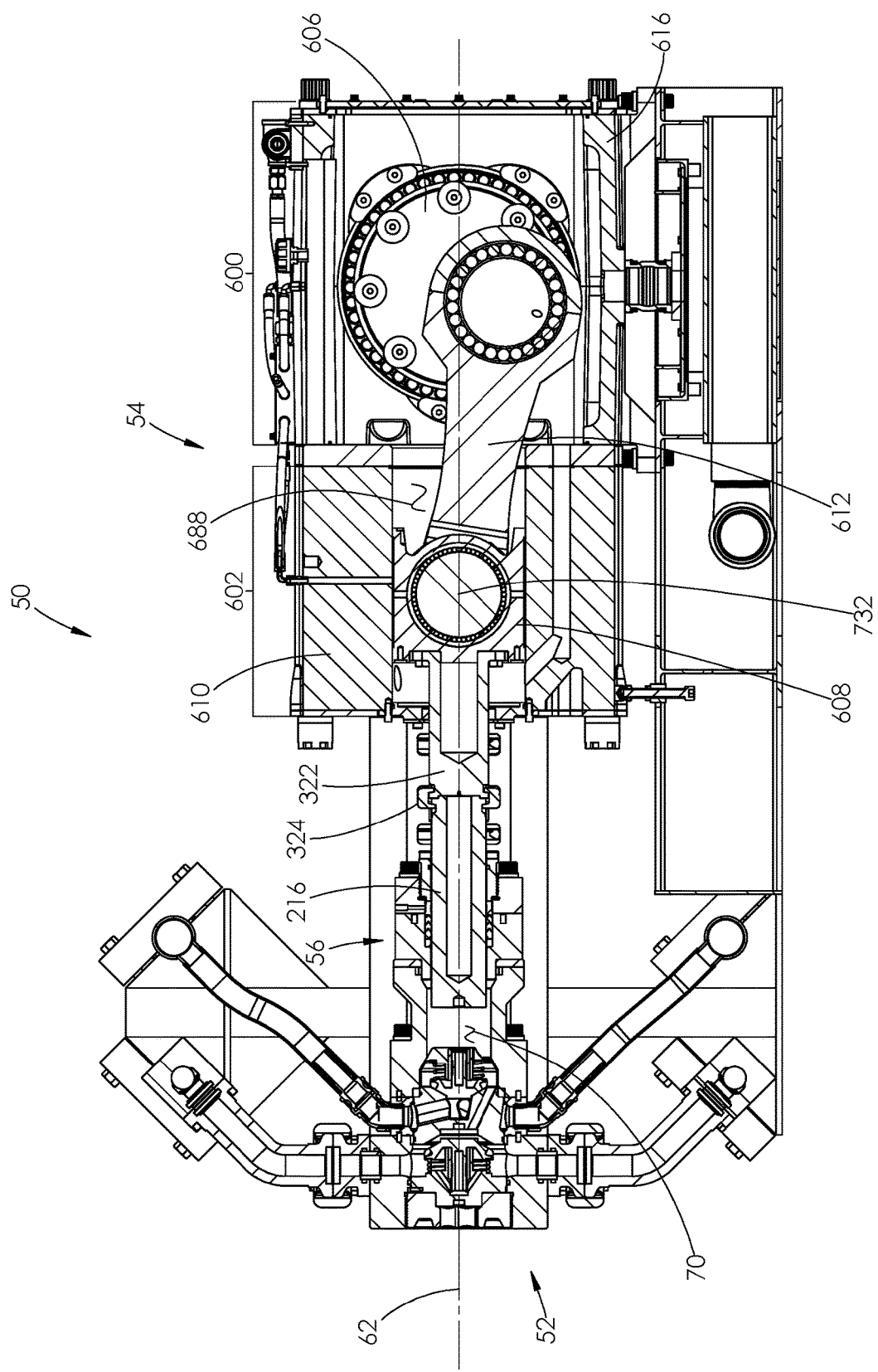

FIG. 82 is a cross-sectional view of the high pressure pump shown in FIG. 81, taken along line W-W.

Figure 83:
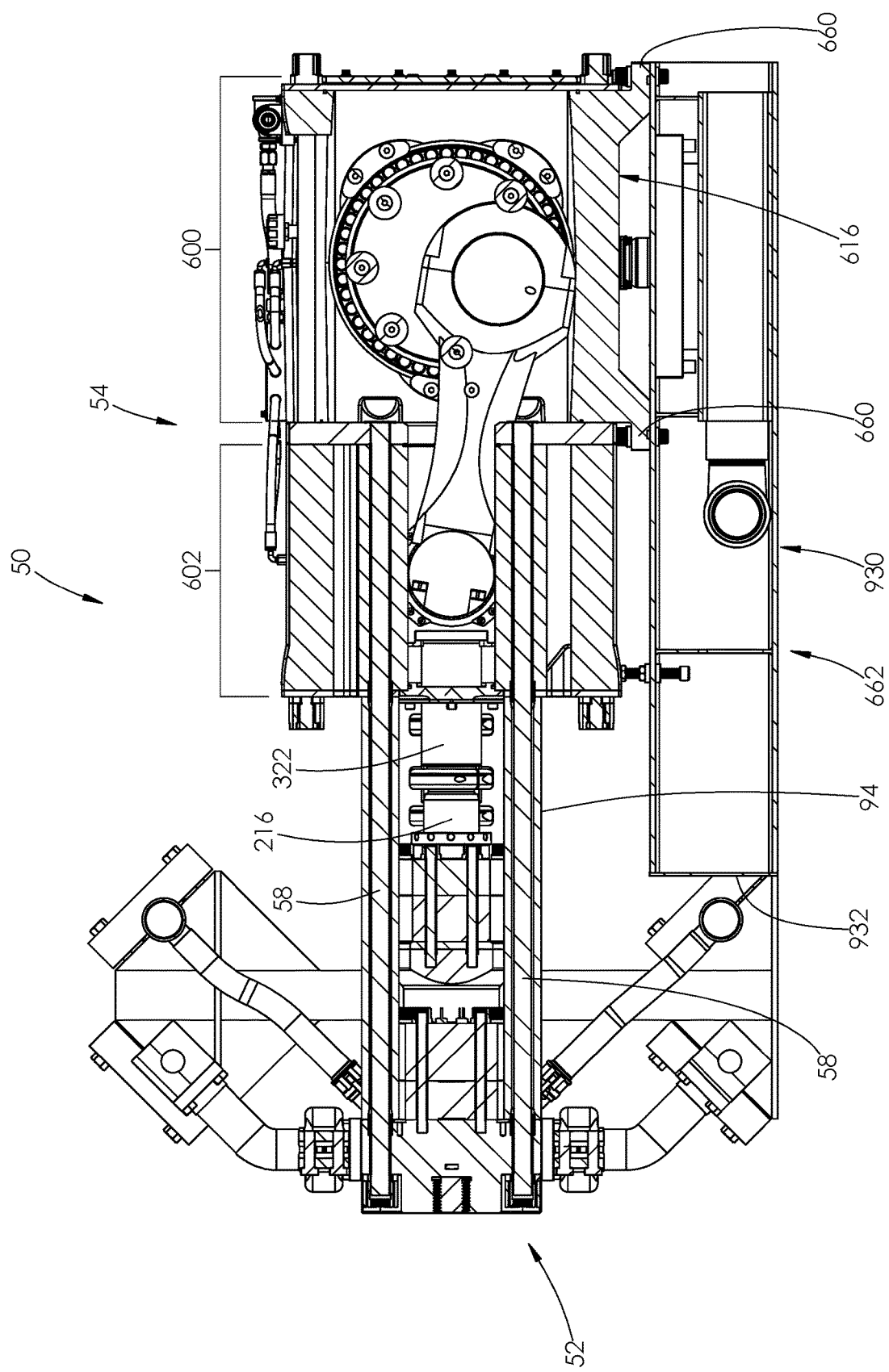

FIG. 83 is a cross-sectional view of the high pressure pump shown in FIG. 81, taken along line X-X.

Figure 84:
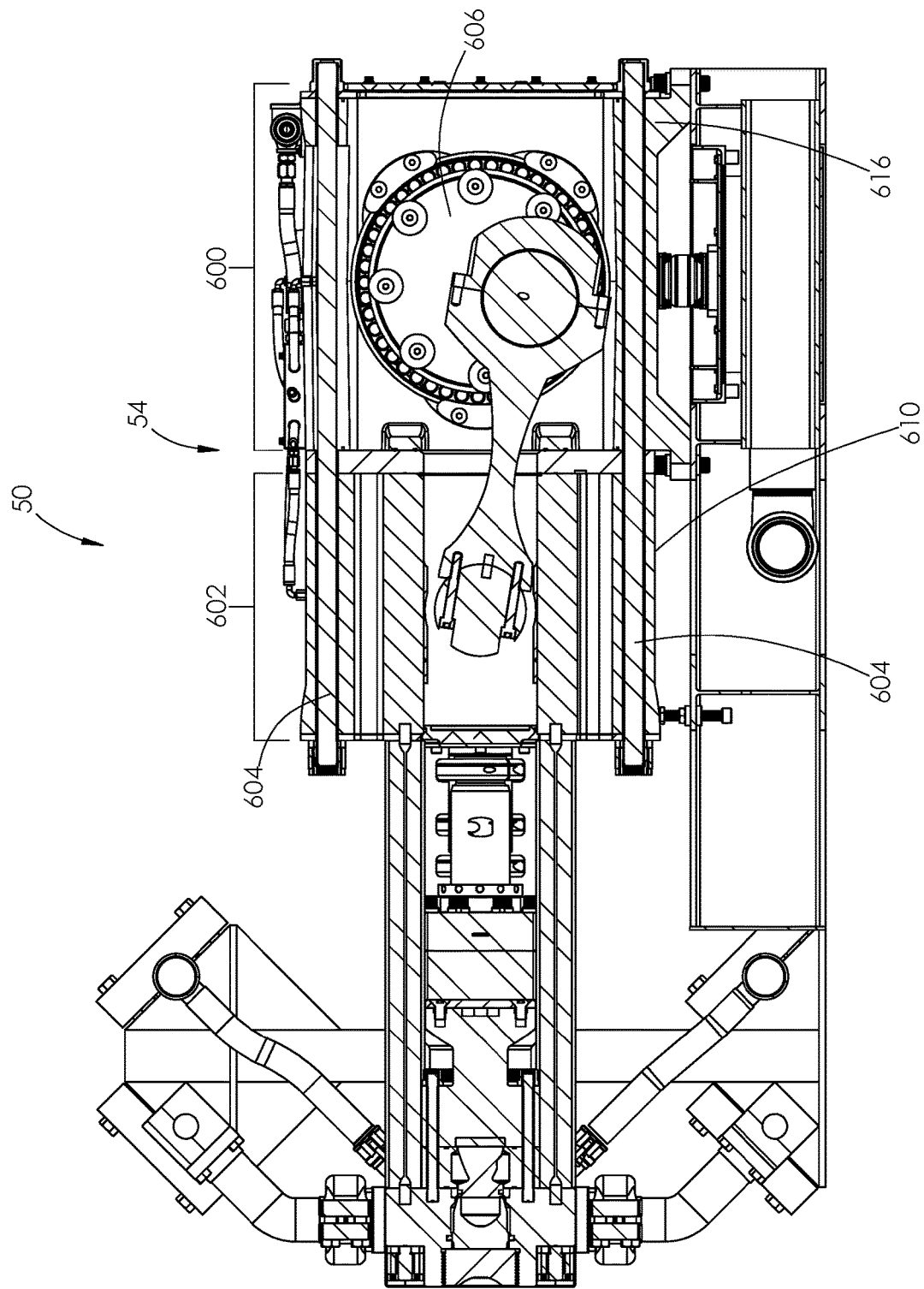

FIG. 84 is a cross-sectional view of the high pressure pump shown in FIG. 81, taken along line Y-Y.

Figure 85:
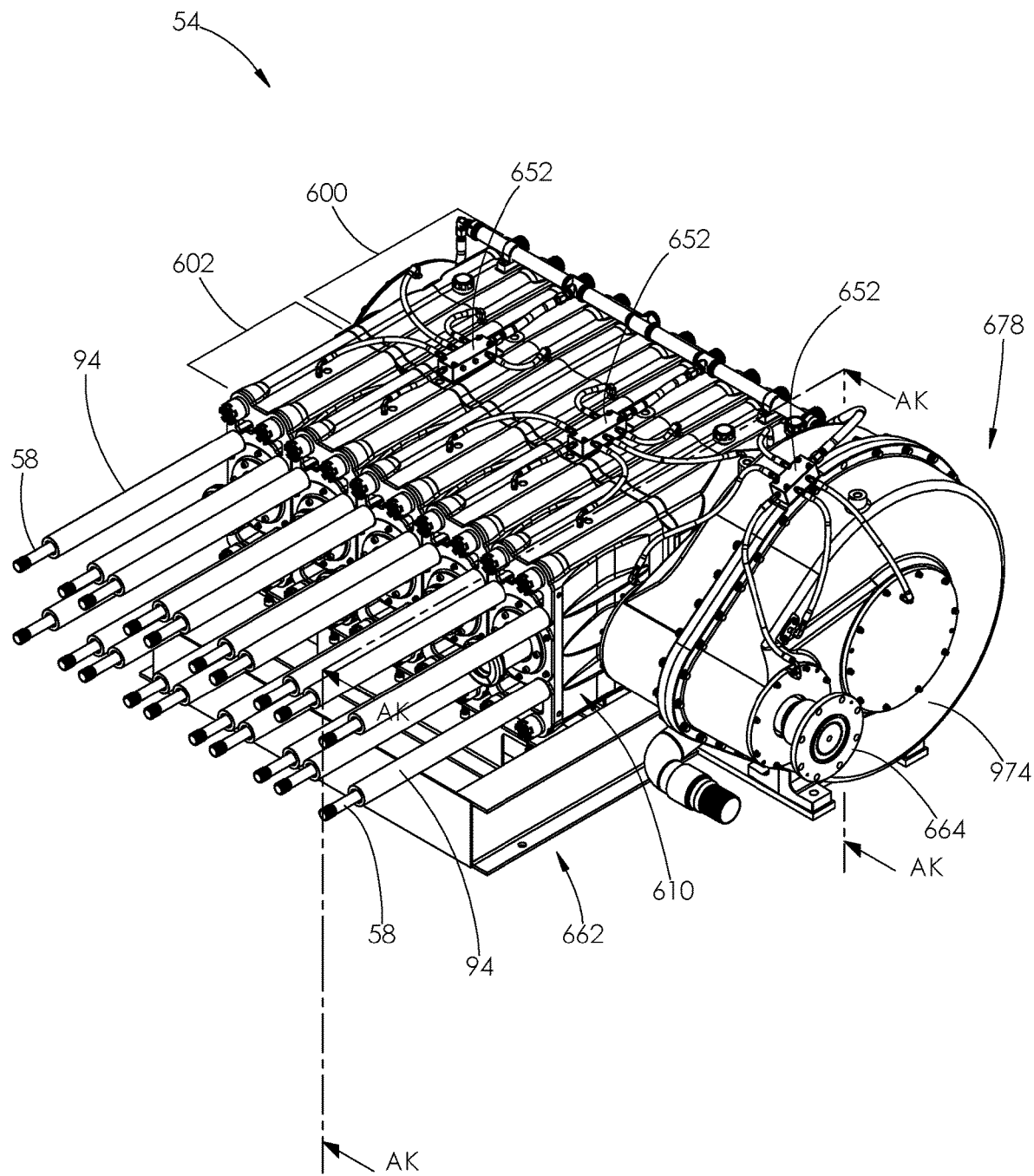

FIG. 85 is a front perspective view of the power end assembly shown in FIG. 3.

Figure 86:
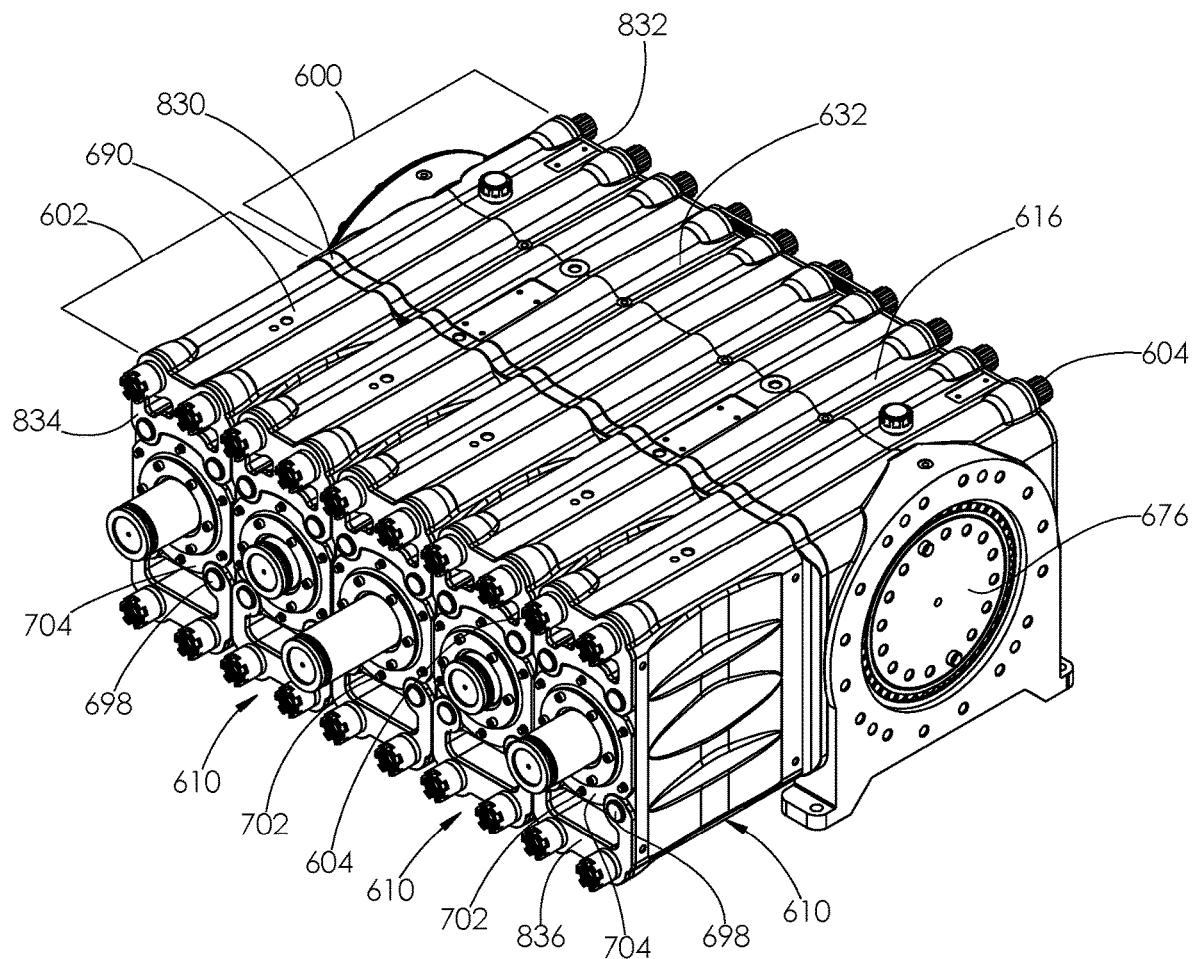

FIG. 86 is the front perspective view of the power end assembly shown in FIG. 85, but the base section, engine section, second stay rods, and lubrication system have been removed for clarity.

Figure 87:
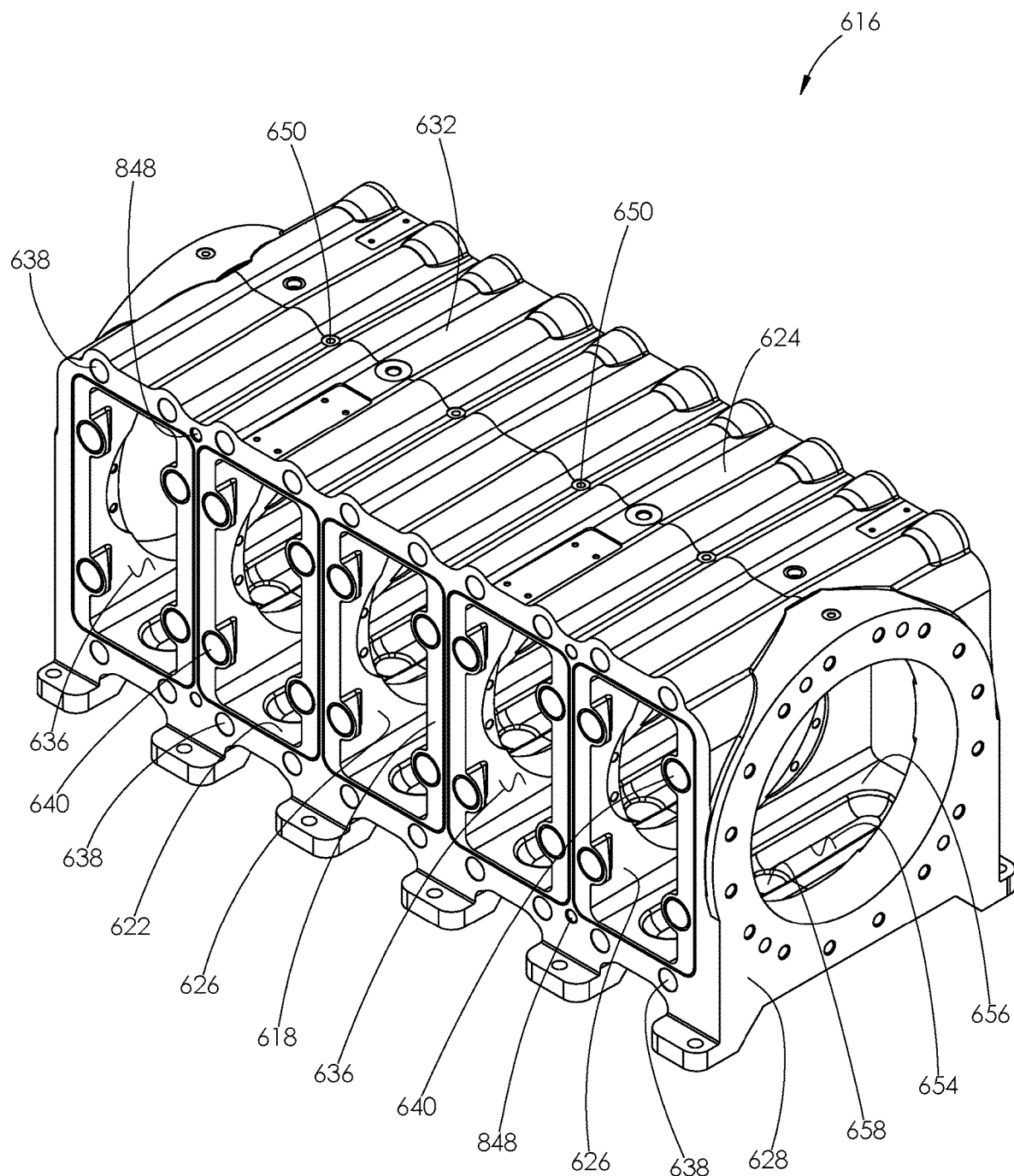

FIG. 87 is a front perspective view of the crank frame shown in FIG. 86.

Figure 88:
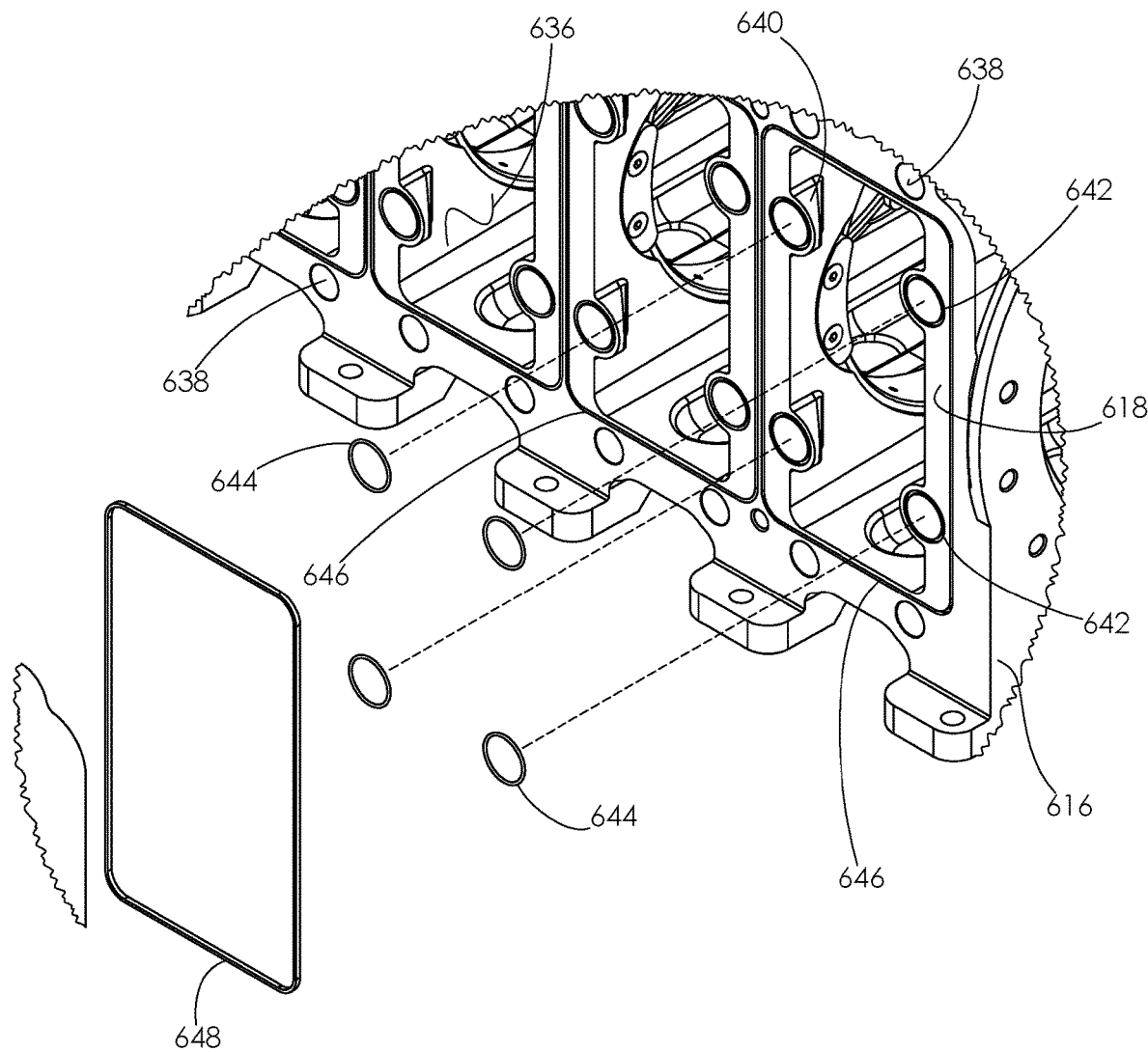
Figure 130:
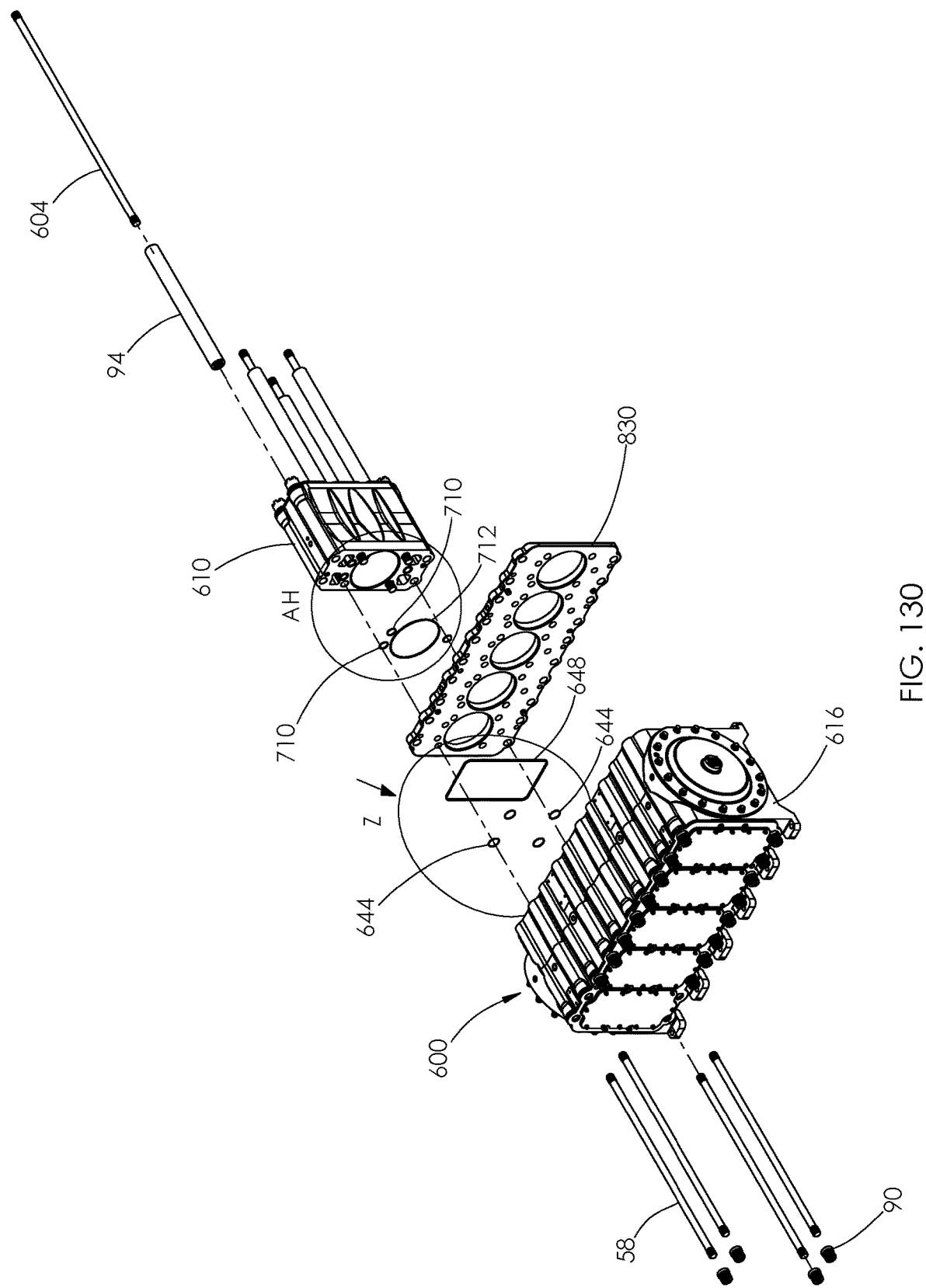

FIG. 88 is an enlarged and exploded view of area Z shown in FIG. 130.

Figure 89:
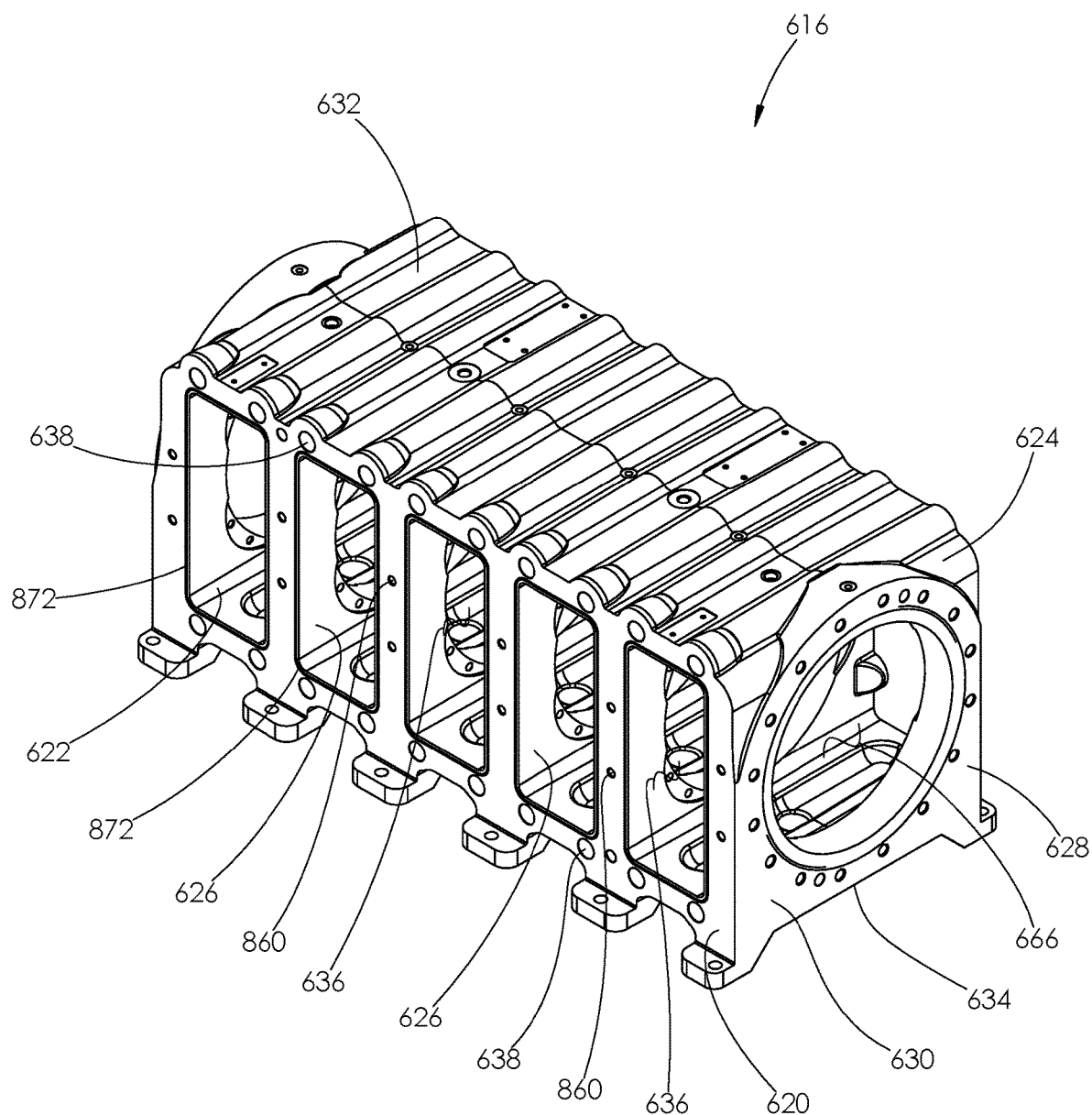

FIG. 89 is a rear perspective view of the crank frame shown in FIG. 87.

Figure 90:
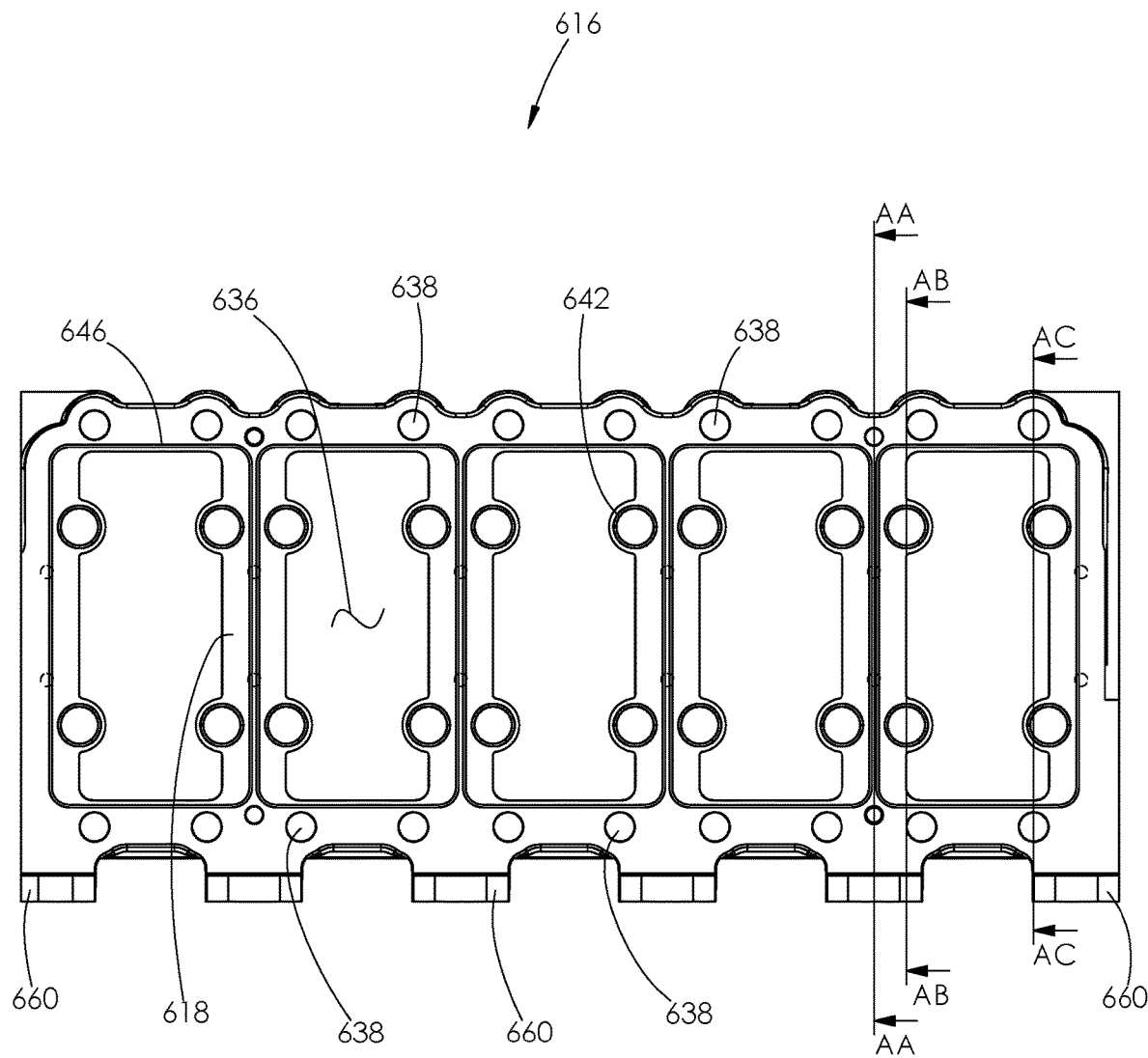

FIG. 90 is a front elevational view of the crank frame shown in FIG. 87.

Figure 91:
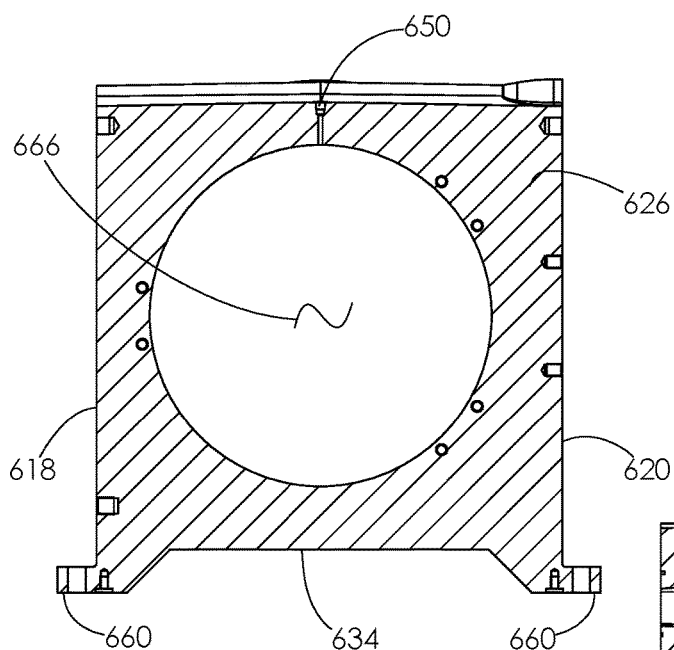

FIG. 91 is a cross-sectional view of the crank frame shown in FIG. 90, taken along line AA-AA.

Figure 92:
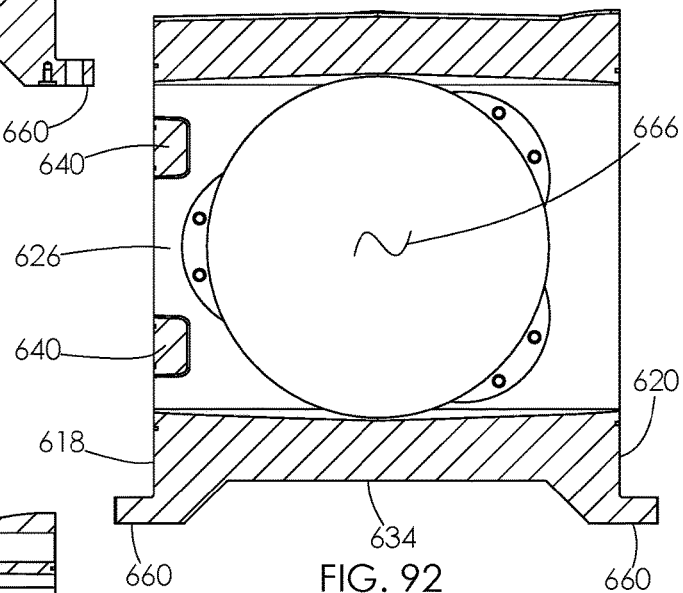

FIG. 92 is a cross-sectional view of the crank frame shown in FIG. 90, taken along line AB-AB.

Figure 93:
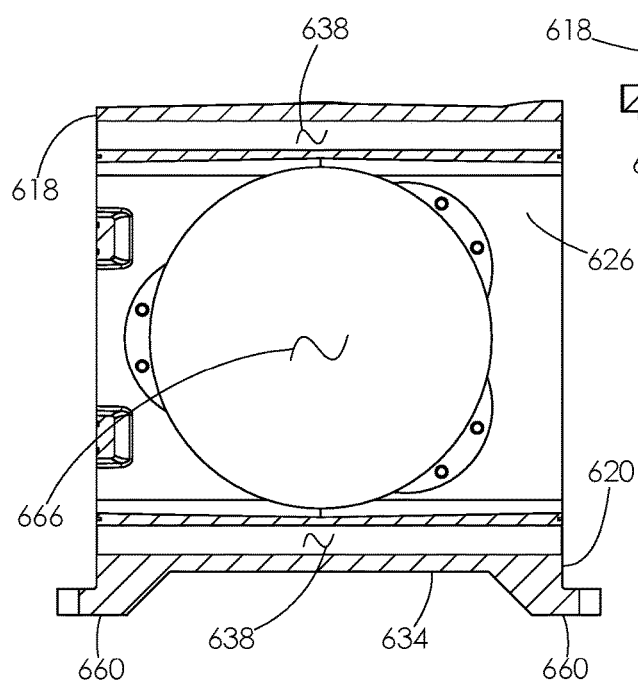

FIG. 93 is a cross-sectional view of the crank frame shown in FIG. 90, taken along line AC-AC.

Figure 94:
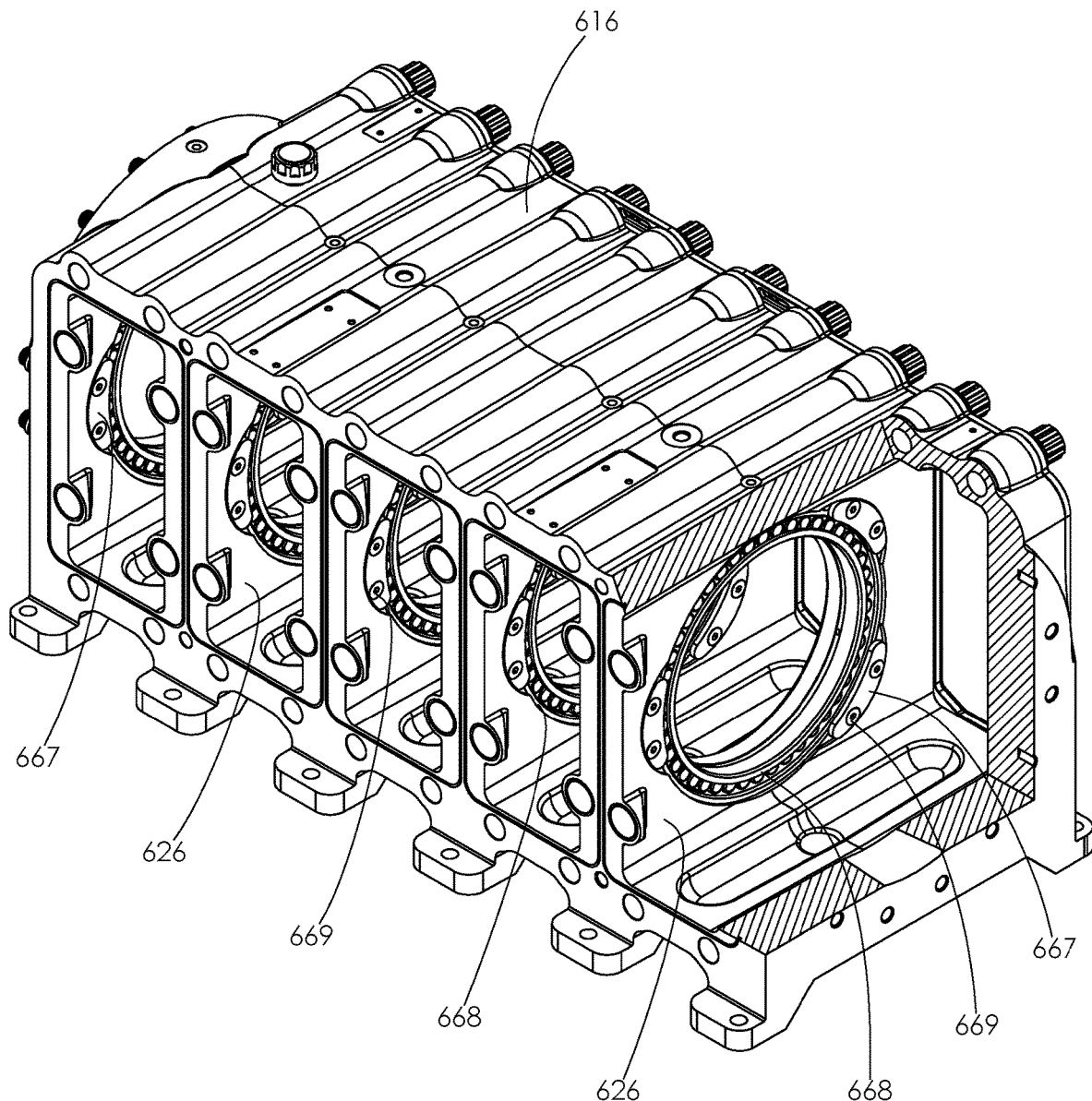

FIG. 94 is a front perspective view of the crank frame shown in FIG. 87 with a plurality of roller bearings installed therein. A section of the frame has been cut-away to expose the interior of the frame.

Figure 95:
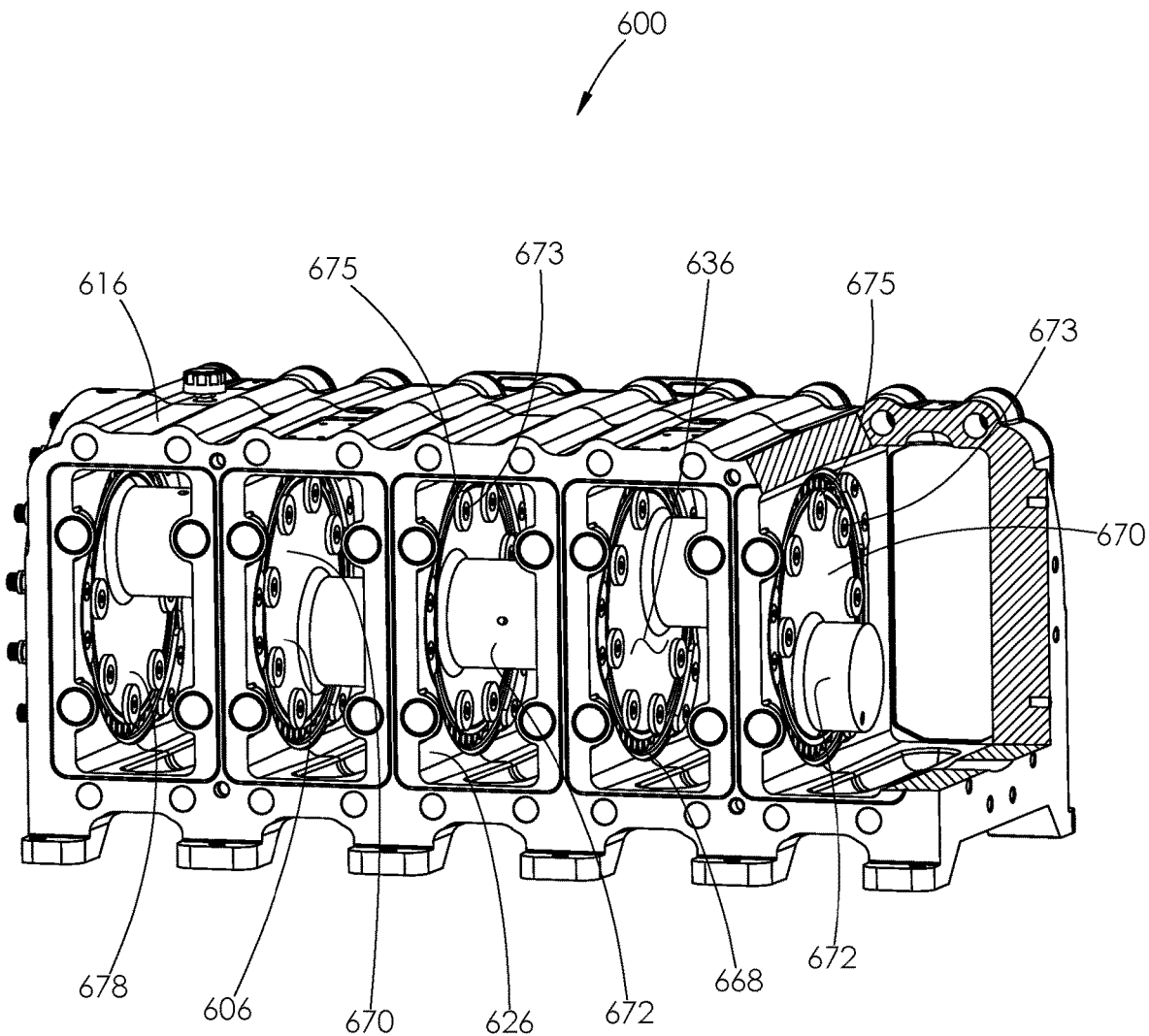

FIG. 95 is the front perspective and sectional view of the crank frame shown in FIG. 94 with the crankshaft installed therein.

Figure 96:
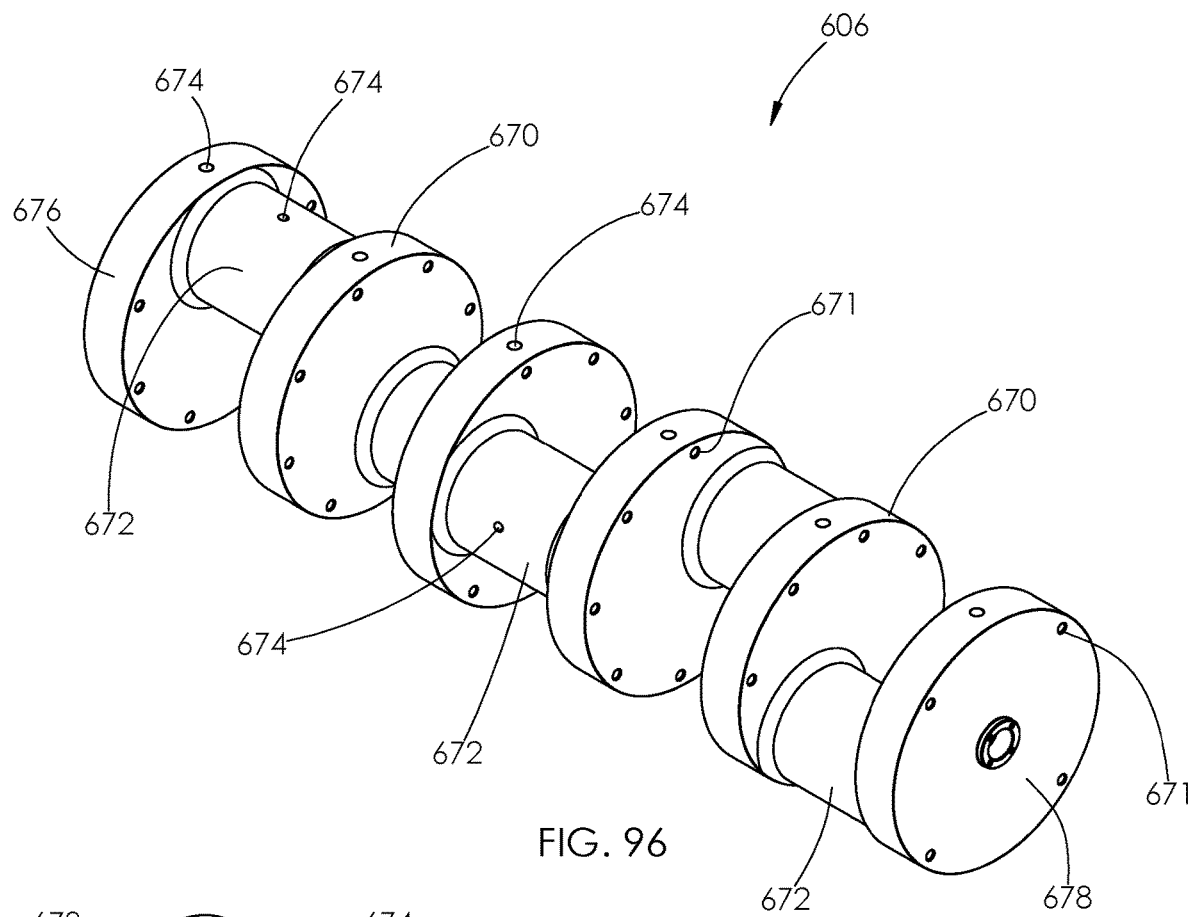

FIG. 96 is a first side perspective view of the crankshaft shown in FIG. 95.

Figure 97:
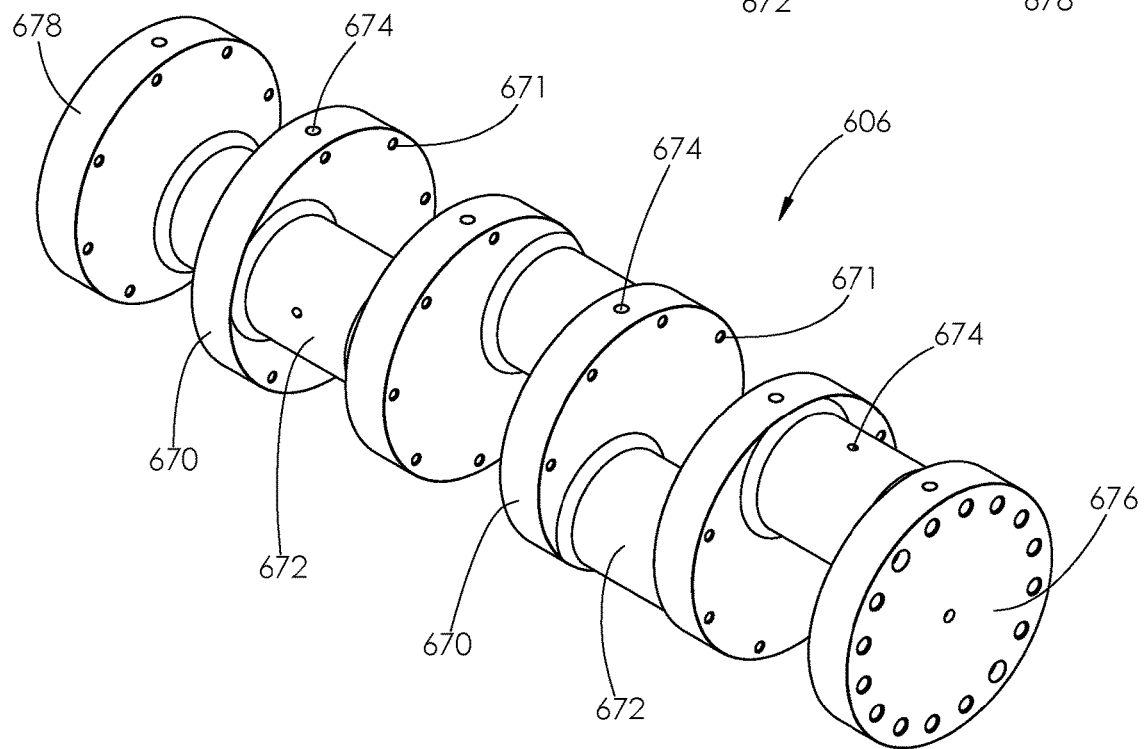

FIG. 97 is a second side perspective view of the crankshaft shown in FIG. 96.

Figure 98:
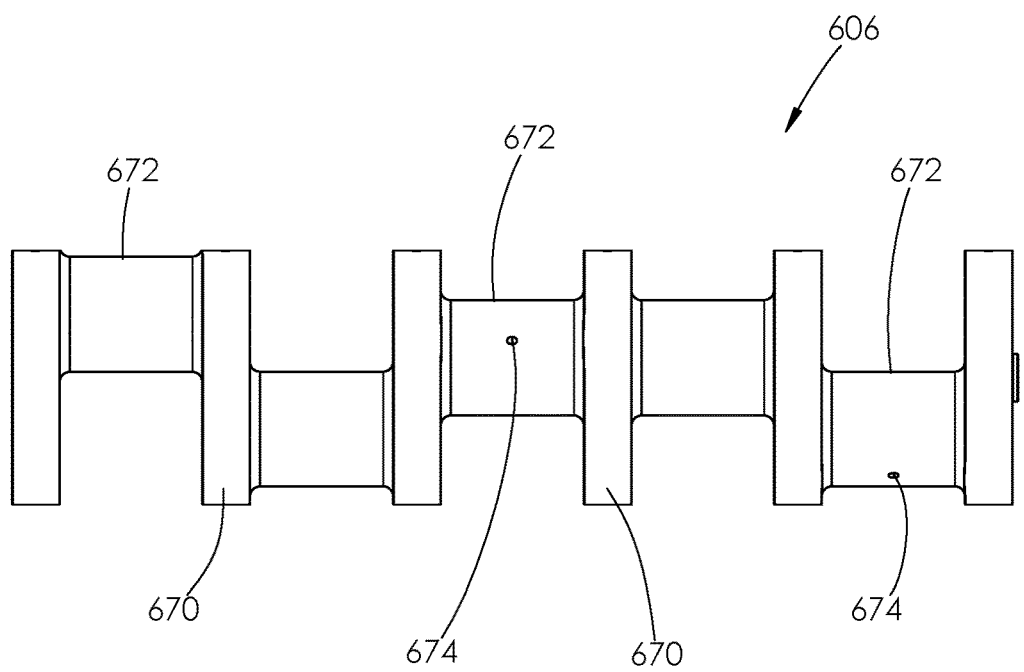

FIG. 98 is a front elevational view of the crankshaft shown in FIG. 96.

Figure 99:
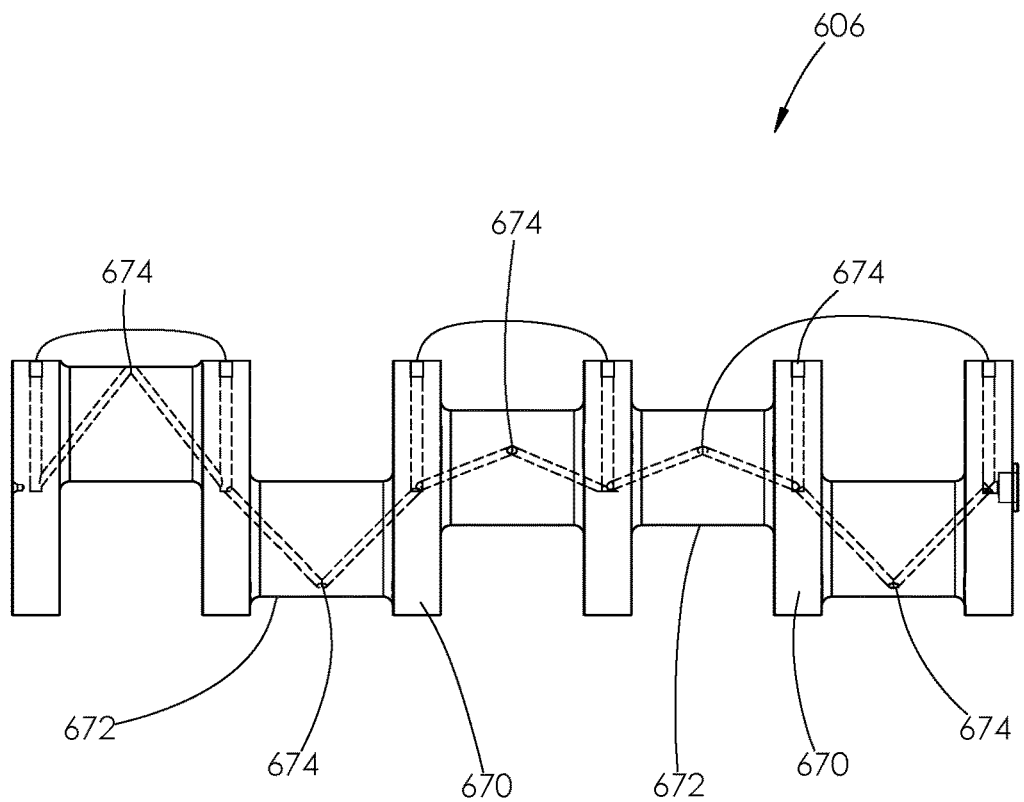

FIG. 99 is the front elevational view of the crankshaft shown in FIG. 96 with the inner lube ports shown in phantom.

Figure 100:
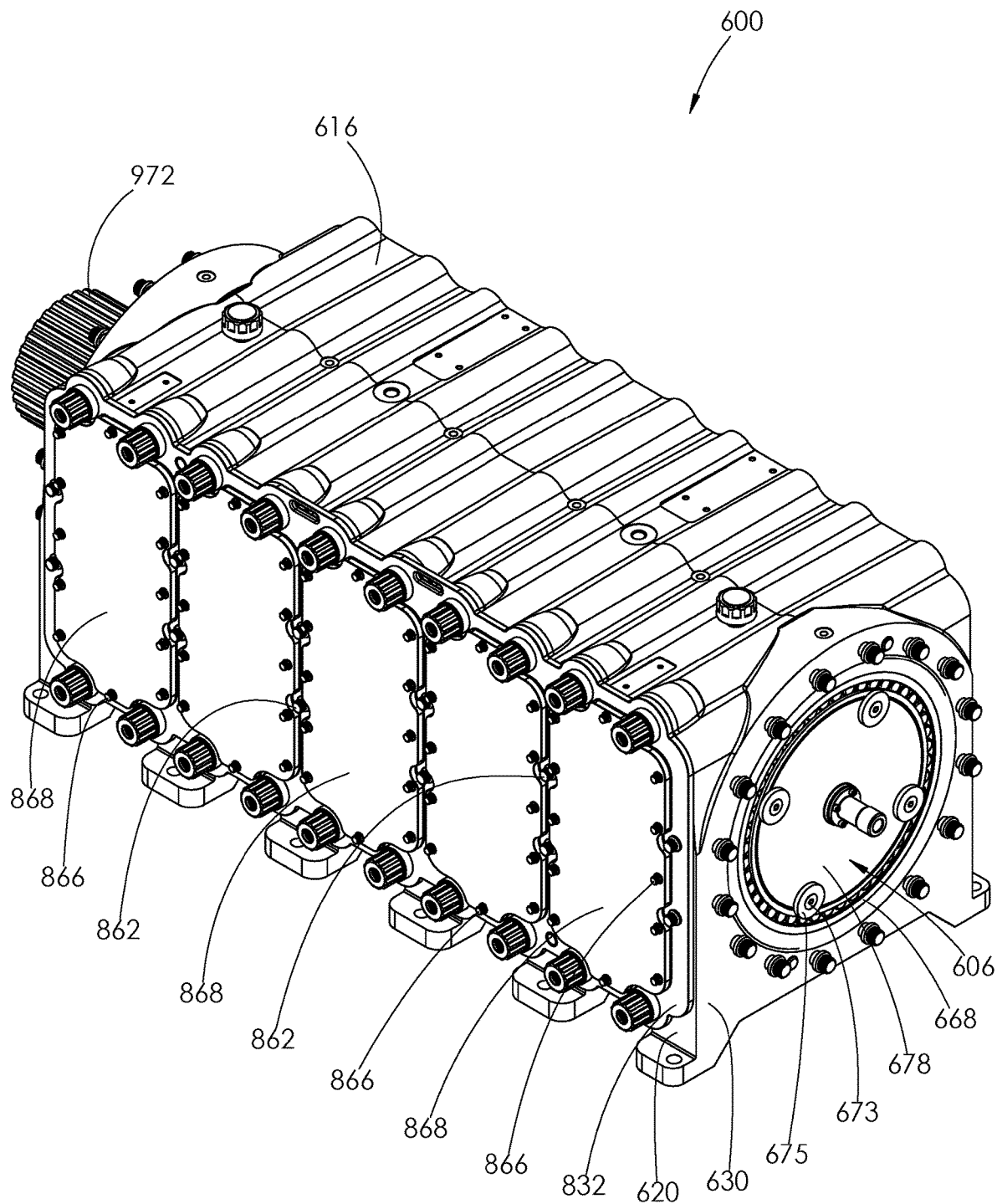

FIG. 100 is a rear perspective view of the crank section shown in FIG. 86.

Figure 101:
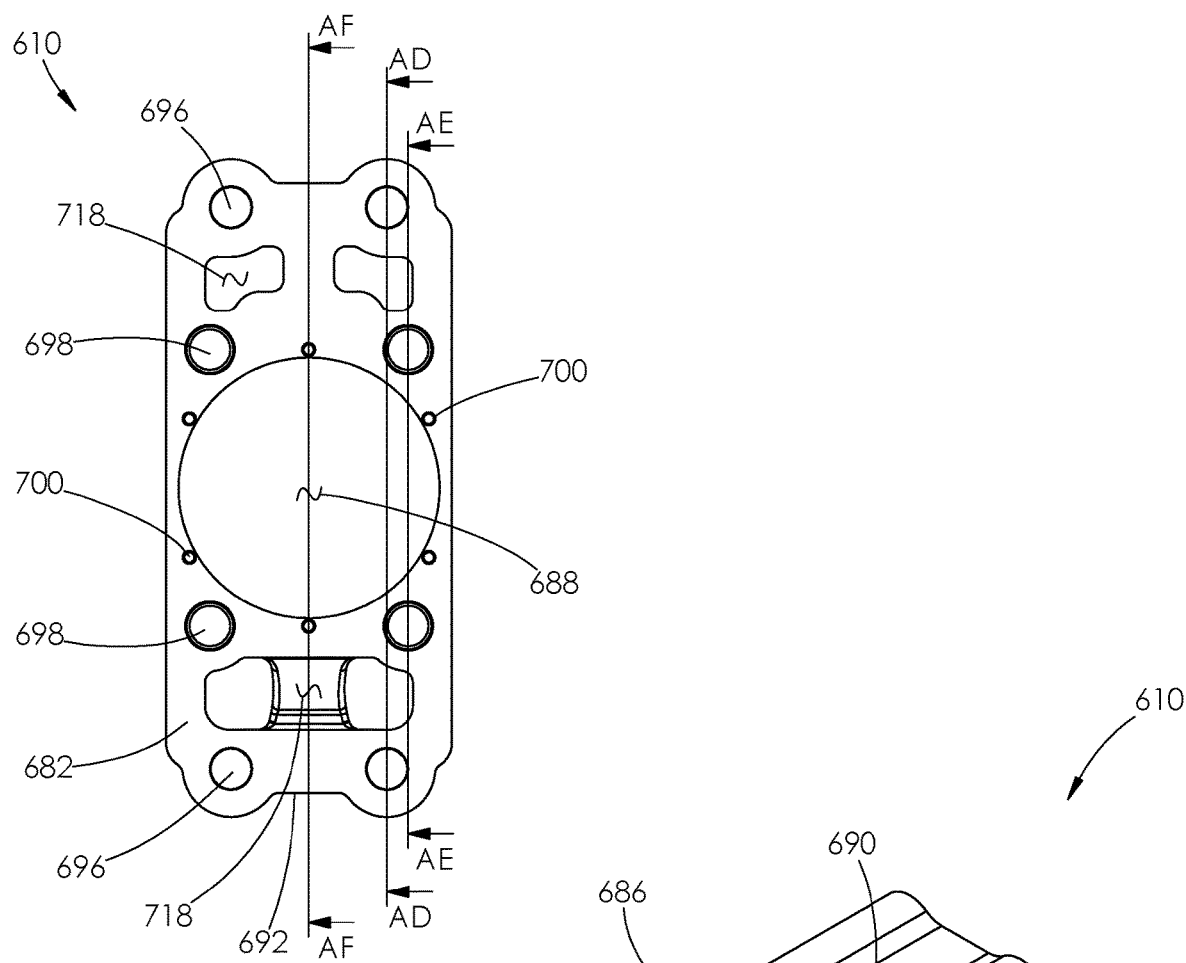

FIG. 101 is a front elevational view of one of the crosshead guides shown in FIG. 86.

Figure 102:
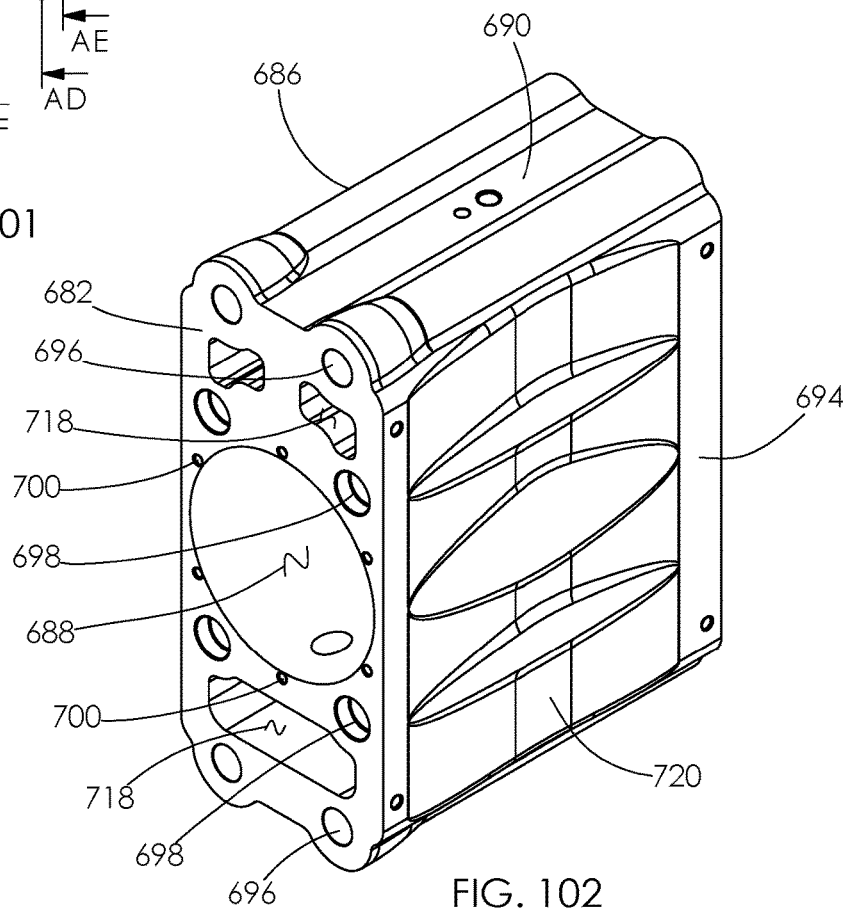

FIG. 102 is a front perspective view of the crosshead guide shown in FIG. 101.

Figure 103:
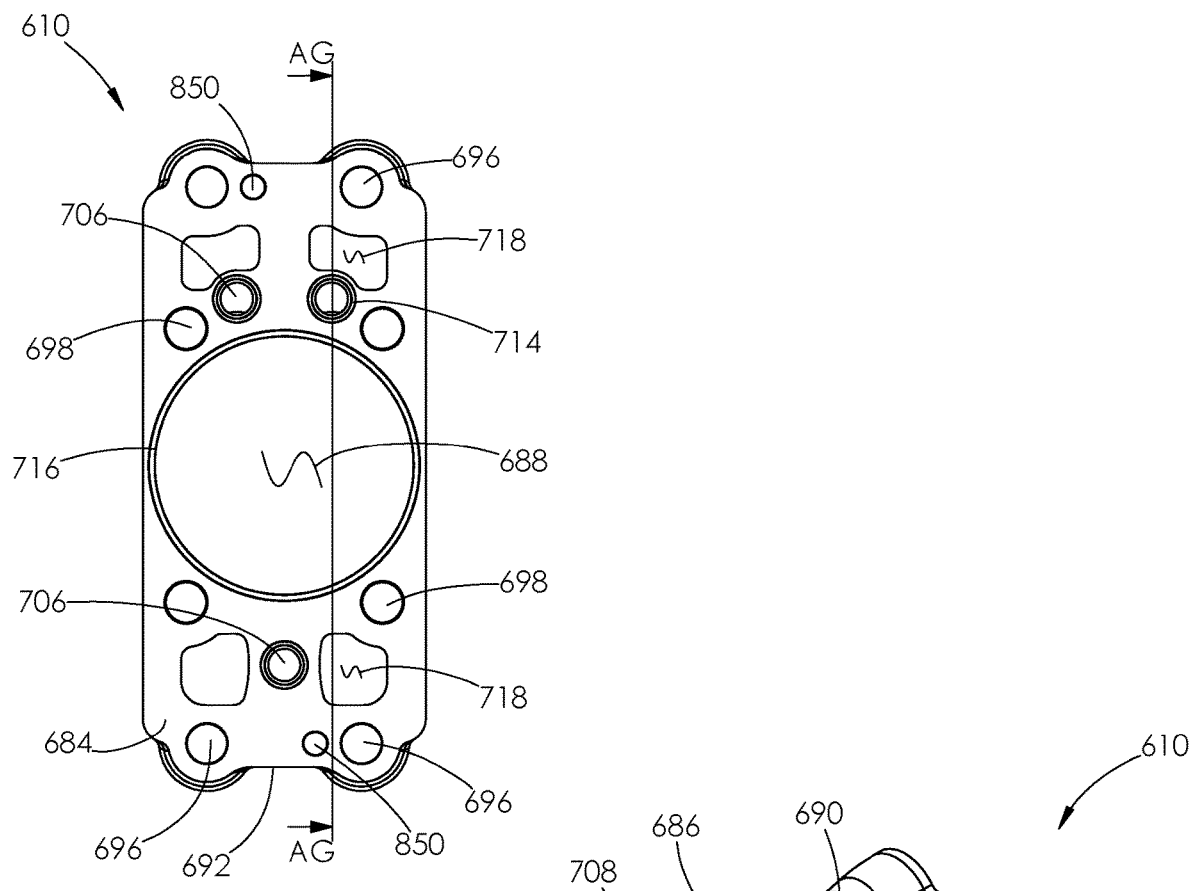

FIG. 103 is a rear elevational view of the crosshead guide shown in FIG. 101.

Figure 104:
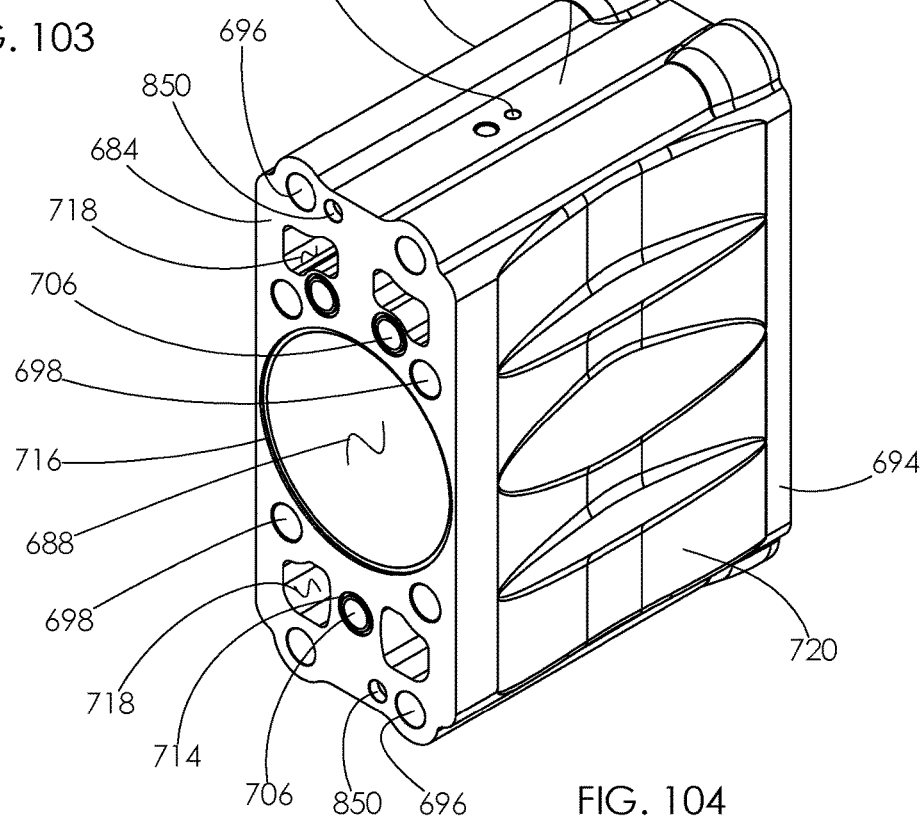

FIG. 104 is a rear perspective view of the crosshead guide shown in FIG. 103.

Figure 105:
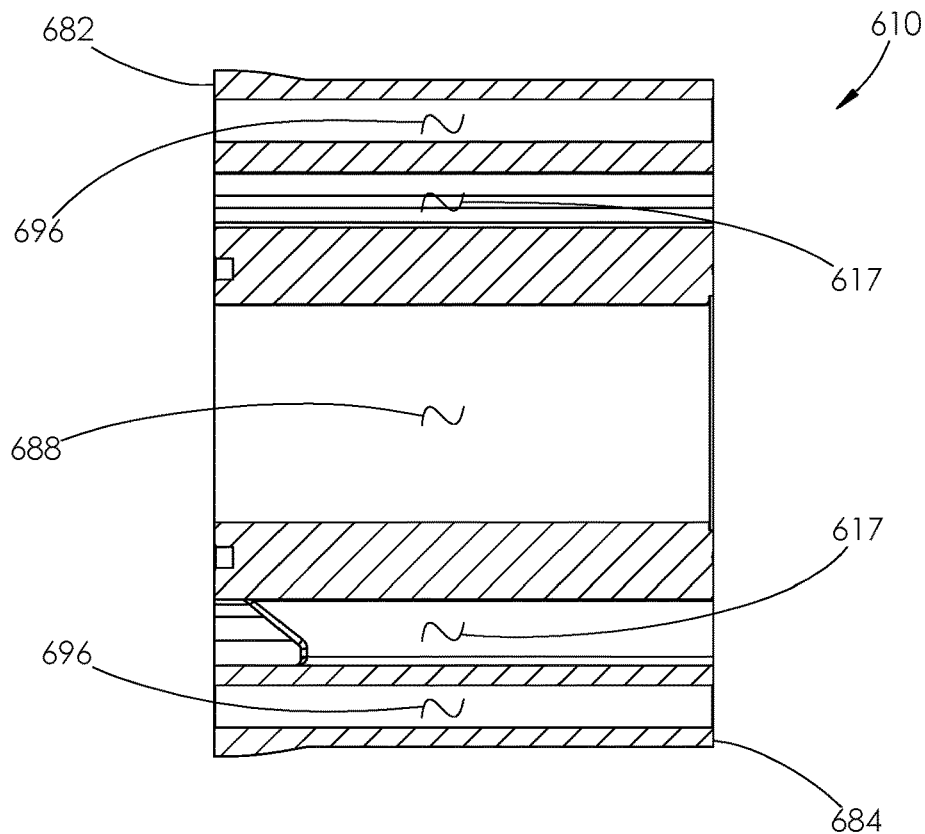

FIG. 105 is a cross-sectional view of the crosshead guide shown in FIG. 101, taken along line AD-AD.

Figure 106:
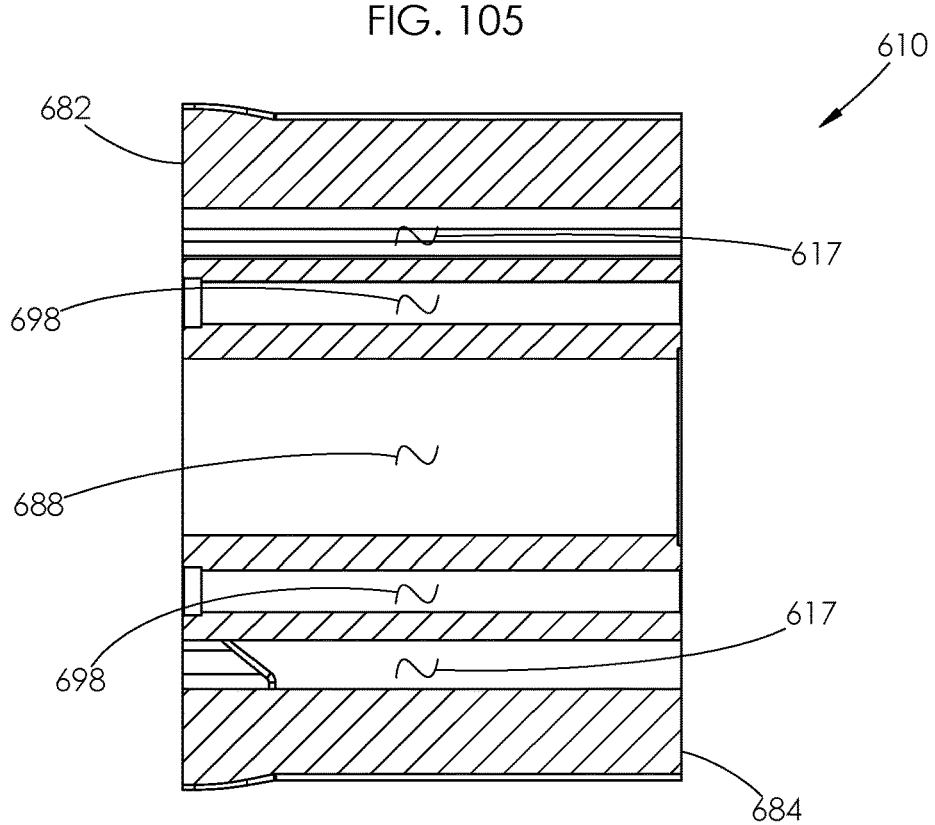

FIG. 106 is a cross-sectional view of the crosshead guide shown in FIG. 101, taken along line AE-AE.

Figure 107:
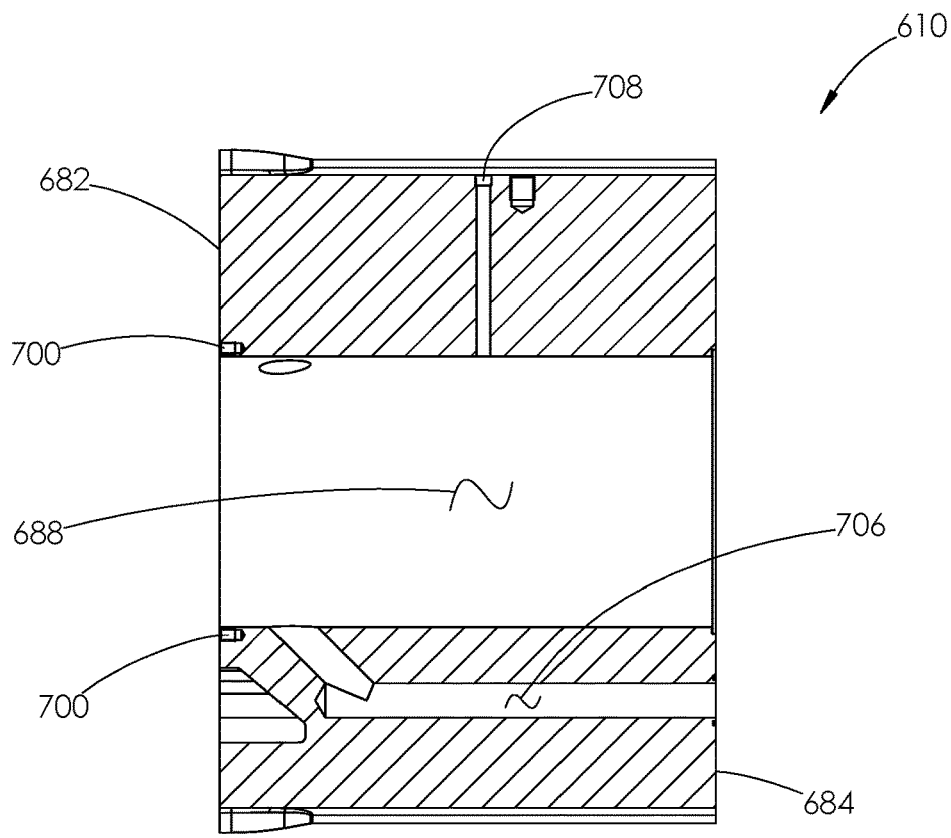

FIG. 107 is a cross-sectional view of the crosshead guide shown in FIG. 101, taken along line AF-AF.

Figure 108:
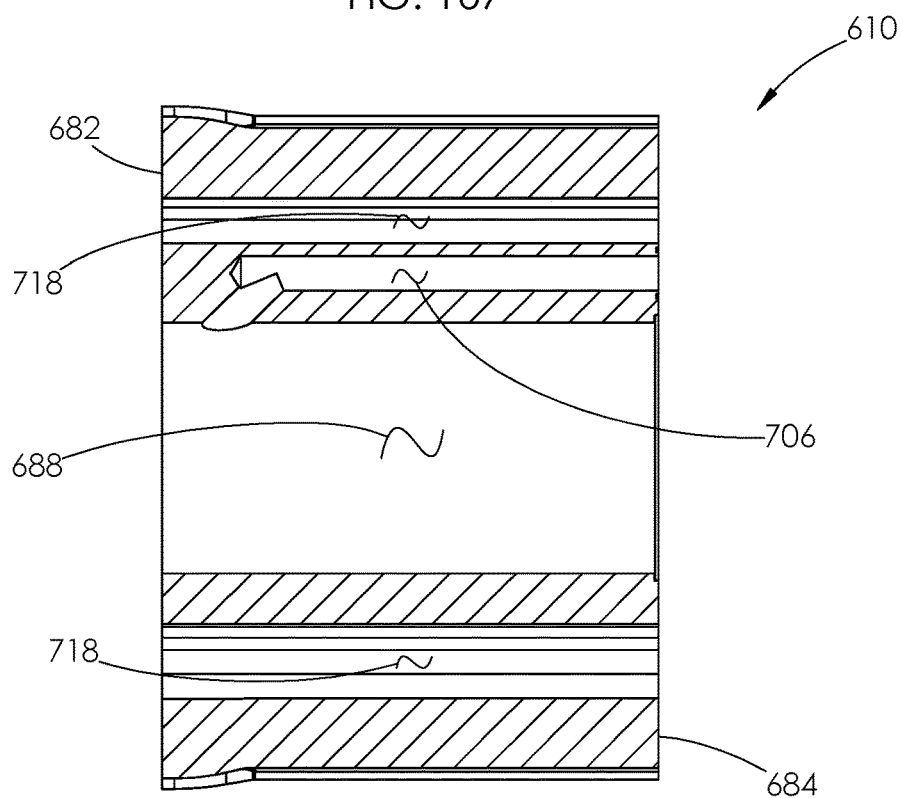

FIG. 108 is a cross-sectional view of the crosshead guide shown in FIG. 103, taken along line AG-AG.

Figure 109:
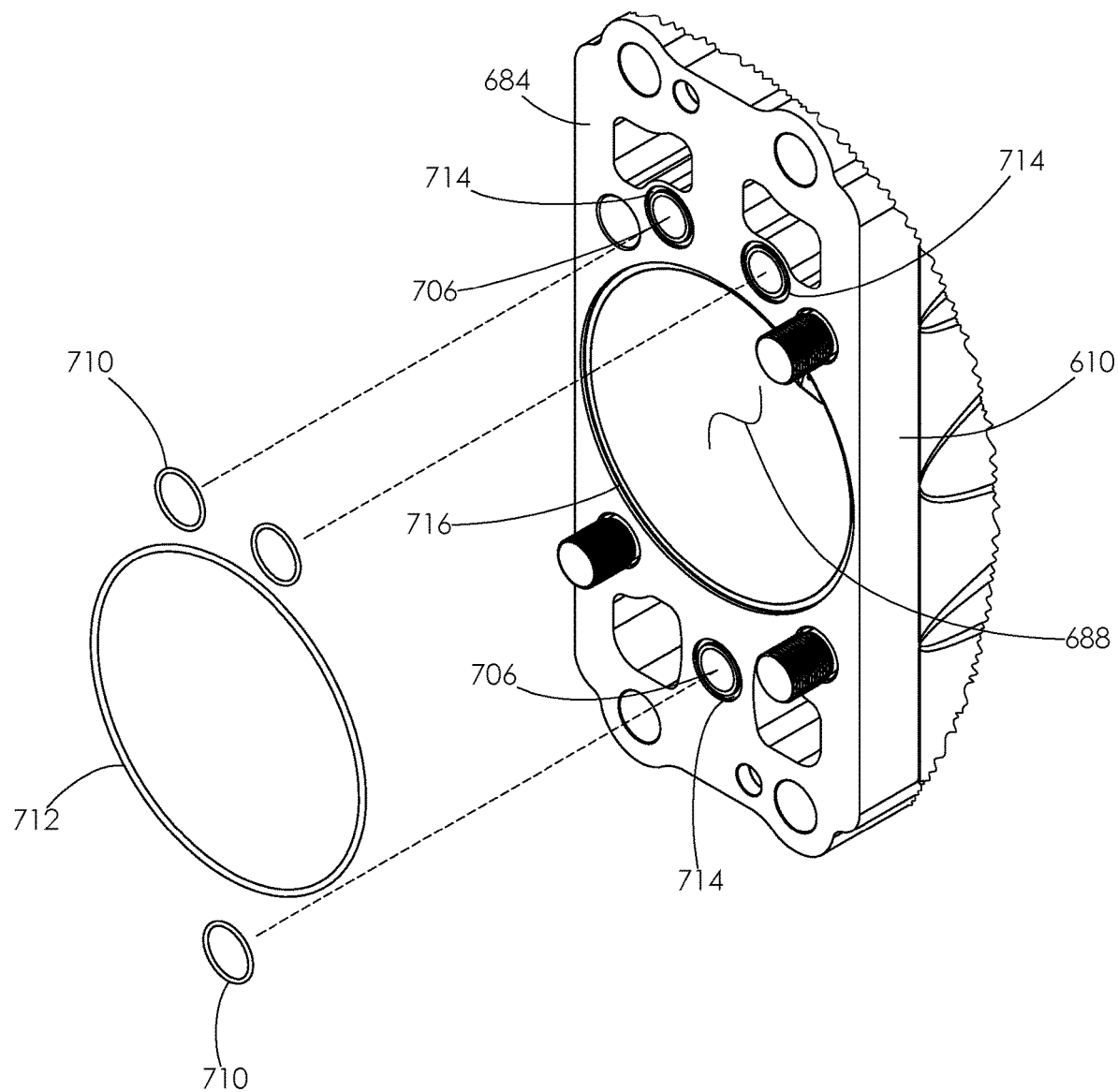

FIG. 109 is an enlarged view of area AH shown in FIG. 130. The enlarged view depicts a rear perspective and exploded view of the crosshead guide shown in FIG. 101 having a plurality of second stay rods installed therein.

Figure 110:
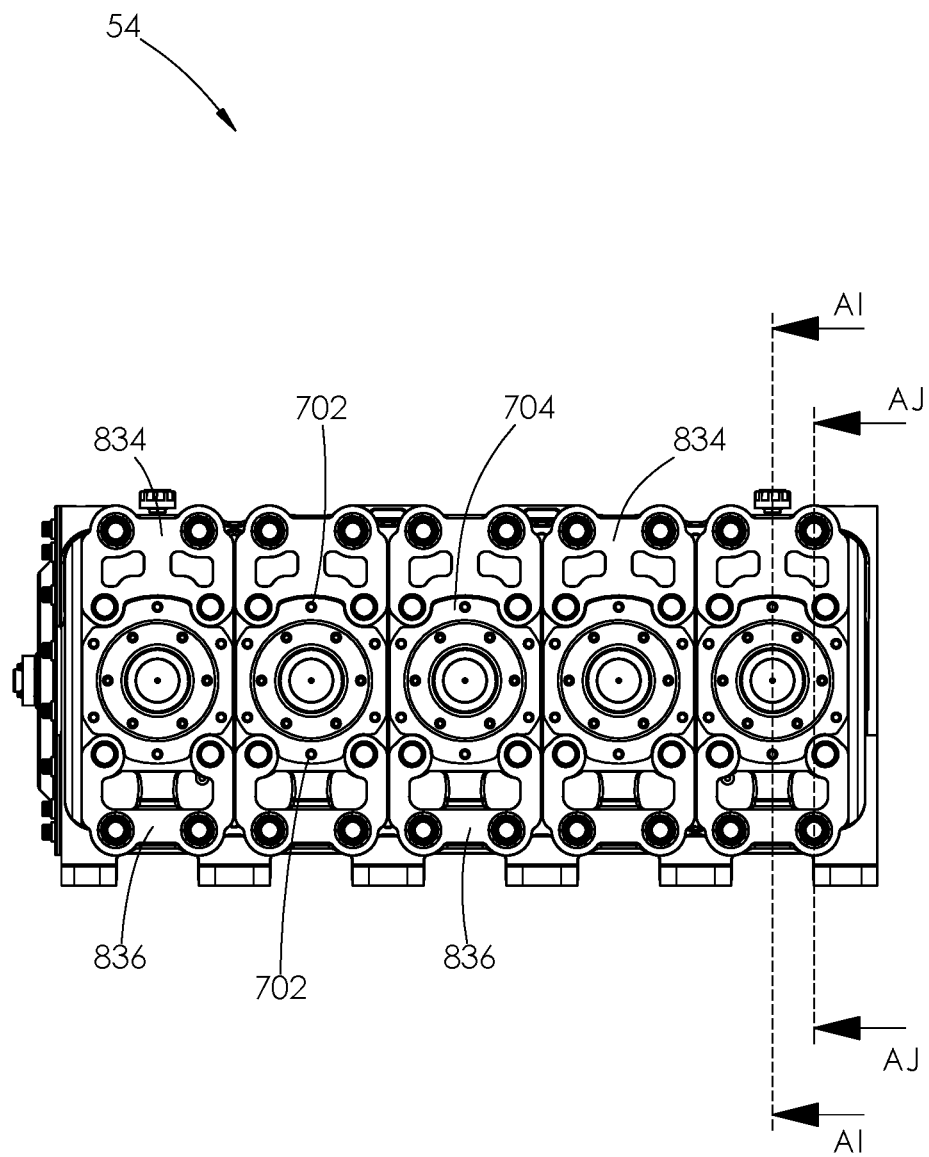

FIG. 110 is a front elevational view of the power end assembly shown in FIG. 86.

Figure 111:
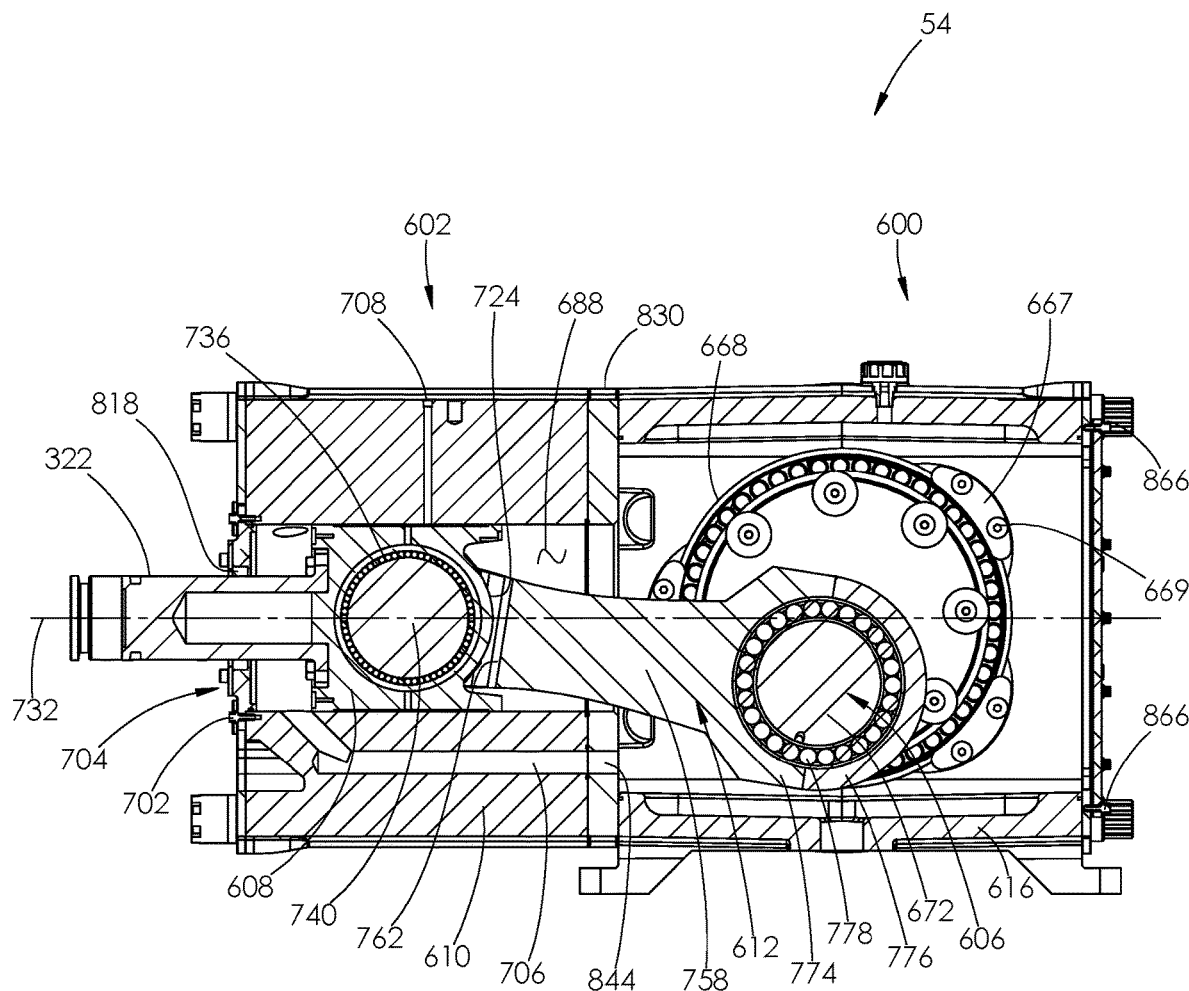

FIG. 111 is a cross-sectional view of the power end assembly shown in FIG. 110, taken along line AI-AI.

Figure 112:
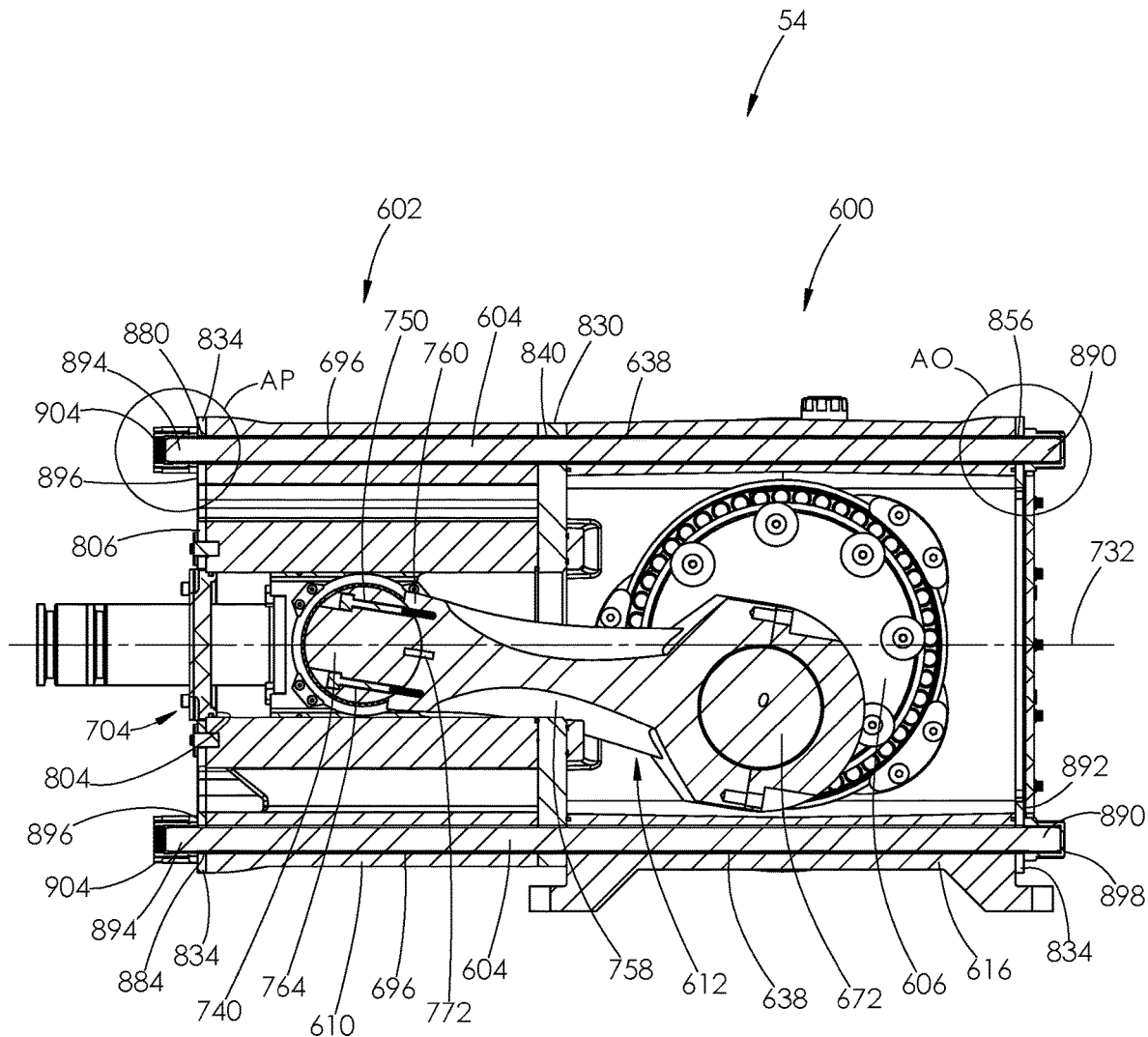

FIG. 112 is a cross-sectional view of the power end assembly shown in FIG. 110, taken along line AJ-AJ.

Figure 113:
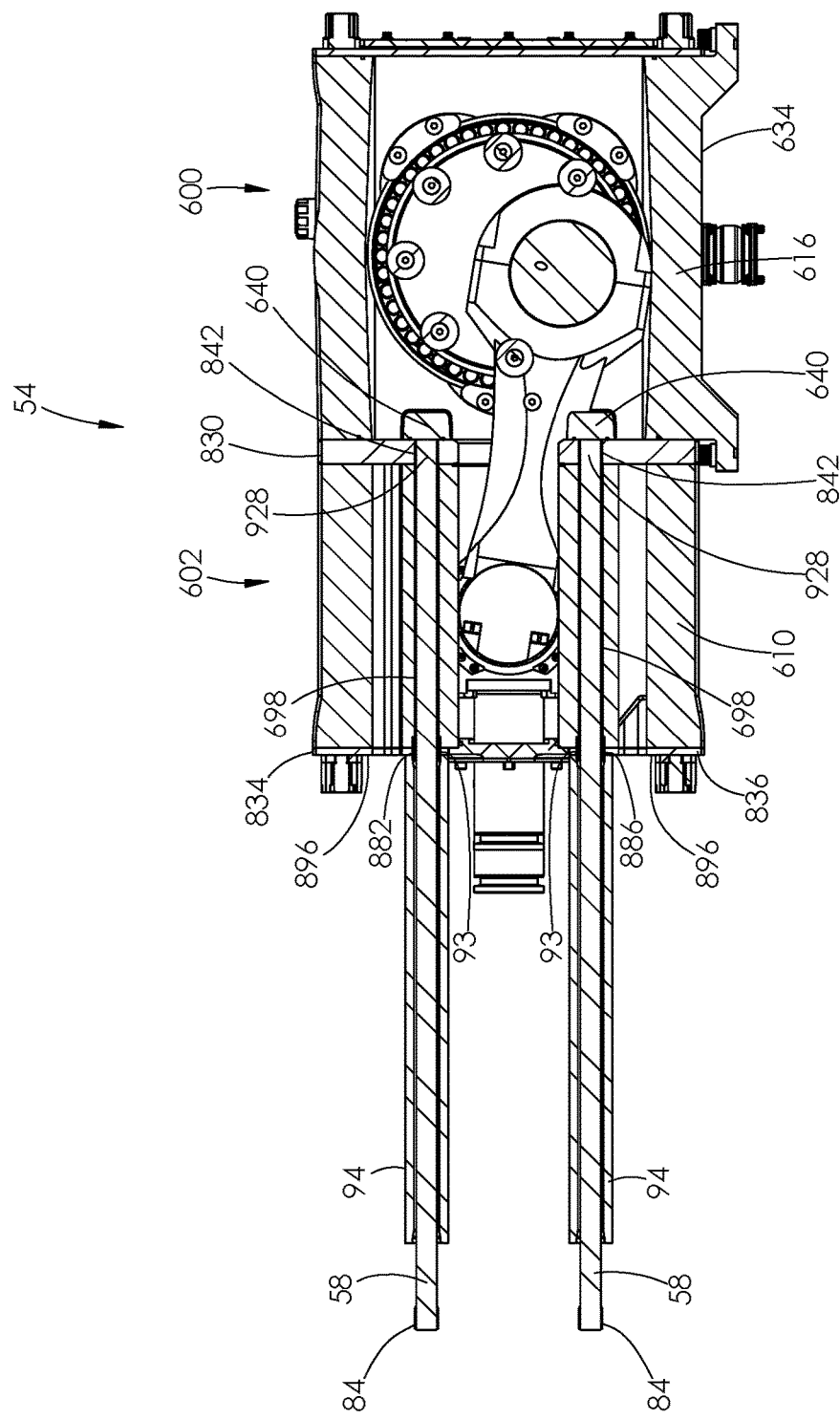

FIG. 113 is a cross-sectional view of the power end assembly shown in FIG. 85, taken along line AK-AK.

Figure 114:
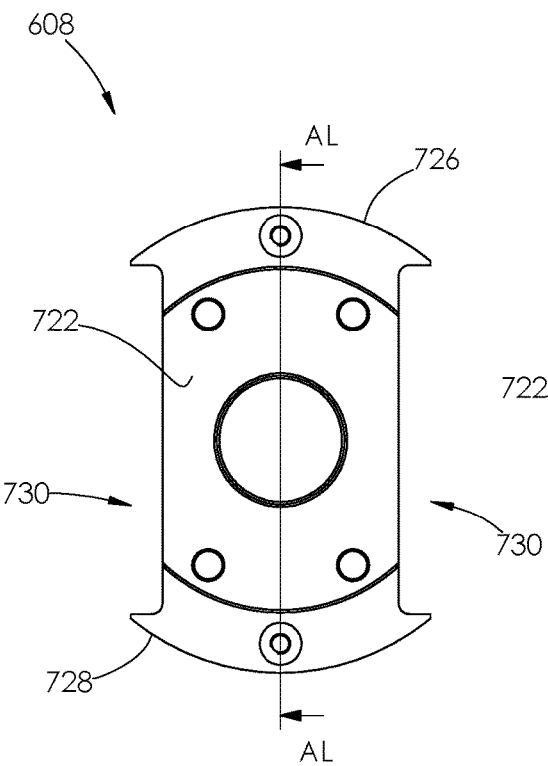

FIG. 114 is a front elevational view of the crosshead shown installed within the power end assembly in FIGS. 111-113.

Figure 115:
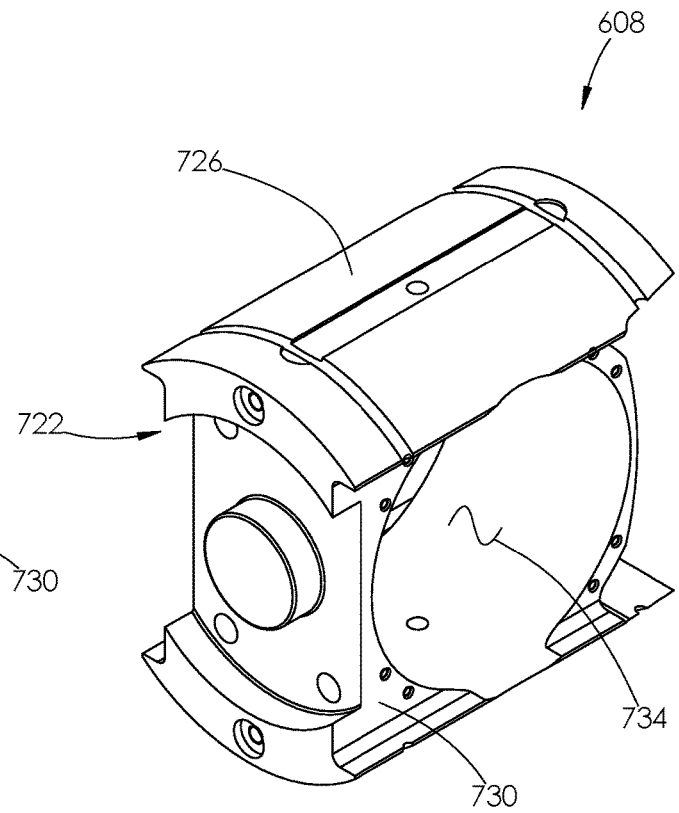

FIG. 115 is a front perspective view of the crosshead shown in FIG. 114.

Figure 116:
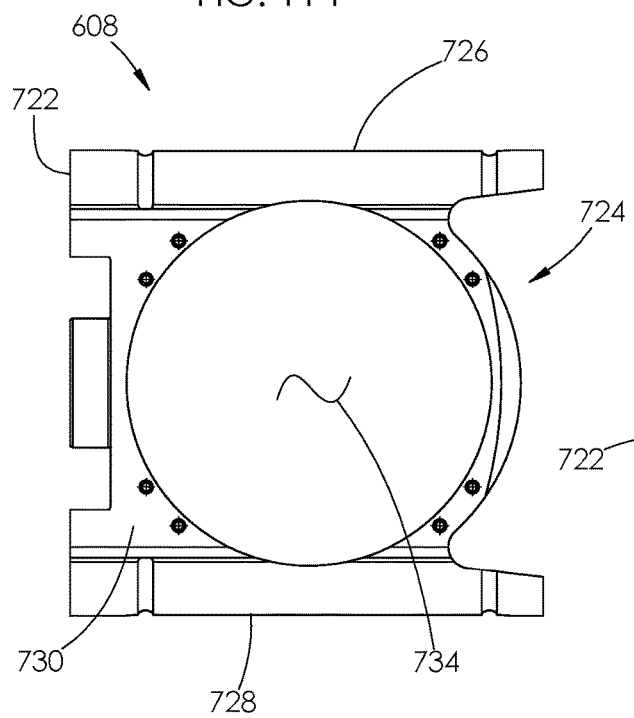

FIG. 116 is a side elevational view of the crosshead shown in FIG. 114.

Figure 117:
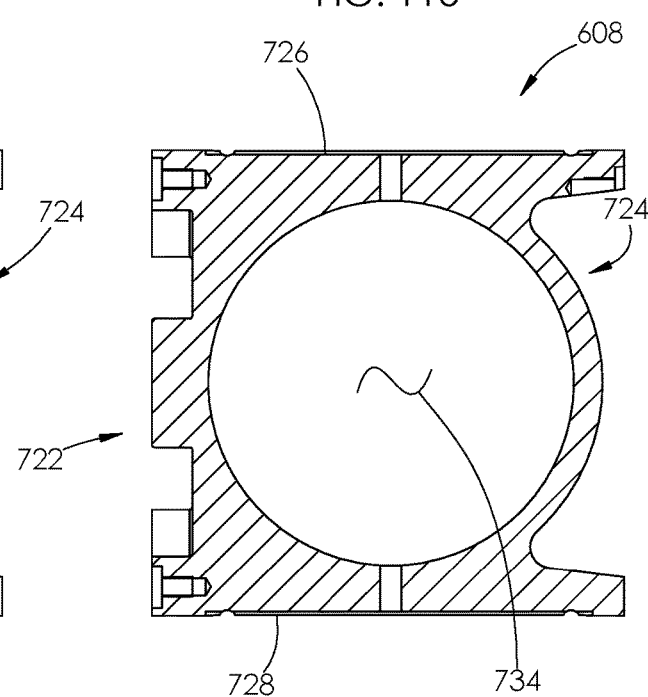

FIG. 117 is a cross-sectional view of the crosshead shown in FIG. 114, taken along line AL-AL.

FIG. 118 is a front perspective view of the wrist pin shown installed within the crosshead in FIGS. 111-113.

FIG. 119 is a front elevational view of the wrist pin shown in FIG. 118.

FIG. 120 is a cross-sectional view of the wrist pin shown in FIG. 119, taken along line AM-AM.

Figure 121:
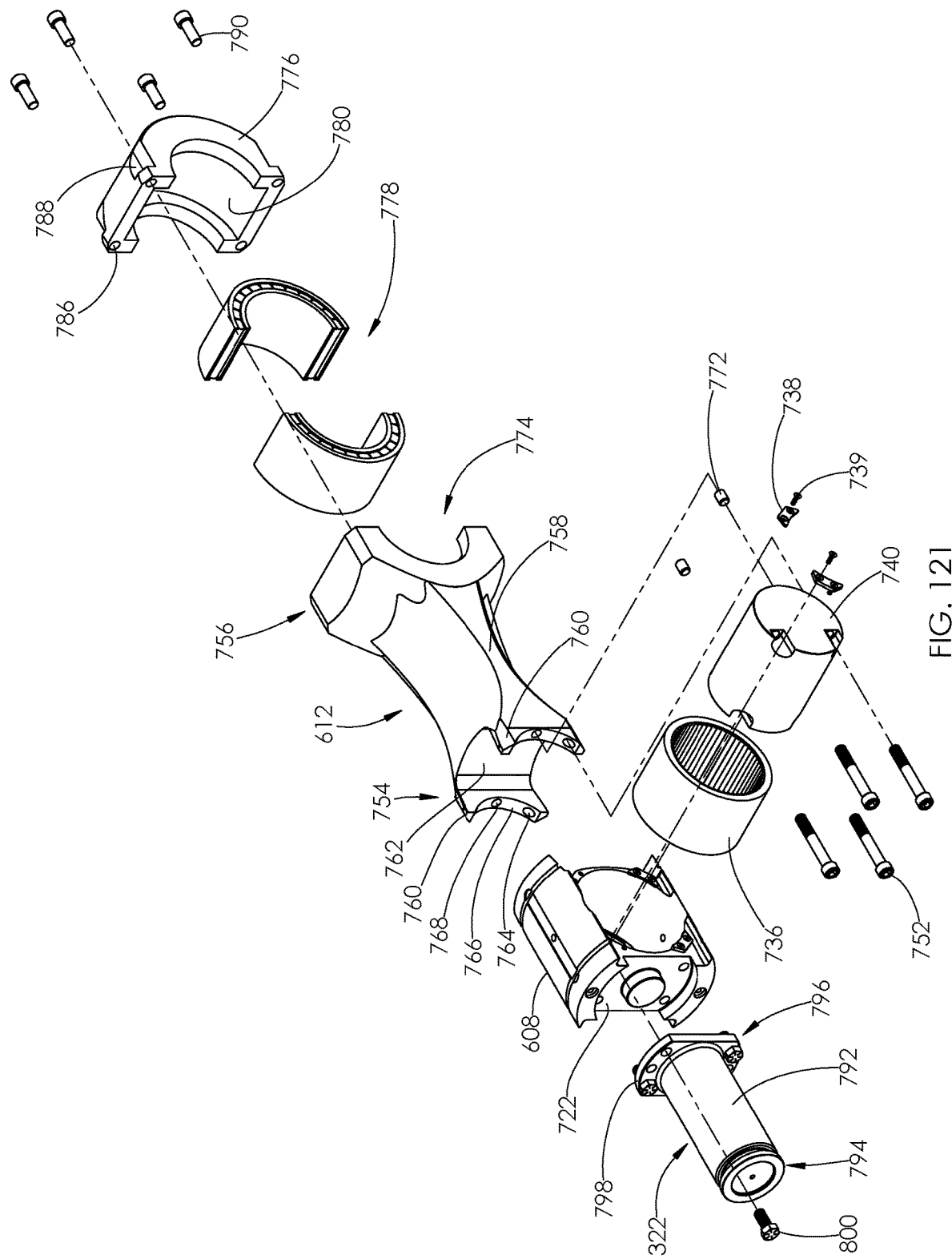

FIG. 121 is a front perspective and exploded view of the pony rod, crosshead, and connecting arm shown installed within the power end assembly in FIGS. 111-113.

Figure 122:
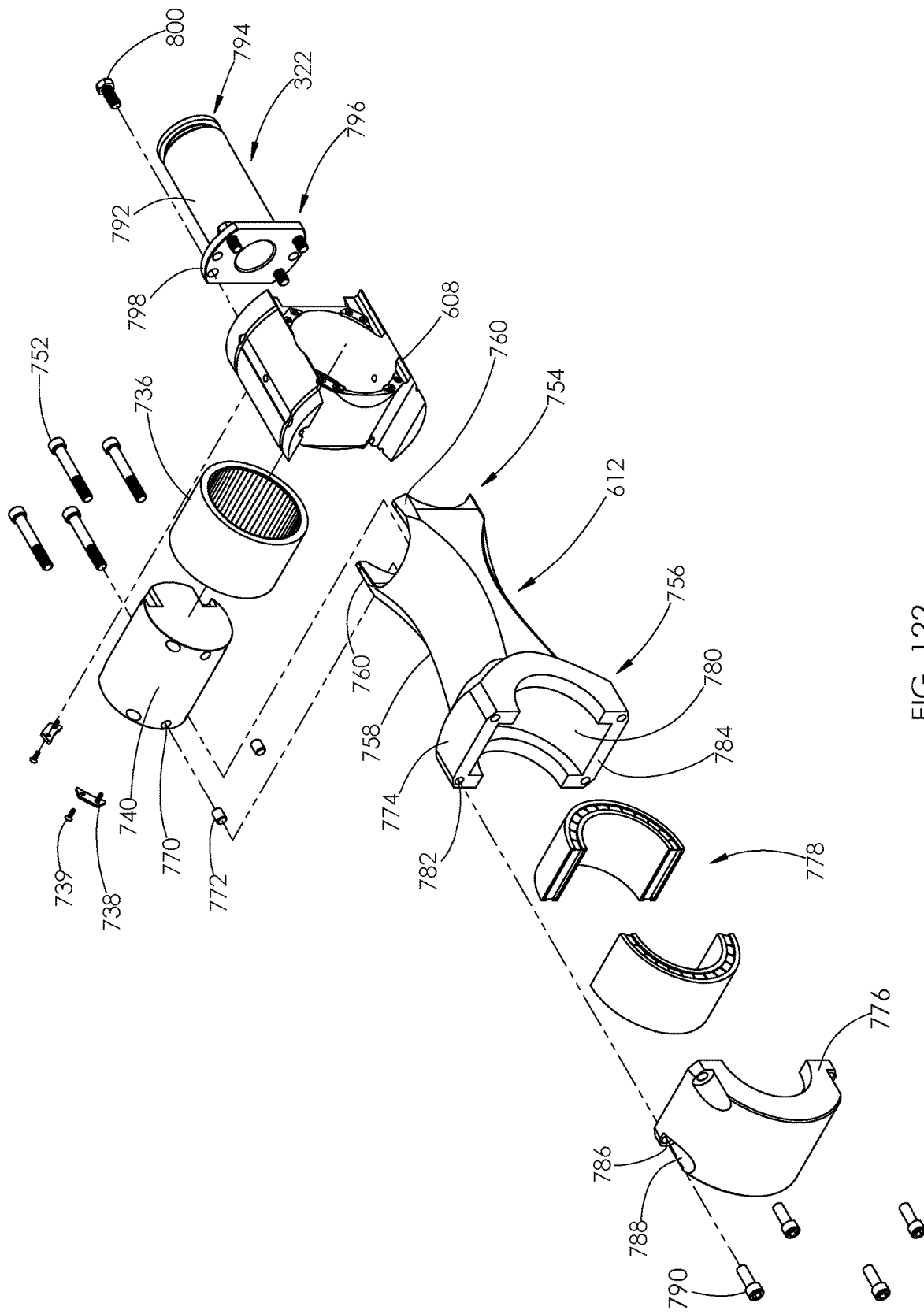

FIG. 122 is a rear perspective and exploded view of the pony rod, crosshead, and connecting arm shown in FIG. 121.

Figure 123:
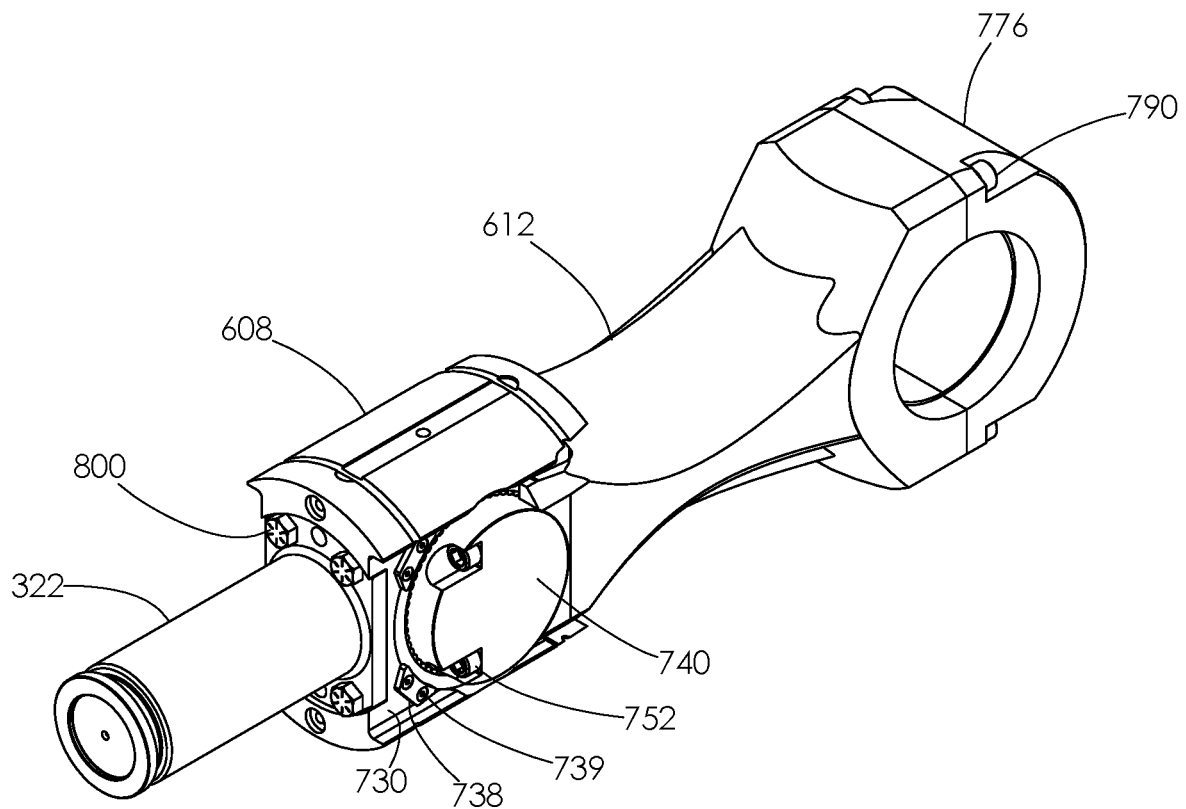

FIG. 123 is a front perspective and assembled view of the pony rod, crosshead, and connecting arm shown in FIG. 121.

Figure 124:
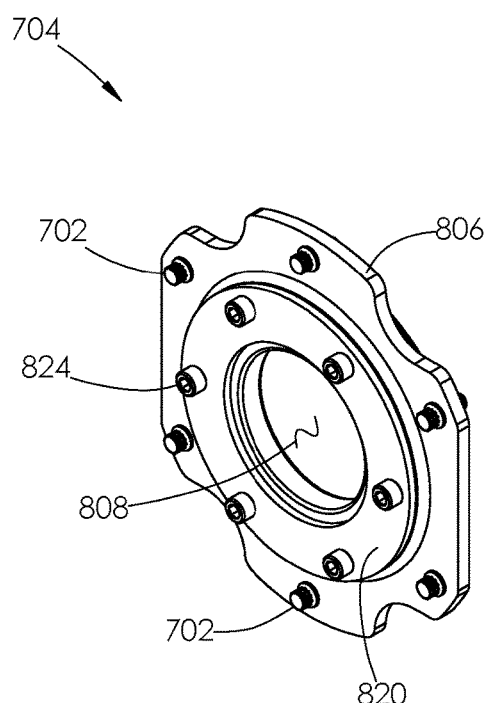

FIG. 124 is a front perspective view of the pony rod seal plate shown attached to the power end assembly in FIGS. 111-113.

Figure 125:
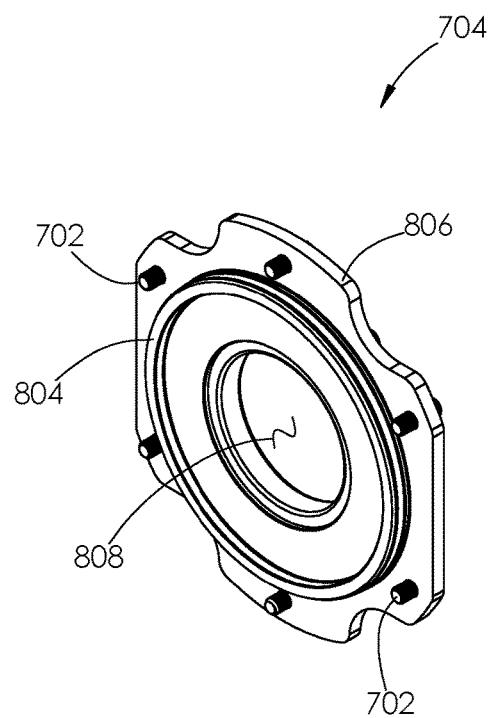

FIG. 125 is a rear perspective view of the pony rod seal plate shown in FIG. 124.

Figure 126:
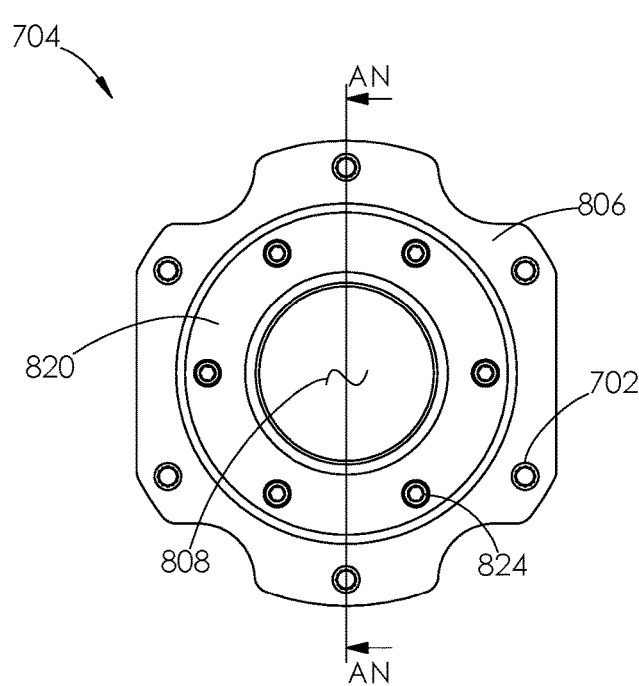

FIG. 126 is a front elevational view of the pony rod seal plate shown in FIG. 124.

Figure 127:
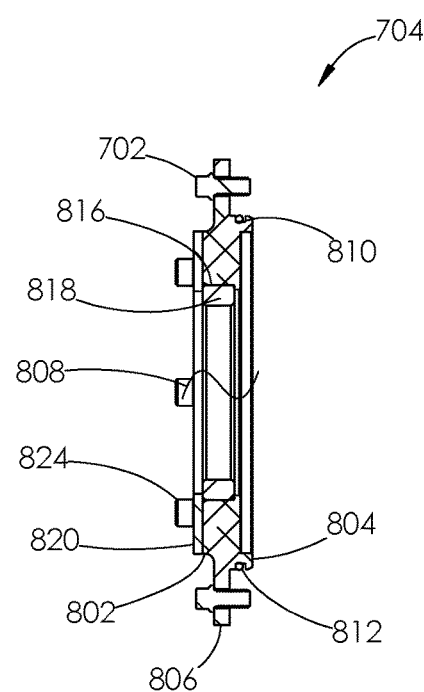

FIG. 127 is a cross-sectional view of the pony rod seal plate shown in FIG. 126, taken along line AN-AN.

Figure 128:
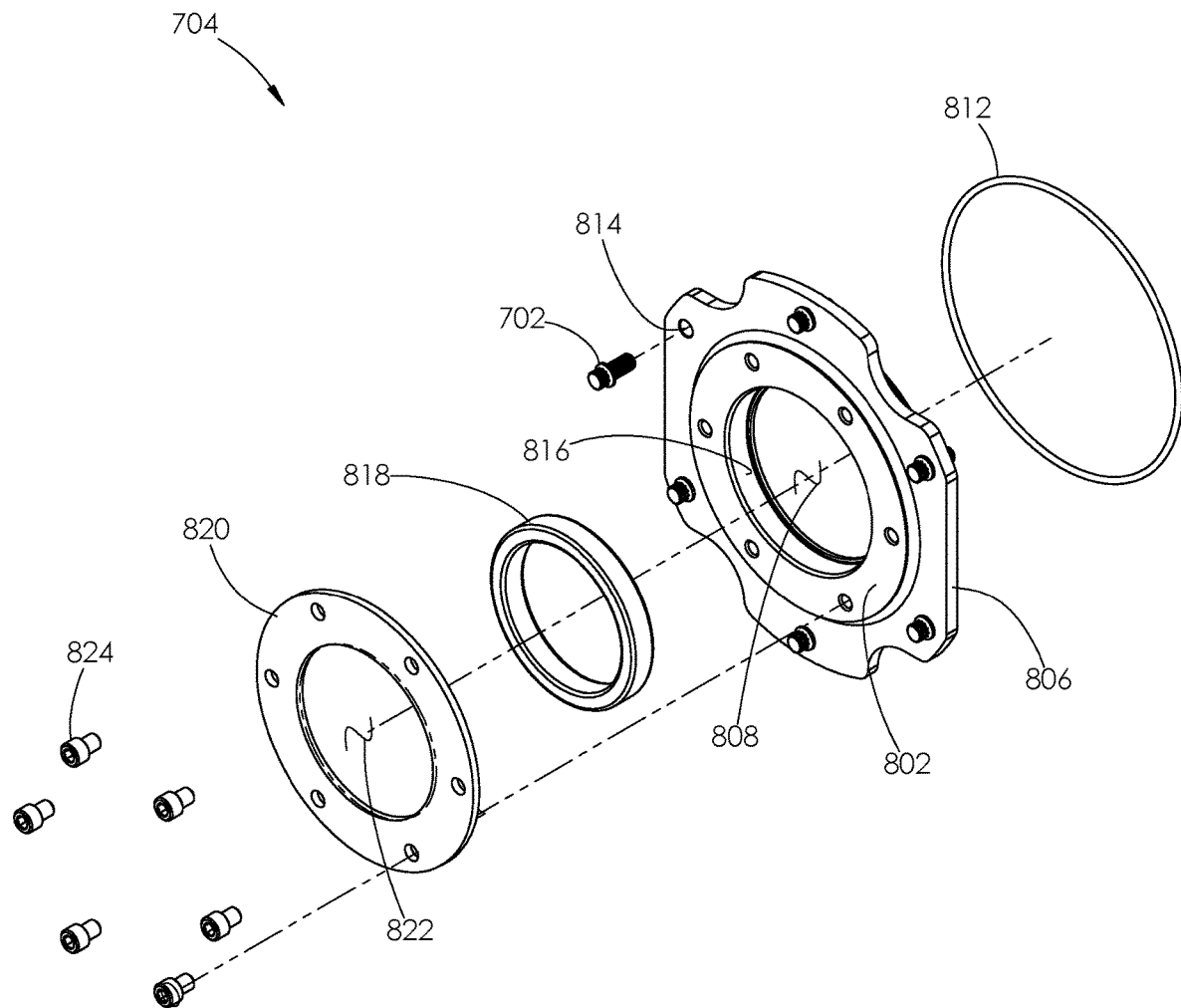

FIG. 128 is a front perspective and exploded view of the pony rod seal plate shown in FIG. 124.

Figure 129:
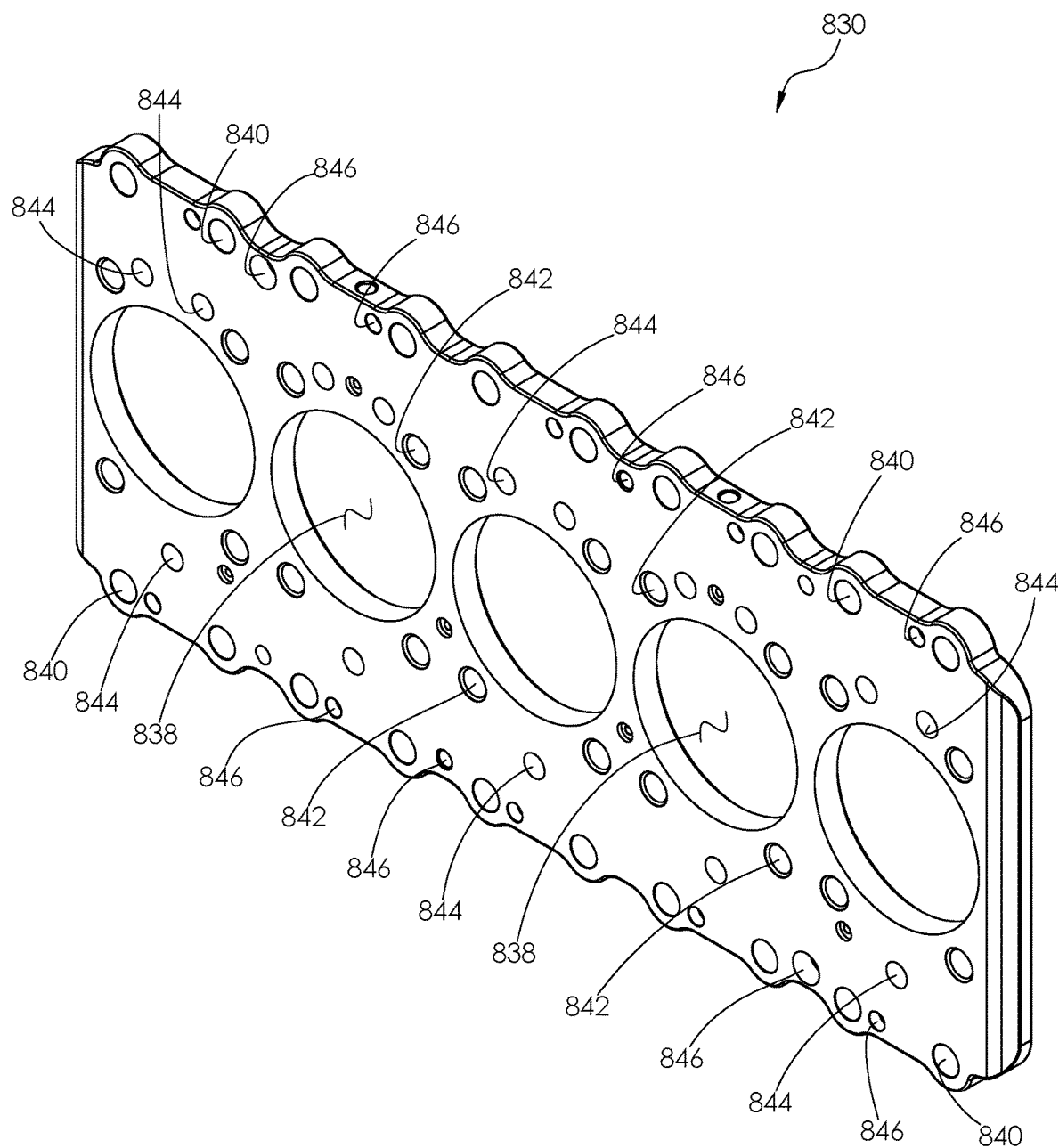

FIG. 129 is a front perspective view of the central support plate included in the power end assembly shown in FIGS. 111-113.

FIG. 130 is a rear perspective and partially exploded view of the power end assembly shown in FIG. 86. A portion of the crosshead section and corresponding second stay rods of the power end assembly have been removed for clarity.

Figure 131:
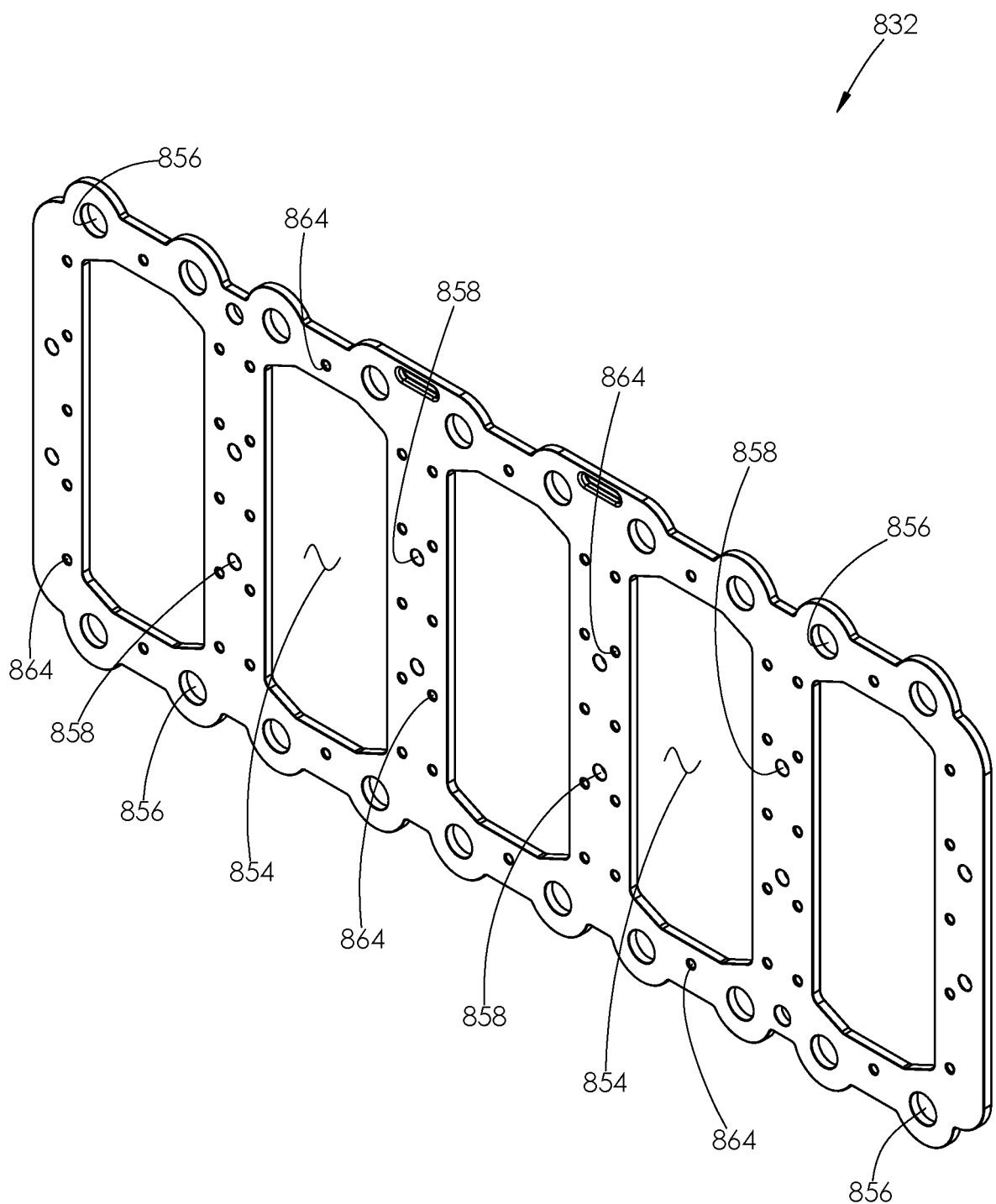

FIG. 131 is a rear perspective view of the rear support plate included in the power end assembly shown in FIGS. 111-113.

Figure 132:
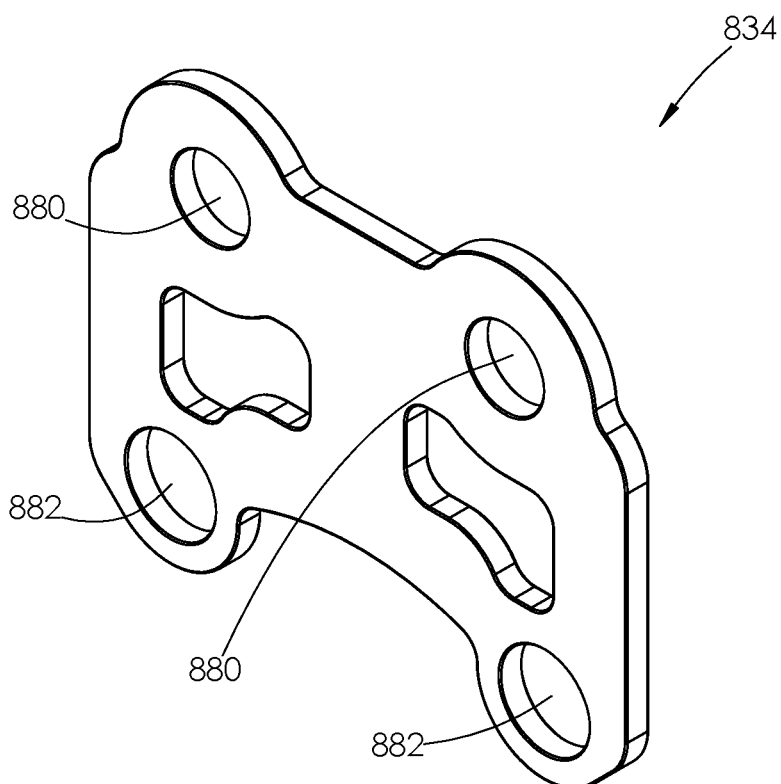

FIG. 132 is a front perspective view of the upper front support plate included in the power end assembly shown in FIGS. 111-113.

Figure 133:
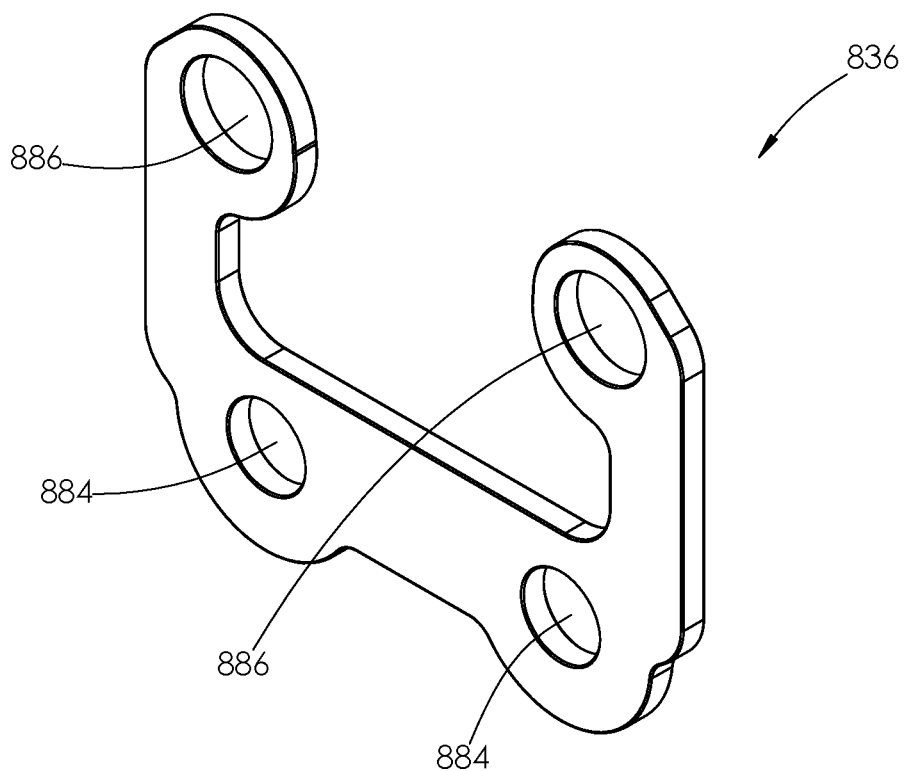

FIG. 133 is a front perspective view of the lower front support plate included in the power end assembly shown in FIGS. 111-113.

Figure 134:
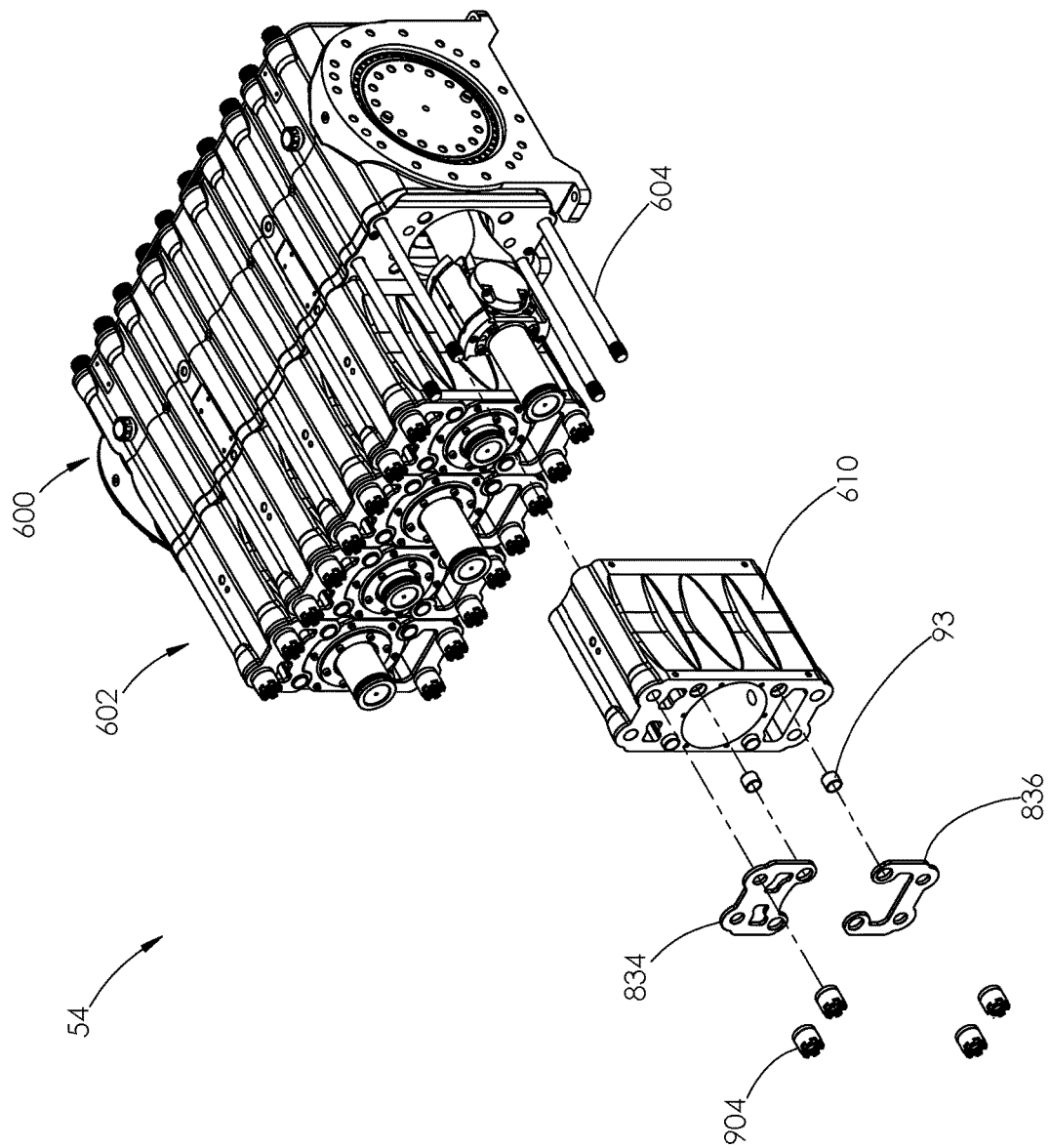

FIG. 134 is a front perspective and partially exploded view of the power end assembly shown in FIG. 86.

Figure 135:
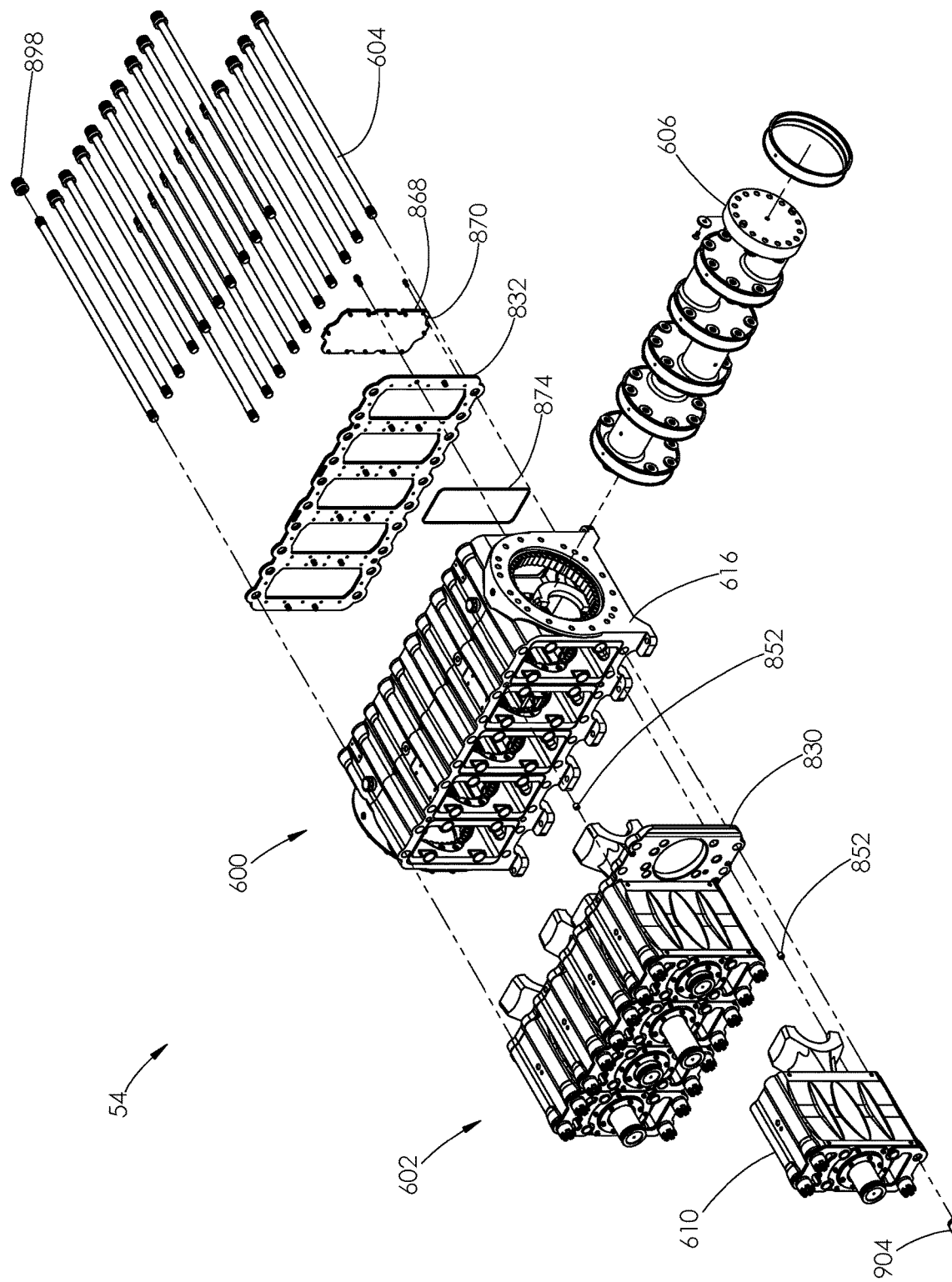

FIG. 135 is the front perspective view and exploded view of the power end assembly shown in FIG. 134, but more components are shown exploded from the assembly.

Figure 136:
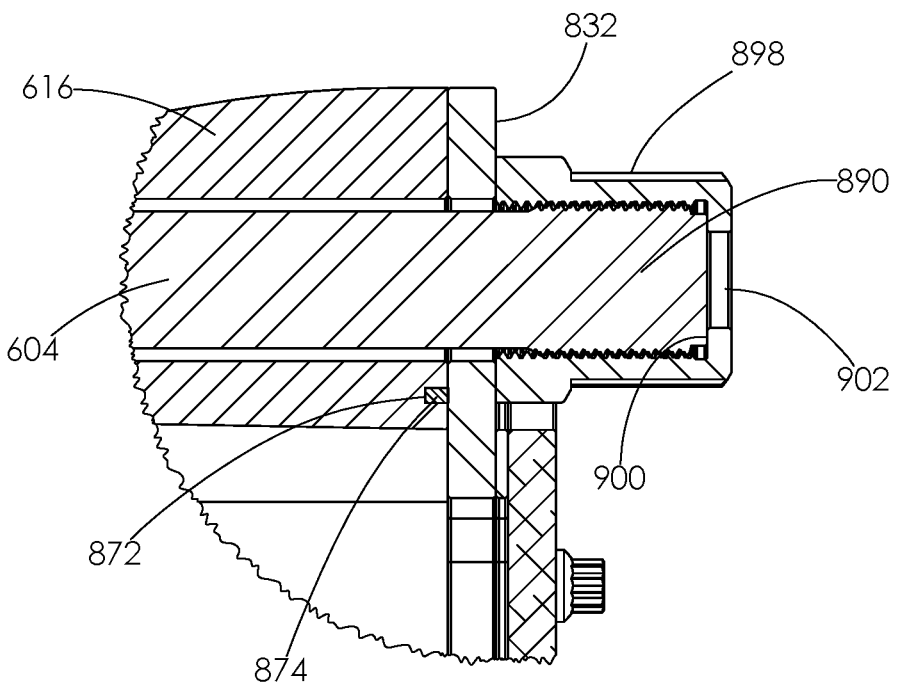

FIG. 136 is an enlarged view of area AO shown in FIG. 112.

Figure 137:
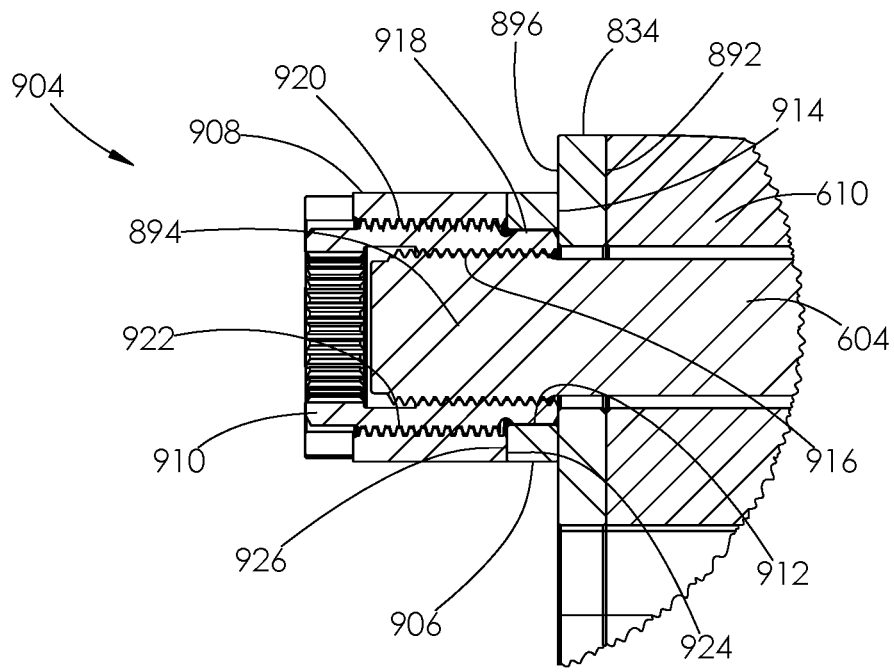

FIG. 137 is an enlarged view of area AP shown in FIG. 112.

Figure 138:
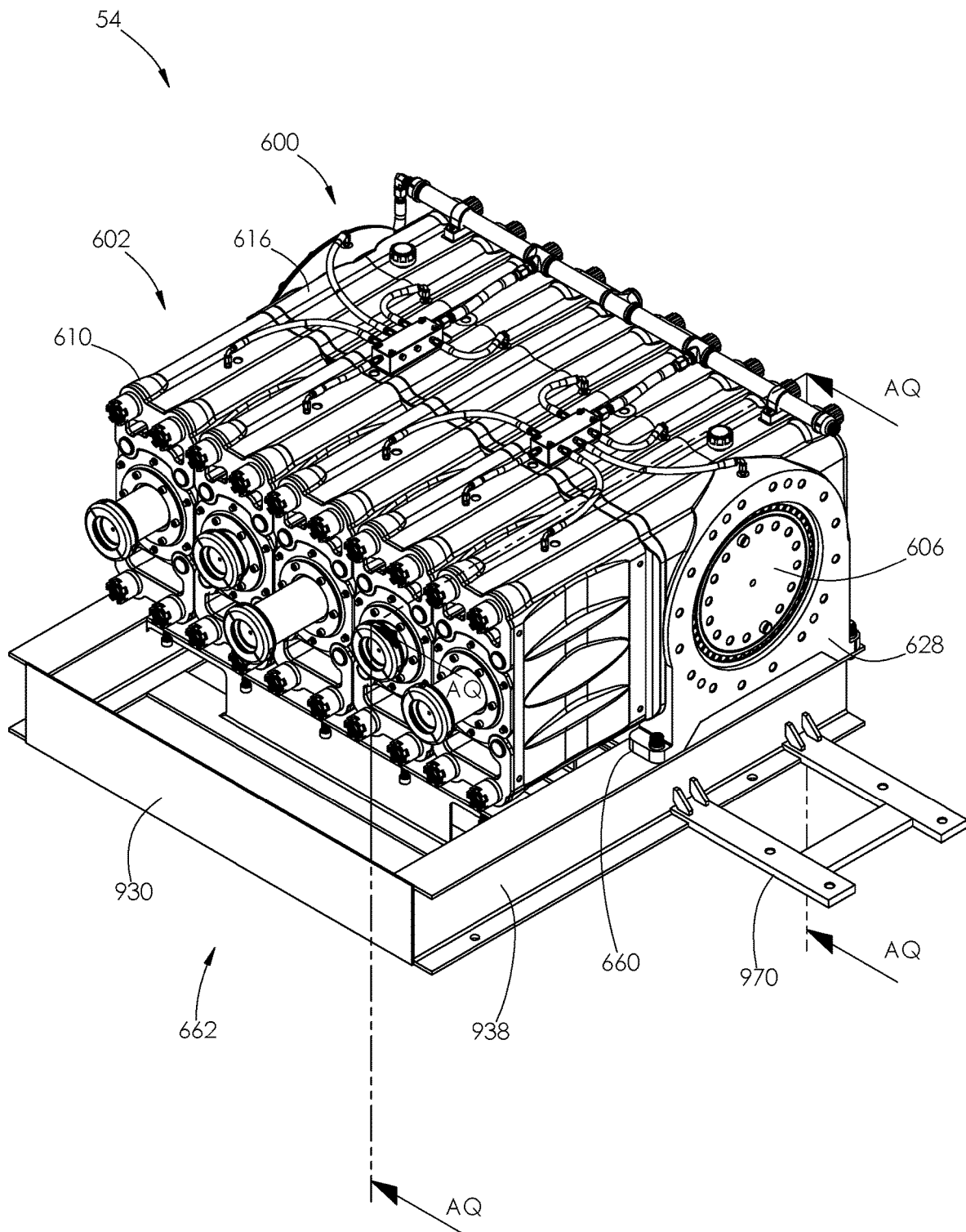

FIG. 138 is a front perspective view of the power end assembly shown in FIG. 85, but the engine section and second stay rods have been removed for clarity.

Figure 139:
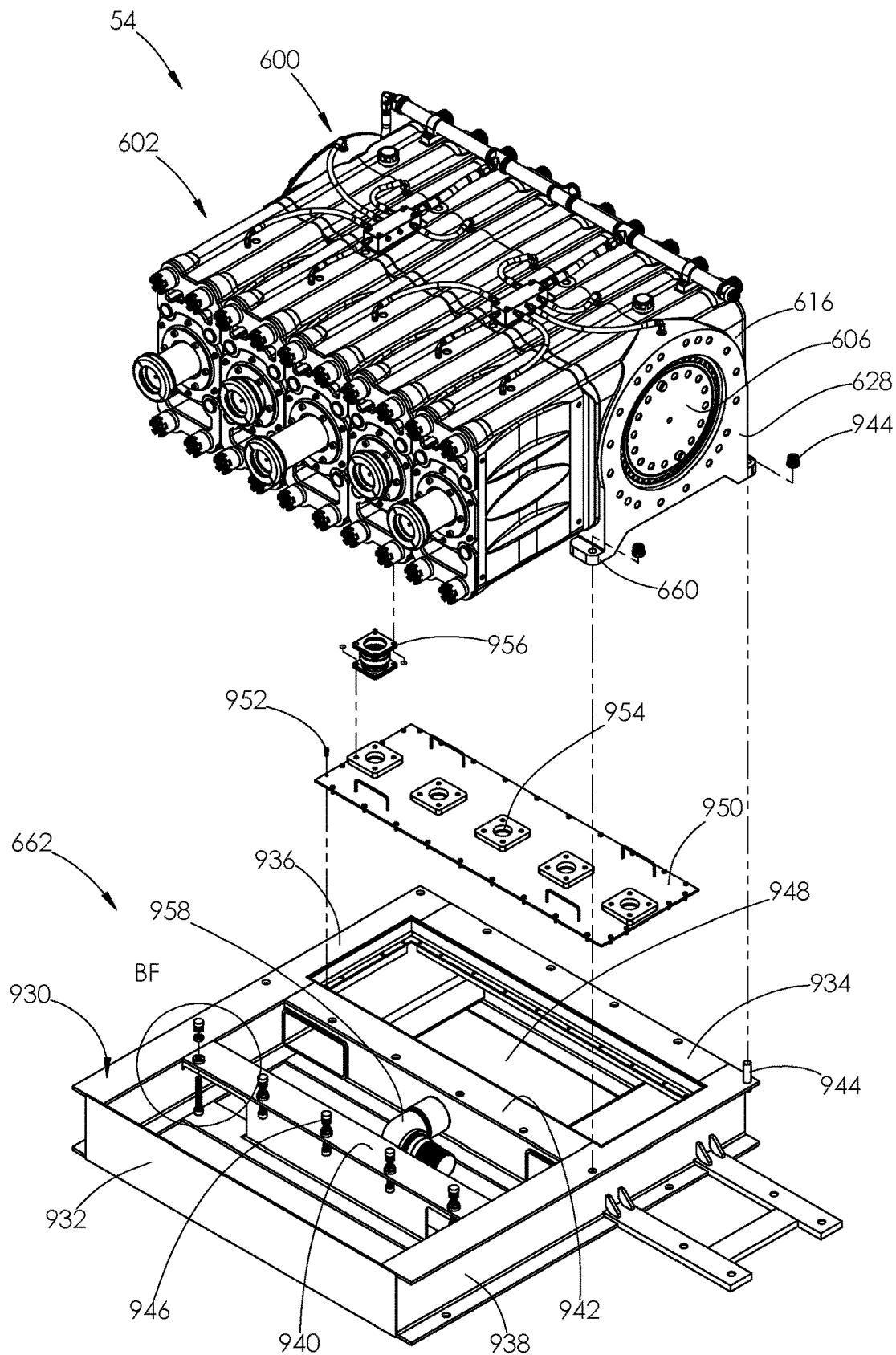

FIG. 139 is a front perspective and exploded view of the power end assembly shown in FIG. 138.

Figure 140:
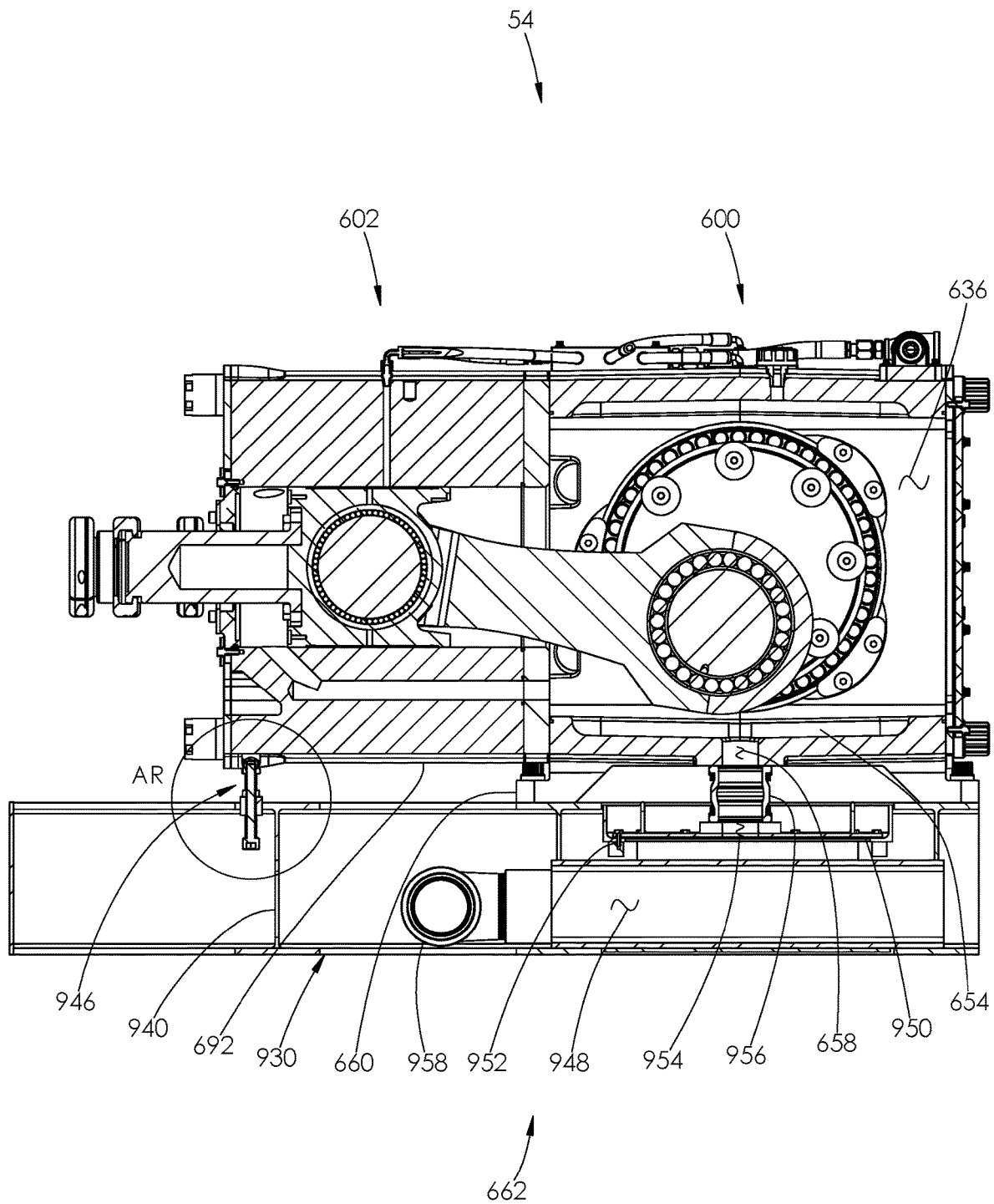

FIG. 140 is a cross-sectional view of the power end assembly shown in FIG. 138, taken along line AQ-AQ.

Figure 141:
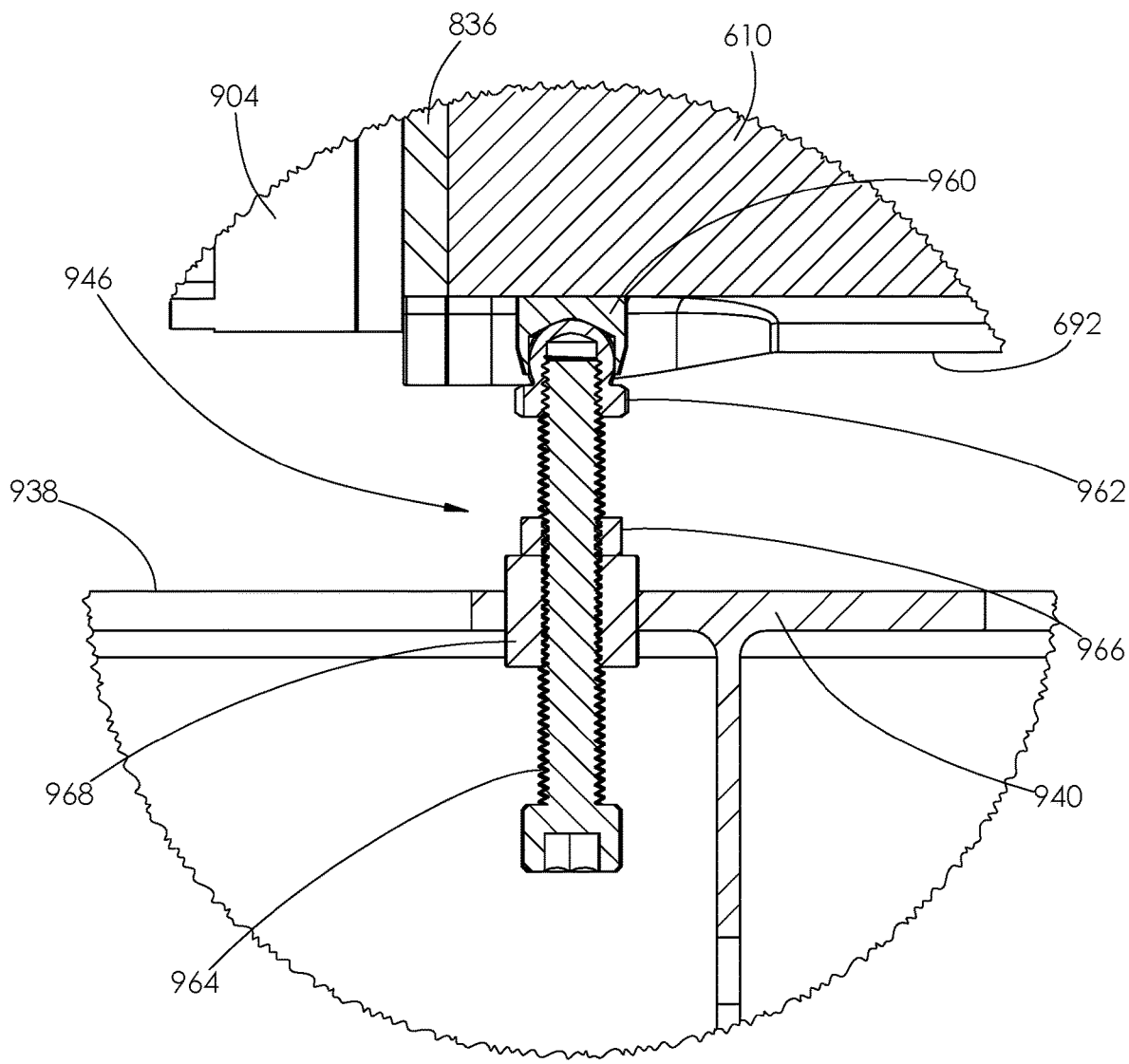

FIG. 141 is an enlarged view of area AR shown in FIG. 140.

DETAILED DESCRIPTION

Figure 80:
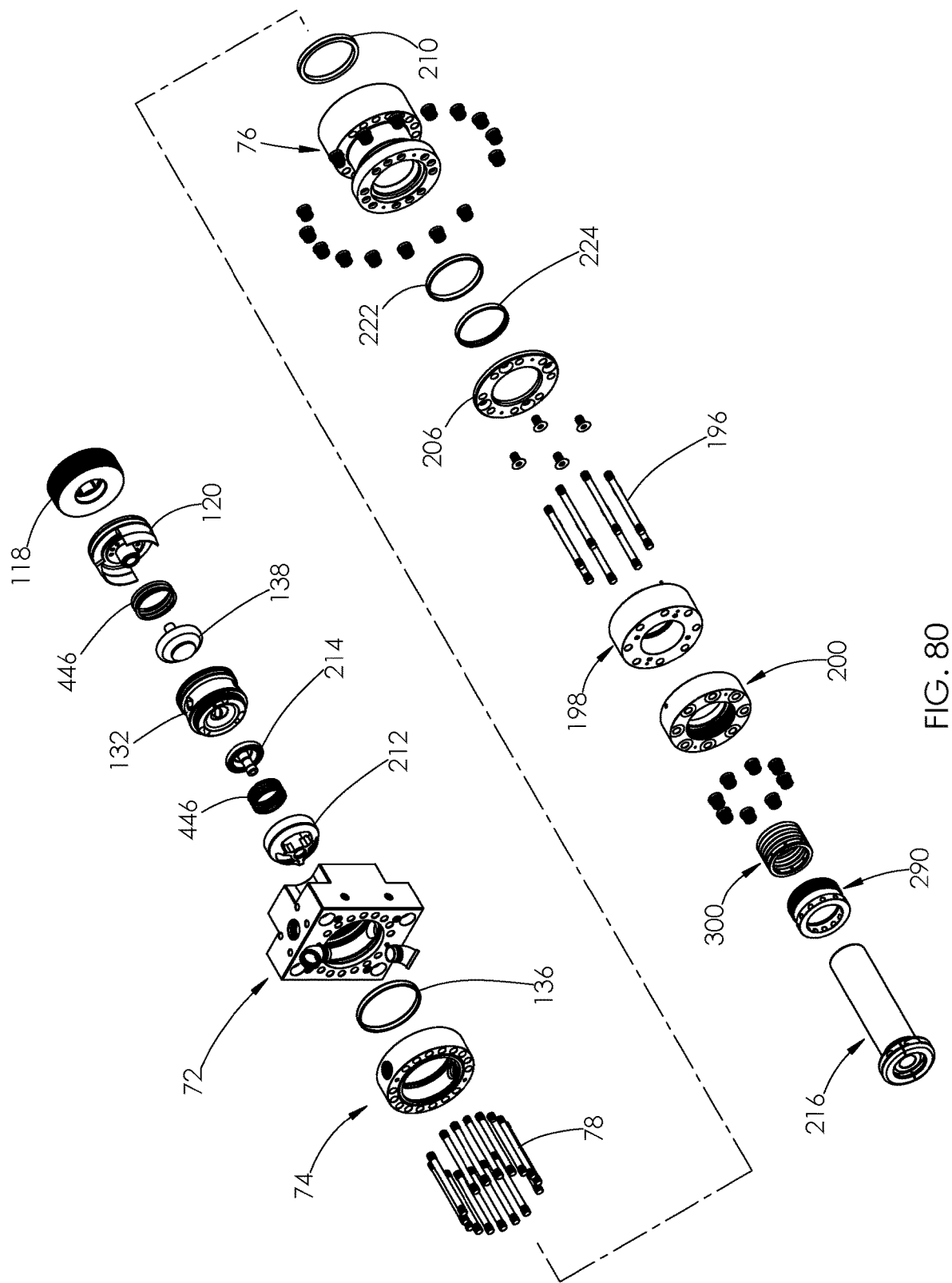
FIG. 80 is a rear perspective and exploded view of the fluid end section shown in FIGS. 9, 29, 40, and 41.

Turning now to FIG. 3, a high pressure pump 50 disclosed herein is shown. The pump 50 comprises a fluid end assembly 52 joined to a power end assembly 54. The fluid end assembly 52 is described with reference to FIGS. 4-80 and the power end assembly 54 is described with reference to FIGS. 81-141.

Fluid End Assembly

Figure 4:
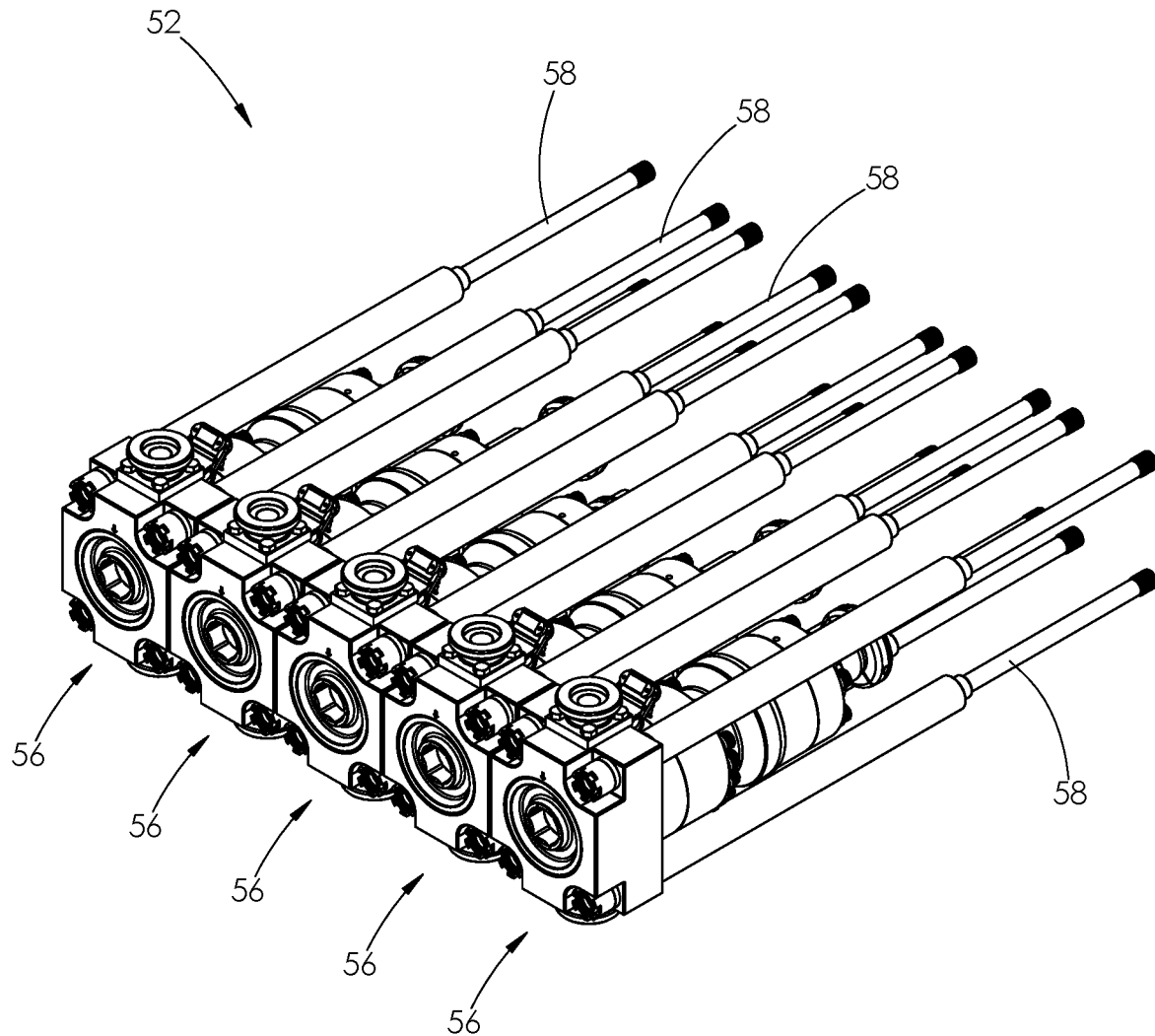
FIG. 4 is a front perspective view of the fluid end assembly shown in FIG. 3 attached to a plurality of stay rods.
Figure 5:
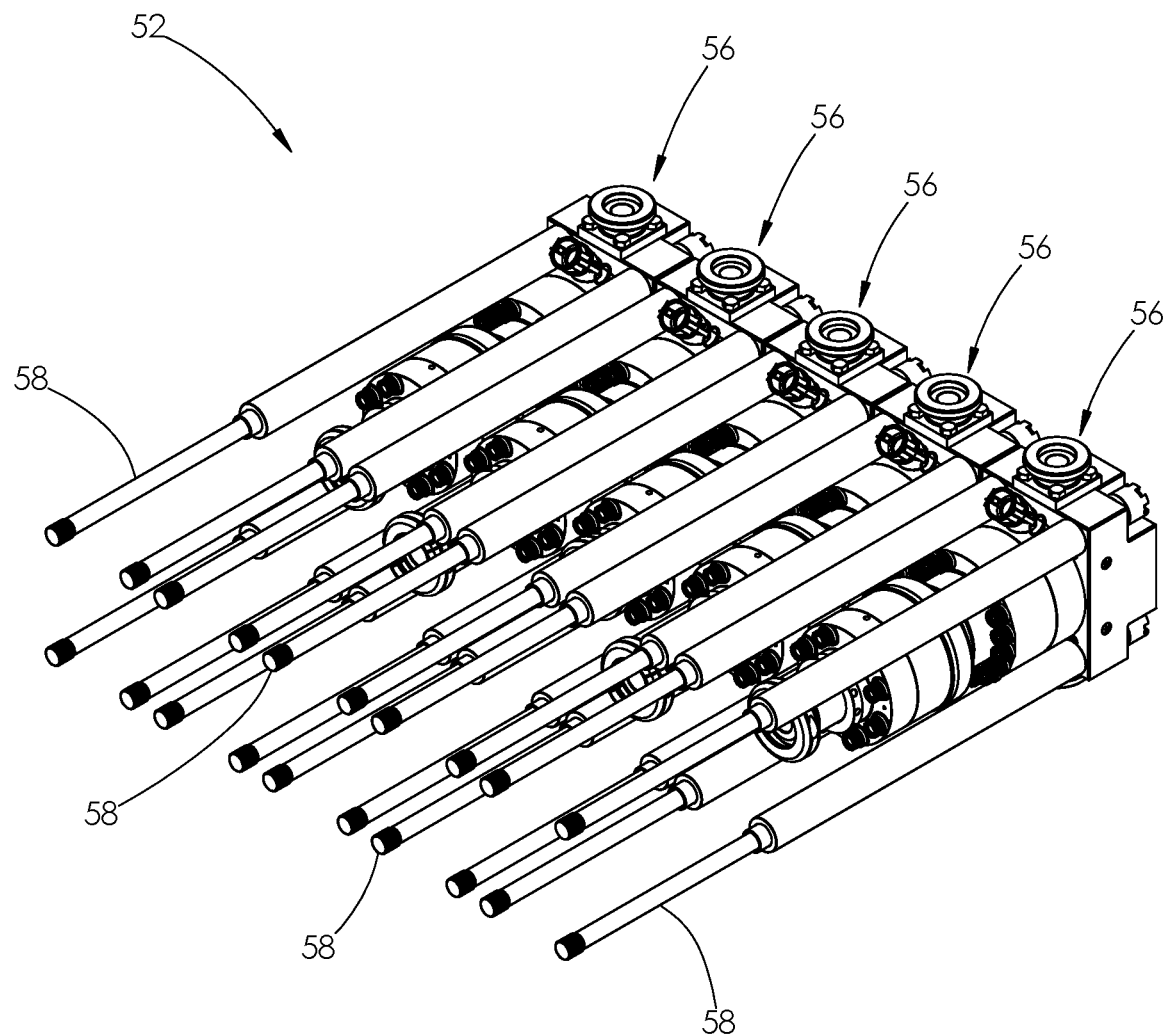
FIG. 5 is a rear perspective view of the fluid end assembly and stay rods shown in FIG. 4.
Figure 6:
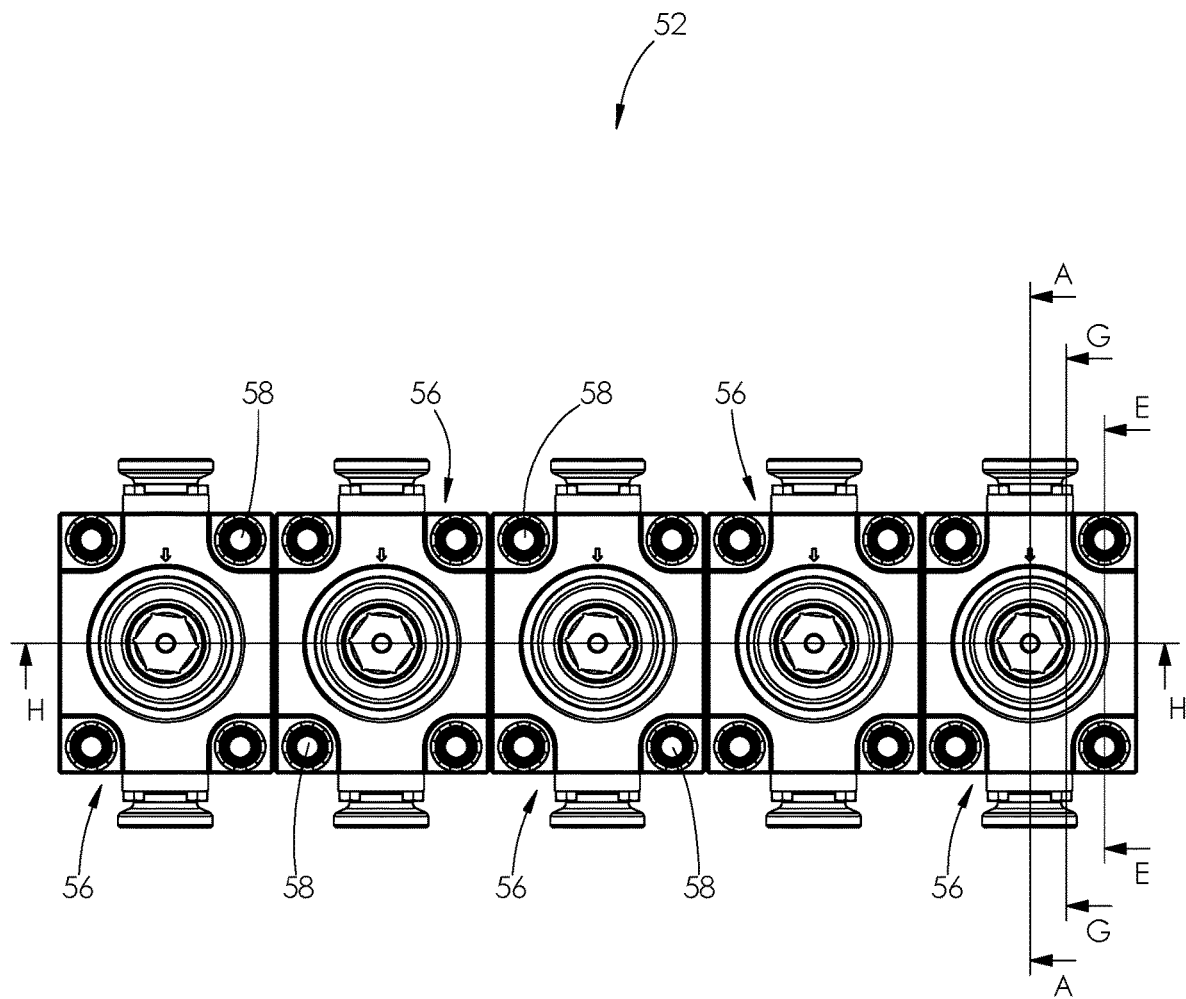
FIG. 6 is a front elevational view of the fluid end assembly and stay rods shown in FIG. 4.
Figure 7:
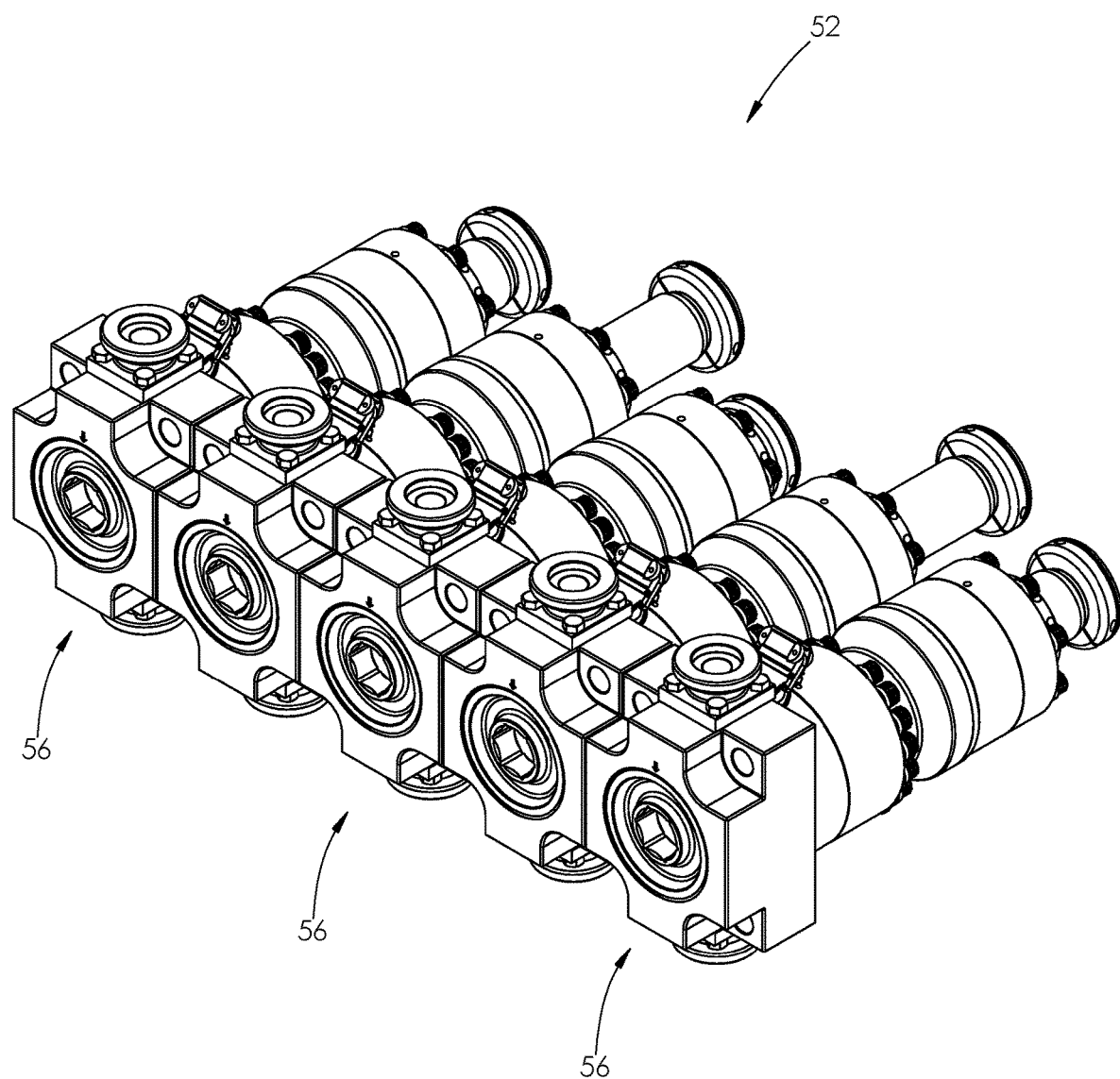
FIG. 7 is a front perspective view of the fluid end assembly shown in FIGS. 3 and 4.
Figure 8:
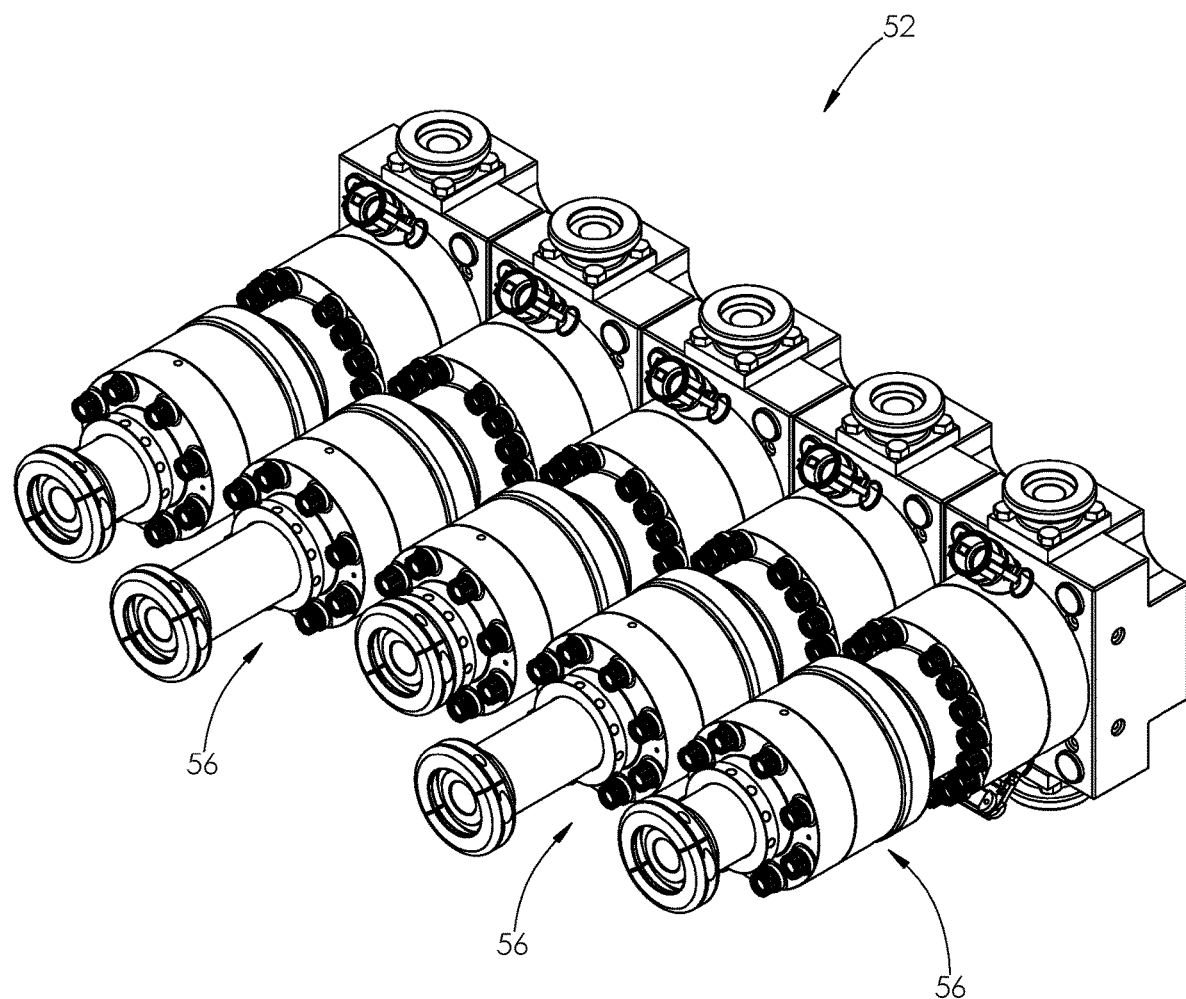
FIG. 8 is a rear perspective view of the fluid end assembly shown in FIG. 7.

Turning to FIGS. 4-8, the fluid end assembly 52 comprises a plurality of fluid end sections 56 positioned in a side-by-side relationship, as shown in FIGS. 6-8. Each fluid end section 56 is attached to the power end assembly 54 using a plurality of stay rods 58, as shown in FIGS. 4 and 5. Preferably, the fluid end assembly 52 comprises five fluid end sections 56 positioned adjacent one another. In alternative embodiments, the fluid end assembly 52 may comprise more or less than five fluid end sections 56. In operation, a single fluid end section 56 may be removed and replaced without removing the other fluid end sections 56 from the fluid end assembly 52.

Housing of Fluid End Section

Figure 9:
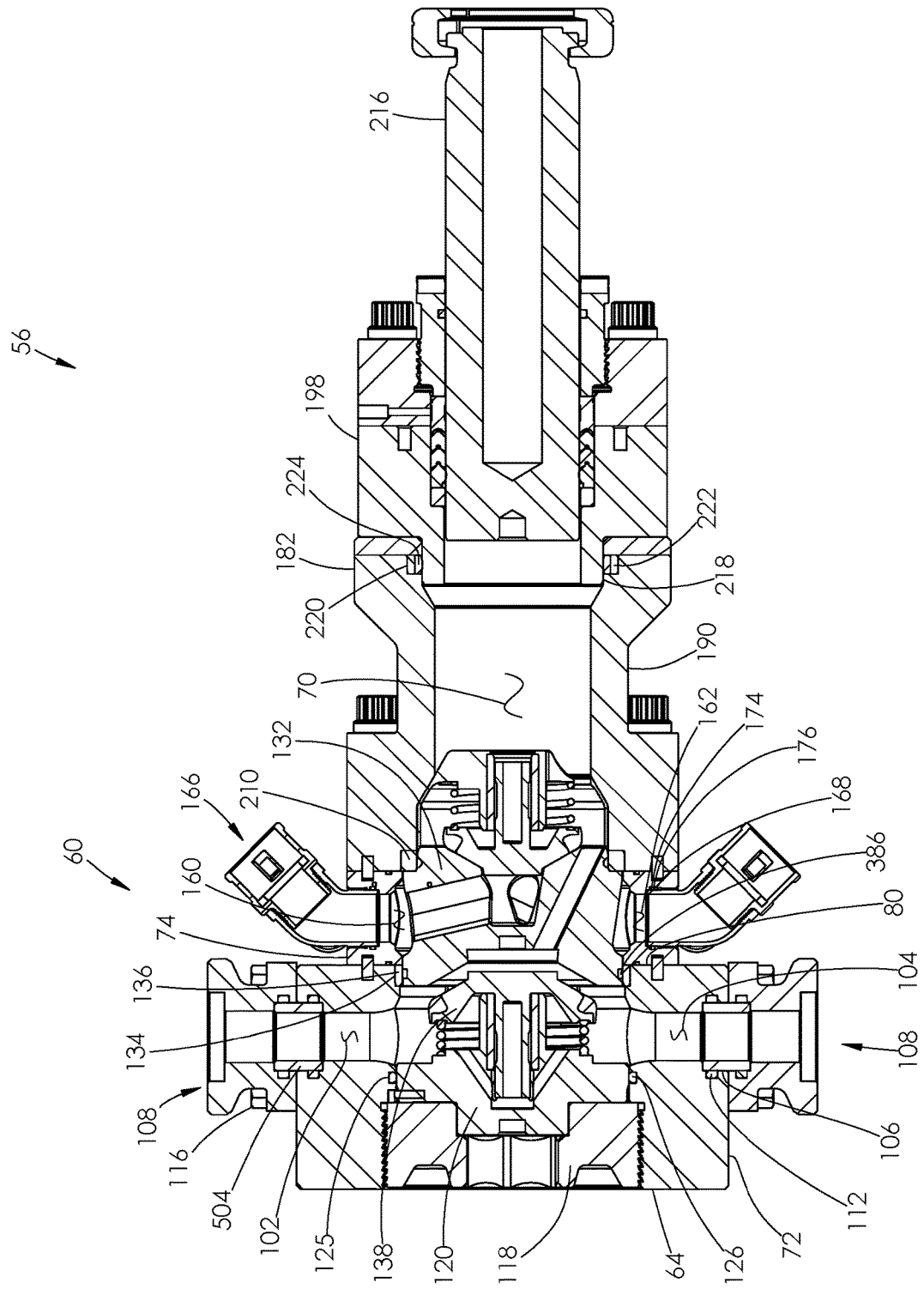
FIG. 9 is a cross-sectional view of one of the fluid end sections making up the fluid end assembly shown in FIG. 6, taken along lines A-A.
Figure 10:
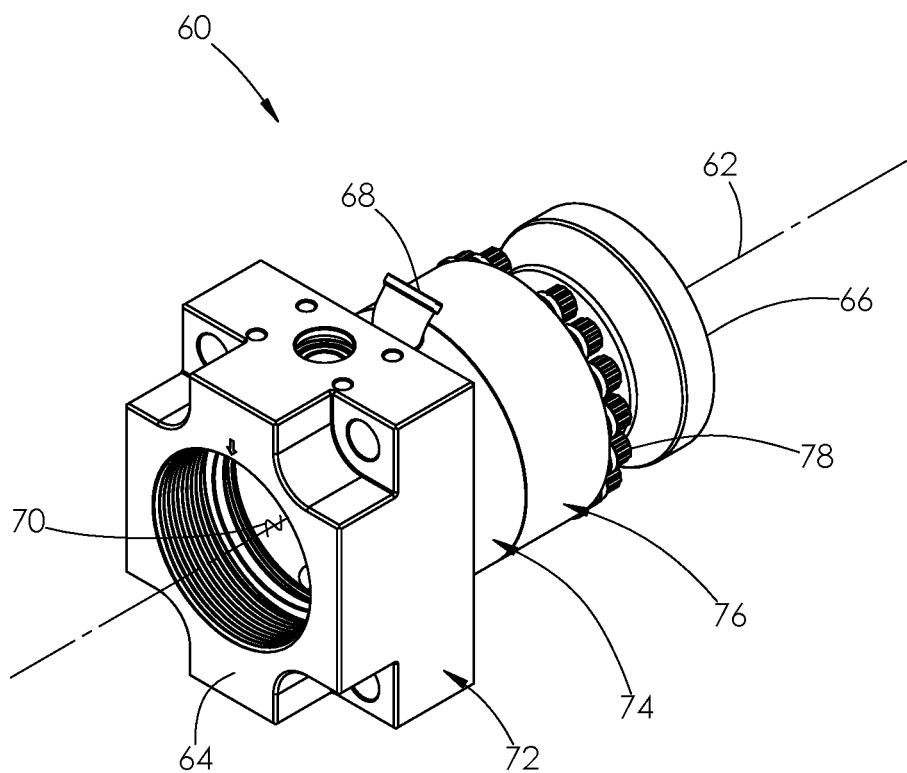
FIG. 10 is a front perspective view of one of the housings used with one of the fluid end sections shown in FIG. 7.
Figure 11:
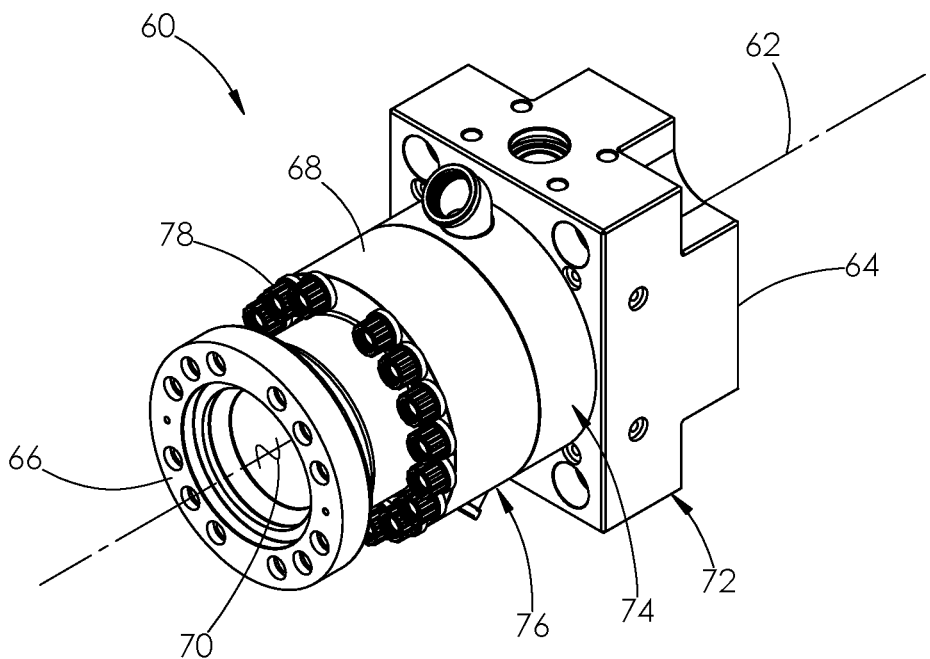
FIG. 11 is a rear perspective view of the housing shown in FIG. 10.
Figure 12:
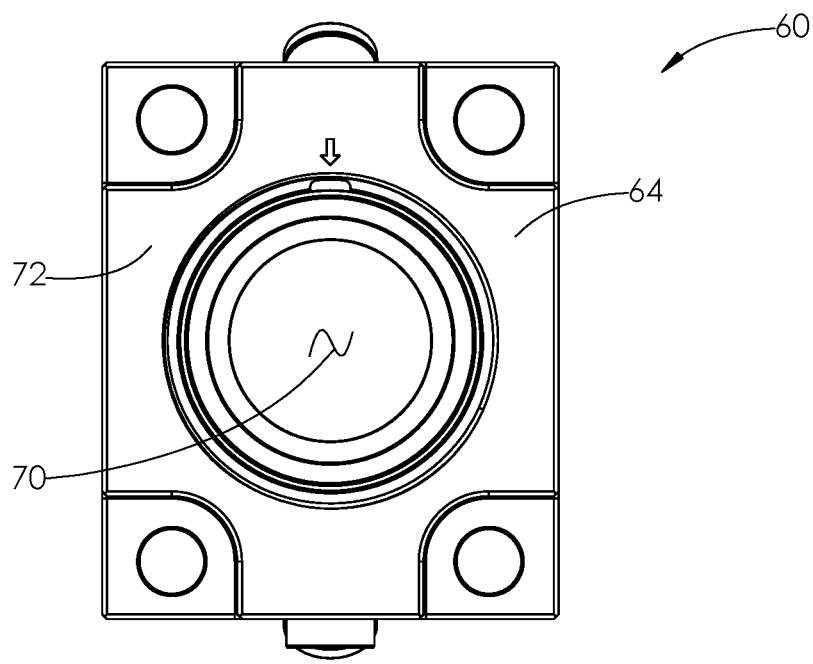
FIG. 12 is a front elevational view of the housing shown in FIG. 10.
Figure 13:
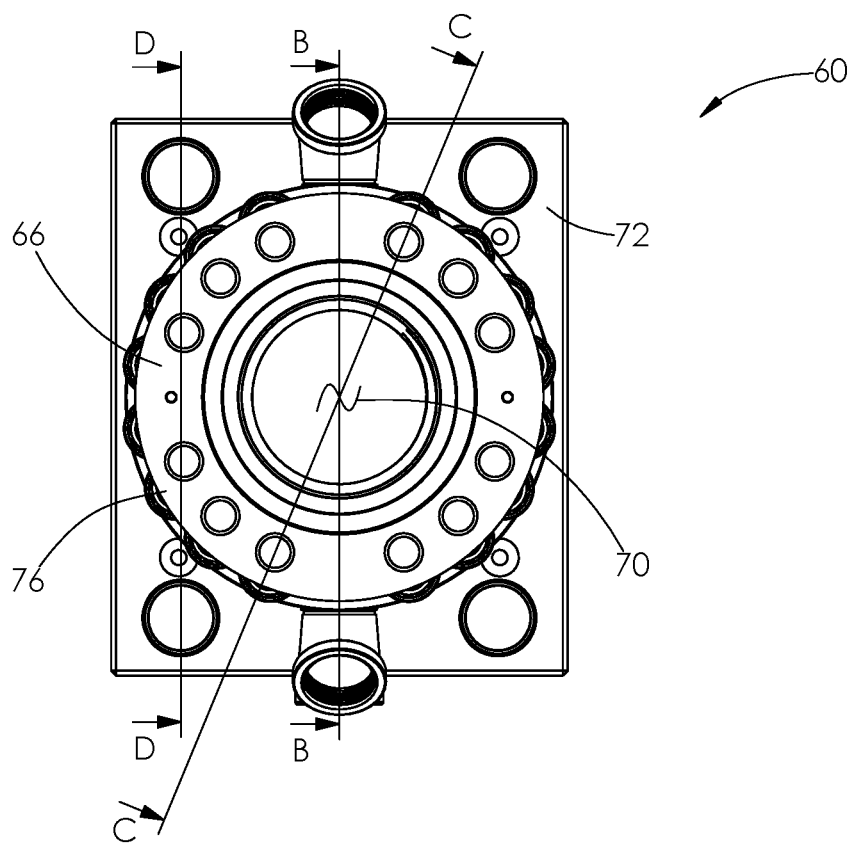
FIG. 13 is a rear elevational view of the housing shown in FIG. 10.
Figure 14:
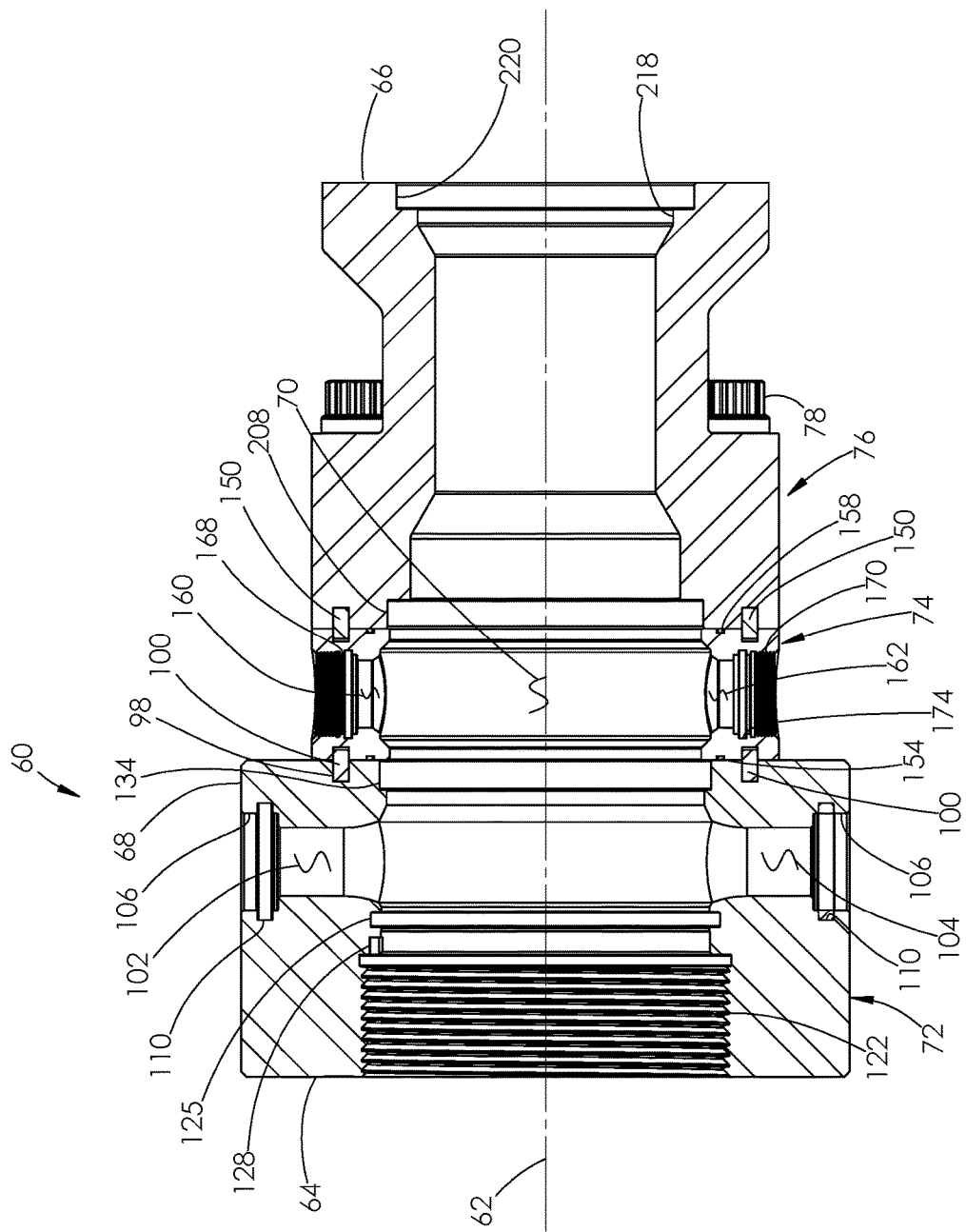
FIG. 14 is a cross-sectional view of the housing shown in FIG. 13, taken along line B-B.
Figure 15:
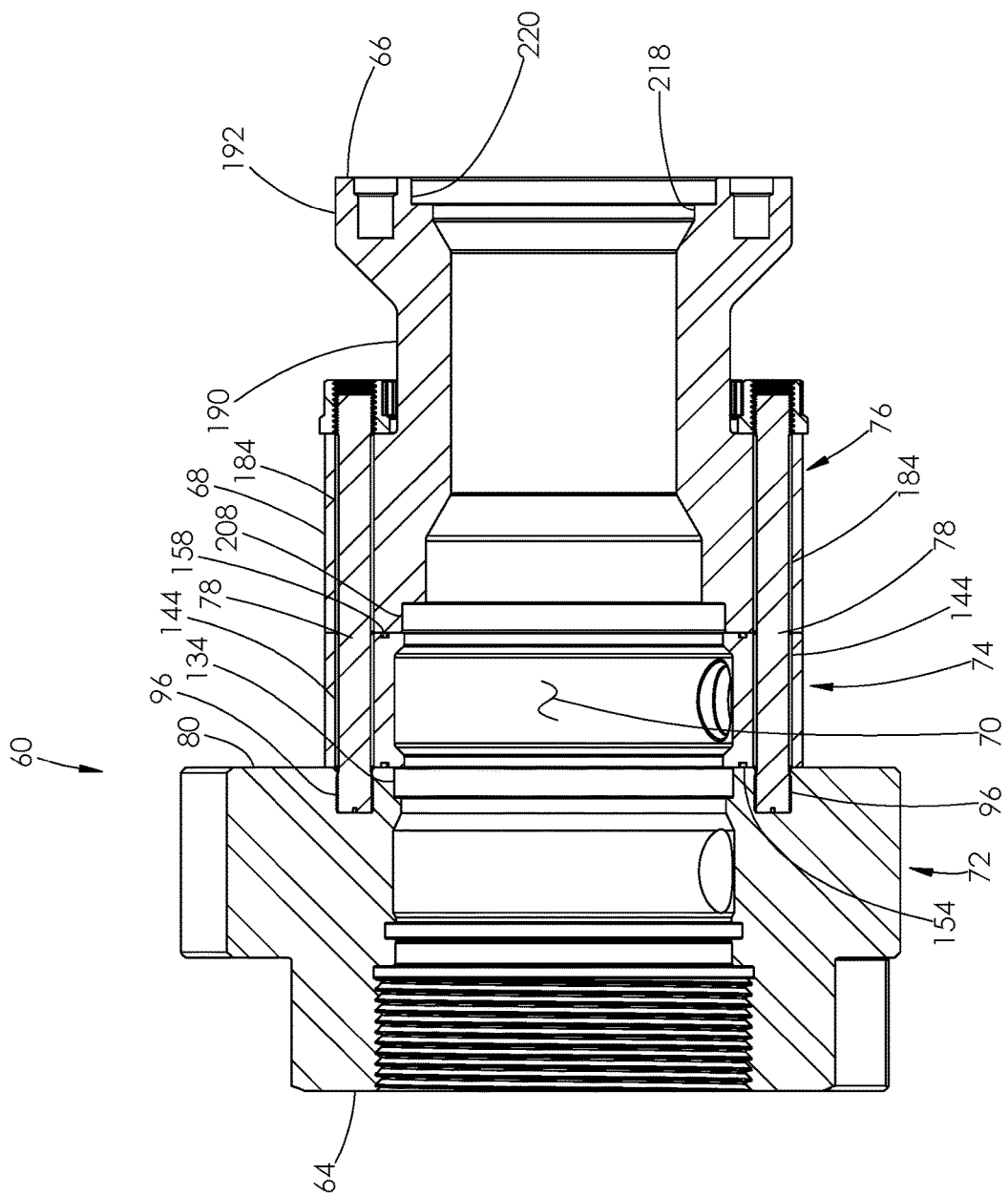
FIG. 15 is a cross-sectional view of the housing shown in FIG. 13, taken along line C-C.

Turning to FIGS. 10-16, each fluid end section 56 comprises a horizontally positioned housing 60 having a longitudinal axis 62 extending therethrough, as shown in FIGS. 10 and 11. The housing 60 has opposed front and rear surfaces 64 and 66 joined by an outer intermediate surface 68. A horizontal bore 70 is formed within the housing 60 and interconnects the front and rear surfaces 64 and 66, as shown in FIGS. 14 and 15. The horizontal bore 70 is sized to receive various components configured to route fluid throughout the housing 60, as shown in FIG. 9. The various components will be described in more detail later herein.

Figure 16:
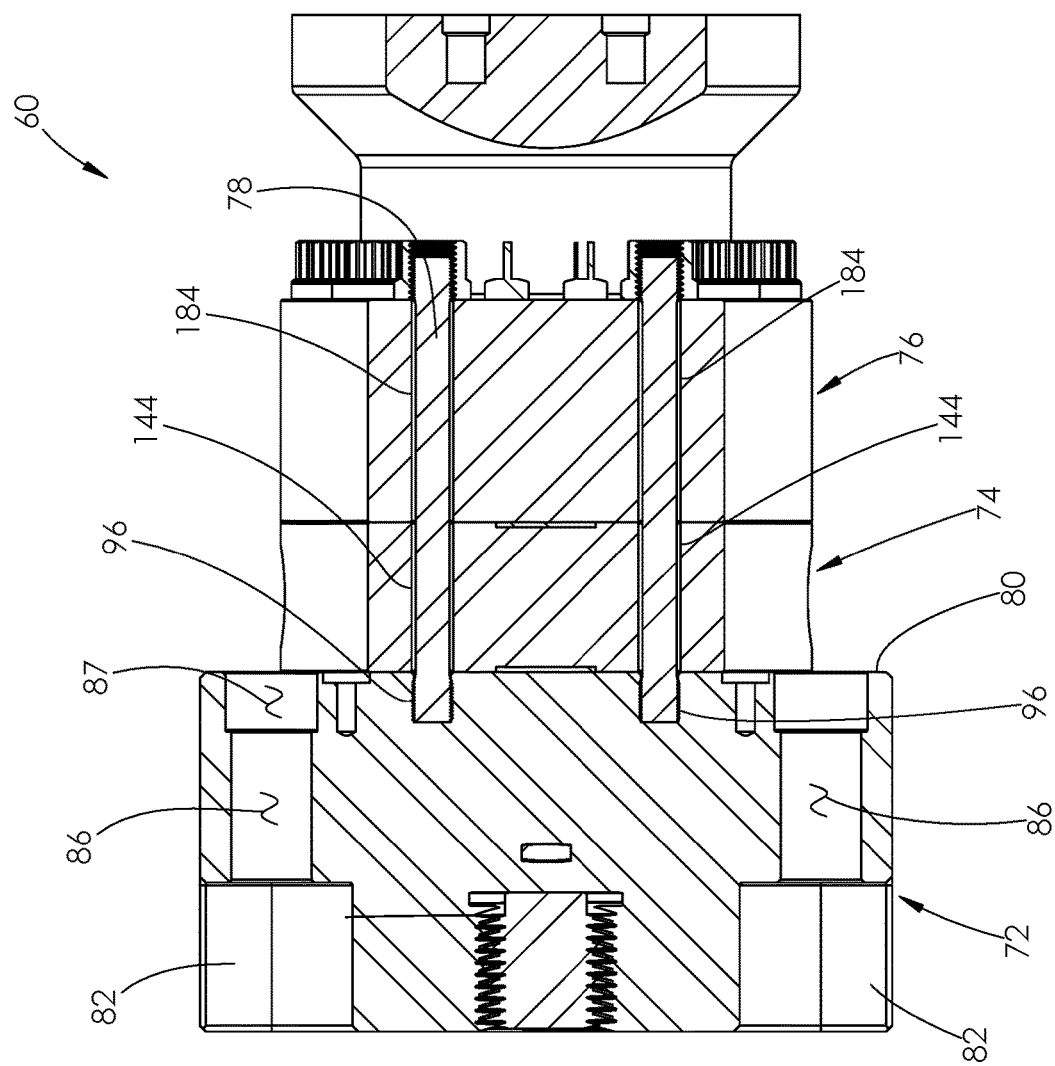
FIG. 16 is a cross-sectional view of the housing shown in FIG. 13, taken along line D-D.

Continuing with FIGS. 10-16, the housing 60 is of multi-piece construction. The housing 60 comprises a first section 72 joined to a second section 74 and a third section 76 by a plurality of first fasteners 78, as shown in FIGS. 15 and 16. By making the housing 60 out of multiple pieces rather than a single, integral piece, any one of the sections 72, 74, and 76 may be removed and replaced with a new section 72, 74, and 76, without replacing the other sections. For example, if a portion of the second section 74 begins to erode or crack, the second section 74 can be replaced without having to replace the first or third sections 72 and 76. In contrast, if the housing 60 were one single piece, the entire housing would need to be replaced, resulting in much more costly repair to the fluid end assembly 52.

First Section of Housing

Figure 17:
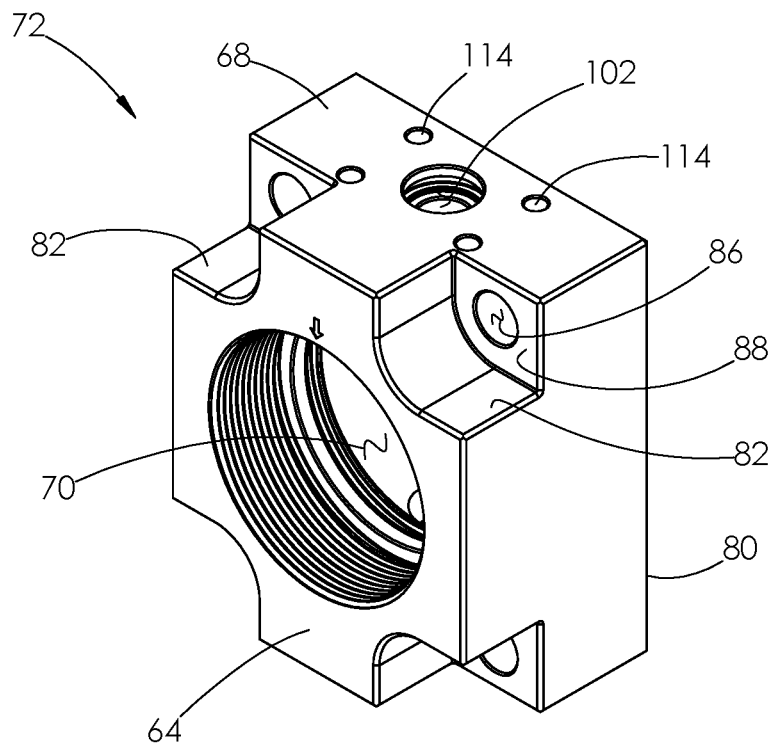
FIG. 17 is a front perspective view of the first section of the housing shown in FIG. 10.
Figure 18:
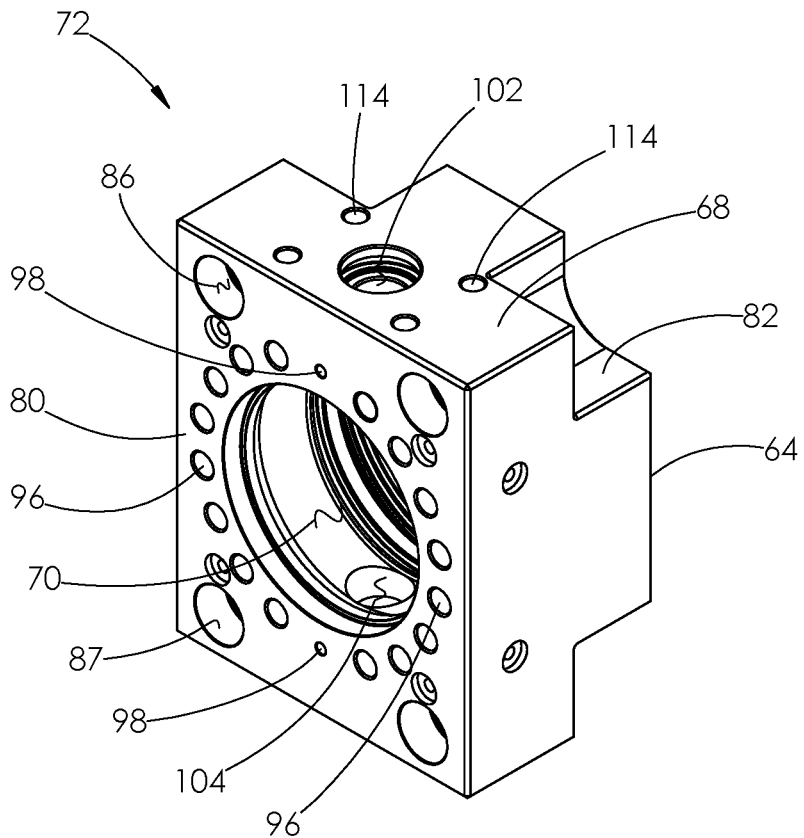
FIG. 18 is a rear perspective view of the first section shown in FIG. 17.
Figure 19:
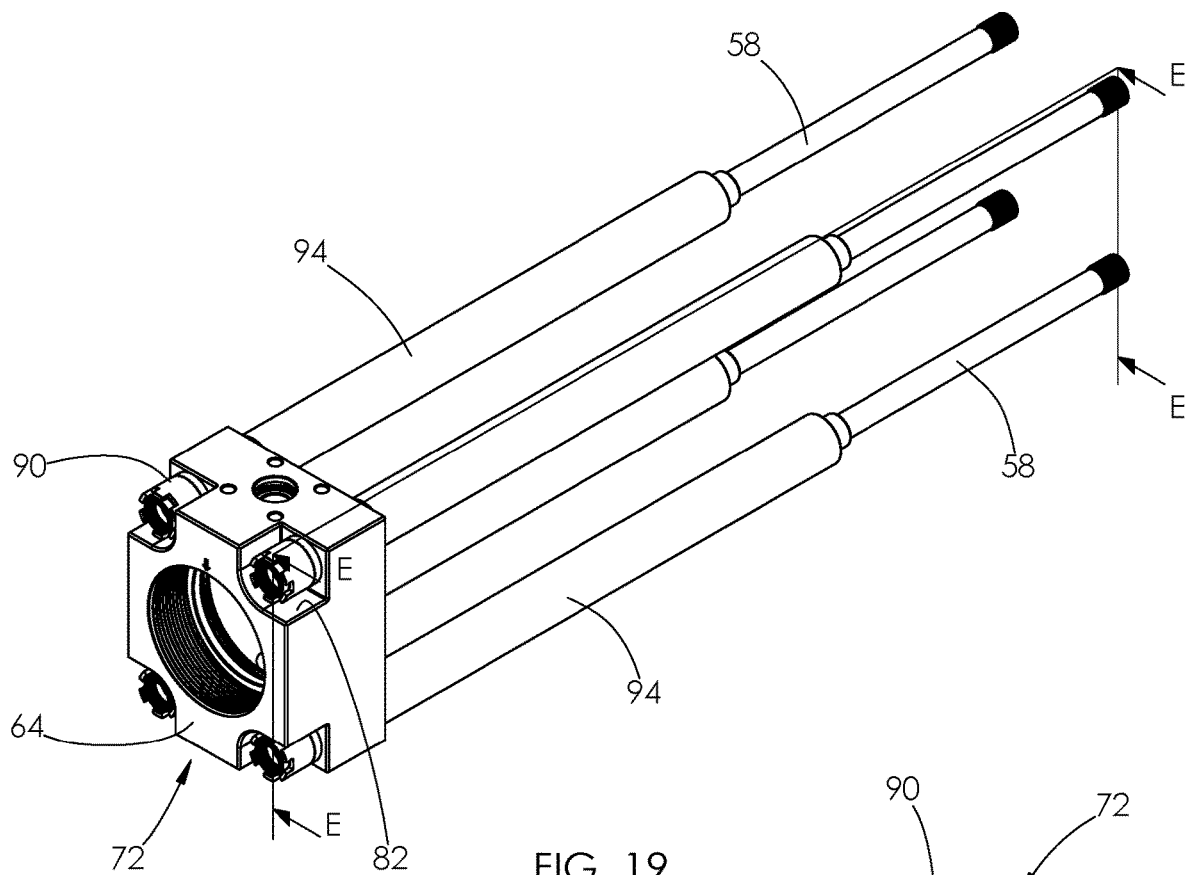
FIG. 19 is a front perspective view of the first section shown in FIG. 17, but the first section has a plurality of stay rods attached thereto.
Figure 20:
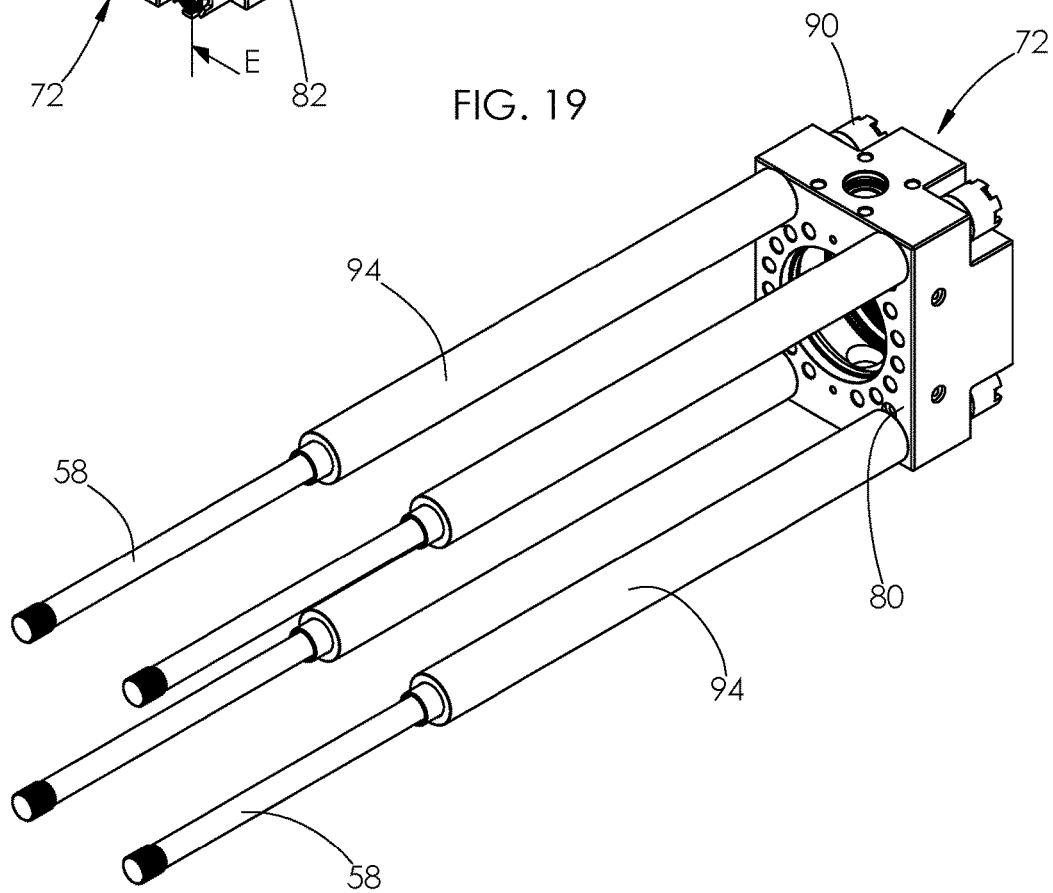
FIG. 20 is a rear perspective view of the first section and stay rods shown in FIG. 19.
Figure 21:
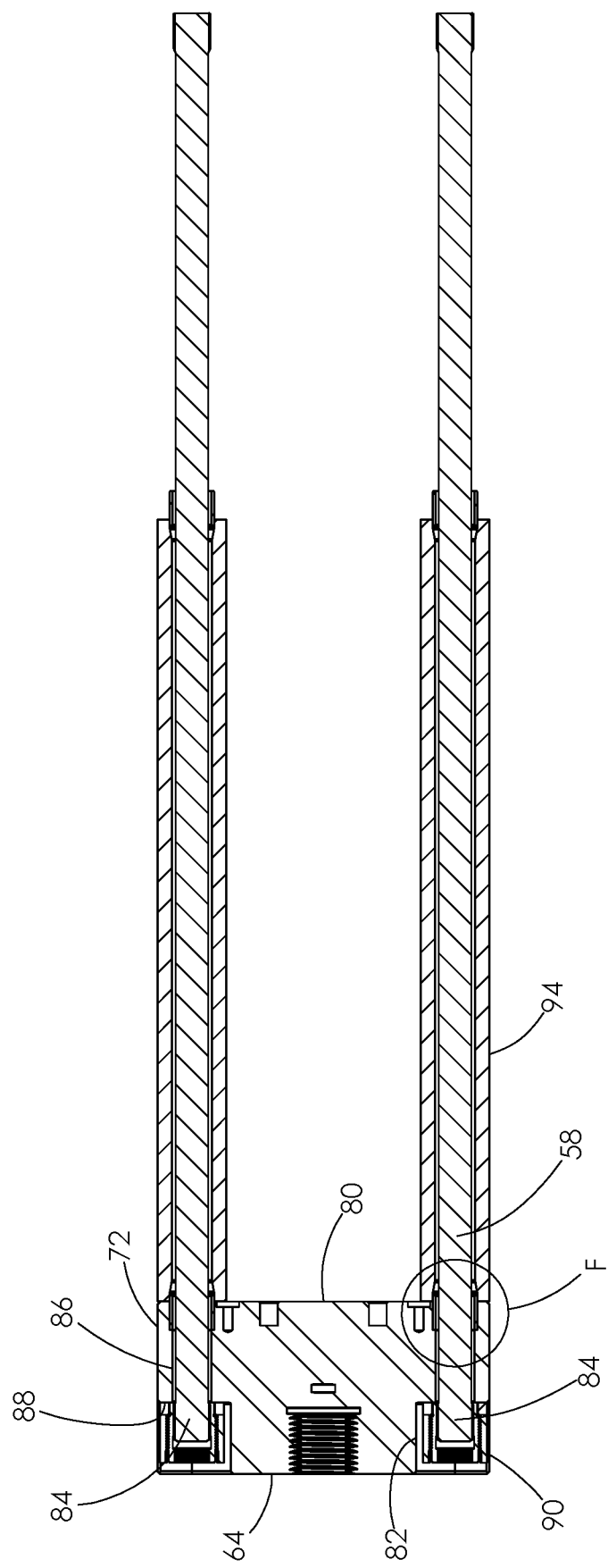
FIG. 21 is a cross-sectional view of the first section and stay rods shown in FIG. 19, taken along line E-E.

Turning to FIGS. 17-21, the first section 72 is positioned at the front end of the housing 60 and includes the front surface 64. During operation, fluid within the first section 72 remains at relatively the same high pressure. Thus, the first section 72 is considered the static or constant high pressure section of the housing 60. The first section 72 is configured to be attached to a plurality of the stay rods 58, as shown in FIGS. 19-21. Thus, each fluid end section 56 is attached to the power end assembly 54 via the first section 72 of the housing 60.

Continuing with FIGS. 17 and 18, each first section 72 comprises the front surface 64 joined to a rear surface 80. The surfaces 64 and 80 are interconnected by a portion of the outer intermediate surface 68 and a portion of the horizontal bore 70. The outer intermediate surface 68 of the first section has the shape of a rectangular prism with a plurality of notches 82 formed within the front surface 64. A notch 82 is formed within each corner of the first section 72 such that the front surface 64 has a cross-sectional shape of a cross sign having radiused corners. The notches 82 are configured to receive a first end 84 of each stay rod 58, as shown in FIG. 21.

With reference to FIGS. 17-21, a plurality of passages 86 are formed in the first section 72. Each passage 86 interconnects the rear surface 80 and a medial surface 88 of the first section 72. The medial surface 88 is defined by the plurality of notches 82. Each passage 86 comprises a counterbore 87 that opens on the rear surface 80, as shown in FIG. 16, and is configured to receive a corresponding one of the stay rods 58. When installed within the first section 72, the first end 84 of each stay rod 58 projects from the medial surface 88 and into the corresponding notch 82, as shown in FIG. 21.

Continuing with FIGS. 19-21, a threaded fastener 90 is installed on the first end 84 of each stay rod 58 within each notch 82. The fastener 90 is a three-piece nut, also known as a torque nut, that facilitates the application of high torque required to properly fasten the fluid end section 56 to the power end assembly 54. The fastener 90 is identical to the three-piece fastener 904 described with reference to FIG. 137 herein. In alternative embodiments, a traditional 12-point flange nut similar to the flange nut 230, shown in FIGS. 27 and 28, may be installed on the first end 84 of each stay rod 58 instead of the fastener 90.

Figure 22:
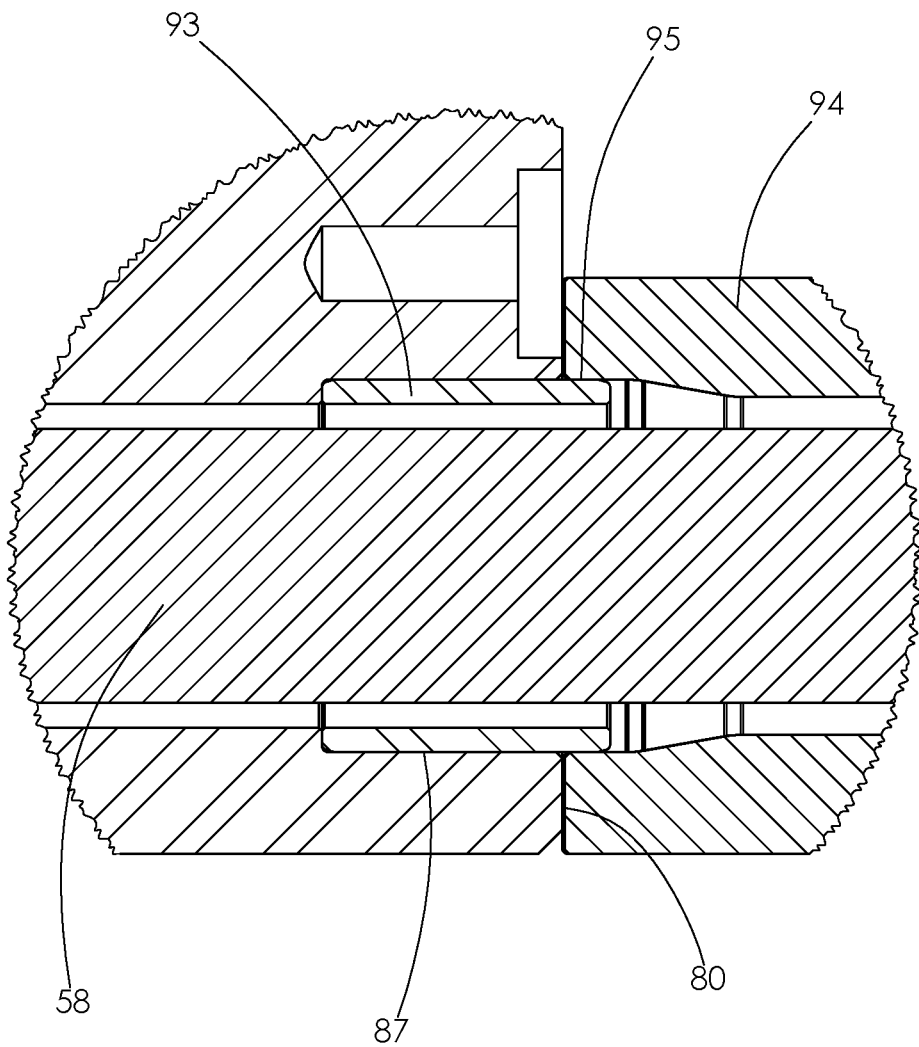
FIG. 22 is an enlarged view of area F shown in FIG. 21.

Continuing with FIGS. 19-22, a sleeve 94 is disposed around a portion of each stay rod 58 and extends between the rear surface 80 of the first section 72 and the power end assembly 54, as shown in FIG. 3. A dowel sleeve 93 is inserted into each counterbore 87 formed in each passage 86, as shown in FIG. 22. When installed therein, a portion of the dowel sleeve 93 projects from the rear surface 80 of the first section 72. A counterbore 95 is formed within the hollow interior of the sleeve 94 for receiving the projecting end of the dowel sleeve 93, as shown in FIG. 22. The dowel sleeve 93 aligns the sleeve 94 and the passage 86 concentrically. Such alignment maintains a planar engagement between the rear surface 80 of the first section 72 and the sleeve 94. When the fastener 90 is torqued against the medial surface 88 of the first section 72, the sleeve 94 abuts the rear surface 80 of the first section 72, rigidly securing the first section 72 to the stay rod 58.

Turning back to FIGS. 14-16, and 18, a plurality of threaded openings 96 are formed in the rear surface 80 of the first section 72. The openings 96 surround an opening of the horizontal bore 70, as shown in FIG. 18. Each opening 96 is configured to receive a corresponding one of the first fasteners 78 used to secure the sections 72, 74, and 76 together, as shown in FIGS. 15 and 16. A plurality of dowel openings 98 are also formed in the rear surface 80 adjacent the openings 96, as shown in FIGS. 14 and 18. The dowel openings 98 are configured to receive first alignment dowels 100, as shown in FIG. 14. The first alignment dowels 100 assist in properly aligning the first section 72 and the second section 74 during assembly of the housing 60.

Continuing with FIG. 14, a pair of upper and lower discharge bores 102 and 104 are formed within the first section 72 and interconnect the intermediate surface 68 and the horizontal bore 70. The upper and lower discharge bores 102 and 104 shown in FIG. 14 are collinear. In alternative embodiments, the bores 102 and 104 may be offset from one another and not collinear. Each bore 102 and 104 may include a counterbore 106 that opens on the intermediate surface 68. Each counterbore 106 is sized to receive a portion of a discharge fitting adapter 504, as shown in FIG. 9. The fitting adapter 504 spans between the discharge bore 102 or 104 and a discharge fitting 108 attached to the outer intermediate surface 68 of the first section 72.

Continuing with FIG. 14, a groove 110 may be formed in the side walls of the counterbore 106 for receiving a seal 112. The seal 112 engages an outer surface of the fitting adapter 504 to prevent fluid from leaking between the first section 72 and the discharge fitting 108, as shown in FIG. 9.

With reference to FIGS. 17 and 18, a plurality of threaded openings 114 are formed in the intermediate surface 68 and surrounding the opening of the upper and lower discharges bores 102 and 104. The threaded openings 114 are configured to receive a plurality of threaded fasteners 116 configured to secure a discharge fitting 108 to the first section 72, as shown in FIG. 9.

Continuing with FIGS. 14 and 15, the walls surrounding the horizontal bore 70 within the first section 72 and positioned between the front surface 64 and the upper and lower discharge bores 102 and 104 are sized to receive a front retainer 118 and a discharge plug 120, as shown in FIG. 9. The discharge plug 120 seals fluid from leaking from the front surface 64 of the housing 60, and the front retainer 118 secures the discharge plug 120 within the first section 72 of the housing 60.

Figure 76:
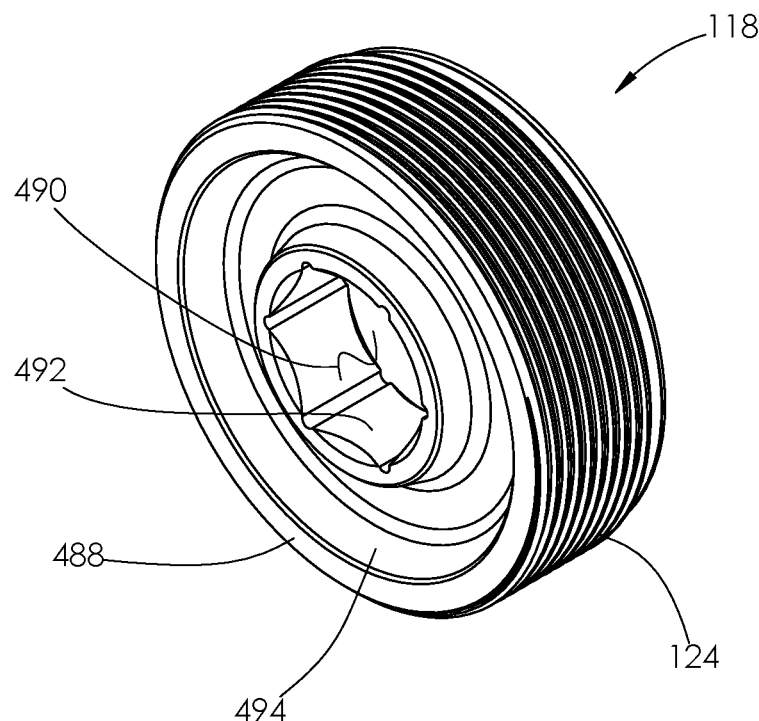
FIG. 76 is a front perspective view of the front retainer shown in FIGS. 40 and 41.
Figure 77:
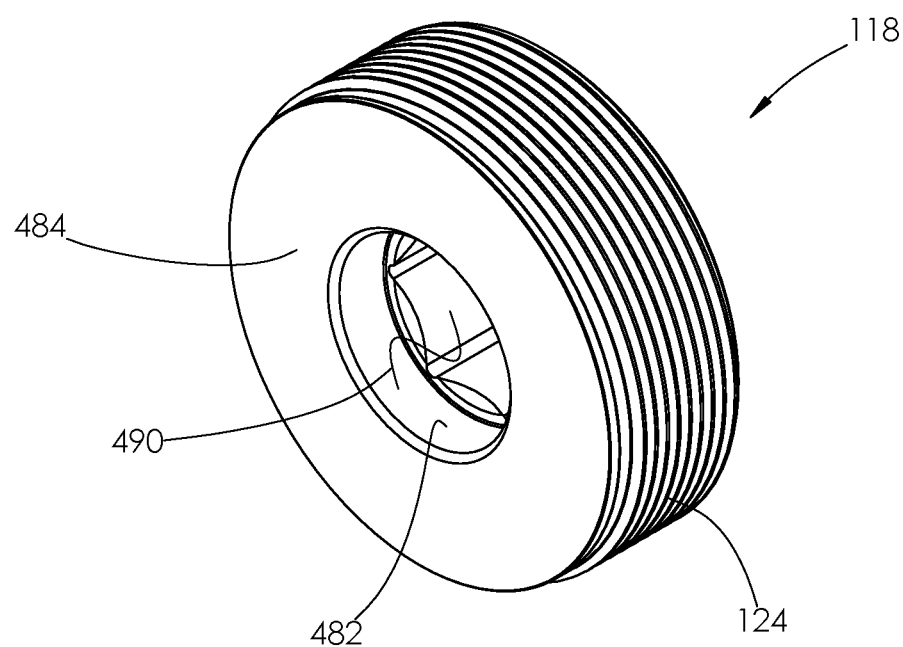
FIG. 77 is a rear perspective view of the front retainer shown in FIG. 76.

Continuing with FIGS. 14 and 15, internal threads 122 are formed in the walls of the first section 72 for mating with external threads 124, shown in FIGS. 76 and 77, formed on an outer surface of the front retainer 118. In contrast, an outer surface of the discharge plug 120 faces flat walls of the first section 72. A small amount of clearance may exist between the plug 120 and the walls of the first section 72.

Continuing with FIGS. 14 and 15, a groove 125 may be formed in such walls for receiving a seal 126 configured to engage an outer surface of the discharge plug 120, as shown in FIG. 9. The seal 126 prevents fluid from leaking around the discharge plug 120 during operation. A locating cutout 128 may further be formed in the walls that is configured to receive a locating dowel pin 130. As will be described later herein, the locating dowel pin 130 is used to properly align the discharge plug 120 within the housing 60.

Continuing with FIGS. 14 and 15, the walls surrounding the horizontal bore 70 and positioned between the upper and lower discharge bores 102 and 104 and the rear surface 80 of the first section 72 are sized to receive a portion of a fluid routing plug 132, as shown in FIG. 9. This area of the walls surrounding the horizontal bore 70 includes a counterbore 134 that opens on the rear surface 80. The counterbore 134 is sized to receive a wear ring 136, as shown in FIG. 9. The wear ring 136 has an annular shape and is configured to engage a first seal 386 installed within an outer surface of the fluid routing plug 132, as shown in FIG. 9. In alternative embodiments, the first section 72 may not include the counterbore 134 or the wear ring 136 and instead may be sized to directly engage the first seal 386 installed within the fluid routing plug 132.

Continuing with FIG. 9, in addition to the above mentioned components, the first section 72 is also configured to house a discharge valve 138. The components discussed above and installed within the first section 72 will be described in more detail later herein.

Second Section of Housing

Figure 23:
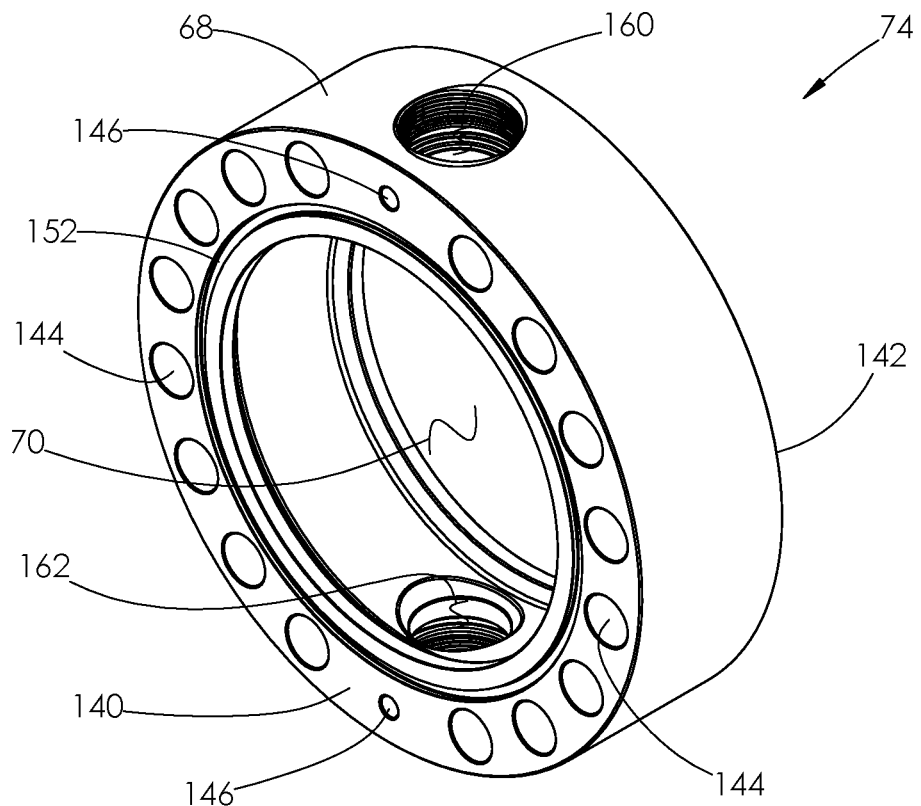
FIG. 23 is a front perspective view of a second section of the housing shown in FIG. 10.
Figure 24:
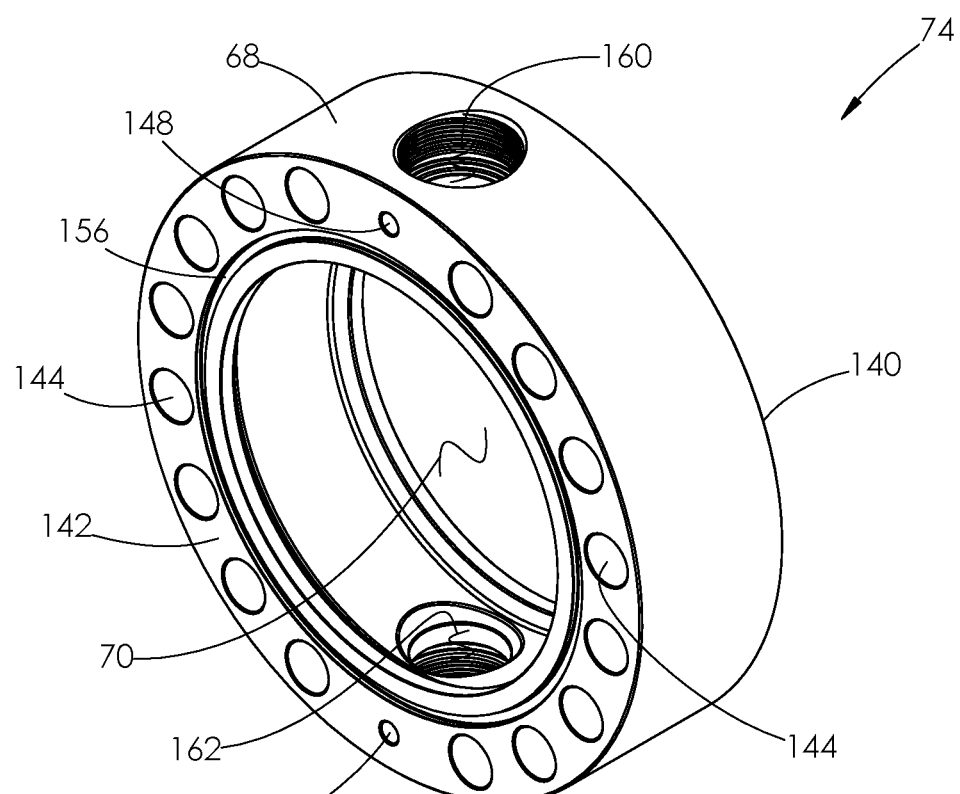
FIG. 24 is a rear perspective view of the second section shown in FIG. 23.

Turning to FIGS. 23 and 24, the second section 74 of the housing 60 is configured to be positioned between the first and third sections 72 and 76 and has a cylindrical cross-sectional shape. During operation, fluid pressure within the second section 74 remains at relatively the same pressure. The pressure is lower than that within the first section 72. Thus, the second section 74 may be referred to as the static or constant low pressure section of the housing 60. The second section 74 comprises opposed front and rear surfaces 140 and 142 joined by a portion of the outer intermediate surface 68 and a portion of the horizontal bore 70.

Continuing with FIGS. 15, 16, 23, and 24, a plurality of passages 144 are formed in the second section 74. The passages 144 surround the horizontal bore 70 and interconnect the front and rear surfaces 140 and 142, as shown in FIGS. 15 and 16. Each passage 144 is configured to receive a corresponding one of the first fasteners 78 used to secure the sections 72, 74, and 76 of the housing 60 together.

Continuing with FIGS. 14, 23, and 24, a plurality of dowel openings 146 are formed in the front surface 140 of the second section 74, as shown in FIG. 23. The dowel openings 146 align with the dowel openings 98 formed in the rear surface 80 of the first section 72 and are configured to receive a portion of the first alignment dowels 100, as shown in FIG. 14. Likewise, a plurality of dowel openings 148 are formed in the rear surface 142 of the second section 74, as shown in FIG. 24. The dowel openings 148 are configured to receive a portion of second alignment dowels 150, as shown in FIG. 14. The second alignment dowels 150 are configured to align the second section 74 and the third section 76 during assembly.

Continuing with FIGS. 14, 15, 23 and 24, a first annular groove 152 is formed in the front surface 140 of the second section 74 such that it surrounds an opening of the horizontal bore 70, as shown in FIG. 23. The first groove 152 is positioned between the horizontal bore 70 and the plurality of passages 144 and is configured to receive a first seal 154, as shown in FIGS. 14 and 15. Likewise, a second annular groove 156 is formed in the rear surface 142 of the second section 74 and positioned between the horizontal bore 70 and the plurality of passages 144, as shown in FIG. 24. The second groove 156 is configured to receive a second seal 158, as shown in FIGS. 14 and 15. The seals 154 and 158 shown in FIGS. 14 and 15 are O-rings. The seals 154 and 158 prevent fluid from leaking between the first and second sections 72 and 74 and between the second and third sections 74 and 76 during operation.

Continuing with FIGS. 14, 23, and 24, a pair of upper and lower suction bores 160 and 162 are formed within the second section 74 and interconnect the intermediate surface 68 and the horizontal bore 70. The upper and lower suction bores 160 and 162 shown in FIG. 14 are collinear. In alternative embodiments, the bores 160 and 162 may be offset from one another and not collinear.

Continuing with FIGS. 9 and 14, the suction bores 160 and 162 are each configured to receive a suction conduit 166, as shown in FIG. 9. The suction conduit 166 comprises a first connection member 164 configured to mate with the housing 60. Each suction bore 160 and 162 opens into a counterbore 168 sized to receive a portion of the first connection member 164. Internal threads 170 are formed in a portion of the walls surrounding the counterbore 168 for mating with external threads 172, shown in FIG. 78, formed on the first connection member 164.

Continuing with FIGS. 9 and 14, a groove 174 is formed in the walls surrounding the counterbore 168 and configured to receive a seal 176, as shown in FIG. 9. The seal 176 engages an outer surface of the first connection member 164 to prevent fluid from leaking from the housing 60 during operation. The suction conduits 166 will be described in more detail later herein.

Continuing with FIGS. 9, 14, and 15, the walls surrounding the horizontal bore 70 within the second section 74 are configured to receive a majority of the fluid routing plug 132, as shown in FIG. 9. A small amount of clearance may exist between the walls of the second section 74 and an outer surface of the fluid routing plug 132.

Third Section of Housing

Turning to FIGS. 14-16, 25 and 26, the third section 76 of the housing 60 is positioned at the rear end of the housing 60 and includes the rear surface 66. The third section 76 has a generally cylindrical cross-sectional shape. Fluid pressure within the third section 76 varies during operation. Thus, the third section 76 may be referred to as the dynamic or variable pressure section of the housing 60.

Figure 25:
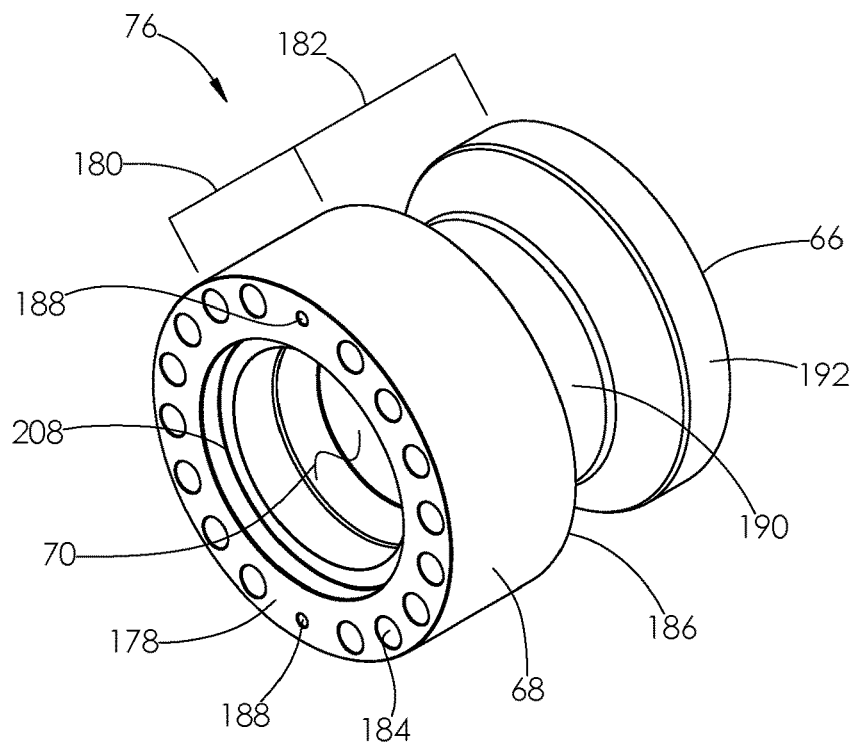
FIG. 25 is a front perspective view of the third section of the housing shown in FIG. 10.
Figure 26:
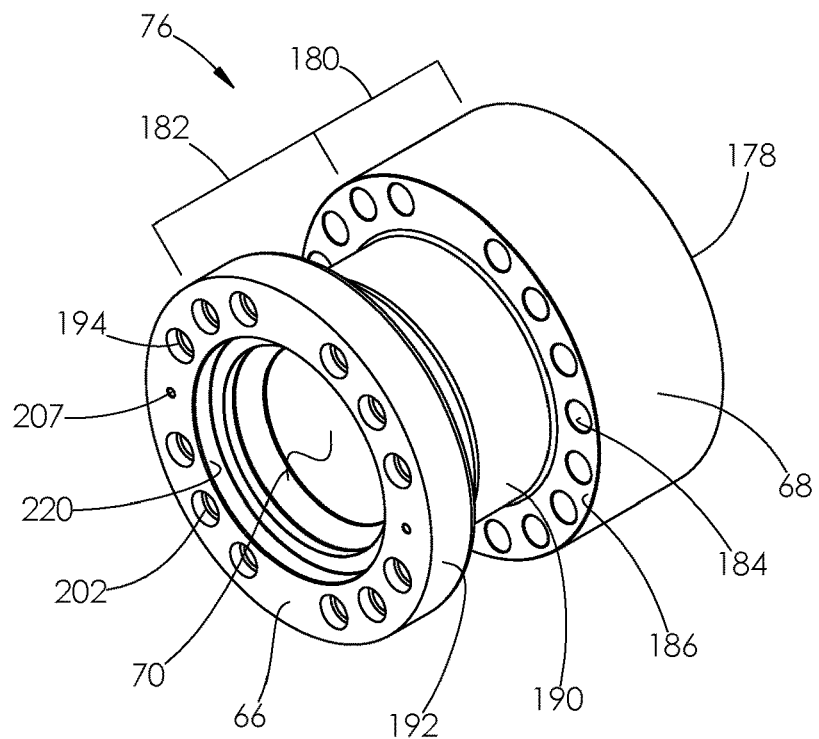
FIG. 26 is a rear perspective view of the third section shown in FIG. 25.

Continuing with FIGS. 25 and 26, the third section 76 comprises a front surface 178 joined to the rear surface 66 of the housing 60 by a portion of the outer intermediate surface 68 and a portion of the horizontal bore 70. The outer intermediate surface 68 of the third section 76 varies in diameter such that the third section 76 comprises a front portion 180 joined to a rear portion 182.

Continuing with FIGS. 15, 16, 25, and 26, the front portion 180 has a constant outer diameter and has a plurality of passages 184 formed therein. The passages 184 interconnect the front surface 178 and a medial surface 186 of the third section 76. The passages 184 align with the plurality of passages 144 formed in the second section 74 and the threaded openings 96 formed in the first section 72 of the housing 60, as shown in FIGS. 14 and 15. The passages 184 are configured to receive the first fasteners 78 used to secure the sections 72, 74, and 76 together.

Continuing with FIGS. 14 and 25, a plurality of dowel openings 188 are formed in the front surface 178 of the third section 76, as shown in FIG. 25. The dowel openings 188 are configured to receive a portion of second alignment dowels 150, as shown in FIG. 14. The second alignment dowels 150 are configured to properly align the third section 76 within the second section 74 during assembly.

Continuing with FIGS. 25 and 26, the rear portion 182 of the third section 76 comprises a neck 190 joined to a shoulder 192. The neck 190 interconnects the front portion 180 and the shoulder 192. The shoulder 192 includes the rear surface 66 of the housing 60. The neck 190 has a smaller outer diameter than that of the front portion 180 and the shoulder 192 to provide clearance for the plurality of passages 184 formed in the front portion 180.

Figure 29:
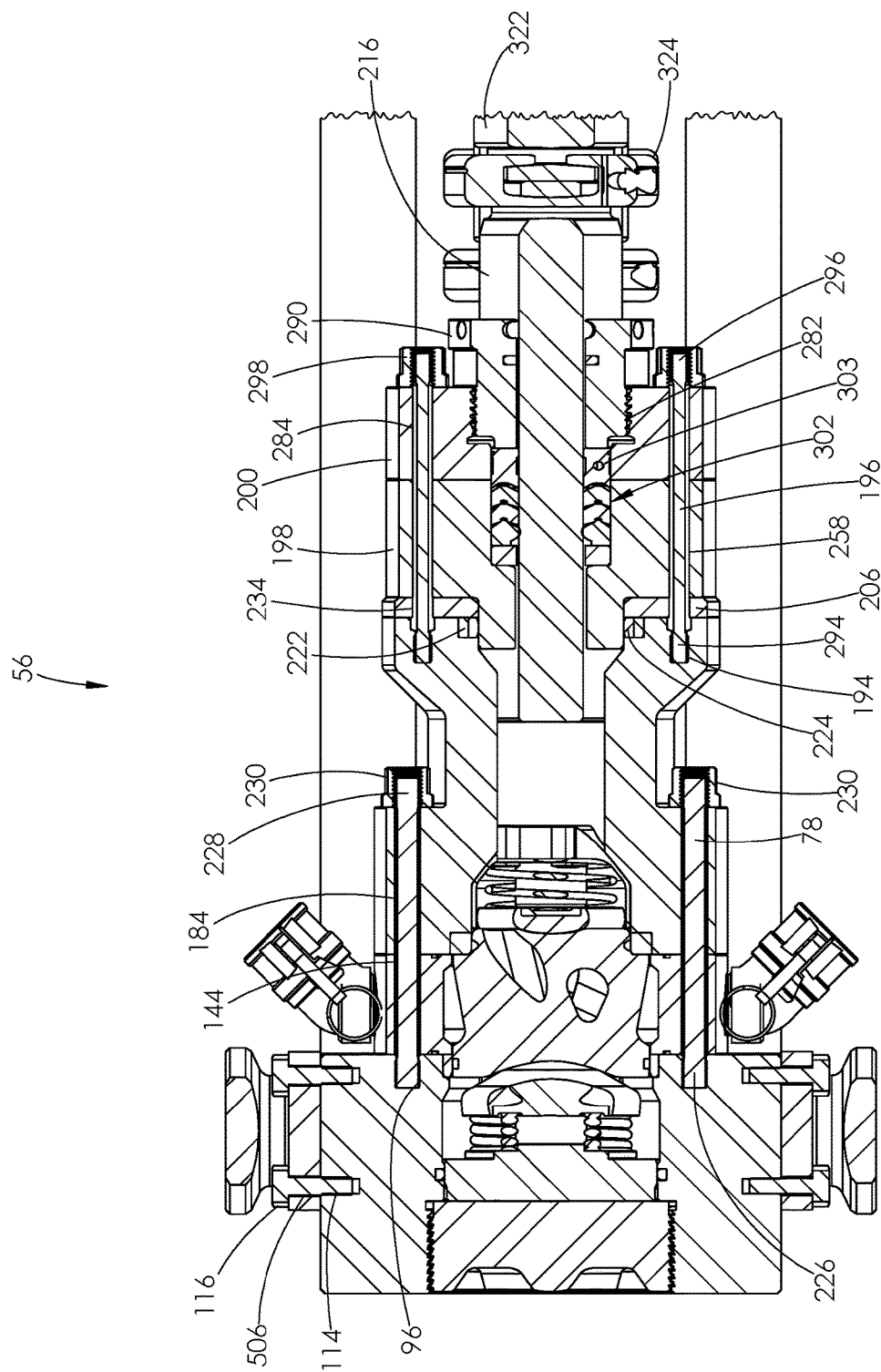
FIG. 29 is a cross-sectional view of the fluid end assembly shown in FIG. 6, taken along line G-G.

With reference to FIGS. 25 and 26, a plurality of first threaded openings 194 are formed in the rear surface 66 of the third section 76. The first threaded openings 194 are configured to receive a plurality of second fasteners 196, as shown in FIG. 29. The second fasteners 196 are configured to secure a stuffing box 198 and a rear retainer 200 to the third section 76 of the housing 60, as shown in FIG. 29. The stuffing box 198 and the rear retainer 200 will be described in more detail later herein.

Figure 32:
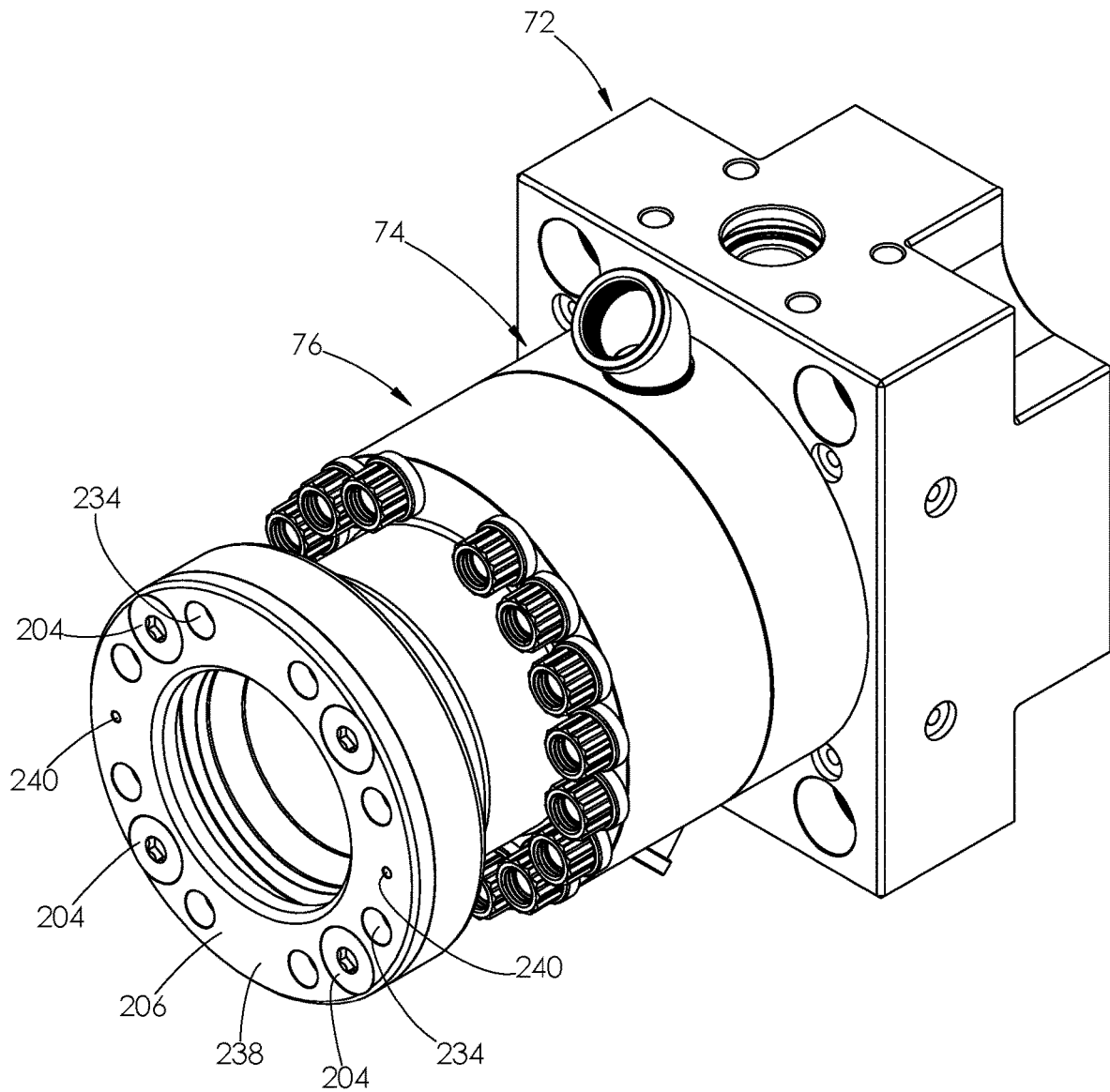
FIG. 32 is a rear perspective view of the retention plate shown in FIG. 30 attached to the housing shown in FIG. 10.
Figure 39:
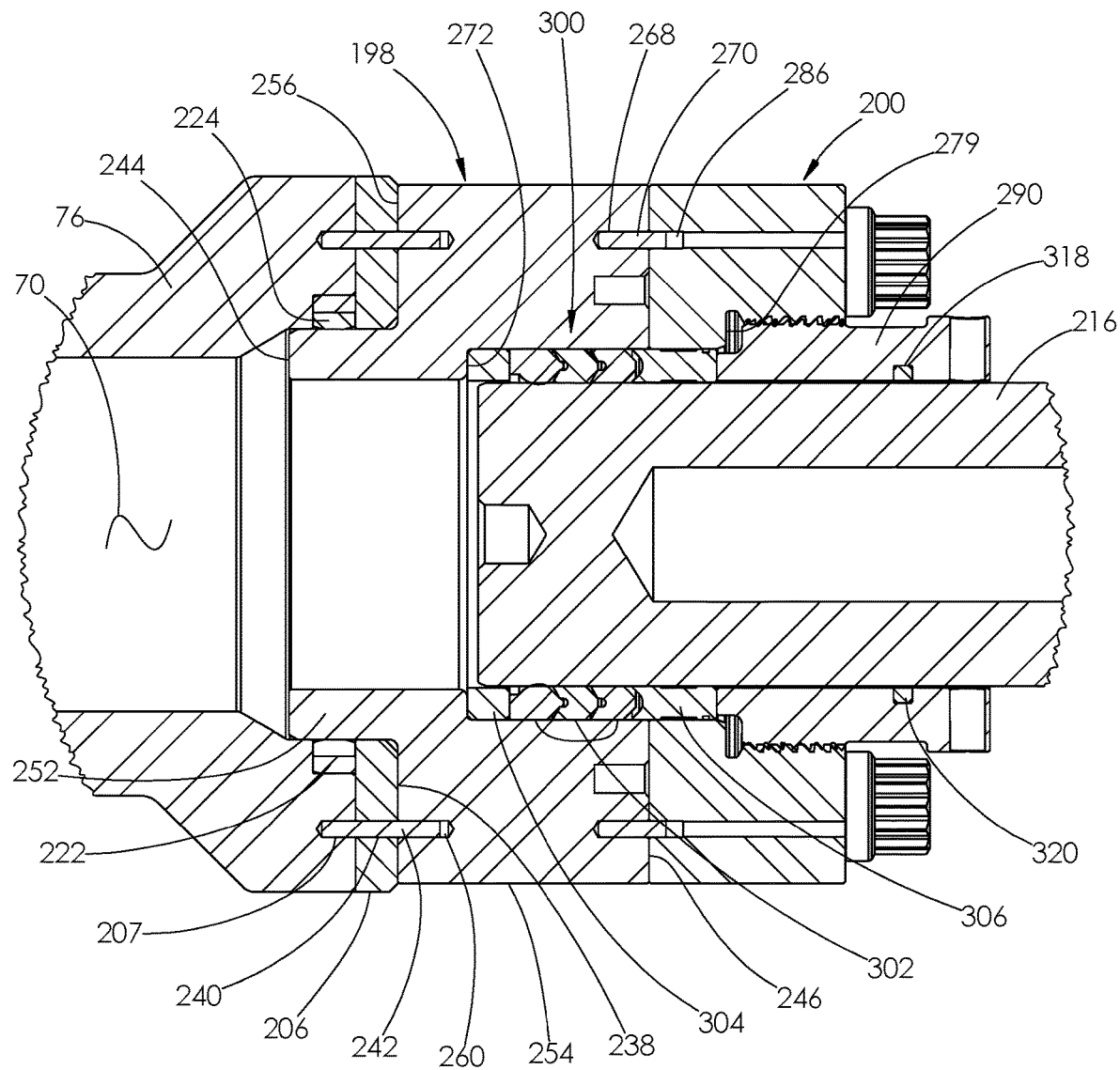
FIG. 39 is an enlarged cross-sectional view of the components attached to a rear surface of the housing in FIG. 9.

With reference to FIGS. 26 and 32, a plurality of second threaded openings 202 are also formed in the rear surface 66 of the third section 76, as shown in FIG. 26. The second threaded openings 202 are configured to receive a plurality of third fasteners 204. The third fasteners 204 are configured to secure a retention plate 206 to the rear surface of the housing 60, as shown in FIG. 32. The retention plate 206 will be described in more detail later herein. A plurality of dowel openings 207 are also formed in the rear surface of the third section 76. The dowel openings 207 are configured to receive third alignment dowels 242, as shown in FIG. 39.

Turning back to FIGS. 9, 14, 15, and 25, a counterbore 208 is formed in the walls surrounding the horizontal bore 70 within the third section 76 and opens on the front surface 178. The counterbore 208 is configured to receive a hardened insert 210, as shown in FIG. 9. The insert 210 will be described in more detail later herein. The insert 210 engages portions of the fluid routing plug 132 when the fluid routing plug 132 is installed within the housing 60, as shown in FIG. 9. The walls surrounding the horizontal bore 70 between the counterbore 208 and the medial surface 186 of the third section 76 are further configured to receive a suction valve guide 212. A suction valve 214 is also installed within the third section 76 of the housing 60. The suction valve 214 and suction valve guide 212 will be described in more detail later herein.

Continuing with FIGS. 9, 14, 15, 25, and 26, the walls surrounding the horizontal bore 70 within the neck 190 of the rear portion 182 are sized to receive at least a portion of a reciprocating plunger 216, as shown in FIG. 9. The portion of the horizontal bore 70 extending through the neck 190 has a uniform diameter and opens into a first counterbore 218 formed in the shoulder 192, as shown in FIGS. 14 and 15. The first counterbore 218 is sized to receive a portion of the stuffing box 198, as shown in FIG. 9. The first counterbore 218 opens into a second counterbore 220, of which opens on the rear surface 66 of the housing 60, as shown in FIGS. 14, 15, and 26. The second counterbore 220 is sized to receive a wear ring 222 and a seal 224, as shown in FIG. 9. The wear ring 222 and the seal 224 each have an annular shape. When such components are installed within the housing 60, the wear ring 222 surrounds the seal 224, and the seal 224 engages an outer surface of the stuffing box 198.

Assembly of Housing

Figure 27:
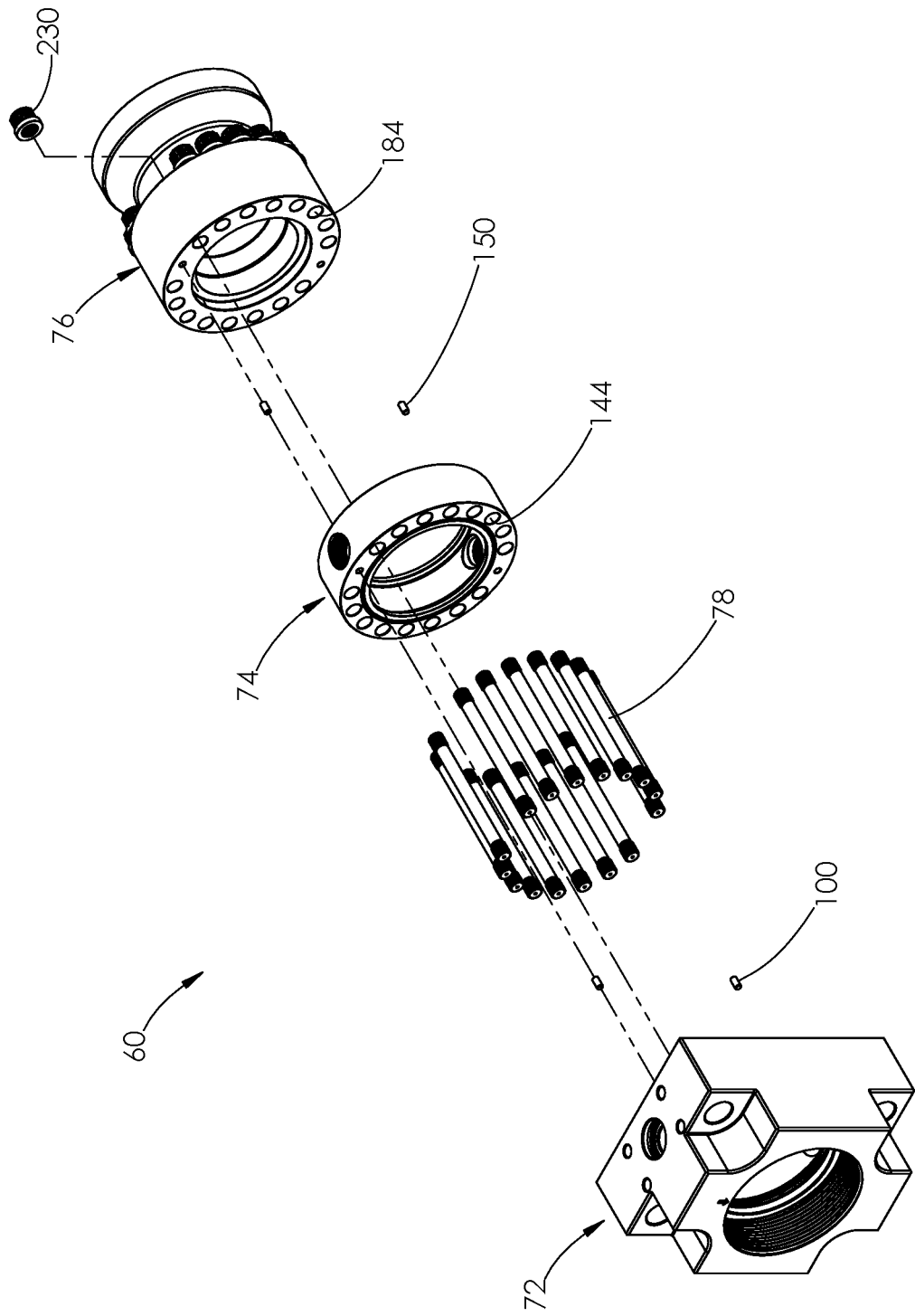
FIG. 27 is a front perspective and exploded view of the housing shown in FIG. 10.
Figure 28:
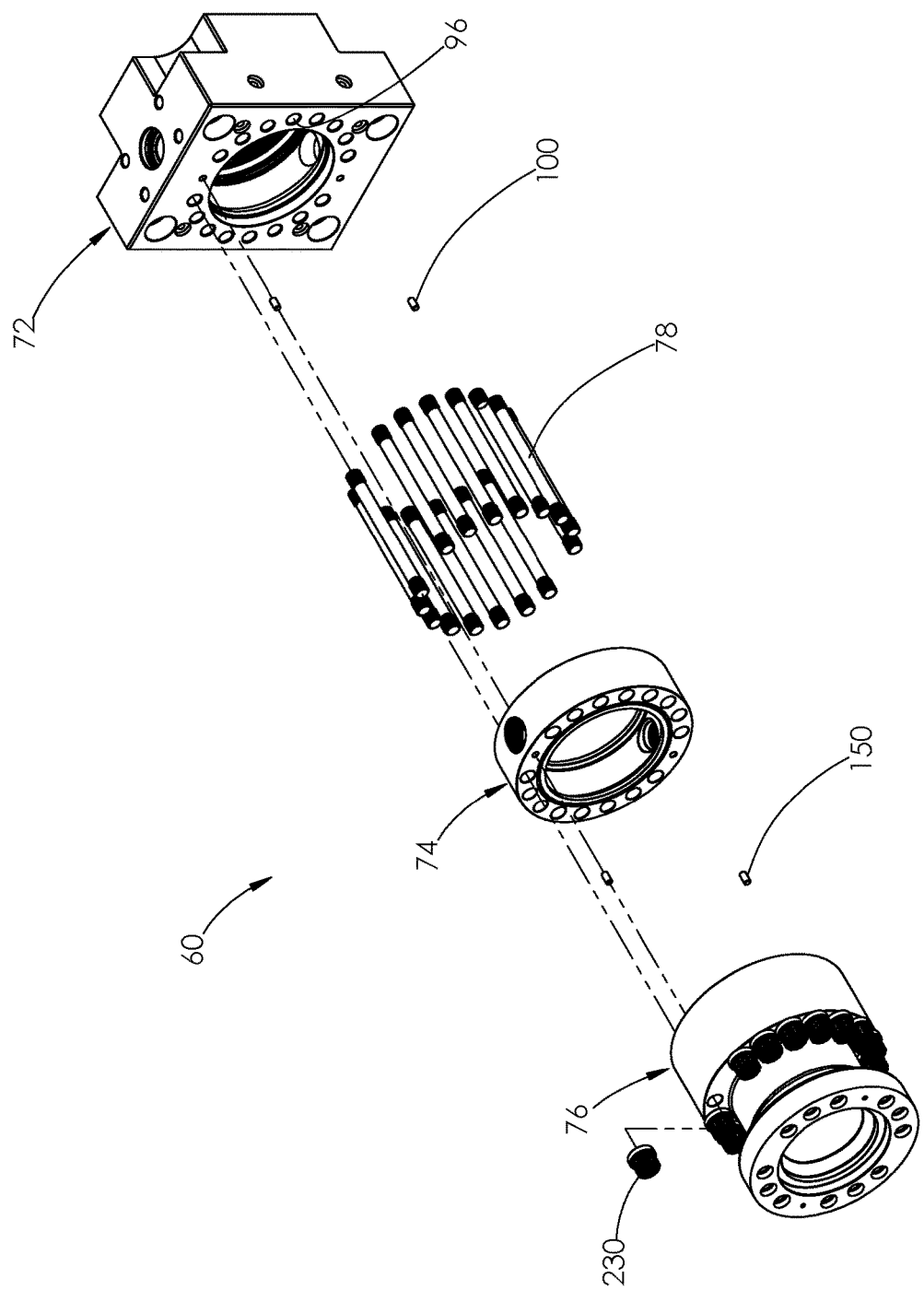
FIG. 28 is a rear perspective and exploded view of the housing shown in FIG. 10.

Turning to FIGS. 27-29, the housing 60 is assembled by threading a first end 226 of each of the first fasteners 78 into a corresponding one of the threaded openings 96 formed in the first section 72. Once installed therein, the first fasteners 78 project from the rear surface 80 of the first section 72. The second and third sections 74 and 76 may then be slid onto the fasteners 78 projecting from the first section 72 using the corresponding passages 144 and 184. The first and second alignment dowels 100 and 150 help to further align the sections 72, 74, and 76 together during assembly.

Continuing with FIGS. 27-29, when the second and third sections 74 and 76 are installed on the fasteners 78, a second end 228 projects from the medial surface 186 of the third section 76, as shown in FIG. 29. A flange nut 230 is installed on the second end 228 and torqued against the medial surface 186, tightly securing the sections 72, 74, and 76 together. When the housing 60 is assembled, a footprint of the rear surface 142 of the second section 74 is entirely within a footprint of the rear surface 80 of the first section 72, as shown in FIG. 29.

Continuing with FIGS. 27-29, the first fastener 78 shown in the figures is a threaded stud. In alternative embodiments, other types of fasteners known in the art may be used instead of a threaded stud. For example, screws or bolts may be used to secure the sections together. In further alternative embodiments, the nut may comprise the three-piece fastener 90, shown in FIGS. 19-21.

Continuing with FIGS. 27-29, to remove a section 72, 74, or 76, the nut 230 is unthreaded from the second end 228 of each first fastener 78. The sections 72, 74, and 76 may then be pulled apart, as needed. If the first section 72 is being replaced, the first fasteners 78 are also unthreaded from the threaded openings 96. The components installed within the housing 60 may also be removed, as needed, prior to disassembling the housing 60.

Components Attached to Rear Surface of Housing

Turning to FIGS. 29-32, in addition to the housing 60, the fluid end section 56 comprises a plurality of components attached to the rear surface 66 of the housing 60. Such components are configured to receive the plunger 216. The various components include the retention plate 206, the stuffing box 198, and the rear retainer 200, previously mentioned. The components further comprise a plunger packing 300, and a packing nut 290.

Retention Plate

Continuing with FIGS. 29-32, the retention plate 206 has a cylindrical cross-sectional shape and is sized to cover the rear surface 66 of the housing 60 and the wear ring 222 and the seal 224, as shown in FIG. 29. The retention plate 206 holds the wear ring 222 and the seal 224 within the housing 60 in the event the stuffing box 198 needs to be removed.

Continuing with FIGS. 29-32, the retention plate 206 comprises opposed front and rear surface 237 and 238 joined by a central opening 239 formed therein. A plurality of first passages 234 are formed in the retention plate 206 and surround the central opening 239 of the plate 206. The first passages 234 align with the first threaded openings 194 formed in the rear surface 66 of the housing 60 and are configured to receive the plurality of second fasteners 196.

Figure 30:
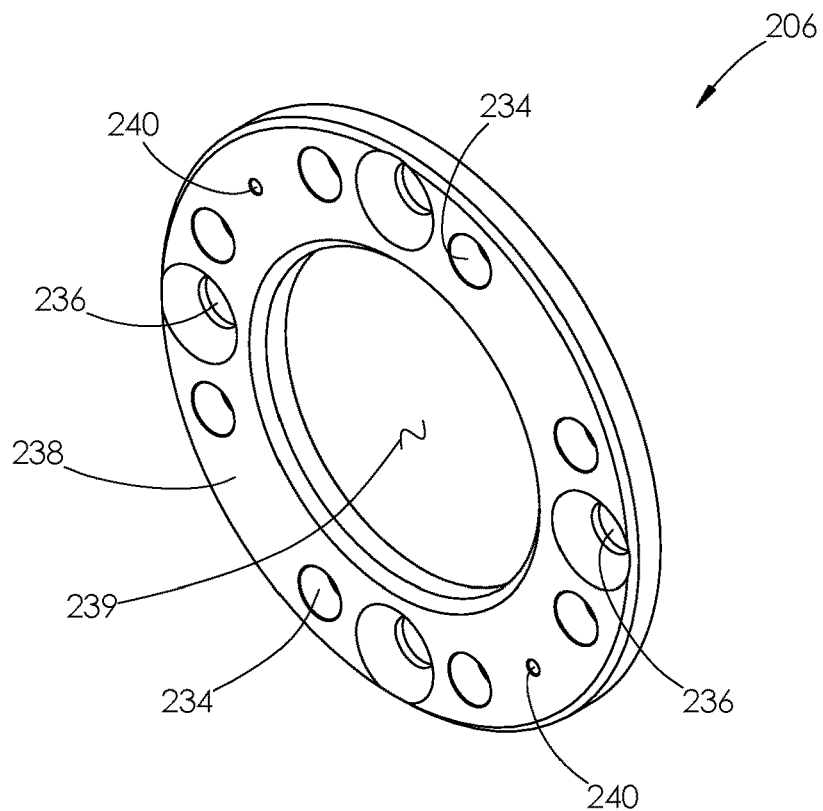
FIG. 30 is a rear perspective view of the retention plate shown in FIGS. 9 and 29.
Figure 31:
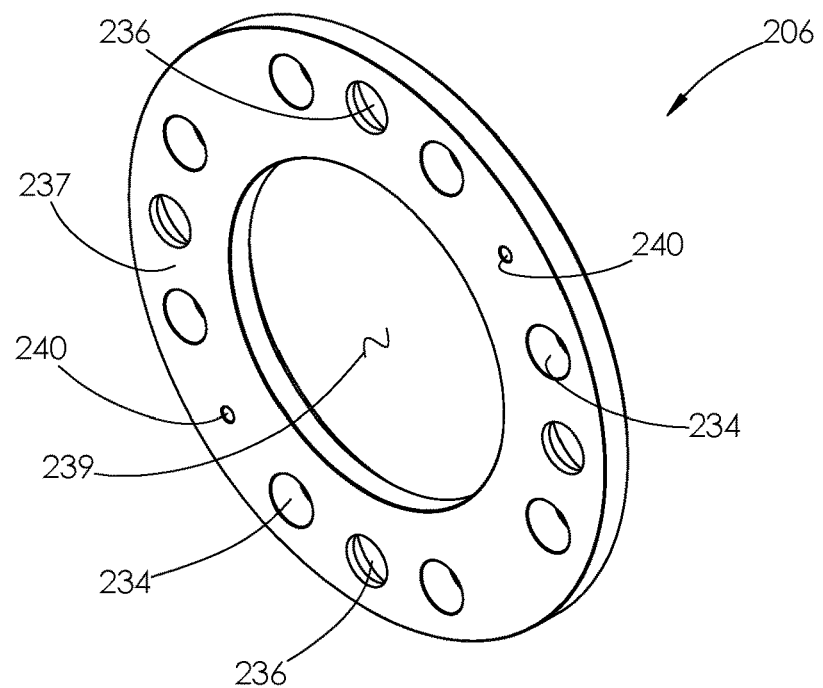
FIG. 31 is a front perspective view of the retention plate shown in FIG. 30.

Continuing with FIGS. 30-32, a plurality of second passages 236 are also formed in the retention plate 206. The second passages 236 align with the second threaded openings 202 formed in the rear surface 66 of the housing 60 and are configured to receive the third fasteners 204, as shown in FIG. 32. A third fastener 204 is threaded into one of the second threaded openings 202 and turned until it sits flush with the rear surface 238 of the retention plate 206, as shown in FIG. 32.

Continuing with FIGS. 30-32, a plurality of dowel openings 240 are formed in the retention plate 206 for receiving third alignment dowels 242, as shown in FIG. 39. The third alignment dowels 242 assist in properly aligning the retention plate 206 and the stuffing box 198 on the housing 60 during assembly.

Turning back to FIG. 29, since fluid does not contact the retention plate 206 during operation, the retention plate 206 may be made of a different and less costly material than that of the housing 60 or the stuffing box 198. For example, the retention plate 206 may be made of alloy steel, while the housing 60 and stuffing box 198 are made of stainless steel.

Stuffing Box

Turning to FIGS. 29, 33, 34, and 39, the stuffing box 198 comprises opposed front and rear surfaces 244 and 246 joined by an outer intermediate surface 248 and a central passage 250 formed therein. The stuffing box 198 further comprises a front portion 252 joined to a rear portion 254. The front portion 252 has a smaller outer diameter than the rear portion 254 such that a medial surface 256 is formed between the front and rear surfaces 244 and 246. The front portion 252 includes the front surface 244 of stuffing box 198, and the rear portion 254 includes the rear surface 246 of the stuffing box 198. An internal shoulder 272 is formed within the walls surrounding the central passage 250 within the rear portion 254 of the stuffing box 198.

Figure 33:
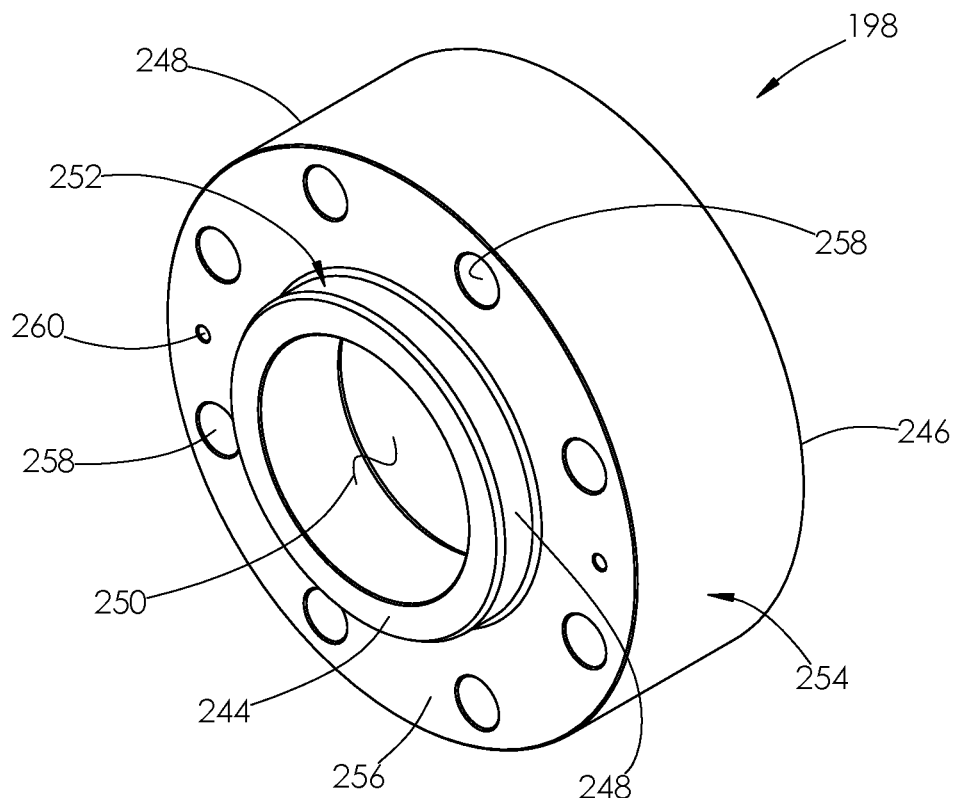
FIG. 33 is a front perspective view of the stuffing box shown in FIGS. 9 and 29.
Figure 34:
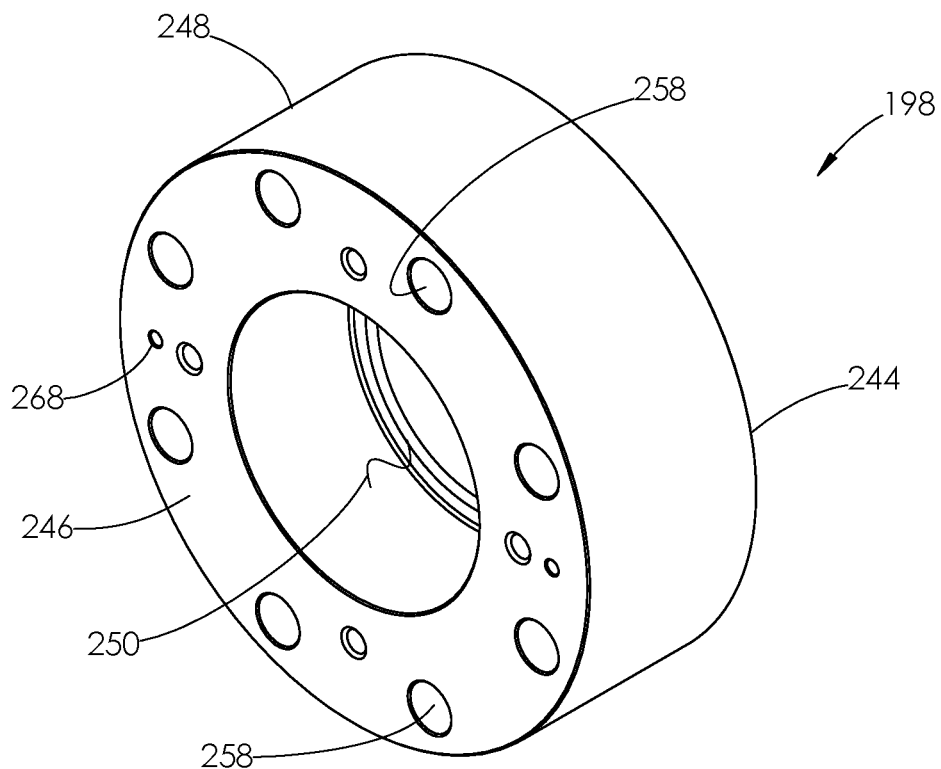
FIG. 34 is a rear perspective view of the stuffing box shown in FIG. 33.
Figure 35:
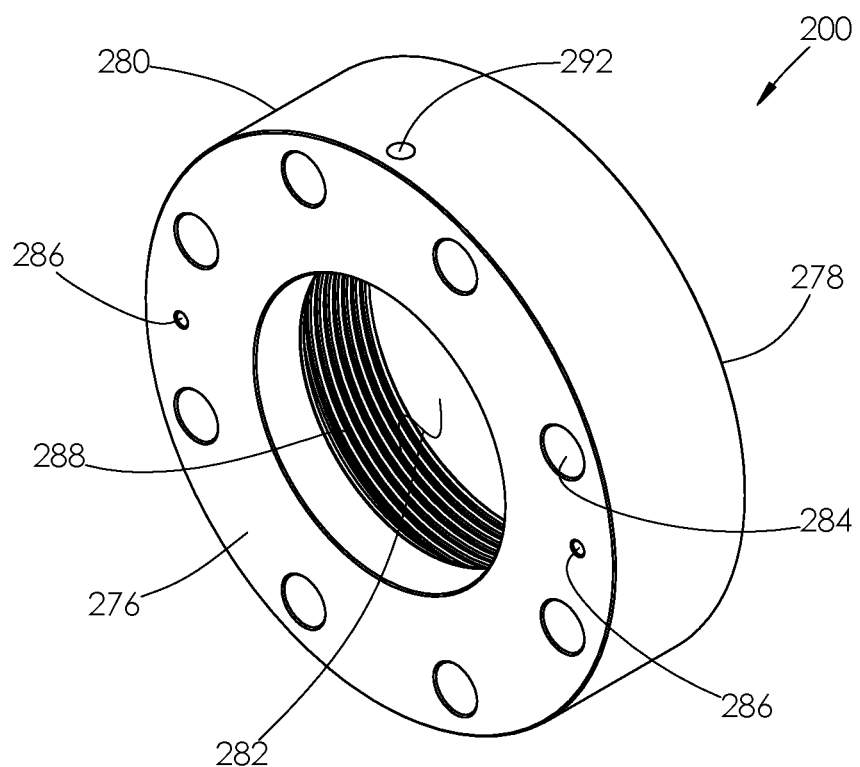
FIG. 35 is a front perspective view of the rear retainer shown in FIGS. 9 and 29.
Figure 36:
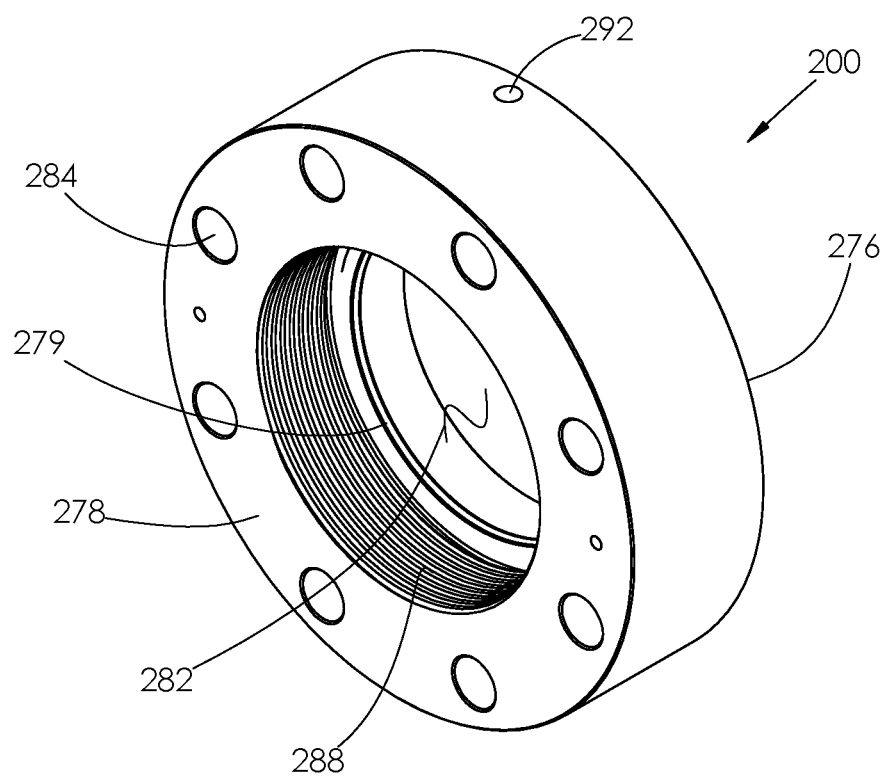
FIG. 36 is a rear perspective view of the rear retainer shown in FIG. 35.

Continuing with FIGS. 33, 34, and 39, a plurality of passages 258 are formed within the rear portion 254 of the stuffing box 198 and interconnect the medial surface 256 and the rear surface 246. The passages 258 are configured to align with the plurality of first passages 234 formed in the retention plate 206 and the plurality of first threaded openings 194 formed in the rear surface 66 of the housing 60, as shown in FIG. 29.

Continuing with FIGS. 33, 34, and 39, a plurality of dowel openings 260 may be formed in the medial surface 256 of the stuffing box 198. The dowel openings 260 are configured to receive at least a portion of the third alignment dowels 242 to properly align the stuffing box 198 on the retention plate 206 and the housing 60 during assembly, as shown in FIG. 39. Likewise, a plurality of dowel openings 268 may be formed in the rear surface 246 of the stuffing box 198 for receiving fourth alignment dowels 270, as shown in FIG. 39. The fourth alignment dowels 270 assist in properly aligning the rear retainer 200 on the stuffing box 198 during assembly.

Continuing with FIG. 39, the stuffing box 198 is installed within the third section 76 of the housing 60 such that the front portion 252 is disposed within the horizontal bore 70 and the medial surface 256 abuts the rear surface 238 of the retention plate 206. The outer intermediate surface 248 of the front portion 252 of the stuffing box 198 engages the seal 224. The seal 224 prevents fluid from leaking between the housing 60 and the stuffing box 198.

Continuing with FIG. 39, during operation, the seal 224 wears against the outer intermediate surface 248 of the front portion 252. Should the front portion 252 begin to erode, the stuffing box 198 may be removed and replaced with a new stuffing box 198. Likewise, the seal 224 wears against the wear ring 222 during operation. The wear ring 222 is preferably made of a harder and more wear resistant material than the housing 60, such as tungsten carbide. Should the wear ring 222 begin to erode, the wear ring 222 can be removed and replaced with a new wear ring 222. Trapping the seal 224 between replaceable parts protects the housing 60 over time.

Rear Retainer

Turning to FIGS. 29, 35, 36, and 39, the rear retainer 200 comprises opposed front and rear surfaces 276 and 278 joined by an outer intermediate surface 280 and a central passage 282 formed therein. A plurality of passages 284 are formed in the rear retainer 200 and surround the central passage 282. The passages 284 interconnect the front and rear surfaces 276 and 278 of the rear retainer 200 and are configured to align with the passages 258 formed in the rear portion 254 of the stuffing box 198, as shown in FIG. 29. A plurality of dowel openings 286 are formed in the front surface 276 of the rear retainer 200 for receiving a portion of the fourth alignment dowels 270, as shown in FIG. 39.

Figure 40:
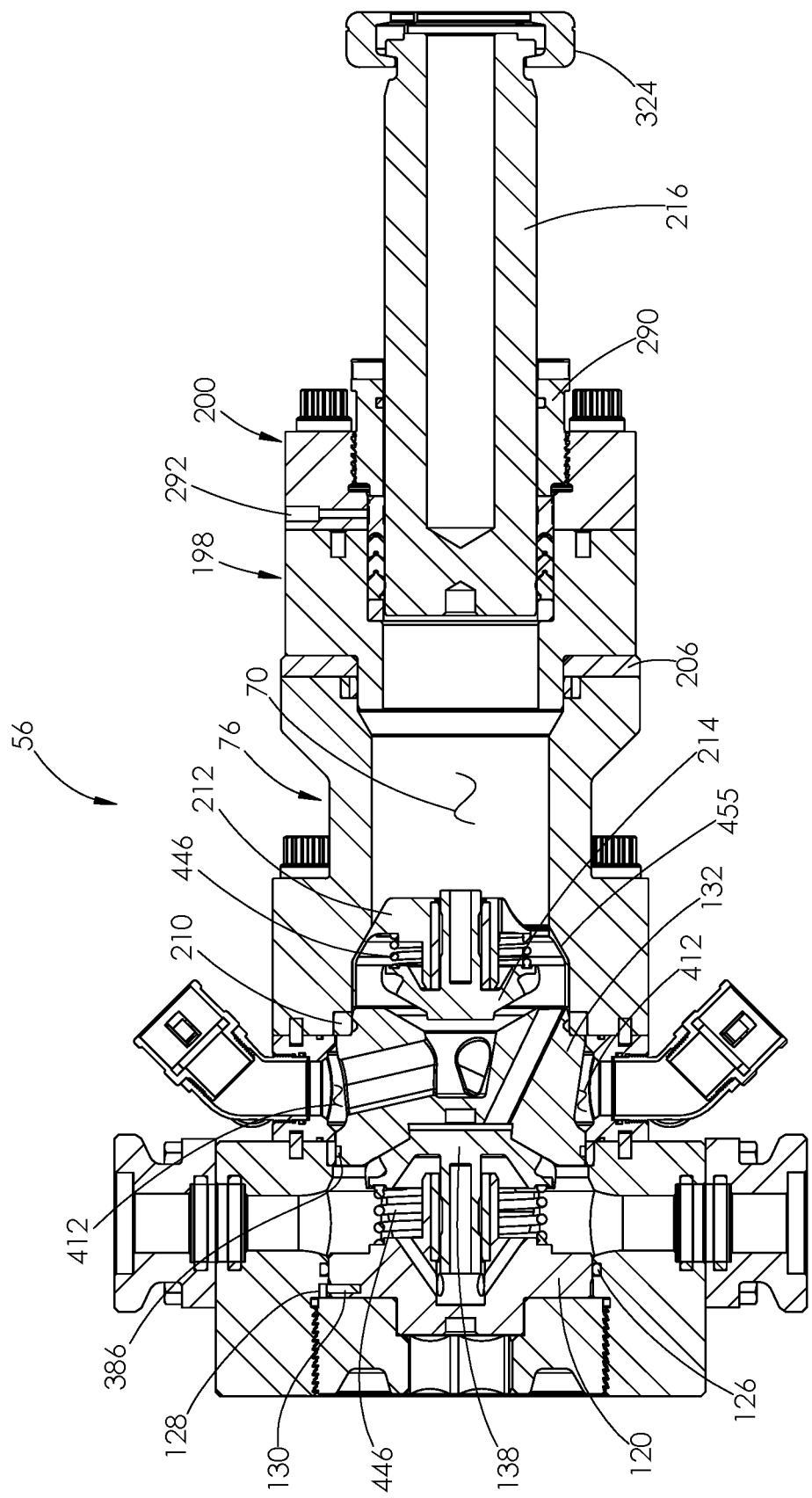
FIG. 40 is the cross-sectional view of the fluid end assembly shown in FIG. 9. The plunger is retracted, and the discharge valve is shown in a closed position.

Continuing with FIGS. 35, 36, 39, and 40, an internal shoulder 279 is formed within the walls surrounding the central passage 282 of the rear retainer 200. Internal threads 288 are formed in the walls surrounding the central passage 282 and positioned between the internal shoulder 279 and the rear surface 278. The internal threads 288 are configured to receive a packing nut 290, as shown in FIG. 39. The walls positioned between the internal shoulder 279 and the front surface 276 are flat and include one or more lube ports 292. The lube port 292 interconnects the central passage 282 and the outer intermediate surface 280 of the rear retainer 200, as shown in FIG. 40.

Plunger Packing and Packing Nut

Continuing with FIG. 39, fluid is prevented from leaking around the plunger 216 during operation by a plunger packing 300. The plunger packing 300 is installed within the stuffing box 198 and comprises a plurality of packing seals 302 sandwiched between first and second metal rings 304 and 306. The first metal ring 304 abuts the internal shoulder 272 formed within the stuffing box 198 and the second metal ring 306 extends into the central passage 282 formed in the rear retainer 200. The second metal ring 306 is known in the art as a "lantern ring". One or more passages 303, shown in FIG. 29, may be formed in the second metal ring 306 and fluidly connect with the one or more lube ports 292 formed in the rear retainer 200. During operation, oil used to lubricate the plunger 216 and plunger packing 300 is supplied through the lube port 292 and second metal ring 306.

Figure 37:
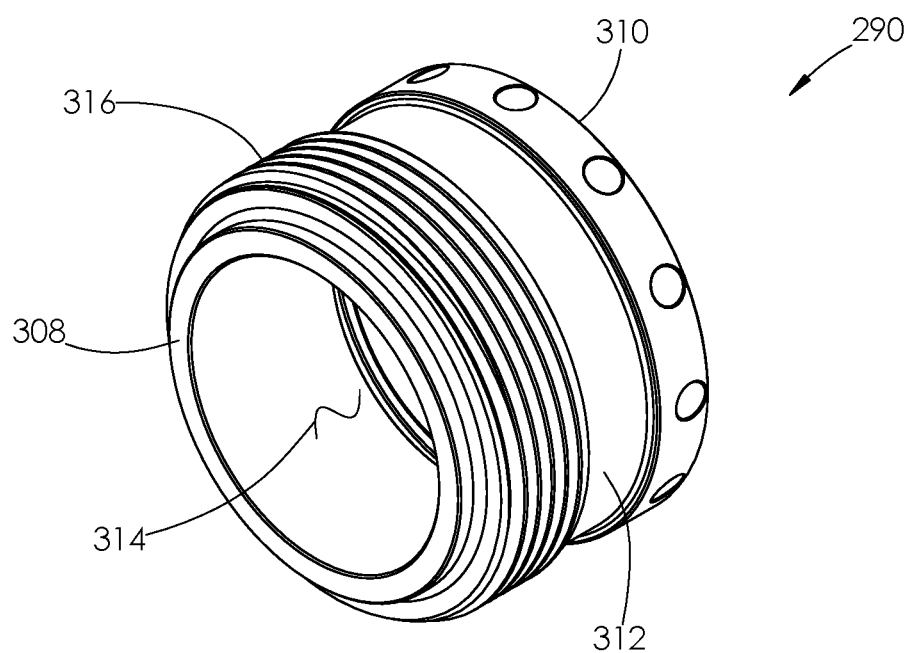
FIG. 37 is a front perspective view of the packing nut shown in FIGS. 9 and 29.
Figure 38:
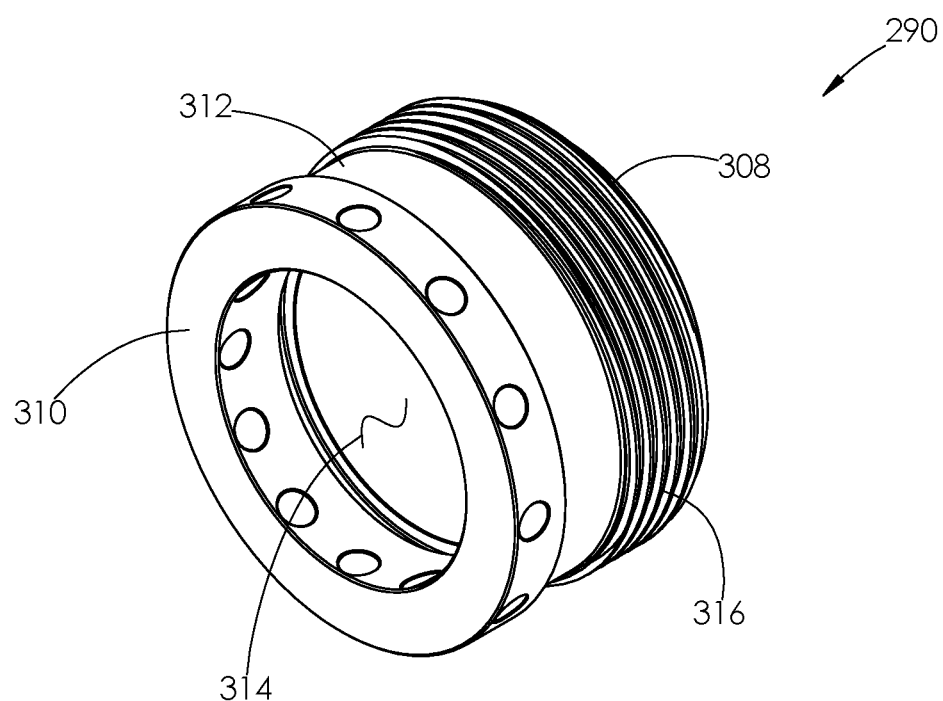
FIG. 38 is a rear perspective view of the packing nut shown in FIG. 37.

With reference to FIGS. 37-39, the plunger packing 300 is retained within the stuffing box 198 and the rear retainer 200 using the packing nut 290. The packing nut 290 comprises opposed front and rear surfaces 308 and 310 joined by an outer intermediate surface 312 and a central passage 314 formed therein. External threads 316 are formed in a portion of the outer intermediate surface 312 for engaging the internal threads 288 formed in the rear retainer 200, as shown in FIG. 39. When the packing nut 290 is installed within the rear retainer 200, the front surface 308 of the packing nut 290 engages and compresses the plunger packing 300, as shown in FIG. 39. When compressed, the packing seals 302 of the plunger packing 300 tightly seal against an outer surface of the plunger 216.

Continuing with FIG. 39, during operation, the packing nut 290 may be tightened, as needed, to ensure adequate compression of the packing seals 302 against the plunger 216. At least a portion of the packing nut 290 projects from the rear surface 278 of the rear retainer 200 to provide clearance to turn the packing nut 290, as needed. The central passage 314 formed in the packing nut 290 is sized to closely receive the plunger 216. A groove 318 may be formed in the walls surrounding the central passage 314 for receiving a seal 320. The seal 320 shown in FIG. 39 is an O-ring. The seal 320 prevents fluid from leaking around the plunger 216 during operation.

Assembly of Components on Rear Surface of Housing

Turning back to FIG. 29, the front surface 276 of the rear retainer 200 abuts the rear surface 246 of the stuffing box 198 such that the plurality of passages 284 align with the plurality of passages 258 formed in the stuffing box 198. A second fastener 196 is installed within a corresponding one of the aligned first threaded openings 194 and passages 234, 258, and 284. A first end 294 of the second fastener 196 threads into the first threaded opening 194 and a second end 296 projects from the rear surface 278 of the rear retainer 200. A nut 298 is threaded onto the second end 296 and torqued against the rear surface 278, tightly securing the stuffing box 198 and the rear retainer 200 to the third section 76 of the housing 60.

Continuing with FIG. 29, the nut 298 shown in the figures is 12-point flange nut. In alternative embodiments, the nut may comprise the three-piece fastener 90, shown in FIGS. 19-21. The second fastener 196 shown in the figures is a threaded stud. In alternative embodiments, the second fastener 196 may comprise other fasteners known in the art, such as a bolt or screw.

Continuing with FIG. 29, the stuffing box 198 and rear retainer 200 are attached to the housing 60 after the retention plate 206 has first been attached to the rear surface 66 of the housing 60. The plunger packing 300 may be installed within stuffing box 198 either before or after the stuffing box 198 is attached to the housing 60. After all the components are assembled, the packing nut 290 is threaded into the rear retainer 200 until it engages the plunger packing 300.

With reference to FIGS. 29 and 39, when the retention plate 206, the stuffing box 198, and rear retainer 200 are attached to the housing 60, the central opening 239 of the retention plate 206 and the central passages 250 and 282 of the stuffing box 198 and the rear retainer 200 form an extension of the horizontal bore 70. Likewise, the interior of the plunger packing 300 and the central passage 314 of the packing nut 290 also form extensions of the horizontal bore 70. The plunger 216 is installed within the fluid end section 56 through the rear surface 310 of the packing nut 290. During operation, the plunger 216 reciprocates within the horizontal bore 70, creating the variance in fluid pressure within the fluid end section 56 during operation.

With reference to FIGS. 3, 39, and 40, as will be discussed in more detail later herein, during operation, reciprocal movement of the plunger 216 is driven by a pony rod 322 installed within the power end assembly 54. A clamp 324 secures the plunger 216 to the pony rod 322 such that the plunger 216 and pony rod 322 move in unison.

Components Installed within the Housing

Turning to FIGS. 40-79, the various internal components of the housing 60 will now be described in more detail. Fluid is routed throughout the housing 60 by the fluid routing plug 132. The timing of movement throughout the fluid routing plug 132 is controlled by the suction valve 214 and the discharge valve 138. Movement of the valves 214 and 138 is guided by the suction valve guide 212 and the discharge plug 120.

Fluid Routing Plug

Figure 41:
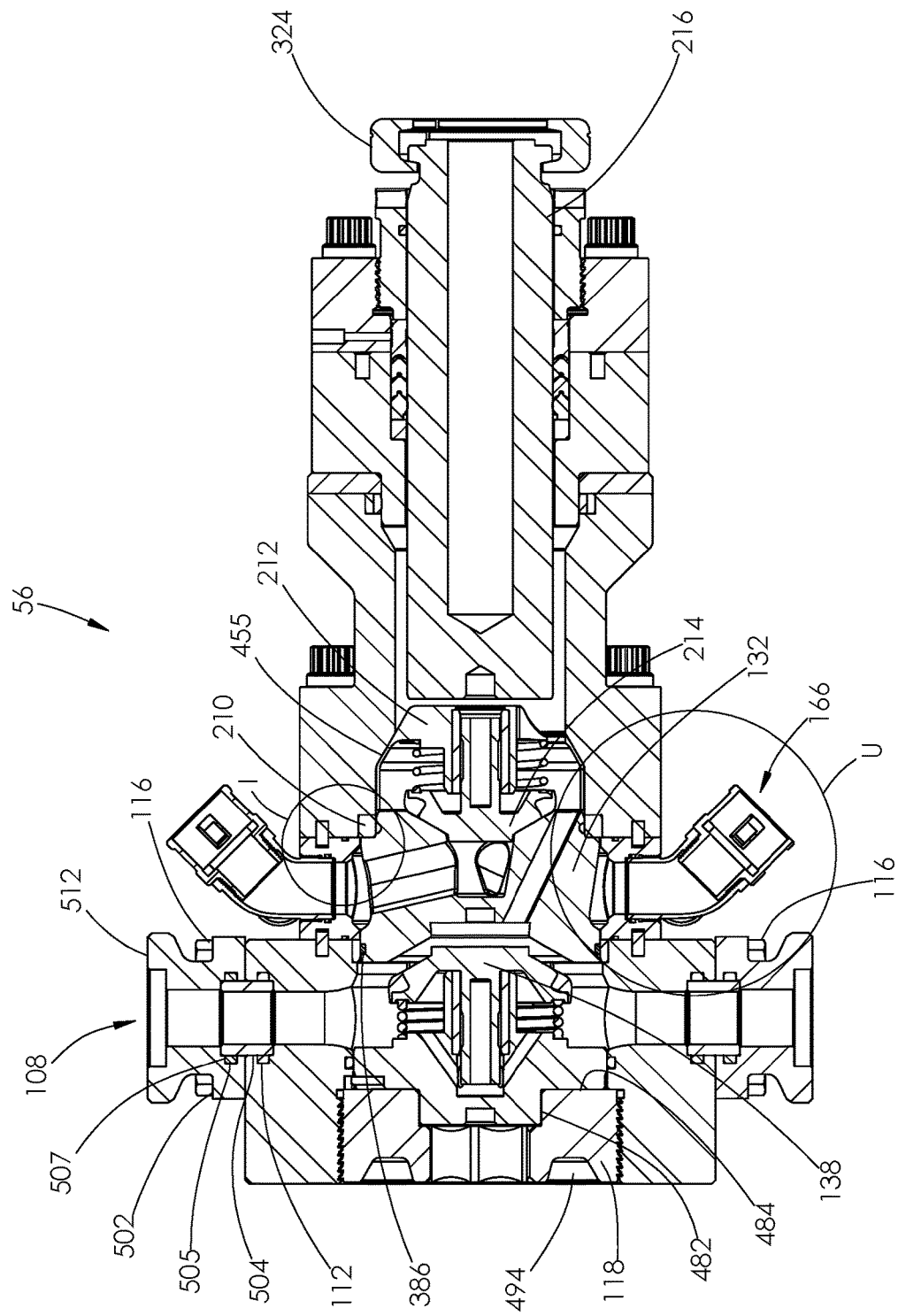
FIG. 41 is the cross-sectional view of the fluid end assembly shown in FIG. 40, but the plunger is extended within the fluid end section and the suction valve is in a closed position.

Turning to FIGS. 40-59, the fluid routing plug 132 comprises a body 330 having a suction surface 332 and an opposed discharge surface 334 joined by an outer intermediate surface 336. A central longitudinal axis 338 extends through the body 330 and the suction and discharge surfaces 332 and 334. When the fluid routing plug 132 is installed within the housing 60, at least a portion of the discharge surface 334 is positioned within the first section 72 of the housing 60, and at least a portion of the suction surface 332 is positioned within the third section 76 of the housing 60, as shown in FIGS. 40 and 41.

Continuing with FIGS. 43-59, the body 330 further comprises a plurality of suction fluid passages 340. The suction passages 340 interconnect the intermediate surface 336 and the suction surface 332 of the body 330, as shown in FIG. 48. The connection is formed within a blind bore 342 formed within the suction surface 332 of the body 330. The blind bore 342 may be referred to as an axially-blind bore 342 because it is blind along the longitudinal axis 338 of the body 330. During operation, fluid entering the housing 60 through the suction bores 160 and 162 flows into the suction passages 340 of the fluid routing plug 132 and into the axially-blind bore 342. From there, fluid flows towards the suction surface 332 of the body 330 and out of the fluid routing plug 132. Three suction fluid passages 340 are shown in FIGS. 43-59. In alternative embodiments, more or less than three suction fluid passages 340 may be formed within the body 330.

Figure 49:
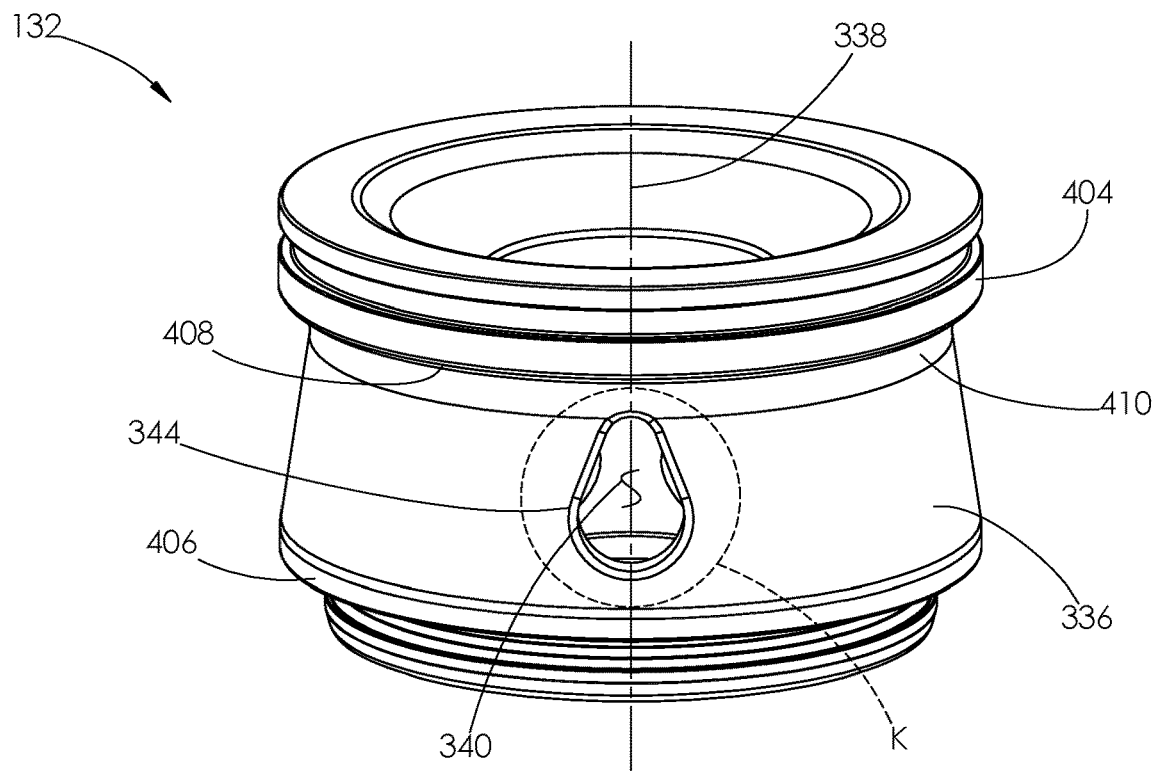
FIG. 49 is a top perspective view of the fluid routing plug shown in FIG. 43.
Figure 50:
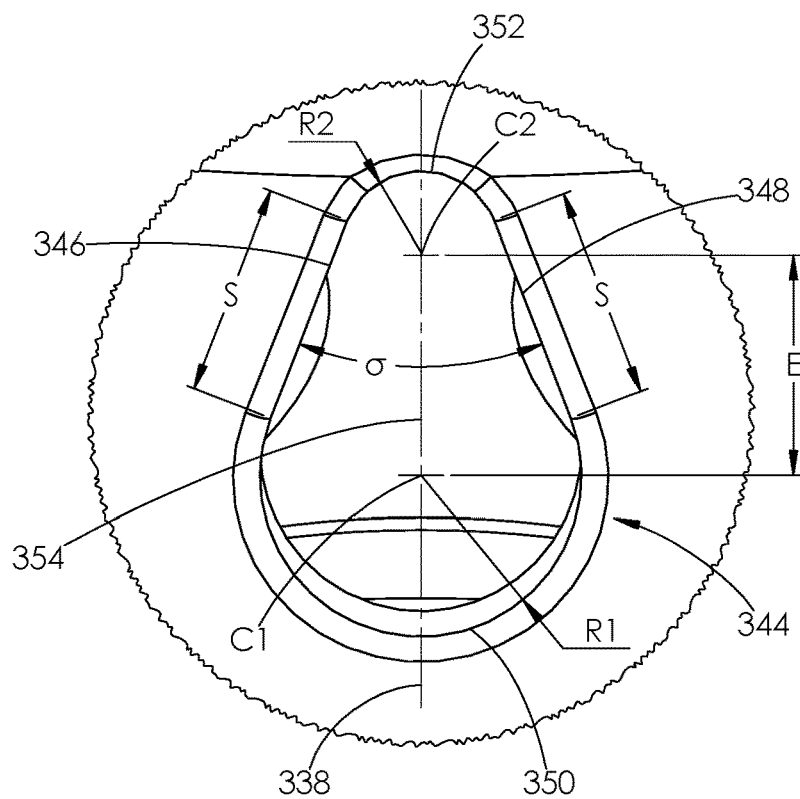
FIG. 50 is an enlarged view of area K shown in FIG. 49.

Continuing with FIGS. 49 and 50, each suction passage 340 has a generally oval or tear drop cross-sectional shape. An opening 344 of each suction passage 340 on the intermediate surface 336 comprises a first side wall 346 joined to a second side wall 348 by first and second ends 350 and 352. The first and second side walls 346 and 348 are straight lines of equal length S, and the first and second ends 350 and 352 are circular arcs, as shown in FIG. 50.

Continuing with FIG. 50, the first end 350 of the opening 344 has a radius of R1 with a center at C1, and the second end 352 has a radius of R2 with a center at C2. The first end 350 is larger than the second end 352 such that R1>R2. The first and second side walls 346 and 348 are tangent to the first and second ends 350 and 352 and have an included angle, σ.

Figure 55:
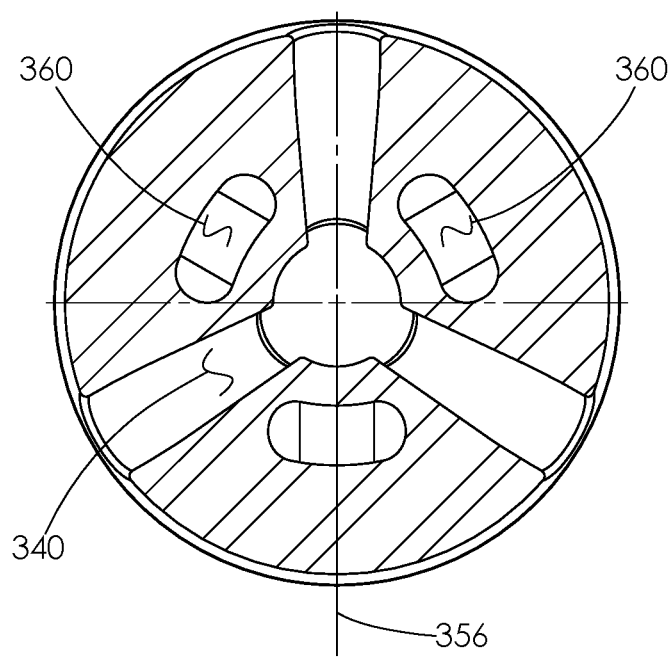
FIG. 55 is a cross-sectional view of the fluid routing plug shown in FIG. 44, taken along line M-M.

Continuing with FIG. 50, the opening 344 has a centerline 354 that connects the centers C1 and C2 of the first and second ends 350 and 352. The centerline 354 has a length E and is parallel with the central longitudinal axis 338. A cross-sectional shape of each suction passage 340 throughout the length of the body 330 corresponds with the shape of each opening 344, as shown in FIG. 55. Each suction passage 340 is sized and shaped to maximize fluid flow through the passage 340 and minimize fluid turbulence and stress to the body 330 of the fluid routing plug 132.

Figure 56:
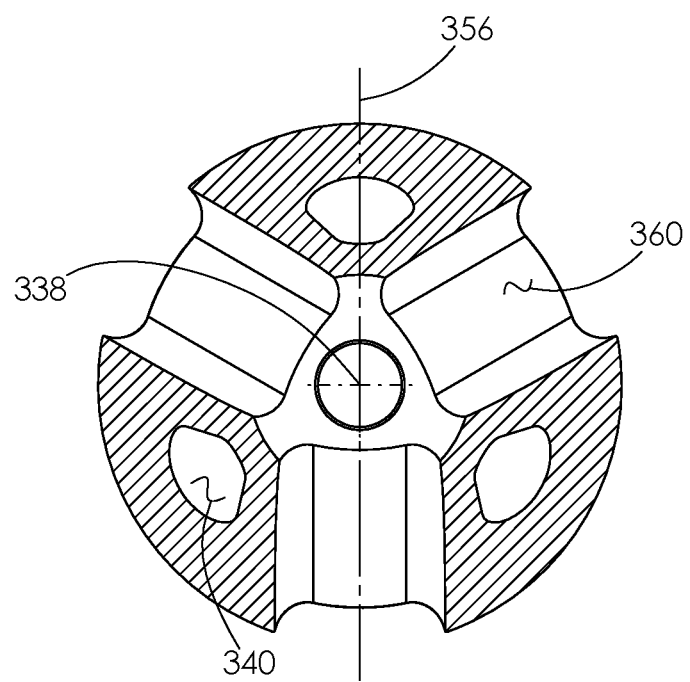
FIG. 56 is a front elevational and conical-sectional view of the fluid routing plug shown in FIG. 43. The conical-section is taken from line O in FIGS. 43 and 45 to line P in FIGS. 46 and 47.
Figure 57:
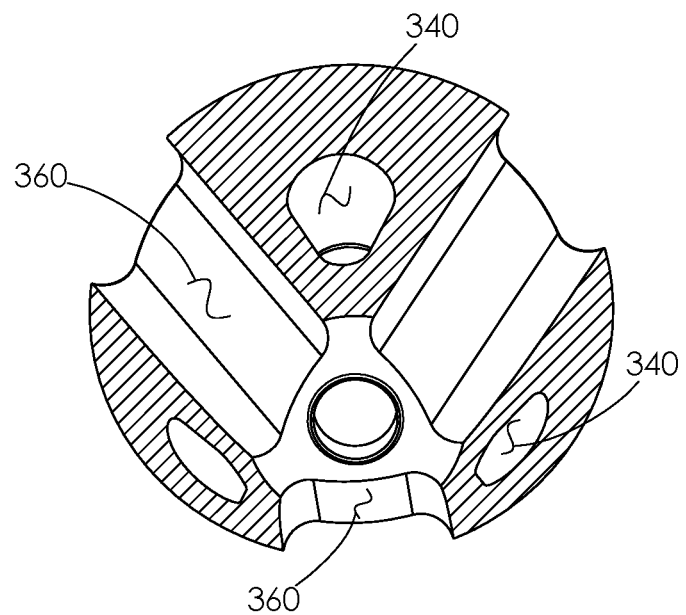
FIG. 57 is a front perspective and conical-sectional view of the fluid routing plug shown in FIG. 56.
Figure 58:
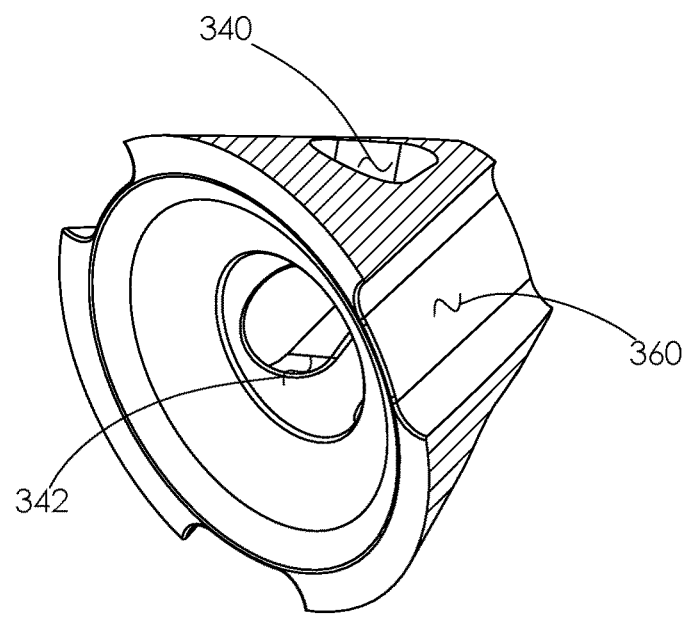
FIG. 58 is a rear perspective and conical-sectional view of the fluid routing plug shown in FIG. 56.
Figure 59:
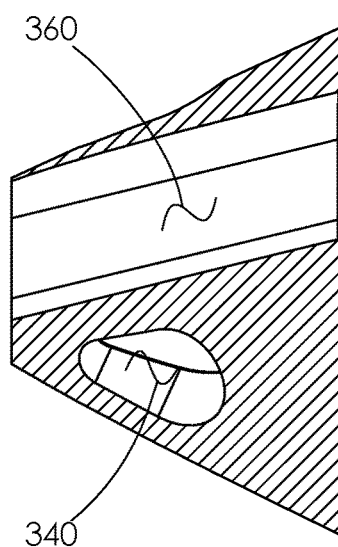
FIG. 59 is a side elevational and conical-sectional view of the fluid routing plug shown in FIG. 56.
Figure 60:
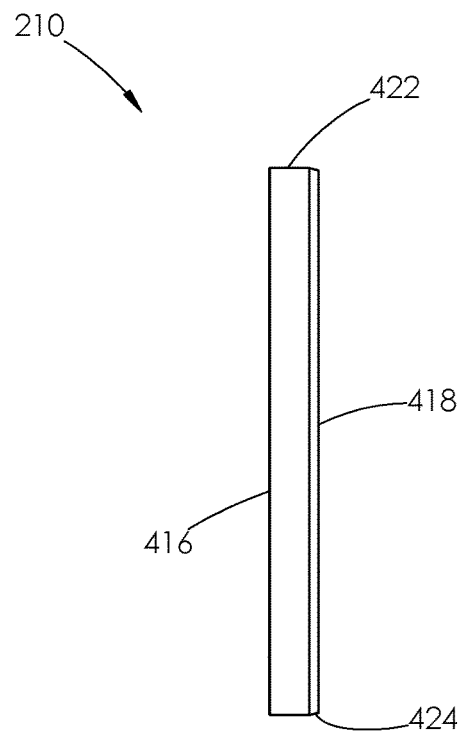
FIG. 60 is a side elevational view of the hardened insert shown in FIGS. 40 and 41.
Figure 61:
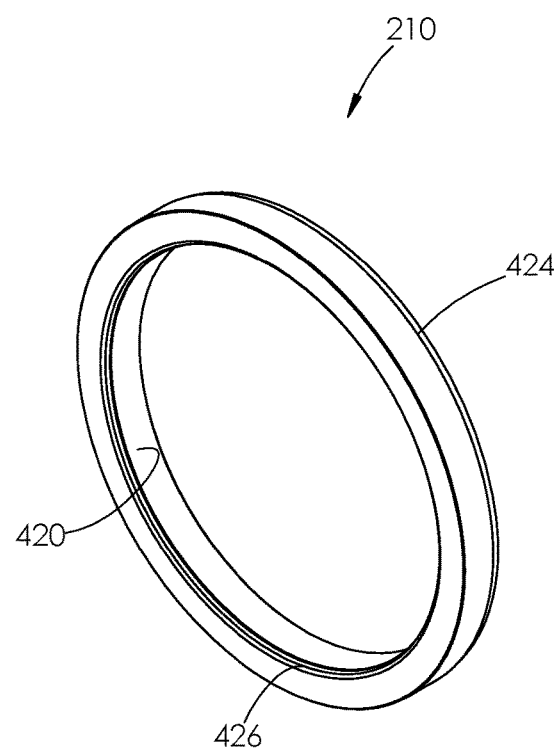
FIG. 61 is a front perspective view of the hardened insert shown in FIG. 60.
Figure 62:
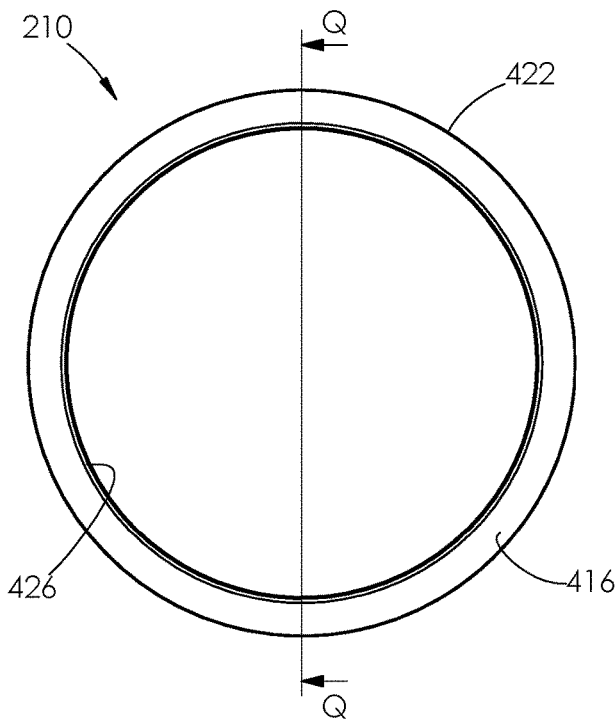
FIG. 62 is a front elevational view of the hardened insert shown in FIG. 60.

With reference to FIGS. 55 and 56, each suction fluid passage 340 extends between the axially-blind bore 342 and the suction surface 332 such that each suction passage 340 comprises a longitudinal axis 356. The longitudinal axis 356 extends through the center C1 of the first end 350 of the opening 344 and intersects the central longitudinal axis 338, as shown in FIG. 56.

Continuing with FIGS. 43-59, the body 330 further comprises a plurality of discharge fluid passages 360. The discharge passages 360 interconnect the suction surface 332 and the discharge surface 334 of the body 330 and do not intersect any of the suction passages 340. Rather, the discharge and suction passages 360 and 340 are in a spaced-relationship. In operation, fluid exiting the body 330 at the suction surface 332 is subsequently forced into the discharge passages 360, towards the discharge surface 334 of the body 330, and out of the fluid routing plug 132. Three discharge fluid passages 360 are shown in FIGS. 43-59. In alternative embodiments, more or less than three discharge fluid passages 360 may be formed within the body 330.

Figure 43:
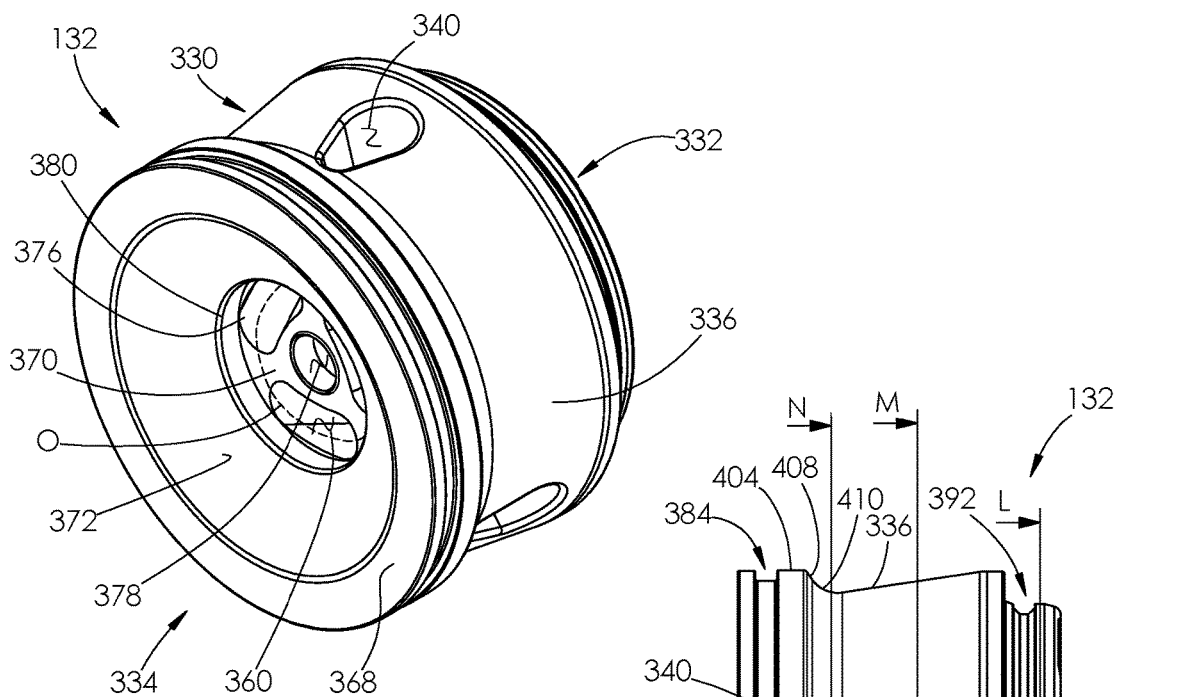
FIG. 43 is a front perspective view of the fluid routing plug shown in FIGS. 40 and 41.

Continuing with FIGS. 43, 46, and 48, the suction surface 332 of the body 330 comprises an outer rim 362 joined to the axially-blind bore 342 by a tapered seating surface 366, as shown in FIGS. 46 and 48. Likewise, the discharge surface 334 comprises an outer rim 368 joined to a central base 370 by a tapered seating surface 372, as shown in FIGS. 43 and 48.

Continuing with FIGS. 43, 46, and 48, each discharge passage 360 opens at a first opening 374 on the outer rim 362 of the suction surface 332 and opens at a second opening 376 on the central base 370 of the discharge surface 334. The second openings 376 surround a blind bore 378 formed in the central base 370 of the discharge surface 334. The blind bore 378 is configured to engage a tool used to grip the fluid routing plug 132, as needed. For example, the walls of the blind bore 378 may be threaded. The central base 370 may also be slightly recessed from the tapered seating surface 372 such that a small counterbore 380 is created. The counterbore 380 helps further reduce any turbulence of fluid exiting the second openings 376.

Figure 54:
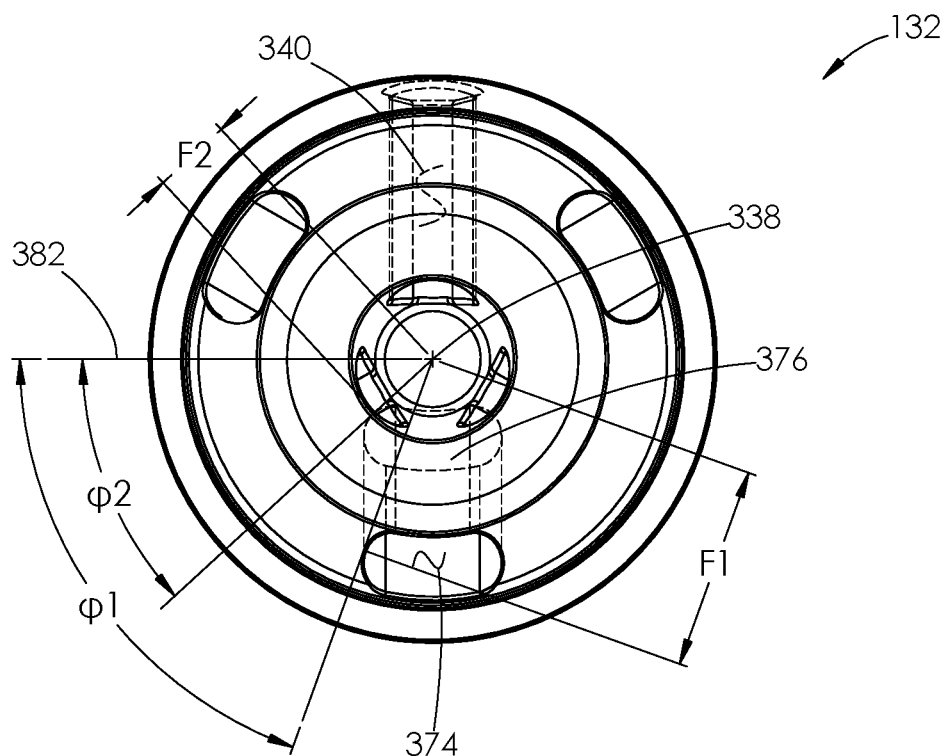
FIG. 54 is a rear elevational view of the fluid routing plug shown in FIG. 43, but one of the suction passages and one of the discharge passages are shown in phantom.

Continuing with FIG. 54, a position of the first and second openings 374 and 376 of each discharge passage 360 may be determined relative to a plane containing a line 382 that is perpendicular to the central longitudinal axis 338. The first opening 374, when projected onto the plane, is positioned at a first distance F1 from the central longitudinal axis 338 and at a first angle φ1 relative to the line 382. The second opening 376, when projected onto the plane, is positioned at a second distance F2 from the central longitudinal axis 338 and at a second angle φ2 relative to the line 382.

The first and second distances F1 and F2 shown in FIG. 54 are different. Likewise, the first and second angles φ1 and φ2 shown in FIG. 54 are different. In alternative embodiments, the first and second angles φ1 and φ2 may be different, but the first and second distances F1 and F2 may be the same. In further alternative embodiments, the first and second angles φ1 and φ2 may be the same, but the first and second distances F1 and F2 may be different. In even further alternative embodiments, the first and second distances F1 and F2 may be the same, and the first and second angles φ1 and φ2 may be the same.

Figure 51:
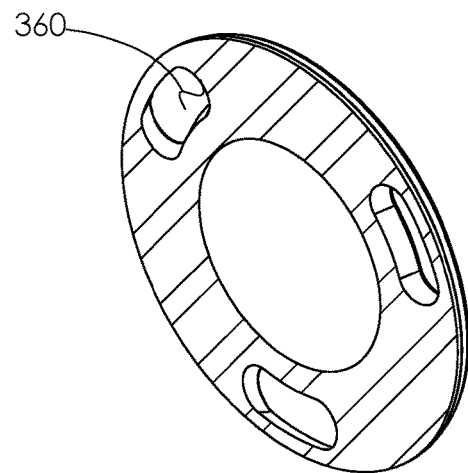
FIG. 51 is a perspective cross-sectional view of the fluid routing plug shown in FIG. 44, taken along line L-L.
Figure 52:
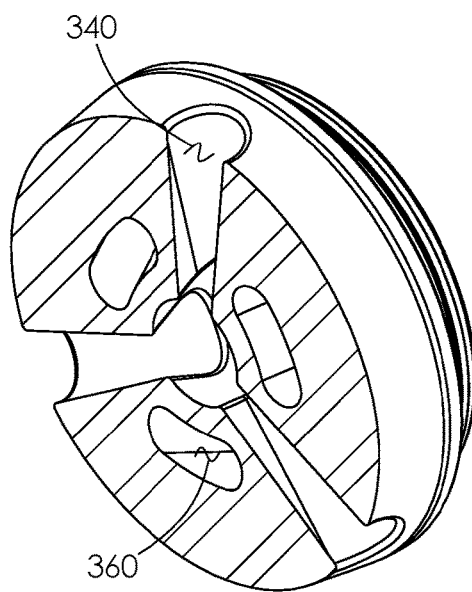
FIG. 52 is a perspective cross-sectional view of the fluid routing plug shown in FIG. 44, taken along line M-M.
Figure 53:
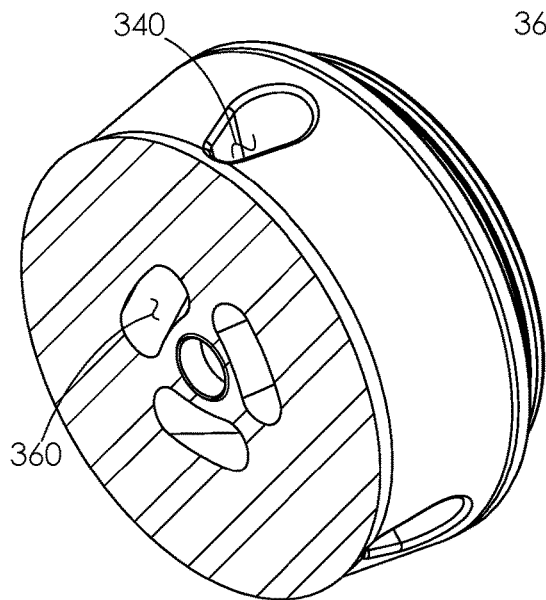
FIG. 53 is a perspective cross-sectional view of the fluid routing plug shown in FIG. 44, taken along line N-N.

With reference to FIGS. 51-53 and 56-59, each discharge passage 360 has an arced cross-sectional shape. The length of the arc may gradually increase between the suction and discharge surfaces 332 and 334, as shown in FIGS. 51-53. In alternative embodiments, the discharge passages 360 may have different shapes and sizes.

Turning back to FIGS. 44 and 48, a first annular groove 384 is formed in the outer intermediate surface 336 of the body 330 for housing the first seal 386. The first groove 384 is positioned adjacent the discharge surface 334 and is characterized by two sides walls 388 joined by a base 390. When the fluid routing plug 132 is installed within the housing 60, the first seal 386 engages an outer surface of the wear ring 136 installed within the first section 72 of the housing 60, as shown in FIGS. 40 and 41. During operation, the first seal 386 wears against the wear ring 136. If the wear ring 136 begins to erode, the wear ring 136 may be removed and replaced with a new wear ring 136. The wear ring 136 has an annular shape and may be made of a harder and more wear resistant material than the housing 60. For example, the housing 60 may be made of stainless steel and the wear ring 136 is made of tungsten carbide.

Figure 42:
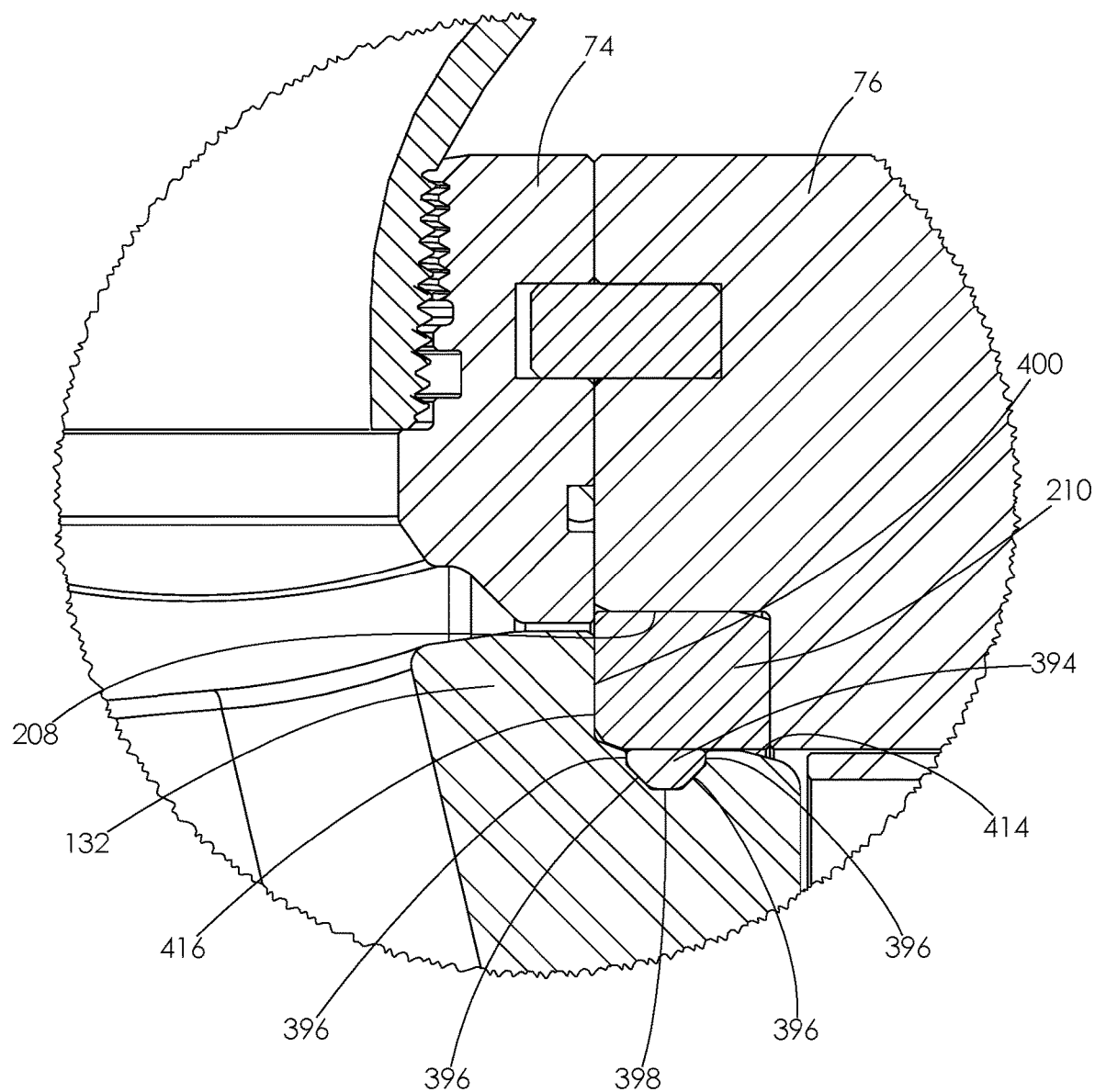
FIG. 42 is an enlarged view of area I shown in FIG. 41.
Figure 44:
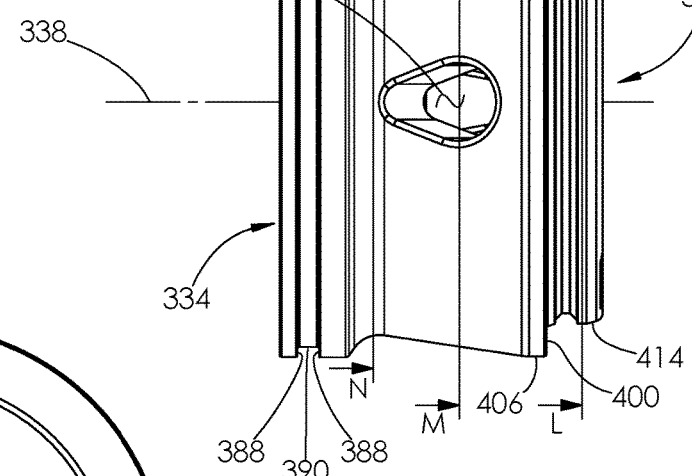
FIG. 44 is a side elevational view of the fluid routing plug shown in FIG. 43.
Figure 45:
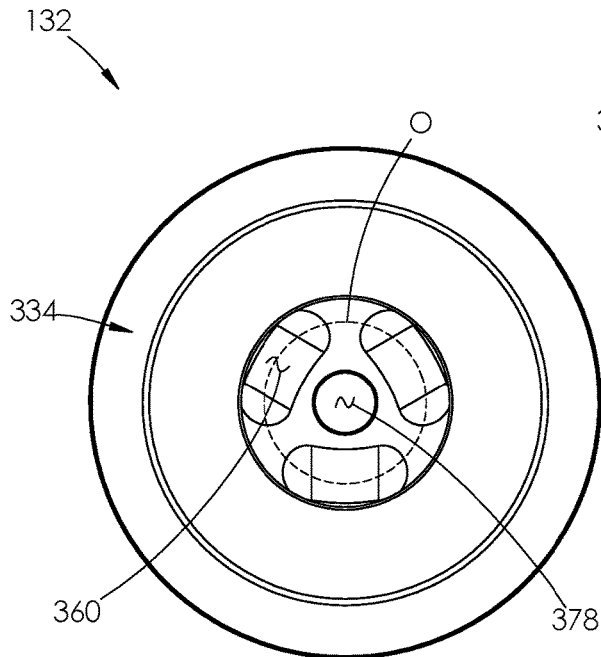
FIG. 45 is a front elevational view of the fluid routing plug shown in FIG. 43.

With reference to FIGS. 42, 44, and 48, a second annular groove 392 is formed in the outer intermediate surface 336 of the body 330 for housing a second seal 394. The second groove 392 is positioned adjacent the suction surface 332 and is characterized by a plurality of side walls 396 joined by a base 398, as shown in FIG. 42. Four side walls 396 are shown in FIG. 42 such that the groove 392 has a rounded shape. When the fluid routing plug 132 is installed within the housing 60, the second seal 394 engages an outer surface of the hardened insert 210, as shown in FIG. 42. During operation, the second seal 394 wears against the insert 210. If the insert 210 begins to erode, the insert 210 may be removed and replaced with a new insert 210.

Continuing with FIGS. 42, 44, and 48, the outer intermediate surface 336 of the body 330 further comprises an annular shoulder 400 formed in the body 330. The shoulder 400 is positioned between the opening 344 of the suction passages 340 and the second groove 392. When the fluid routing plug 132 is installed within the housing 60, the shoulder 400 abuts a front surface 416 of the insert 210, as shown in FIG. 42. Axial movement of the fluid routing plug 132 towards the rear surface 66 of the housing 60 is prevented by the engagement between the shoulder 400 and the insert 210. During operation, the shoulder 400 may wear against the insert 210. If either feature begins to wear, the fluid routing plug 132 and/or the insert 210 may be removed and replaced with a new fluid routing plug 132 and/or insert 210.

Continuing with FIGS. 40, 41, 44, and 48, the outer intermediate surface 336 of the body 330 adjacent the first groove 384 is characterized as a first cylindrical surface 404. Likewise, the outer intermediate surface 336 adjacent the annular shoulder 400 is characterized as a second cylindrical surface 406. The first cylindrical surface 404 has a maximum outer diameter that is equal or almost equal to a maximum outer diameter of the second cylindrical surface 406. The surfaces 404 and 406 are configured to closely face the walls surrounding the horizontal bore 70 within the second section 74 of the housing 60, as shown in FIGS. 40 and 41.

Continuing with FIGS. 40, 41, 44, 48, and 49, the outer intermediate surface 336 of the body 330 further comprises a first bevel 408 joined to a transition surface 410 formed in the body 330. The first bevel 408 and the transition surface 410 are positioned between the first cylindrical surface 404 and the openings 344 of the suction passages 340. The outer intermediate surface 336 of the body 330 slowly tapers outward from the transition surface 410 to the second cylindrical surface 406.

Continuing with FIGS. 40 and 41, when the fluid routing plug 132 is installed within the housing 60, the first bevel 408 provides clearance between the outer intermediate surface 336 of the fluid routing plug 132 and an opening of the suction bores 160 and 162. Such clearance gives way to an annular fluid channel 412 formed between the housing 60 and the fluid routing plug 132. The shape of the outer intermediate surface 336 of the fluid routing plug 132 between the first and second cylindrical surfaces 404 and 406 helps direct fluid flowing from the suction bores 160 and 162 into the openings 344 of the suction passages 340 while minimizing fluid turbulence.

Turning back to FIG. 42, the outer intermediate surface 336 of the body 330 further comprises a second bevel 414 formed in the body 330. The second bevel 414 is positioned between the suction surface 332 and the second groove 392. The second bevel 414 provides clearance to help install the fluid routing plug 132 within the housing 60 and the insert 210.

Hardened Insert

Figure 63:
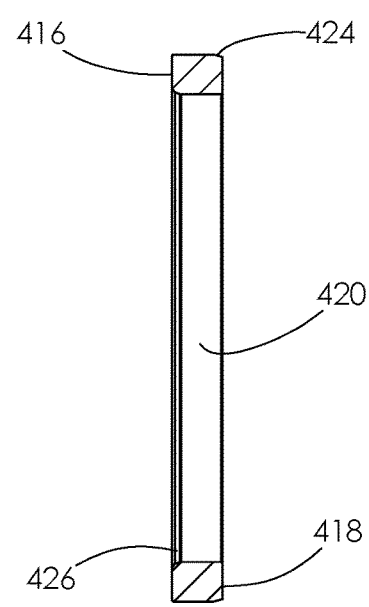
FIG. 63 is a cross-sectional view of the hardened insert shown in FIG. 62, taken along line Q-Q.
Figure 64:
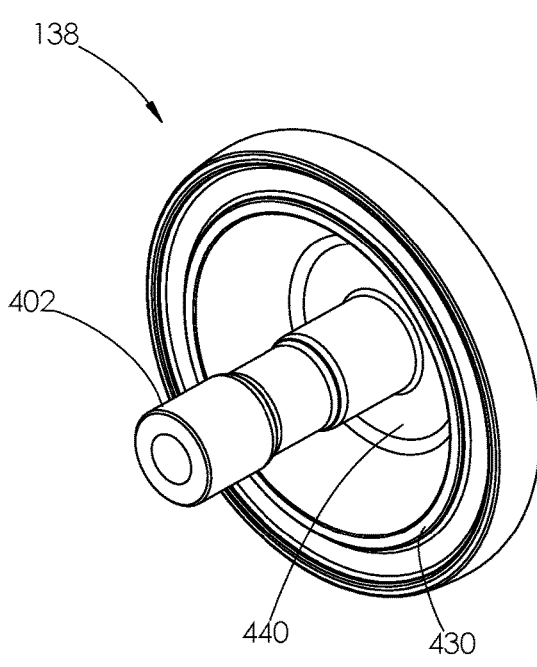
FIG. 64 is a front perspective view of the discharge valve shown in FIGS. 40 and 41.
Figure 65:
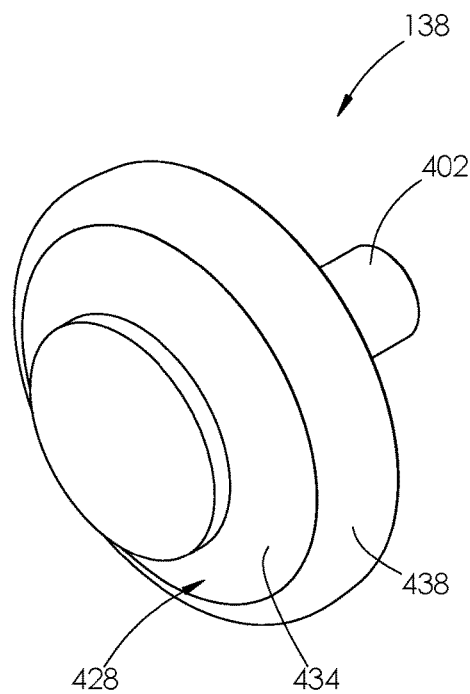
FIG. 65 is a rear perspective view of the discharge valve shown in FIG. 64.

With reference to FIGS. 42 and 60-63, the insert 210 has an annular shape and comprises opposed front and rear surfaces 416 and 418 joined by inner and outer intermediate surfaces 420 and 422. The insert 210 further comprises a first bevel 426 formed in the inner intermediate surface 420 adjacent the front surface 416, as shown in FIG. 63. The first bevel 426 provides clearance to assist in installing the fluid routing plug 132 within the insert 210 within the housing 60, as shown in FIG. 42. The insert 210 also comprises a second bevel 424 formed in the outer intermediate surface 422 adjacent the rear surface 418. The second bevel 424 provides clearance to assist in installing the insert 210 within the counterbore 208 formed in the third section 76 of the housing 60, as shown in FIG. 42. The insert 210 is made of a harder and more wear resistant material than the housing 60. For example, if the housing 60 is made of stainless steel, the insert 210 may be made of tungsten carbide.

Suction and Discharge Valves

With reference to FIGS. 40, 41, and 64-67, the flow of fluid throughout the housing 60 and the fluid routing plug 132 is regulated by the suction and discharge valves 214 and 138. The suction valve 214 is configured to engage the suction surface 332, and the discharge valve 138 is configured to engage the discharge surface 334 of the fluid routing plug 132 such that the surfaces 332 and 334 function as valve seats. The valves 214 and 138 are similar in shape but may vary in size. As shown in FIGS. 40 and 41, the discharge valve 138 is slightly large than suction valve 214.

Figure 66:
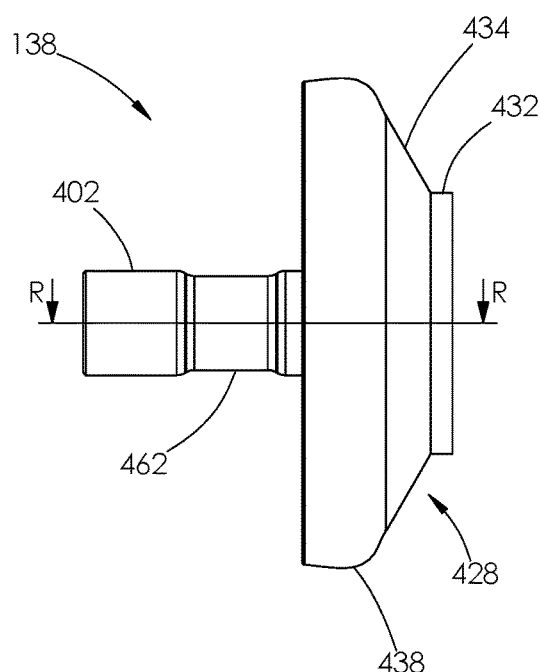
FIG. 66 is a side elevational view of the discharge valve shown in FIG. 64.
Figure 67:
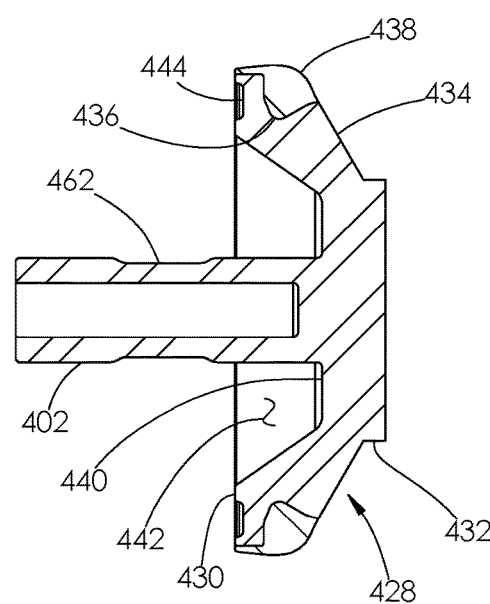
FIG. 67 is a cross-sectional view of the discharge valve shown in FIG. 66, taken along line R-R.
Figure 68:
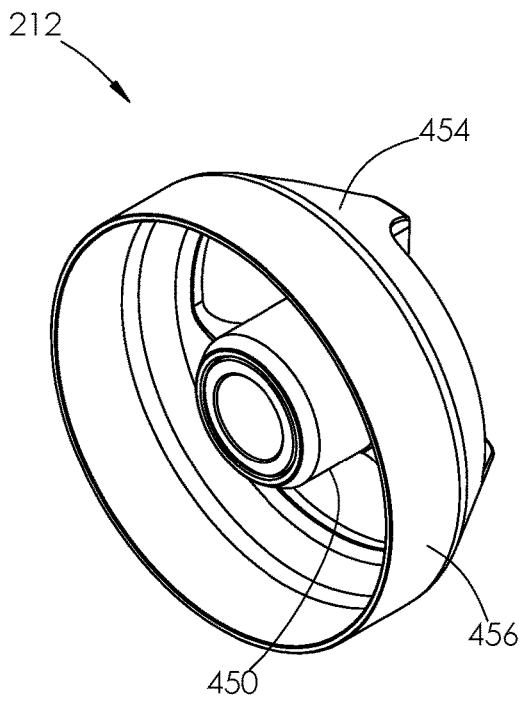
FIG. 68 is a front perspective view of the suction valve guide shown in FIGS. 40 and 41.
Figure 69:
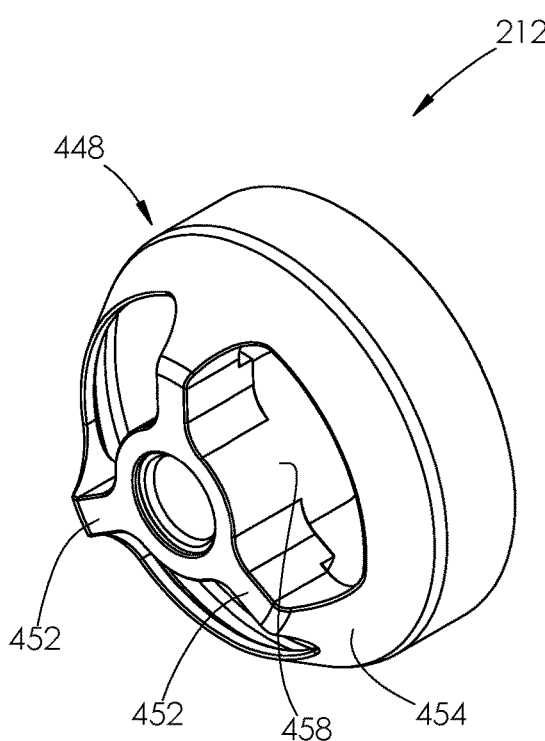
FIG. 69 is a rear perspective view of the suction valve guide shown in FIG. 68.
Figure 70:
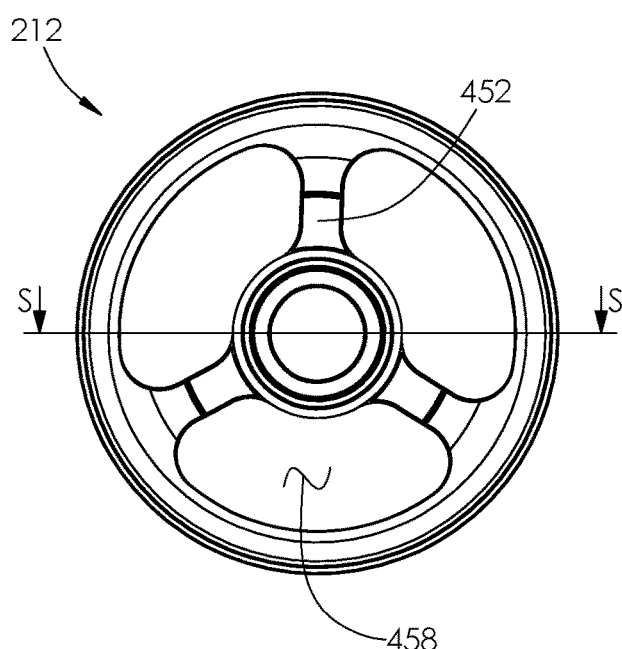
FIG. 70 is a front elevational view of the suction valve guide shown in FIG. 68.

Continuing with FIGS. 64-67, the discharge valve 138 is shown in more detail. The suction valve 214 has the same features as the discharge valve 138 so only the discharge valve 138 is shown in more detail in the figures. The discharge valve 138 comprises a stem 402 joined to a body 428. The body 428 comprises an outer rim 430 joined to a valve insert 432 by a tapered seating surface 434. An annular cutout 436 formed within the seating surface 434 is configured to house a seal 438, as shown in FIG. 67.

Continuing with FIGS. 40 and 41, during operation, the seating surface 434 and the seal 438 engage the seating surface 372 of the discharge surface 334 and block fluid from entering or exiting the discharge passages 360, as shown in FIG. 40. Likewise, the seating surface 434 and the seal 438 on the suction valve 214 engage the seating surface 366 of the suction surface 332 and block fluid from entering or exiting the suction passages 340, as shown in FIG. 41.

Continuing with FIGS. 40 and 41, when the seating surfaces 434 and 372 are engaged, the valve insert 432 extends partially into the counterbore 380 formed in the discharge surface 334. Fluid exiting the second openings 376 of the discharge passages 360 contacts the insert 432, pushing the discharge valve 138 away from the discharge surface 334 before flowing around the seating surface 434 of the discharge valve 138. Such motion enlarges the area for fluid to flow between the seating surfaces 372 and 434 before fluid reaches the surfaces 372 and 434, thereby reducing the velocity of fluid flow within such area. The lowered fluid velocity between the surfaces 372 and 434 causes any wear to the valve 138 or 214 to be concentrated at the insert 432 instead of the crucial sealing elements, thereby extending the life of the valve 138 or 214.

Likewise, the insert 432 on the suction valve 214 extends partially into the opening of the axially-blind bore 342. Fluid within the axially-blind bore 342 contacts the insert 432 before flowing around the seating surface 434 and seal 438 of the suction valve 214. Such motion enlarges the area for fluid to flow between the seating surfaces 366 and 434 before fluid reaches the surfaces 366 and 434, thereby reducing the velocity of fluid flow within such area.

Continuing with FIGS. 64-67, the stem 402 projects from a top surface 440 of the body 428 of the valve 138 or 214. The outer rim 430 surrounds the stem 402 and is spaced from the stem 402 by an annular void 442. A groove 444 is formed in the outer rim 430 for receiving a portion of a spring 446, as shown in FIGS. 40 and 41.

Continuing with FIGS. 40 and 41, during operation, the valves 138 and 214 move axially along the longitudinal axis 62 of the housing 60 between open and closed positions. In the closed position, the seating surface 434 and the seal 438 of each of the valves 138 and 214 tightly engage the corresponding seating surface 372 or 366 of the fluid routing plug 132 and the valve insert 432 is disposed within the corresponding bore 380 or 342. In the open position, the seating surface 434 and the seal 438 are spaced from the corresponding seating surface 372 or 366 of the fluid routing plug 132 and the valve insert 432 is spaced from the corresponding bore 380 or 342.

Suction Valve Guide

With reference to FIGS. 40, 41, and 68-71, axial movement of the suction valve 214 is guided by the suction valve guide 212. The suction valve guide 212 comprises a thin-walled skirt 448 joined to a body 450 by a plurality of support arms 452. The skirt 448 comprises a tapered upper section 454 joined to a cylindrical lower section 456. The plurality of arms 452 join the tapered upper section 454 to the body 450. A plurality of flow ports 458 are formed between adjacent arms 452 such that fluid may pass through the suction valve guide 212 during operation.

Continuing with FIGS. 40 and 41, the suction valve guide 212 is installed within the housing 60 such that the tapered upper section 454 engages a tapered surface 455 of the walls surrounding the horizontal bore 70. Such engagement prevents further axial movement of the suction valve guide 212 within the housing 60. When the suction valve guide 212 is installed within the housing 60, the skirt 448 covers the walls of the housing 60 positioned between the flow ports 458 and the fluid routing plug 132. During operation, fluid wears against the skirt 448, thereby protecting the housing 60 from wear and erosion. If the skirt 448 begins to erode, the suction valve guide 212 can be removed and replaced with a new guide 212.

Figure 71:
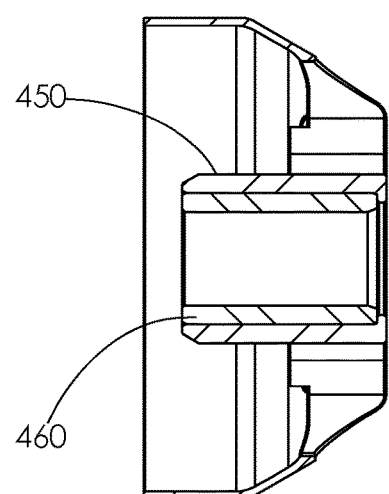
FIG. 71 is a cross-sectional view of the suction valve guide shown in FIG. 70, taken along line S-S.
Figure 72:
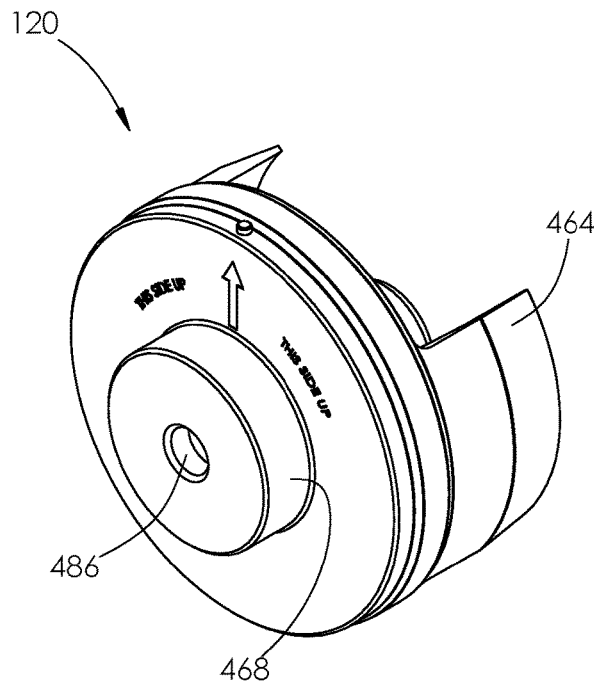
FIG. 72 is a front perspective view of the discharge plug shown in FIGS. 40 and 41.
Figure 73:
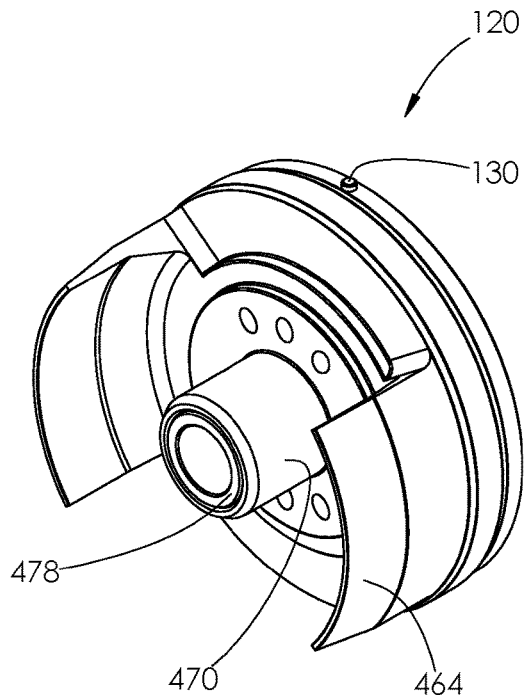
FIG. 73 is a rear perspective view of the discharge plug shown in FIG. 72.
Figure 74:
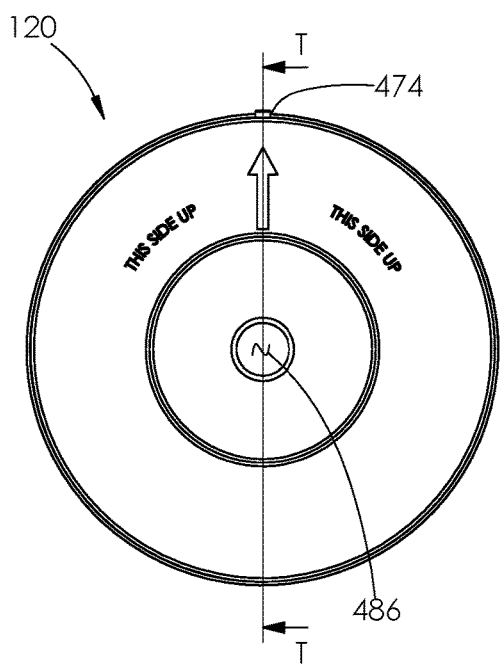
FIG. 74 is a front elevational view of the discharge plug shown in FIG. 72.

Continuing with FIGS. 40, 41, and 68-71, the body 450 of the suction valve guide 212 is tubular and is centered within the skirt 448. A tubular insert 460 is installed within the body 450, as shown in FIG. 71. The insert 460 is configured to receive the stem 402 of the suction valve 214, as shown in FIGS. 40 and 41. During operation, the stem 402 moves axially within the insert 460 and wears against the insert 460. An annular cutout 462 formed in the stem 402, shown in FIGS. 66 and 67, provides space for any fluid or other material trapped between the stem 402 and the insert 460. The insert 460 is made of a harder and more wear resistant material than the body 450 thereby extending the life of the suction valve guide 212. For example, if the body 450 is made of stainless steel, the insert 460 may be made of tungsten carbide.

Continuing with FIGS. 40 and 41, a spring 446 is positioned between the outer rim 430 of the suction valve 214 and the plurality of arms 452 such that the spring 446 surrounds at least a portion of the body 450 of the suction valve guide 212. During operation, the spring 446 biases the suction valve 212 in a closed position, as shown in FIG. 41. Fluid pushing against the valve insert 432 moves the suction valve 214 axially to compress the spring 446 and move the suction valve 214 to an open position, as shown in FIG. 40.

Discharge Plug

With reference to FIGS. 40, 41, and 72-75, axial movement of the discharge valve 138 is guided by the discharge plug 120. The discharge plug 120 comprises a pair of legs 464 joined to a body 466. The body 466 comprises a front portion 468 joined to a rear portion 470 by a medial portion 472. The medial portion 472 has a larger outer diameter than both the front and rear portions 468 and 470. An outer surface of the medial portion 472 engages the seal 126 installed within the first section 72 of the housing 60, as shown in FIGS. 40 and 41. The pair of legs 464 are joined to the medial portion 472 and extend between the medial portion 472 and the discharge surface 334 of the fluid routing plug 132.

Continuing with FIGS. 40, 41, and 72-75, a dowel opening 474 is formed in the outer surface of the medial portion 472 for receiving the locating dowel pin 130. The discharge plug 120 is installed within the first section 72 of the housing 60 such that the locating dowel pin 130 is installed within the dowel opening 474 formed in the medial portion 472 and the locating cutout 128 formed in the first section 72 of the housing 60. Such installation aligns the discharge plug 120 within the housing 60 so that the pair of legs 464 do not block the openings of the upper and lower discharge bores 102 and 104.

Continuing with FIGS. 40 and 41, the locating cutout 128 may be large enough to provide sufficient clearance for installation of the locating dowel pin 130 within the locating cutout 128. The locating cutout 128 is sized to allow maximum clearance for assembly, but still maintain an acceptable rotational position of the discharge plug 120. For example, the cutout 128 may be a maximum of 15 degrees wide along the circumference of the horizontal bore 70.

Figure 75:
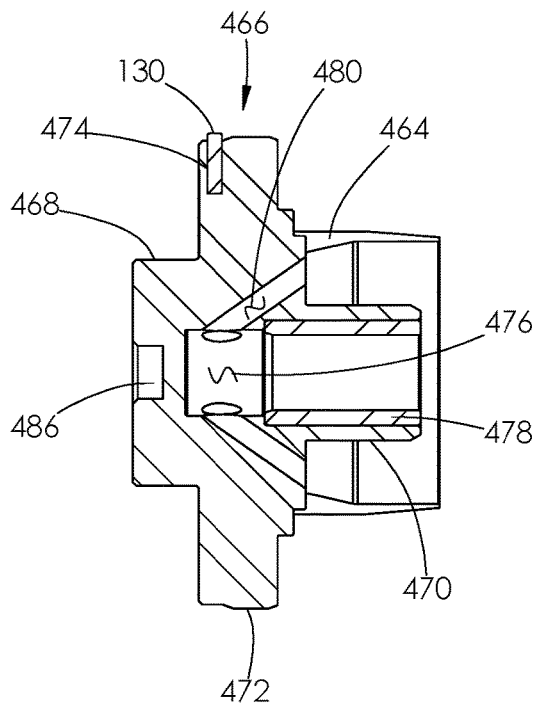
FIG. 75 is a cross-sectional view of the discharge plug shown in FIG. 74, taken along line T-T.

Continuing with FIG. 75, an axially-blind bore 476 extends within the body 466 and opens on the rear portion 470 of the body 466. The bore 476 is sized to receive a tubular insert 478. The tubular insert 478 is similar to the tubular insert 460 installed within the suction valve guide 212. The tubular insert 478 is configured to receive the stem 402 of the discharge valve 138, as shown in FIGS. 40 and 41.

Continuing with FIGS. 40, 41, and 75, during operation, the stem 402 moves axially within the tubular insert 478. A plurality of passages 480 are formed in the body 466 and interconnect the bore 476 and an outer surface of the medial portion 472. During operation, any fluid or other material trapped within the bore 476 exits the discharge plug 120 through the passages 480. A spring 446 is positioned between the medial portion 472 of the plug 120 and the outer rim 430 of the discharge valve 138, as shown in FIGS. 40 and 41. The spring 446 biases the discharge valve 138 in the closed position, as shown in FIG. 40. Fluid pushing against the valve insert 432 moves the discharge valve 138 axially to compress the spring 446 and move the discharge valve 138 to an open position, as shown in FIG. 41.

Continuing with FIGS. 40, 41, 72, and 75, the front portion 468 of the body 466 is sized to be disposed within a counterbore 482 formed within the front retainer 118. When disposed therein, a rear surface 484 of the front retainer 118 abuts an outer surface of the medial portion 472 of the discharge plug 120, as shown in FIGS. 40 and 42. Such engagement holds the discharge plug 120 in place between the front retainer 118 and the fluid routing plug 132. A blind bore 486 is formed in an outer surface of the front portion 468 of the plug 120. The blind bore 486 is configured to engage a tool used to help install or remove the plug 120 from the housing 60. For example, the bore 486 may have threaded walls.

Front Retainer

With reference to FIGS. 40, 41, 76, and 77, the front retainer 118 comprises opposed front and rear surfaces 488 and 484 joined by an outer surface having external threads 124 and a horizontal bore 490 formed therein. The horizontal bore 490 comprises a hex portion 492 that opens in the counterbore 482, as shown in FIGS. 40 and 41. The hex portion 492 is configured to mate with a tool used to thread the front retainer 118 into the housing 60 until it abuts the discharge plug 120, as shown in FIGS. 40 and 41. An annular void 494 is formed within the front surface 488 of the front retainer 118. The annular void 494 decreases the weight of the front retainer 118, making it easier to thread into the housing 60.

Discharge Conduits and Manifold

With reference to FIG. 41, each discharge fitting 108 comprises a support base 502 and a connection end 512. A discharge fitting adapter 504 is installed within the counterbore 106 formed in the upper and lower discharge bores 102 and 104. When installed, the seal 112 engages an outer surface of the fitting adapter 504. A groove 505 is formed with the discharge fitting 108 for receiving a second seal 507. The second seal 507 likewise engages an outer surface of the fitting adapter 504.

Continuing with FIG. 41, the support base 502 is sized to abut the outer intermediate surface 68 of the first section 72 of the housing 60. The support base 502 comprises a plurality of passages 506, shown in FIG. 29, configured to align with the threaded openings 114 formed in the intermediate surface 68 and surrounding the discharges bores 102 and 104. The threaded fasteners 116 are installed within the aligned passages 506 and openings 114 and tightened to secure the discharge fitting 108 to the first section 72.

With reference to FIGS. 3 and 41, the connection end 512 of the discharge fitting 108 is configured to mate within one or more discharge conduits 500 included in an upper or lower discharge manifold 514 or 516, as shown in FIG. 3. The upper and lower discharge manifolds 514 and 516 are supported on rack 518, as shown in FIG. 3. The fluid end assembly 52 is disposed within the interior open area of the rack 518. The rack 518 supports the upper and lower discharge manifolds 514 and 516 in a spaced position from the discharge bores 102 and 104. As a result, each discharge conduit 500 has an angled or bent shape. In operation, fluid discharges from the housing 60 through upper and lower discharge bores 102 and 104 and is carried to the corresponding upper or lower discharge manifolds 514 or 516 by the discharge fittings and conduits 108 and 500.

Suction Conduits and Manifold

Figure 78:
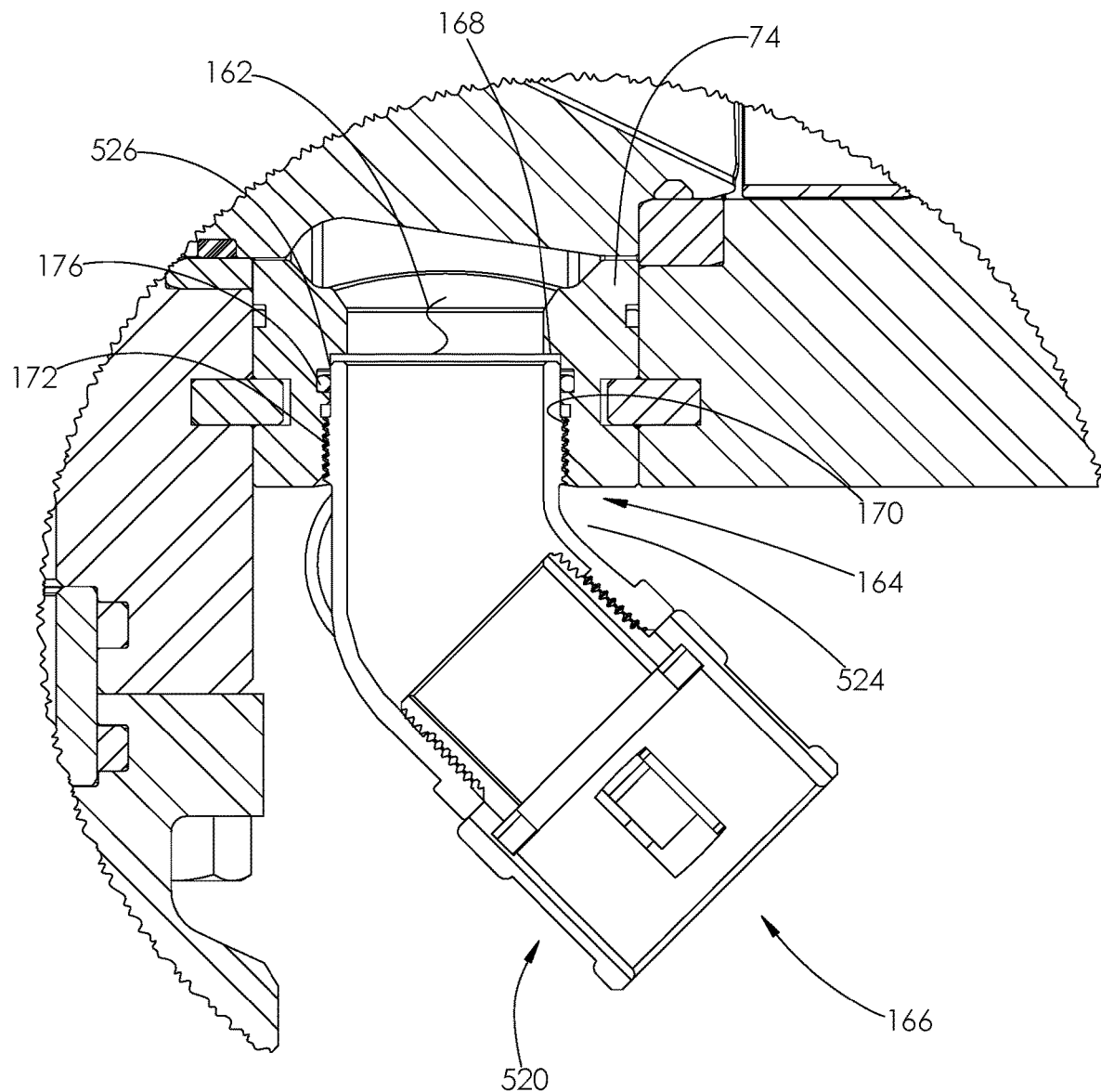
FIG. 78 is an enlarged view of area U shown in FIG. 41.
Figure 79:
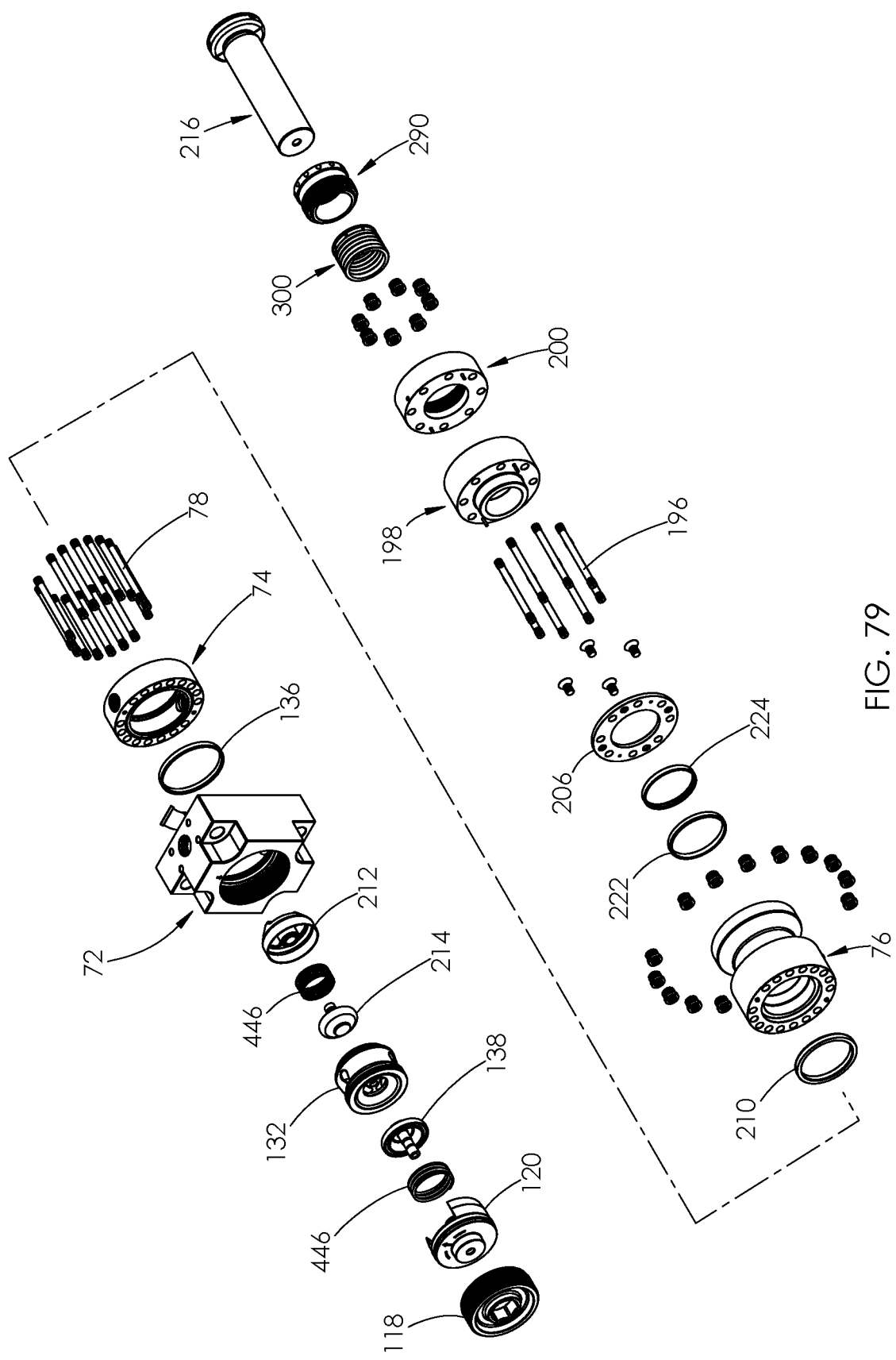
FIG. 79 is a front perspective and exploded view of the fluid end section shown in FIGS. 9, 29, 40, and 41.

With reference to FIGS. 41 and 78, each suction conduit 166 comprises the first connection member 164 joined to a second connection member 520 by threads, as shown in FIG. 78. The first and second connection members 164 and 520 may be made of a metal or hardened material.

Continuing with FIG. 78, the first connection member 164 comprises upper portion 524 joined to a lower portion 526. External threads 172 are formed on a portion of the lower portion 526 for mating with the internal threads 170 formed in the suction bores 160 or 162. The seal 176 installed within the housing 60 engages a cylindrical outer surface of the lower portion 526 below the external threads 172. The upper portion 524 has a larger outer diameter than the lower portion 526 and is positioned outside of the housing 60. The lower portion 526 abuts the counterbore 168 of the suction bores 160 and 162 of the second section 74 of the housing 60.

With reference to FIGS. 3 and 78, the second connection member 520 is configured to mate with one or more connection members or hoses 528 formed on an upper or lower suction manifold 530 or 532. The upper and lower suction manifolds 530 and 532 are supported on the rack 518 adjacent the discharge manifolds 514 and 516. The connection members or hoses 528 may be flexible so that they may bend, as needed, to properly interconnect the suction conduits 166 and the suction manifolds 530 and 532. In operation, fluid is drawn into the housing 60 from the suction manifolds 530 and 532 via the connection members 528, the suction conduits 166, and the upper and lower suction bores 160 and 162.

Assembly of Fluid End Section and Assembly

Turning to FIGS. 9, 29, 79, and 80, prior to assembling the housing 60, the wear ring 136 is preferably first pressed into the counterbore 134 formed in the first section 72 of the housing 60. Likewise, the hardened insert 210 is pressed into the counterbore 208 formed in the third section 76 of the housing 60. The seals 126, 112, and 176 may also be installed within the first and second sections 72 and 74 of the housing 60. The wear ring 222 and seal 224 may also be installed within the third section 76 of the housing 60 prior to assembling the housing 60.

Following installation of the above described components, the housing 60 may be assembled as described above. Thereafter, the retention plates 206, stuffing box 198, rear retainer 200, plunger packing 300, and packing nut 290 may be attached to the rear surface 66 of the housing 60. The inner components of the housing 60 are inserted within the housing 60 through the front surface 64 of the first section 72. The inner component may be installed prior to attaching the components to the rear surface 66 of the housing 60, if desired. Following assembly of each fluid end section 56, each section 56 is attached to the power end assembly 54 using the stay rods 58.

Each fluid end section 56 and its various components are heavy and cumbersome. Various tools or lifting mechanisms may be used to assemble the fluid end assembly 52 and attach it to the power end assembly 54, creating the high pressure pump 50.

Operation of Fluid End Assembly

Turning back to FIGS. 40 and 41, in operation, retraction of the plunger 216 out of the housing 60 pulls fluid from the upper and lower suction bores 160 and 162 into the suction passages 340 within the fluid routing plug 132. Fluid flowing through the suction passages 340 and into the axially-blind bore 342 pushes on the valve insert 432 of the suction valve 214, causing the valve 214 to compress the spring 446 and move to an open position, as shown in FIG. 40. When in the open position, fluid flows around the suction valve 214 and the suction valve guide 212 and into the open horizontal bore 70 within the third section 76 of the housing 60.

Continuing with FIG. 41, extension of the plunger 216 further into the housing 60 pushes against fluid within the open horizontal bore 70 and forces the fluid towards the suction surface 332 of the fluid routing plug 132. Such motion also causes the suction valve 214 to move to a closed position, sealing the opening of the axially-blind bore 342. Because the bore 342 is sealed, fluid is forced into the discharge passages 360.

Fluid flowing through the discharge passages 360 contacts the valve insert 432 on the discharge valve 138, causing the discharge valve 138 to compress the spring 446 and move into an open position, as shown in FIG. 41. When in the open position, fluid flows around the discharge valve 138 and into the upper and lower discharge bores 102 and 104. Because fluid exiting the discharge passages 360 has been compressed by extension of the plunger 216 into the housing 60, such fluid has a higher fluid pressure than that entering the housing 60 through the suction bores 160 and 162.

Figure 1:
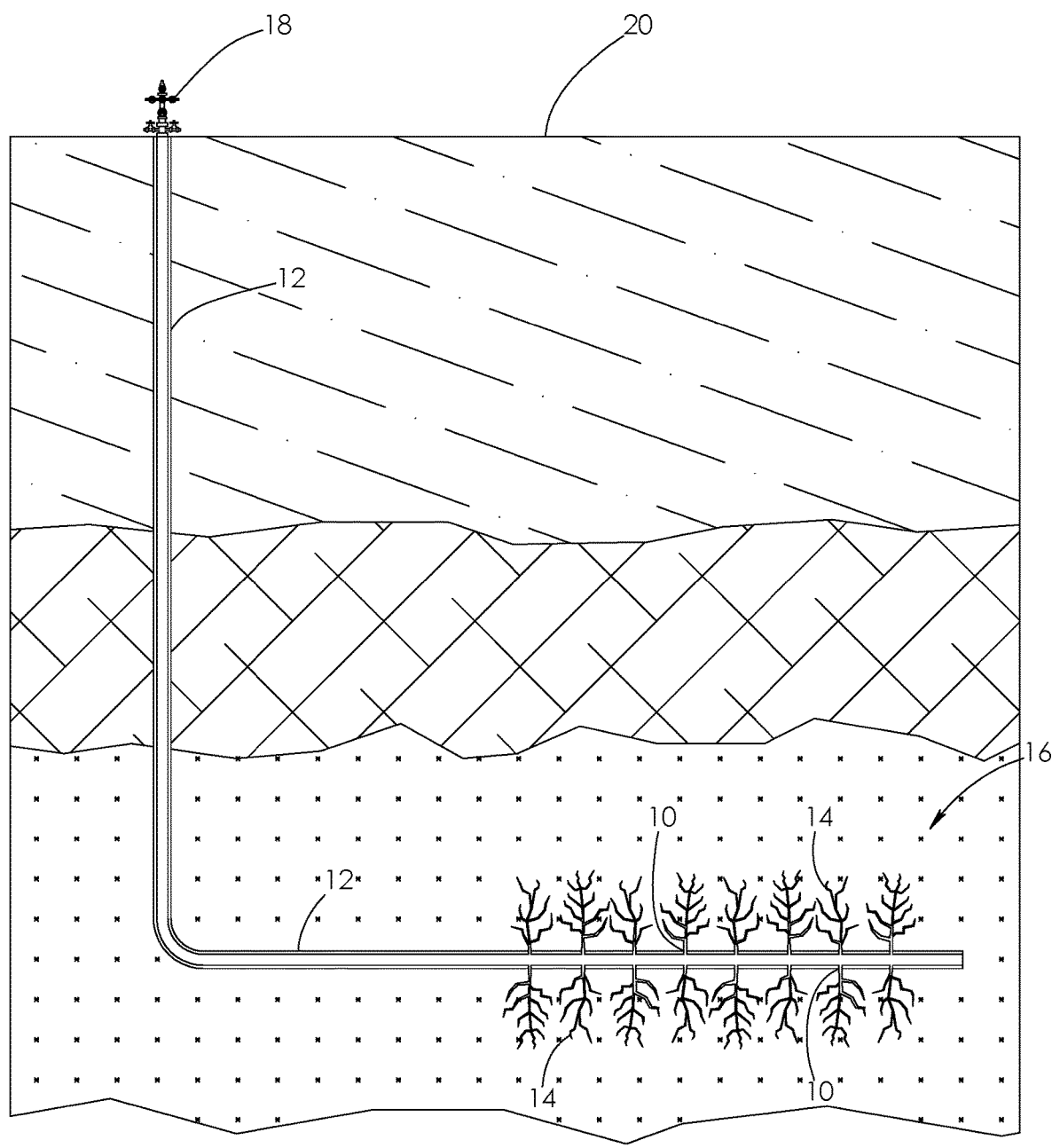
FIG. 1 is an illustration of the underground environment of a hydraulic fracturing operation.
Figure 2:
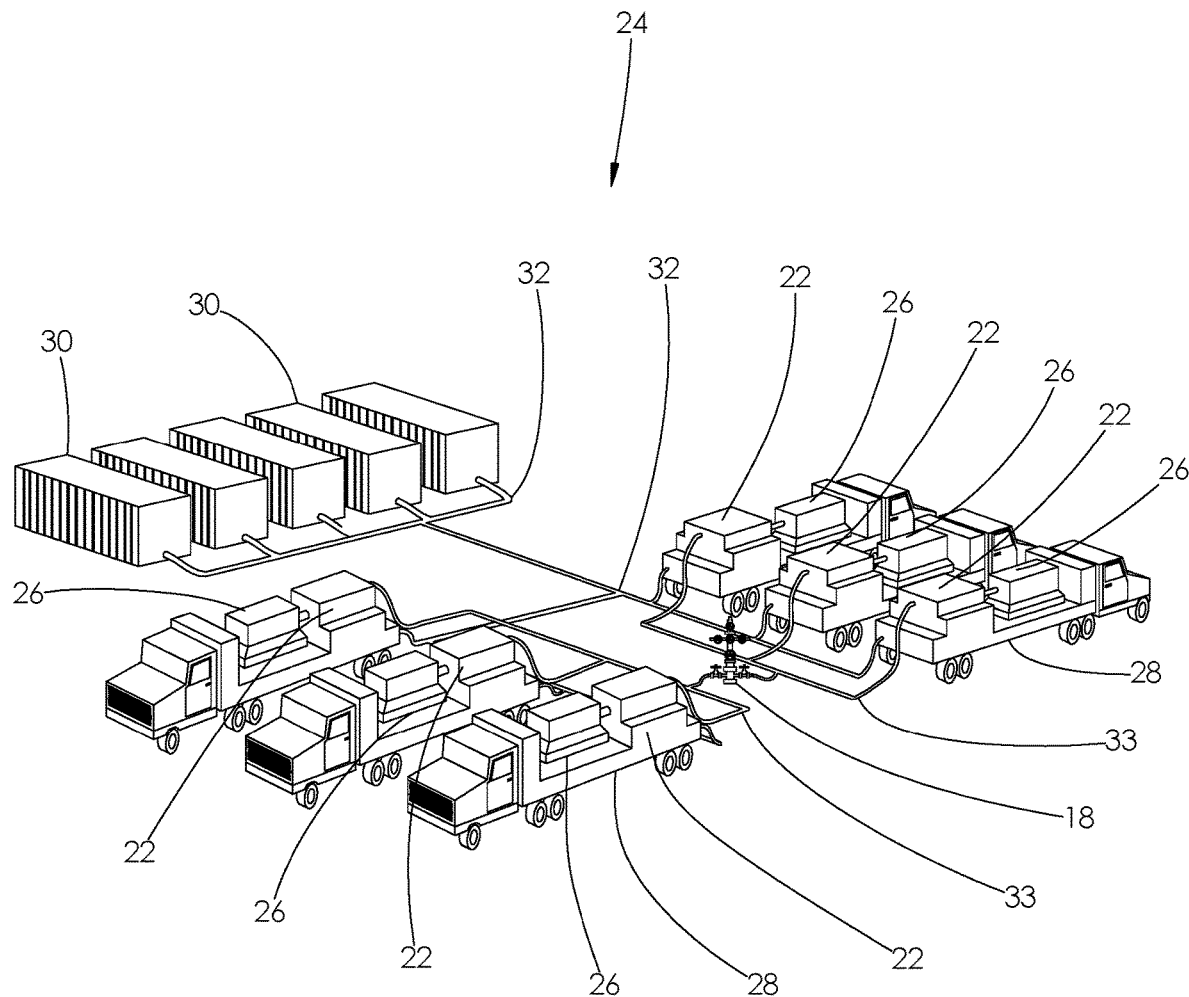
FIG. 2 illustrates above-ground equipment used in a hydraulic fracturing operation.

During operation, the plunger 216 continually reciprocates within the housing 60, pressuring all fluid drawn into the housing 60 through the suction bores 160 and 162. Pressurized fluid exiting the housing 60 through the upper and lower discharge bores 102 and 104 is delivered to the upper and lower discharge manifolds 514 and 516 in communication with each of the fluid end sections 56. Pressurized fluid within the discharge manifolds 514 and 516 is eventually delivered to the wellhead 18, as shown in FIG. 2.

Power End Assembly

Turning now to FIGS. 81-141, the power end assembly 54 is shown in more detail. The power end assembly 54 comprises a crank section 600 joined to a crosshead section 602 by a plurality of stay rods 604, as shown in FIG. 84. The stay rods 604 may be characterized as a plurality of first stay rods or a first set of stay rods 604, while the stay rods 58, shown in FIGS. 4, 5, and 83, may be characterized as a plurality of second stay rods or a second set of stay rods 58. As will be described in more detail herein, the first set of stay rods 604 secure the components of the power end assembly 54 together, while the second set of stay rods 58 secure the fluid end assembly 52 to the power end assembly 54.

Continuing with FIGS. 82-84, as will be described in more detail herein, the crank section 600 is configured to house a crankshaft 606, and the crosshead section 602 is configured to house a plurality of crossheads 608. Each crosshead 608 is supported within a crosshead guide 610 and is attached to the crankshaft 606 by a connecting rod 612. Rotation of the crankshaft 606 causes the connecting rod 612 to reciprocate the crosshead 608 within the crosshead guide 610. A pony rod 322 interconnects each plunger 216 within a corresponding one of the crossheads 608. As the crosshead 608 reciprocates within the crosshead guide 610, the crosshead 608 causes the pony rod 322 and connected plunger 216 to reciprocate, thereby reciprocating the plunger 216 within each fluid end section 56. The various components of the power end assembly 54 will now be described in more detail.

CRANK SECTION

Crank Frame

With reference to FIGS. 85-93, the crank section 600 comprises a crank frame 616 made of a single casting or of single-piece construction. The crank frame 616 comprises opposed front and rear surfaces 618 and 620 joined by inner and outer intermediate surfaces 622 and 624, as shown in FIGS. 87 and 89. The inner intermediate surface 622 defines a plurality of support members 626 sized to receive and support the crankshaft 606, as shown in FIG. 95. The outer intermediate surface 624 comprises opposed first and second sides 628 and 630 and upper and lower surfaces 632 and 634.

Continuing with FIGS. 87, 89, and 90, the crank frame 616 comprises four support members 626 equally spaced between the first and second sides 628 and 630 of the frame 616. Together, the support members 626 and sides 628 and 630 define five rectangular shaped cavities 636 formed within the crank frame 616. As will be discussed in more detail herein, each cavity 636 is sized to receive a corresponding one of the connecting rods 612, as shown in FIG. 82.

Continuing with FIGS. 87-90, and 93, a plurality of passages 638 are formed in the crank frame 616 adjacent its upper and lower surfaces 632 and 634. Each passage 638 interconnects the front and rear surfaces 618 and 620 of the frame 616 and is sized to receive one of the first stay rods 604 in a one-to-one relationship, as shown in FIG. 112. The passages 638 are positioned such that four passages 638 surround a single cavity 636, two passages 638 are adjacent the upper corners of the cavity 636 and two passages 638 are adjacent the lower corners of the cavity 636, as shown in FIGS. 87 and 89.

Continuing with FIGS. 87, 88, and 92, the front surface 618 of the crank frame 616 further comprises a plurality of bosses 640. The bosses 640 are features formed on the sides of each support member 626 and configured so that a flat circular surface lies flush with the front surface 618 of the frame 616. Four bosses 640 surround each cavity 636. As will be described in more detail herein, the bosses 640 are configured to engage an end of each second stay rod 58.

Continuing with FIG. 88, each boss 640 is surrounded on the front surface 618 by a groove 642. The groove 642 is configured to house an O-ring seal 644. The seals 644 prevent lubricant contained within the power end assembly 54 from leaking between the various components of the assembly 54. A rectangular shaped groove 646 is also formed in the front surface 618 around each cavity 636. The groove 646 is configured to house a seal 648. The seal 648 likewise prevents lube from leaking between the components of the assembly 54.

Continuing with FIGS. 85, 87 and 91, the upper surface 632 of the crank frame 616 comprises one or more lube ports 650. The lube ports 650 connect with a lubrication system 652 supported on the upper surface 632, as shown in FIG. 85. Lube is supplied to the crankshaft 606 during operation through the lube ports 650. A lube reservoir 654 is formed in a base 656 of each cavity 636 for collecting lubricant during operation, as shown in FIG. 87. An opening 658 is formed in the center of each lube reservoir 654. As will be described in more detail herein, each opening 658 drains into the lubrication system 652.

Continuing with FIGS. 91-93, the lower surface 634 of the crank frame 616 comprises a plurality of integrally formed feet 660 projecting from the front and rear surfaces 618 and 620 of the frame 616. The feet 660 are configured to support the frame 616 on a base section 662, as shown in FIG. 83.

Continuing with FIGS. 87, 89, and 91-94, the first and second sides 628 and 630 and the inner support members 626 each comprise a circular shaped bearing opening 666. The bearing openings 666 are sized to each receive a roller bearing 668, as shown in FIG. 94. The roller bearings 668 are secured within each opening 666 by a plurality of brackets 667. The brackets 667 are secured to the sides 628 and 630 and the support members 626 using a plurality of fasteners 669. Each roller bearing 668 is sized to receive a portion of the crankshaft 606, as shown in FIG. 95.

Crankshaft

Turning to FIGS. 96-99, the crankshaft 606 comprises a plurality of bearing journals 670 and a plurality of rod journals 672. The crankshaft 606 is bounded by a first end journal 676 and an opposed second end journal 678. Adjacent bearing journals 670 are joined by one of the rod journals 672. Adjacent rod journals 672 are offset from one another. A plurality of interconnecting lube ports 674 are formed within the bearing journals 670 and the rod journals 672. Together the lube ports 674 form a continuous lube pathway throughout the crankshaft 606.

Continuing with FIGS. 96 and 97, each bearing journal 670 comprises a plurality of threaded openings 671. The openings 671 are positioned around the periphery of each side of each bearing journal 670. Each opening 671 is configured to receive a threaded fastener 673, as shown in FIG. 95.

With reference to FIGS. 95 and 100, the crankshaft 606 is installed within the crank frame 616 such that each bearing journal 670 is supported within a corresponding one of the roller bearings 668. Each bearing journal 670 is held within a corresponding roller bearing 668 by a plurality of washers 675. A plurality of the washers 675 are attached to each side of each bearing journal 670 using the fasteners 673. Each washer 675 extends past the periphery of each bearing journal 670 and engages an edge of the corresponding roller bearing 668. Such engagement on both sides of each bearing journal 670 and roller bearing 668 prevents lateral movement of each bearing journal 670 relative to the corresponding roller bearing 668.

Continuing with FIGS. 85, 86, 95, and 100, when the crankshaft 606 is installed within the crank frame 616, each bearing journal 670 is rotatable within the corresponding roller bearing 668. The first end journal 676 is supported within the opening 666 formed within first side 628 of the frame 616, as shown in FIG. 86. The first end journal 676 is configured to attach to a gearbox section 678 of the power end assembly 54, as shown in FIG. 85. Rotation of the crankshaft 606 is powered by an engine (not shown) attached to the gearbox section 678. The second end journal 678 is supported within the roller bearing 668 on the second side 630 of the frame 616, as shown in FIG. 100. The second end journal 678 may be protected by a cover (not shown) attached to the second side 630 of the frame 616.

Continuing with FIGS. 82 and 95, when the crankshaft 606 is installed within the crank frame 616, each rod journal 672 spans between adjacent support members 626 and is accessible within the corresponding cavity 636, as shown in FIG. 95. Each connecting rod 612 attaches to a corresponding one of the rod journals 672 within each cavity 636, as shown in FIG. 82.

Crosshead Section

Turning back to FIGS. 85 and 86, the crosshead section 602 has the same or almost the same height and width as the crank section 600. The crosshead section 602 is positioned offset from and in front of the crank section 600 such that the power end assembly 54 has the general shape of a rectangular prism. The crosshead section 602 comprises a plurality of the crosshead guides 610 situated in a side-by-side relationship. Five crosshead guides 610 are shown in FIGS. 85 and 86. Each crosshead guide 610 corresponds with one of the cavities 636 formed within the crank frame 616. By using individual crosshead guides 610, a single guide 610 may be removed and replaced with a new guide 610, if needed, without replacing the entire crosshead section 602 of the assembly 54.

Crosshead Guide

Continuing with FIGS. 101-112, each crosshead guide 610 is configured to receive one of the crossheads 608 in a one-to-one relationship, as shown in FIGS. 111 and 112. Each crosshead guide 610 has the general shape of a rectangular prism and comprises opposed front and rear surfaces 682 and 684 joined by an outer intermediate surface 686 and a bore 688 formed therein, as shown in FIGS. 101-110. The bore 688 shown in FIGS. 101-112 is horizontally positioned.

Continuing with FIGS. 101-112, the outer intermediate surface 686 of the crosshead guide 610 comprises upper and lower surfaces 690 and 692 and opposed side surfaces 694. A plurality of first passages 696 are formed in the guide 610 adjacent the upper and lower surfaces 690 and 692, as shown in FIGS. 101-105. Each first passage 696 interconnects the front and rear surfaces 682 and 684 and is configured to receive one of the first stay rods 604, as shown in FIG. 112. Four first passages 696 are shown in FIGS. 101-104, two passages 696 adjacent the upper surface 690 and two passages 696 adjacent the lower surface 692. The first passages 696 are positioned such that they align with the plurality of passages 638 formed in the crank frame 616, as shown in FIG. 112.

Continuing with FIGS. 101-104, 106, and 113, a plurality of second passages 698 are also formed in each crosshead guide 610. The second passages 698 interconnect the front and rear surfaces 682 and 684 of the guide 610 and are configured to receive a plurality of the second stay rods 58 in a one-to-one relationship, as shown in FIG. 113. The second passages 698 are positioned between the horizontal bore 688 and the plurality of first passages 696 such that the first and second passages 696 and 698 are vertically offset from one another. Four second passages 698 are shown in FIGS. 101-104, two passages 698 closer to the upper surface 690 and two passages 698 closer to the lower surface 692 of the crosshead guide 610.

Continuing with FIGS. 101, 102, and 107, the front surface 682 of the crosshead guide 610 further comprises a plurality of threaded openings 700. The threaded openings 700 surround an opening of the horizontal bore 688 and are configured to receive a plurality of fasteners 702 in a one-to-one relationship, as shown in FIG. 86. The fasteners 702 are configured to secure a pony rod seal plate 704 to the front surface 682 of the crosshead guide 610, as shown in FIG. 86.

Continuing with FIGS. 103, 104, 107, and 108, the crosshead guide 610 further comprises a plurality of exhaust vents 706 formed therein. Each vent 706 interconnects the horizontal bore 688 and the rear surface 684 of the guide 610. Three vents 706 are shown in FIGS. 103 and 104. Two vents 706 are positioned between the horizontal bore 688 and the upper surface 690, and a third vent 706 is positioned between the horizontal bore 688 and the lower surface 692. In operation, any air pressure accumulating within the horizontal bore 688 is vented into the open space within the crank frame 616 through one or more of the vents 706, as shown in FIG. 111.

With reference to FIGS. 85, 104, 107-109, and 111, the crosshead guide 610 further comprises a lube port 708 configured to receive lube from the lubrication system 652, as shown in FIG. 85. The lube port 708 interconnects the upper surface 690 and the horizontal bore 688 of the crosshead guide 610, as shown in FIGS. 107 and 111. In operation, lubricant delivered to the crosshead 608 from the lube port 708 eventually drains from the crosshead guide 610 and into the crank frame 616 via one or more of the vents 706 and/or the horizontal bore 688, as shown in FIG. 111. Lubricant is prevented from leaking around the crosshead guide 610 by a plurality of O-ring seals 710 and 712, as shown in FIG. 109. The seals 710 are installed within grooves 714 formed in the rear surface 684 of the guide 610 and surrounding the opening of the vents 706. The seal 712 is installed within a groove 716 formed in the rear surface 684 of the guide 610 and surrounding the opening of the horizontal bore 688.

Continuing with FIGS. 101-108, each crosshead guide 610 is heavy and made of a single casting or of single-piece construction and may require a lifting mechanism to maneuver. To reduce the weight of each crosshead guide 610 as much as possible, a plurality of non-symmetrically shaped holes 718 are formed with the crosshead guide 610 and interconnect the front and rear surfaces 682 and 684, as shown in FIGS. 105, 106, and 108. The holes 718 remove unnecessary raw material from each guide 610, thereby reducing its weight. Likewise, a plurality of cavities 720 are formed in the sides 694 of each crosshead guide 610, as shown in FIGS. 102 and 104. The cavities 720 remove unnecessary material from each guide 610, thereby reducing its weight.

Along the same lines, the upper and lower surfaces 690 and 692 of the crosshead guides 610 and the upper surface 632 of the crank frame 616 are shaped to conform to the shape of each of the plurality of first stay rods 604, as shown in FIG. 86. Shaping the surfaces 690 and 692 and 632 and 634 to conform to the shape of the stay rods 604 reduces unnecessary weight from the assembly 54.

Crosshead

Turning to FIGS. 111, 112, and 114-117, the crosshead 608 comprises opposed front and rear surfaces 722 and 724 joined by upper and lower surfaces 726 and 728 and opposed side surfaces 730, as shown in FIGS. 114-117. The upper and lower surfaces 726 and 728 are shaped to conform to the cylindrical walls of the horizontal bore 688 of the crosshead guide 610, as shown in FIGS. 111 and 112. The front surface 722 is configured to attach to a pony rod 322 and the rear surface 724 is sized to closely face a portion of the connecting rod 612, as shown in FIG. 111. The crosshead 608 is sized to be movable relative to the crosshead guide 610 and along a longitudinal axis 732 of the horizontal bore 688, as shown in FIGS. 111 and 112.

Continuing with FIGS. 111, 112, and 121-123, a bore 734 is formed within the crosshead 608 and interconnects the opposed side surfaces 730, as shown in FIGS. 115 and 116. When the crosshead 608 is installed within the guide 610, the bore 734 extends at a right angle relative to the bore 688 formed in the guide 610, as shown in FIGS. 111 and 112. The bore 734 is sized to closely receive a cylindrical bearing 736, as shown in FIGS. 121-123. The bearing 736 is secured within the bore 734 by a plurality of brackets 738 and fasteners 739. The bearing 736 is sized to closely receive a cylindrical wrist pin 740. The wrist pin 740 is rotatable relative to the bearing 736.

Continuing with FIGS. 118-123, the wrist pin 740 comprises opposed side surfaces 742 joined by a cylindrical intermediate surface 744. A pair of notches 746 are formed in each of the sides 742. Each notch 746 exposes a flat medial surface 748 formed within the wrist pin 740. A plurality of passages 750 are formed within the wrist pin 740 and extend along a diameter of the wrist pin 740. Each passage 750 interconnects the medial surface 748 and the cylindrical outer intermediate surface 744. The passages 750 are configured to receive a plurality of fasteners 752 in a one-to-one relationship. When the wrist pin 740 is installed within the bearing 736, the sides 742 project from the sides 730 of the crosshead 608 such that the passages 750 are positioned outside of the crosshead 608, as shown in FIG. 123.

Connecting Rod

Continuing with FIGS. 111, 112, and 121-123, the connecting rod 612 comprises a crosshead connection end 754 joined to a crankshaft connection end 756 by an elongate body 758. The crosshead connection end 754 comprises opposed yoke arms 760 projecting from a medial surface 762, as shown in FIGS. 121 and 122. The yoke arms 760 are U-shaped and are sized to mate with the cylindrical outer intermediate surface 744 of the wrist pin 740. A plurality of threaded openings 764 are formed in a front surface 766 of each yoke arm 760. The openings 764 are positioned to align with the passages 750 formed within the wrist pin 740. A fastener 752 is installed within each aligned passage 750 and opening 764 to secure the connecting rod 612 to the wrist pin 740, as shown in FIG. 112. When secured together, the medial surface 762 of the crosshead connection end 754 of the connecting rod 612 faces and is in a spaced-relationship with the rear surface 724 of the crosshead 608, as shown in FIG. 111.

Continuing with FIGS. 112 and 121, a dowel opening 768 formed within each front surface 766 of each yoke arm 760 aligns with dowel openings 770 formed in the cylindrical outer intermediate surface 744 of the wrist pin 740. The openings 768 and 770 are configured to receive alignment dowels 772, as shown in FIG. 112. The alignment dowels 772 properly align the threaded openings 764 and passages 750 during assembly.

Continuing with FIGS. 111 and 112, when the connecting rod 612 is rigidly attached to the wrist pin 740, the connecting rod 612 and wrist pin 740 move together relative to the crosshead 608. The wrist pin 740 is rotatable within the bearing 736 while the elongate body 758 of the connecting rod 612 is pivotable relative to the crosshead 608.

Continuing with FIGS. 111, 112, and 121-123, while the crosshead connection end 754 is integral with the body 758 of the connecting rod 612, the crankshaft connection end 756 comprises multiple pieces. The crankshaft connection end 756 is configured to clamp around a corresponding one of the rod journals 672 of the crankshaft 606. The crankshaft connection end 756 comprises front and rear clamp sections 774 and 776. The front clamp section 774 is integrally formed with the body 758 of the connecting rod 612, while the rear clamp section 776 is a separate piece. The crankshaft connection end 756 further comprises a split ring bearing 778 configured to be positioned intermediate the rod journal 672 and the clamp sections 774 and 776, as shown in FIG. 111.

Continuing with FIGS. 111, 112, and 121-123, the split ring bearing 778 is sized to closely surround the rod journal 672. A semi-circular recess 780 is formed within each clamp section 774 and 776, as shown in FIGS. 121 and 122. Each recess 780 is sized to closely receive a portion of the ring bearing 778. A plurality of threaded openings 782 are formed in a rear surface 784 of the front clamp section 774, as shown in FIG. 122. The openings 782 correspond with a plurality of passages 786 formed in the rear clamp section 776, as shown in FIG. 122. Each passage 786 opens into a notch 788 formed in an outer surface of the rear clamp section 776.

Continuing with FIGS. 111, 112, and 123, a plurality of fasteners 790 are installed within each pair of aligned openings 782 and passages 786 and tightened to tightly clamp the split ring bearing 778 and the clamp sections 774 and 776 around the rod journal 672. The split ring bearing 778 allows the crankshaft connection end 756 of the connecting rod 612 to rotate relative to the rod journal 672 while the body 758 of the connecting rod 612 pivots relative to the rod journal 672.

Pony Rod

Continuing with FIGS. 121-123, the pony rod 322 comprises an elongate cylindrical body 792 having a plunger connection end 794 and an opposed crosshead connection end 796. The crosshead connection end 796 comprises an integrally formed plate 798. The plate 798 is sized to mate with the front surface 722 of the crosshead 608. The plate 798 is secured to the front surface 722 of the crosshead 608 using a plurality of fasteners 800. When secured thereto, the elongate body 792 of the pony rod 322 projects away from the crosshead 608 and is positioned along the longitudinal axis 732 of the bore 688 formed within the crosshead guide 610 and is positioned along the longitudinal axis 62 of the horizontal bore 70 formed within the fluid end section 56, as shown in FIG. 82. The plunger connection end 794 of the pony rod 322 is configured to be secured to an end of the plunger 216 using the clamp 324. When secured together, the plunger 216 and pony rod 322 are aligned and both extend along the longitudinal axes 732 and 70, as shown in FIG. 82.

Pony Rod Seal Plate

With reference to FIGS. 86 and 124-128, the opening of the bore 688 on the front surface 682 of each guide 610 is sealed by the pony rod seal plate 704, as shown in FIG. 86. The plate 704 comprises opposed front and rear flanged portions 802 and 804 joined by an intermediate portion 806 and a central passage 808 formed therein, as shown in FIGS. 124-128. The intermediate portion 806 has a greater outer diameter than the front and rear flanged portions 802 and 804.

Continuing with FIGS. 112 and 127, a groove 810 is formed in the outer surface of the rear flanged portion 804 for housing a seal 812, as shown in FIG. 127. The rear flanged portion 804 is sized to be closely received within the bore 688 of the guide 610, as shown in FIG. 112. The rear flanged portion 804 is installed within the bore 688 until the intermediate portion 806 abuts the front surface 682 of the guide 610. When installed therein, the seal 812 engages the walls of the horizontal bore 688 and prevents lubricant from leaking around the plate 704.

Continuing with FIGS. 86, 110, 111, and 124-128, the intermediate portion 806 is shaped to not interfere with the plurality of second passages 698 formed in the crosshead guide 610, as shown in FIG. 86, and comprises a plurality of passages 814. Each passage 814 is positioned to align with one of the threaded openings 700 formed in the front surface 682 of the guide 610. The fasteners 702 are installed within the aligned passages 814 and openings 700 to secure the plate 704 to the guide 610, as shown in FIGS. 86 and 111.

Continuing with FIGS. 111 and 128, the central passage 808 comprises a counterbore 816 configured to receive a seal 818. The seal 818 is sized to engage an outer surface of the pony rod 322 and prevent lubricant from leaking around the pony rod 322 during operation, as shown in FIG. 111. The seal 818 is retained within the counterbore 816 by a retainer plate 820 having a central opening 822 formed therein. The retainer plate 820 is secured to the front flanged portion 802 of the pony rod seal plate 704 using a plurality of fasteners 824, as shown in FIG. 128. The pony rod 322 is disposed within the central passage 808 of the seal plate 704 and the central opening 822 of the retainer plate 820. During operation, only the seal 818 engages the outer surface of the pony rod 322, as shown in FIG. 111.

Operation of Crank and Crosshead Sections

With reference to FIG. 82, during operation, rotation of the crankshaft 606 causes the connecting rod 612 to pivot about the wrist pin 740 while reciprocating along the longitudinal axis 732 of the bore 688. As the connecting rod 612 moves, it reciprocates the crosshead 608 back and forth along the longitudinal axis 732 of the horizontal bore 688. Thus, the crankshaft 606 and the connecting rod 612 are configured to translate rotational movement of the crankshaft 606 into linear movement of the crosshead 608. Reciprocal movement of the crosshead 608 thereby causes reciprocal movement of both the pony rod 322 and the plunger 216.

Support Plates

Turning back to FIGS. 83-86, the power end assembly 54 further comprises a central support plate 830, a rear support plate 832, and a plurality of upper and lower front support plates 834 and 836. The support plates 830, 832, 834, and 836 provide stability to the assembly 54 as well as areas for supporting assembly of the first and second stay rods 604 and 58, as shown in FIGS. 83 and 84.

Central Support Plate

With reference to FIGS. 129, 130, and 134, the central support plate 830 is positioned between the crosshead section 602 and the crank section 600. The central support plate 830 is a single-integral piece or is of single-piece construction and has the same or about the same height and width as the crosshead and crank sections 602 and 600. The various openings formed in the central support plate 830 match the size, shape, and position of the various openings formed in the rear surface 684 of each crosshead guide 610.

Continuing with FIGS. 112, 129, and 130, the central support plate 830 comprises a plurality of crosshead openings 838 positioned in a side-by-side relationship. Each opening 838 corresponds with an opening of the bore 688 of each crosshead guide 610. The central support plate 830 also comprises a plurality of first passages 840 and a plurality of threaded passages 842. The first passages 840 align with the passages 638 formed in the crank frame 616 and the first passages 696 formed in each crosshead guide 610. The aligned passages 696, 840, and 638 are configured to receive the plurality of first stay rods 604 in a one-to-one relationship, as shown in FIG. 112.

Continuing with FIGS. 113 and 129, a plurality of threaded passages 842 are also formed in the central support plate 830. The threaded passages 842 align with the second passages 698 formed in each crosshead guide 610 and align with the bosses 640 formed on the crank frame 616. The aligned passages 698 and 842 are configured to receive the plurality of second stay rods 58 in a one-to-one relationship, as shown in FIG. 113.

Continuing with FIGS. 111, 129, and 135, the central support plate 830 further comprises a plurality of upper and lower vent openings 844. The vent openings 844 correspond with the vent openings 706 formed on the rear surface 684 of each crosshead guide 610, as shown in FIG. 111. The central support plate 830 further comprises a plurality of dowel openings 846. The dowel openings 846 align with dowel openings 848 formed in the front surface 618 of the crank frame 616 and dowel openings 850 formed in the rear surface 684 of each crosshead guide 610. The dowel openings 846, 848, and 850 are configured to receive alignment dowels 852 used to properly align the components during assembly, as shown in FIG. 135.

In alternative embodiments, screws may be used in place of some or all of the alignment dowels to retain the central support plate 830 to the crank frame 616 until the crosshead guides 610 are installed. In such embodiment, the corresponding dowel openings 848 are threaded so as to accept the threaded screws.

Continuing with FIG. 130, when the central support plate 830 is pressed against the crank frame 616, the seals 644 around the bosses 640 and the rectangular seal 648 around each cavity 636 seal against the plate 830. Likewise, when the central support plate 830 is pressed against the crosshead guides 610, the seals 710 around the opening of each vent 706 and the seal 712 around the opening of the horizontal bore 688 seal against the plate 830. The seals 644, 648, 710, and 712 prevent lubricant from leaking between the various components, thereby helping lubricant to drain into the lube reservoirs 654, shown in FIG. 87, formed in the crank frame 616.

Rear Support Plate

Turning to FIGS. 100 and 131, the rear support plate 832 is attached to the rear surface 620 of the crank frame 616. The rear support plate 832 is of single-piece construction and is the same or about the same height and width as the crank frame 616. The rear support plate 832 comprises a plurality of maintenance openings 854 positioned in a side-by-side relationship, as shown in FIG. 131. The openings 854 correspond with the openings of each cavity 636, shown in FIG. 89, formed in the rear surface 620 of the crank frame 616.

Continuing with FIGS. 100 and 131, the rear support plate 832 further comprises a plurality of passages 856. The passages 856 align with the passages 638 formed in the crank frame 616 and are configured to receive the first stay rods 604 in a one-to-one relationship, as shown in FIG. 112. A plurality of aligned openings 858 and 860 are formed in the rear support plate 832 and the rear surface 620 of the crank frame 616 for receiving fasteners 862, as shown in FIGS. 86 and 100. The fasteners 862 align and secure the rear support plate 832 to the crank frame 616 during assembly.

Continuing with FIGS. 100, 103, and 135, the rear support plate 832 also comprises a plurality of threaded openings 864 surrounding each maintenance opening 854. The threaded openings 864 are configured to receive a plurality of fasteners 866. The fasteners 866 are configured to secure a cover 868 over each of the maintenance openings 854. Each cover 868 comprises a plurality of holes 870 configured to align with the threaded openings 864 in the rear support plate 832, as shown in FIG. 135. The covers 868 seal the rear surface 620 of the crank frame 616 from the outside environment. During operation, one or more of the covers 868 may be removed to access the interior of the crank frame 616, if needed.

With reference to FIGS. 89 and 135, a rectangular groove 872 for housing a rectangular seal 874, shown in FIG. 135, is formed around each opening of each cavity 636 in the rear surface 620 of the crank frame 616, as shown in FIG. 89. When the rear support plate 832 is pressed against the rear surface 620 of the crank frame 616, the seal 874 seals against the plate 832, preventing any lubricant from leaking between the components.

Upper and Lower Front Support Plates

Turning to FIGS. 132-134, each upper front support plate 834 and each lower front support plate 836 correspond with one of the crosshead guides 610 in a one-to-one relationship. The front support plates 834 and 836 provide stability to the power end assembly 54 as well as area to secure each first stay rod 604 to the assembly 54. By using a plurality of front support plates 834 and 836, only a single upper front support plate 834 and a single lower front support plate 836 needs to be removed to remove a single crosshead frame 610 from the assembly 54.

Continuing with FIGS. 112, 113, and 132, each upper front support plate 834 corresponds to the shape of the upper portion of the crosshead frame 610 and comprises a first pair of openings 880. Each first opening 880 aligns with the first passages 696 formed in the crosshead guide 610 adjacent its upper surface 690 and is configured to receive a corresponding one of the first stay rods 604, as shown in FIG. 112. Each upper front support plate 834 further comprises a second pair of openings 882. Each second opening 882 aligns with the second passages 698 formed in the crosshead guide 610 between the horizontal bore 688 and the upper surface 690, as shown in FIG. 113. The second openings 882 are configured to receive a corresponding one of the second stay rods 58.

Continuing with FIGS. 112, 113, and 133, each lower front support plate 836 corresponds to the shape of the lower portion of the crosshead frame 610 and comprises a first pair of openings 884. Each first opening 884 aligns the first passages 696 formed in the crosshead guide 610 adjacent its lower surface 692 and is configured to receive a corresponding one of the first stay rods 604, as shown in FIG. 112. Each lower front support plate 836 further comprises a second pair of openings 886. Each second opening 886 aligns with the second passages 698 formed in the crosshead guide 610 between the horizontal bore 688 and the lower surface 692, as shown in FIG. 113. The second openings 886 are configured to receive a corresponding one of the second stay rods 58.

Continuing with FIG. 86, while the crank frame 616 and the crosshead guides 610 may be made of ductile iron or alloy steel, the support plates 830, 832, 834, and 836 may be made of stronger and more wear resistant materials, such as stainless steel. Reserving the heavier materials for the areas bearing the most load during operation helps reduce the overall cost and weight of the assembly 54.

First Set of Stay Rods

With reference to FIGS. 112 and 135, the power end assembly 54 is assembled by inserting each first stay rod 604 through the aligned openings 880 or 884 and passages 696, 840, 638, and 856 formed in the front support plates 834 or 836, crosshead guides 610, central support plate 830, crank frame 616, and rear support plate 832, as shown in FIG. 112. Each first stay rod 604 is pushed through the aligned components until a rear end 890 of each first stay rod 604 projects from a rear surface 892 of the rear support plate 834, and a front end 894 of each first stay rod 604 projects from a front surface 896 of each front support plate 834 or 836.

With reference to FIG. 136, threads are formed on the rear end 890 of each first stay rod 604 for mating with a threaded blind nut 898. The blind nut 898 is turned on the first stay rod 604 until the rear end 890 bottoms out on an inner base 900 of the blind nut 898. A hole 902 is formed in the base 900 of the blind nut 898 for monitoring the position of the first stay rod 604 during assembly and operation.

With reference to FIG. 137, threads are formed on the front end 894 of each first stay rod 604 for mating with a three-piece fastener 904. The three-piece fastener 904 comprises a washer 906, an outer castle nut 908, and an inner nut 910. The washer 906 has a flat outer surface and a splined inner surface 912. When positioned over the front end 894, a flat rear surface 914 of the washer 906 abuts the upper or lower front support plates 834 or 836.

Continuing with FIG. 137, the inner nut 910 comprises an inner threaded surface 916 that mates with outer threads on the front end 894 of the first stay rod 604. The inner nut 910 further comprises a splined outer surface 918 positioned adjacent a threaded outer surface 920. The splined outer surface 918 mates with the splined inner surface 912 of the washer 906. The outer nut 908 comprises a threaded inner surface 922 that mates with the threaded outer surface 920 of the inner nut 910. A flat rear surface 924 of the outer nut 908 abuts a flat front surface 926 of the washer 906.

In operation, as the outer nut 908 is turned, the inner nut 910 moves axially away from the front support plates 834 or 836, thereby applying a tensile load to the first stay rod 604. The engagement of the splined surfaces 918 and 912 between the inner nut 910 and the washer 906 rotationally couples the inner nut 910 to the washer 906. Such coupling prevents the inner nut 910 from turning while providing a solid reaction point for turning the outer nut 908.

Continuing with FIGS. 134 and 135, the construction of the three-piece fastener 904 allows the fastener 904 to load the first stay rods 604 in tension with only a minimal amount of torsional stress. By reducing the amount of torsional stress applied to the first stay rod 604, the life of the stay rod 604 is increased. The construction of the three-piece fastener 904 also applies a repeatable tensile force to each first stay rod 604 when a known torque is applied to the fastener 904.

Continuing with FIG. 112, during assembly, the three-piece fastener 904 is turned until it tightly engages the corresponding front support plate 834 or 836 and the blind nut 898 tightly engages the rear support plate 832, thereby securing the components of the power end assembly 54 together. The various components are compressed together, thereby distributing the load applied to the assembly during operation throughout the various components of the assembly 54. Greater distribution of the load during operation reduces stress to the various components, thereby increasing the lifespan of the assembly 54.

Second Set of Stay Rods

Turning to FIGS. 83 and 113, the second set of stay rods 58 are configured to secure the fluid end assembly 52 to the power end assembly 54. Each second stay rod 58 is inserted through the corresponding aligned opening 882 or 886 and passage 698 formed in the front support plates 834 or 836 and the crosshead guide 610 until it reaches the threaded passage 842 formed in the central support plate 830.

Continuing with FIG. 113, a rear end 928 of each second stay rod 58 is threaded and configured to thread into the threaded passage 842 formed in the central support plate 830. Each second stay rod 58 is turned until the rear end 928 is fully threaded within each threaded passage 842 and bottoms out on the corresponding boss 640 formed in the crank frame 616. When installed therein, the front end 84 of each second stay rod 58 projects from the front surface 896 of each front support plate 834 or 836, as shown in FIG. 85.

Continuing with FIGS. 83, 85, and 113, the sleeves 94 are installed on each second stay rod 58 projecting from the front support plates 834 and 836. Each sleeve 94 is aligned with the front support plates 834 and 836 using one of the dowel sleeves 93, as shown in FIGS. 113 and 134. As discussed above, the front end 84 of each second stay rod 58 attaches to the first section 72 of the housing 60, thereby securing each fluid end section 56 to the power end assembly 54. Using a second set of stay rods 58 to attach the fluid end assembly 52 to the power end assembly 54 allows the second set of stay rods 58 to be vertically offset from the first set of stay rods 604. Moving the second set of stay rods 58 closer to the longitudinal axes 732 of the crosshead section 602 reduces stress and deflection between the fluid end assembly 52 and the power end assembly 54 during operation, thereby increasing the life span of the assemblies 52 and 54.

Base Section, Lubrication System, and Gearbox Section

Turning to FIGS. 138-141, the base section 662 comprises a skid assembly 930 comprising a front beam 932 and an opposed rear beam 934 joined by opposed first and second side beams 936 and 938, as shown in FIG. 139. The side beams 936 and 938 are further joined by first and second crossbeams 940 and 942. The plurality of feet 660 on the lower surface 634 of the crank frame 616 are supported on and attached to the side and rear beams 936, 938, and 934 and the second crossbeam 942 using a plurality of fasteners 944. As will be described in more detail herein, each crosshead guide 610 is supported on the first crossbeam 940 using a jack screw 946.

Continuing with FIG. 83, during operation, the pony rods 322 and plungers 216 reciprocate over the front beam 932 of the skid assembly 930. The majority of the fluid end assembly 52 is held above the ground surface and in offset position from the skid assembly 930 by the second stay rods 58.

Continuing with FIGS. 139 and 140, a lubrication tank 948 is formed between the rear beam 934 and the second crossbeams 942. The tank 948 is sealed by a cover 950. The cover 950 is secured to the inner walls of the tank 948 using a plurality of fasteners 952. A plurality of openings 954 are formed in the tank 948 and are centrally situated along a length of the cover 950. Each opening 954 is situated below one of the lube reservoirs 654 formed in each cavity 636, as shown in FIG. 140. Each opening 954 is interconnected with the opening 658 formed in each lube reservoir 654 via a conduit 956, as shown in FIG. 140. During operation, lube draining into each lube reservoir 654 flows into the lubrication tank 948 via the conduits 956.

Continuing with FIG. 139, the skid assembly 930 further comprises a conduit 958 attached to the second crossbeam 940 and in fluid communication with the lubrication tank 948. The conduit 958 interconnects the lubrication tank 948 and the various hoses and conduits of the lubrication system 652 positioned on the outer surface of the power end assembly 54, as shown in FIG. 85. Lubricant collecting within the lubrication tank 948 flows into the conduit 958 where it is eventually redirected back into the crank section 600 and the crosshead section 602 of the assembly 54. Thus, during operation, lubricant is continually recycled through the assembly 54.

Continuing with FIGS. 140 and 141, the lower surface 692 of each crosshead guide 610 is supported on the first crossbeam 940 by a jack screw 946. The jack screw 946 comprises an upper support surface 960 attached to a threaded nut 962. A threaded screw 964 is installed within the threaded nut 962 and a threaded connector 968 secured within the first crossbeam 940. The screw 964 is held in a desired position by a jam nut 966 engaged with the connector 968. The lower surface 692 of the crosshead guide 610 rests on the support surface 960 of the jack screw 946. The support surface 960 is raised or lowered by turning the threaded screw 964 in a clockwise or counterclockwise direction. When the support surface 960 is at the desired height, the jack screw 946 is secured in place by tightening the jam nut 966 against the connector 968.

During assembly of the power end assembly 54, the space between the skid assembly 930 and the lower surface 692 of each crosshead guide 610 may vary slightly for each guide 610. Thus, if each guide 610 were supported on a pad of the same height, the crosshead section 602 may not be level, leading to wear or damage during operation. By supporting each crosshead guide 610 on an adjustable jack screw 946, the space between each guide 610 and the skid assembly 930 can be modified, as needed, to keep the crosshead section 602 level during operation.

Continuing with FIGS. 85, 138, and 139, the skid assembly 930 further comprises a plurality of gearbox support beams 970. The gearbox support beams 970 project from the second side beam 938 and align with the first side 628 of the crank frame 616. The gearbox section 678 attaches to the support beams 970 and the first side 628 of the crank frame 616, as shown in FIG. 85.

With reference to FIGS. 85 and 100, the gearbox section 678 comprises an input shaft 664, shown in FIG. 85, and a drive shaft 972, shown in FIG. 100. The shafts 664 and 972 are mechanically connected via a series of intermeshed gears supported within a gearbox 974. The drive shaft 972 is further attached to the crankshaft 606, and the input shaft 664 is attached to an engine (not shown). In operation, the engine powers rotation of the input shaft 664, which in turn rotates the drive shaft 972. Rotation of the drive shaft 972 in turn powers rotation of the crankshaft 606. Other components (not shown) may be installed between the engine and the input shaft 664 to maximize efficiency.

In alternative embodiments, the fluid end assembly described herein may comprise one or more of the features included in the fluid end assembly described in the '173 application. In further alternative embodiments, the fluid end assembly described herein may include one more embodiments or features of the fluid ends, fluid routing plugs, or packing seal assemblies described in the following applications: U.S. patent application Ser. No. 17/884,712, authored by Thomas et al., and filed on Aug. 10, 2022, U.S. patent application Ser. No. 17/884,736, authored by Son et al., and filed on Aug. 10, 2022, and U.S. patent application Ser. No. 17/884,757, authored by Barnett et al, and filed of Aug. 10, 2022, the entire contents of all of which are incorporated herein by reference. In even further alternative embodiments, the power end assembly described herein may comprise one or more of the features included in the power end assembly described in the '453 application.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. An apparatus, comprising:
   a modular power end assembly secured together by a plurality of first stay rods, each of the plurality of first stay rods traversing a length of the modular power end assembly and terminating at opposed first and second ends of the modular power end assembly;
   a modular fluid end assembly comprising:
      a variable pressure section comprising at least one suction valve; and
      a constant pressure section attached to the variable pressure section and comprising at least one discharge bore;
      a stuffing box engaging the variable pressure section and having opposed first and second surfaces, the stuffing box further having a central passage and a plurality of passages formed therein, the plurality of passages surrounding the central passage; and in which the central passage and each of the plurality of passages open on the first surface of the stuffing box;
      a plurality of fasteners, each fastener disposed within a corresponding one of the plurality of passages and attaching the stuffing box to the variable pressure section;
      a plunger packing installed within the central passage of the stuffing box at the first surface of the stuffing box; and
      a packing nut attached to the stuffing box and engaging the plunger packing; and
   a plurality of second stay rods, each of the plurality of second stay rods projecting from the first end of the modular power end assembly and attached to the constant pressure section of the fluid end assembly.

2. The apparatus of claim 1, in which the variable pressure section of the fluid end assembly is positioned between the constant pressure section of the fluid end assembly and the first end of the modular power end assembly such that the variable pressure section is positioned adjacent the plurality of second stay rods.

3. The apparatus of claim 1, in which the plurality of second stay rods comprises:
   a plurality of upper second stay rods; and
   a plurality of lower second stay rods, each lower second stay rod in a spaced-relationship with each upper second stay rod;
   in which the variable pressure section of the fluid end assembly is positioned intermediate the plurality of upper second stay rods and the plurality of lower second stay rods.

4. The apparatus of claim 1, in which the fluid end assembly further comprises:
   a plurality of fluid end sections positioned in a side-by-side relationship, each fluid end section comprising:
      an individual variable pressure section comprising a suction valve; and
      an individual constant pressure section attached to the individual variable pressure section and comprising a discharge bore;
   in which the variable pressure section of the fluid end assembly comprises a plurality of the individual variable pressure sections and the at least one suction valve is one of the suction valves included within in one of the individual variable pressure sections;
   in which the constant pressure section of the fluid end assembly comprises a plurality of the individual constant pressure sections and the at least one discharge bore is one of the discharge bores formed in one of the individual constant pressure sections.

5. The apparatus of claim 4, in which each individual constant pressure section further comprises:
   a first portion attached to a second portion;
   in which the first portion has the discharge bore formed therein and houses at least a portion of a fluid routing plug;
   in which the second portion comprises at least one suction bore; and
   in which the second portion is positioned intermediate the first portion of the constant pressure section and the variable pressure section.

6. The apparatus of claim 1, in which the modular fluid end assembly further comprises:
   a retainer engaging the stuffing box and attached to the variable pressure section using the plurality of fasteners; in which the packing nut is installed within the retainer.

7. The apparatus of claim 4, in which a length of each individual variable pressure section is greater than a length of each individual constant pressure section.

8. The apparatus of claim 1, in which the modular power end assembly comprises:
   a crank section comprising a crank shaft; and
   a crosshead section offset from the crank section and comprising a plurality of crossheads.

9. The apparatus of claim 8, wherein the modular power end assembly further comprises:
   a rear support plate; and
   a central support plate;
   in which the plurality of first stay rods traverse the rear support plate, the crank section, the central support plate, and the crosshead section;
   in which the crank section is disposed between the rear support plate and the central support plate;
   in which the central support plate is disposed between the crosshead section and the crank section.

10. The apparatus of claim 9, wherein the modular power end assembly further comprises:
    a plurality of front support plates;
    in which the plurality of front support plates are traversed by the plurality of first stay rods; and
    in which the crosshead section is disposed between the plurality of front support plates and the central support plate.

11. The apparatus of claim 8, in which each of the plurality of crossheads comprises:
    a wrist pin disposed within a cavity formed in the crosshead; in which opposed ends of the wrist pin project from opposed sides of the crosshead;
    in which the modular power end assembly further comprises:
    a plurality of connecting rods, each connecting rod interconnecting the crank shaft and a corresponding one of the crossheads;
    in which each connecting rod is attached to the opposed ends of the wrist pin using a plurality of fasteners.

12. The apparatus of claim 8, in which each of the plurality of second stay rods traverses the crosshead section, but not the crank section.

13. The apparatus of claim 8, in which the modular power end assembly further comprises:
    a central support plate positioned between the crank section and the crosshead section;
    in which each of the plurality of second stay rods is attached to the central support plate and traverses the crosshead section, but not the crank section.

14. The apparatus of claim 1, further comprising:
    a sleeve disposed around each of the plurality of second stay rods and interposed between the constant pressure section of the fluid end assembly and the first end of the modular power end assembly.

15. The apparatus of claim 1, further comprising:
    an upper suction manifold attached to the modular fluid end assembly;
    a lower suction manifold attached to the modular fluid end assembly;
    an upper discharge manifold attached to the modular fluid end assembly; and
    a lower discharge manifold attached to the modular fluid end assembly.

16. The apparatus of claim 15, in which the upper and lower suction manifolds are attached to the fluid end assembly by a plurality of suction conduits; in which the upper and lower discharge manifolds are attached to the modular fluid end assembly by a plurality of discharge conduits; and in which the plurality of suction conduits and the plurality of discharge conduits are made of a flexible material.

17. The apparatus of claim 1, in which the plurality of second stay rods are in a spaced-relationship with the variable pressure section of the fluid end assembly.

18. The apparatus of claim 1, in which at least a portion of each of a plurality of a reciprocating plungers are installed within the variable pressure section.

19. The apparatus of claim 1, in which the variable pressure section is attached to the constant pressure section using a plurality of fasteners.

20. The apparatus of claim 1, in which the constant pressure section comprises a high pressure constant pressure section joined to a low pressure constant pressure section by a plurality of fasteners; and in which the high pressure constant pressure section comprises at least one discharge bore and the low pressure constant pressure section comprises at least one suction bore.

21. The apparatus of claim 1, in which the stuffing box is of a single-piece construction.

22. The apparatus of claim 1, in which a plurality of threaded openings are formed within the variable pressure section of the modular fluid end assembly, the plurality of threaded openings aligned with the plurality of passages formed in the stuffing box in a one-to-one relationship; and in which the plurality of fasteners are installed within a corresponding one of the plurality of threaded openings.

23. An apparatus, comprising:
a fluid end assembly configured to be attached to a power end assembly using a plurality of stay rods, the fluid end assembly comprising:
a housing having a plurality of through-bores formed therein, each through-bore configured to receive a corresponding one of the plurality of stay rods such that an end of each of the plurality of stay rods is positioned adjacent a front surface of the fluid end assembly;
a stuffing box attached to the housing and having opposed first and second surfaces, the stuffing box further having a central passage and a plurality of passages formed therein, the plurality of passages surrounding the central passage; and in which the central passage and each of the plurality of passages open on the first surface of the stuffing box;
a plurality of fasteners, each fastener disposed within a corresponding one of the plurality of passages and attaching the stuffing box to the housing;
a plunger packing installed within the central passage of the stuffing box at the first surface of the stuffing box; and
a packing nut attached to the stuffing box and engaging the plunger packing.

24. The apparatus of claim 23, in which the power end assembly has opposed front and rear surfaces, the front surface of the power end assembly facing a rear surface of the fluid end assembly, the apparatus further comprising:
a front support plate configured to be attached to the front surface of the power end assembly using a plurality of rods; and
in which at least a portion of at least one of the plurality of stay rods is configured to be disposed within the front support plate.

25. The apparatus of claim 24, in which each of the plurality of rods is configured to extend between the front and rear surfaces of the power end assembly.

26. The apparatus of claim 24, in which the front support plate is one of a plurality of front support plates, each front support plate configured to be attached to the front surface of the power end assembly using the plurality of rods.

27. The apparatus of claim 24, in which the plurality of stay rods are characterized as a set of second stay rods; and in which the plurality of rods are characterized as a set of first of stay rods.

28. The apparatus of claim 23, further comprising:
a plurality of nuts, each nut configured to be attached to a corresponding one of the ends of the plurality of stay rods positioned adjacent the front surface of the fluid end assembly.

29. The apparatus of claim 23, in which a threaded opening is formed in the housing adjacent the front surface of the fluid end assembly, the fluid end assembly further comprising:
a front retainer having a threaded outer surface and installed within the threaded opening formed in the housing.

30. The apparatus of claim 29, in which the ends of the plurality of stay rods are positioned adjacent the front retainer when the ends of the plurality of stay rods are positioned adjacent the front surface of the fluid assembly.

31. The apparatus of claim 23, in which the fluid end assembly further comprises:
a rear retainer attached to the stuffing box using the plurality of fasteners, in which the packing nut is installed within a central passage formed in the rear retainer.

32. The apparatus of claim 23, in which the stuffing box is of a single-piece construction.

33. The apparatus of claim 23, in which a plurality of threaded openings are formed within the housing, the plurality of threaded openings aligned with the plurality of passages formed in the stuffing box in a one-to-one relationship; and in which the plurality of fasteners are installed within a corresponding one of the plurality of threaded openings.

* * * * *

UNITED STATES PATENT AND TRADEMARK OFFICE
CERTIFICATE OF CORRECTION

| | | |
|---|---|---|
| PATENT NO. | : 12,018,662 B2 | Page 1 of 1 |
| APPLICATION NO. | : 17/952729 | |
| DATED | : June 25, 2024 | |
| INVENTOR(S) | : Keith et al. | |

It is certified that error appears in the above-identified patent and that said Letters Patent is hereby corrected as shown below:

On the Title Page

Page 2, Item (63) Under the Related U.S. Application Data section, please insert --provisional application No. 62/936,789, filed on Nov. 18, 2019--.

Page 2, Item (63) Under the Related U.S. Application Data section, please insert --provisional application No. 62/940,513, filed on Nov. 26, 2019--.

Signed and Sealed this
Twentieth Day of August, 2024

Katherine Kelly Vidal
*Director of the United States Patent and Trademark Office*